US007450827B2

(12) United States Patent
Tanaka et al.

(10) Patent No.: US 7,450,827 B2
(45) Date of Patent: *Nov. 11, 2008

(54) RECORDING MEDIUM AND SIGNAL PROCESSING APPARATUS

(75) Inventors: Yoshiaki Tanaka, Fujisawa (JP); Shoji Ueno, Fujisawa (JP); Norihiko Fuchigami, Yamato (JP)

(73) Assignee: Victor Company of Japan, Ltd., Yokohama (JP)

( * ) Notice: Subject to any disclaimer, the term of this patent is extended or adjusted under 35 U.S.C. 154(b) by 912 days.

This patent is subject to a terminal disclaimer.

(21) Appl. No.: 10/767,076

(22) Filed: Jan. 30, 2004

(65) Prior Publication Data

US 2004/0184782 A1 Sep. 23, 2004

(51) Int. Cl.
*H04N 5/00* (2006.01)
*H04N 5/91* (2006.01)
*H04N 7/00* (2006.01)

(52) U.S. Cl. .......................... 386/125; 386/95; 386/126

(58) Field of Classification Search ................... 386/96, 386/46, 95, 125–126
See application file for complete search history.

(56) References Cited

U.S. PATENT DOCUMENTS

| | | | | |
|---|---|---|---|---|
| 5,301,040 A * | 4/1994 | Hoshi et al. | ................. | 358/465 |
| 5,313,443 A | 5/1994 | Iitsuka | | |
| 5,825,899 A | 10/1998 | Yamaguchi | | |
| 5,953,290 A | 9/1999 | Fukuda et al. | | |
| 5,987,417 A * | 11/1999 | Heo et al. | ................... | 704/500 |
| 6,222,983 B1 | 4/2001 | Heo | | |
| 6,262,777 B1 | 7/2001 | Brewer et al. | | |
| 6,636,474 B1 | 10/2003 | Tanaka et al. | | |
| 6,738,561 B1 | 5/2004 | Tanaka et al. | | |

FOREIGN PATENT DOCUMENTS

| | | |
|---|---|---|
| EP | 0714098 | 5/1995 |
| EP | 0677848 | 10/1995 |
| EP | 0795870 | 9/1997 |
| EP | 0797197 | 9/1997 |
| EP | 0817195 | 1/1998 |
| EP | 0855715 | 7/1998 |
| EP | 0856849 | 8/1998 |
| EP | 0867877 | 9/1998 |
| EP | 0892404 | 1/1999 |
| EP | 0910082 | 4/1999 |

(Continued)

OTHER PUBLICATIONS

"Outline of DVD Standard" by M. Moriva et al; National Technical Report, vol. 43, No. 3, Jun. 1997; pp. 223-229.
"DVD-Audio Format" by E. Funasaka; An Audio Engineering Society Preprint, Sep. 1997; pp. 1-8.

(Continued)

*Primary Examiner*—Thai Tran
*Assistant Examiner*—Daquan Zhao
(74) *Attorney, Agent, or Firm*—Louis Woo

(57) ABSTRACT

A digital signal recording disc has a first area storing an audio title set. The audio title set has data representing audio information and data representing a still picture. The audio title set is void of a pack of data for playback control. The first area also stores information for managing the audio title set. The digital signal recording disc is void of a second area storing a video title set and information for managing the video title set.

4 Claims, 84 Drawing Sheets

FOREIGN PATENT DOCUMENTS

| | | |
|---|---|---|
| JP | 07-105630 | 4/1995 |
| JP | 08-008754 | 1/1996 |
| JP | 09120645 | 5/1997 |
| JP | 09120647 | 5/1997 |
| WO | WO 97 15924 | 5/1997 |

OTHER PUBLICATIONS

Von Logneysen, Ulrich:"DVD-Audio: PCM GEGEN Bitstream-Recording" Funkschau, Franzis-Verlag K.D. Munchen, DE, No. 6, Feb. 28, 1997, pp. 56-59, XP000688422 ISSN: 0016-2841.

* cited by examiner

FIG. 5

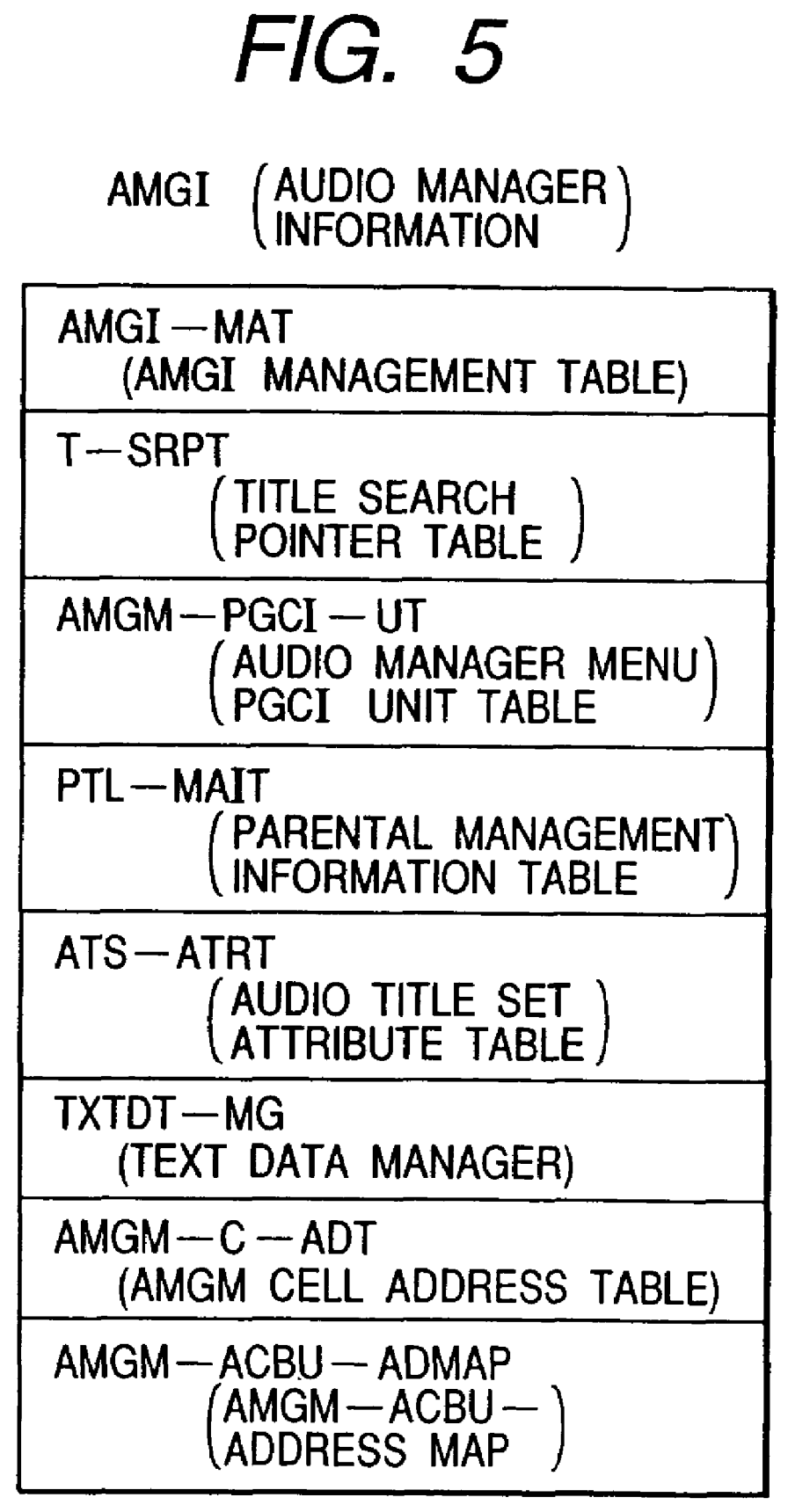

AMGI (AUDIO MANAGER INFORMATION)

| |
|---|
| AMGI—MAT (AMGI MANAGEMENT TABLE) |
| T—SRPT (TITLE SEARCH POINTER TABLE) |
| AMGM—PGCI—UT (AUDIO MANAGER MENU PGCI UNIT TABLE) |
| PTL—MAIT (PARENTAL MANAGEMENT INFORMATION TABLE) |
| ATS—ATRT (AUDIO TITLE SET ATTRIBUTE TABLE) |
| TXTDT—MG (TEXT DATA MANAGER) |
| AMGM—C—ADT (AMGM CELL ADDRESS TABLE) |
| AMGM—ACBU—ADMAP (AMGM—ACBU— ADDRESS MAP) |

FIG. 6

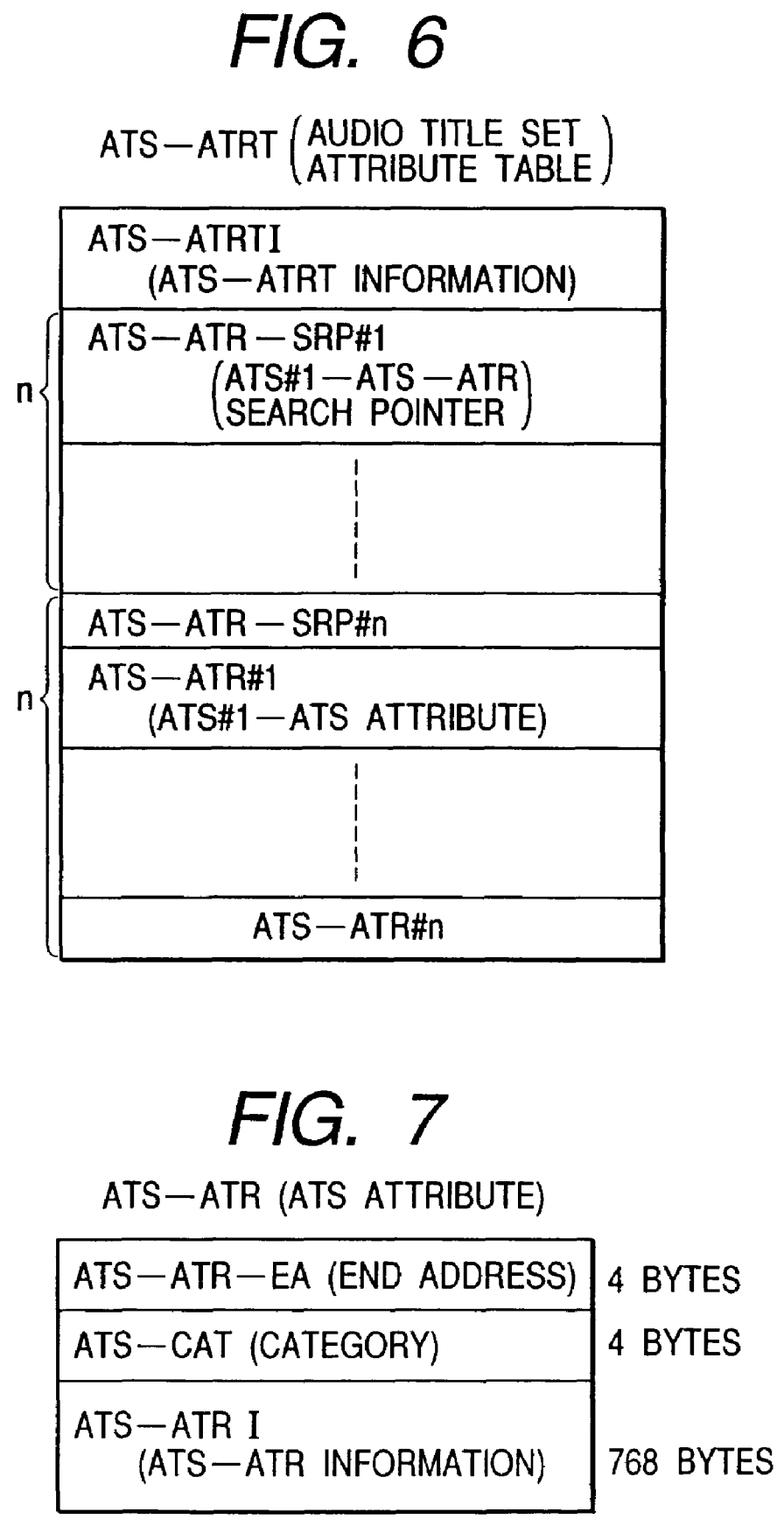

ATS-ATRT (AUDIO TITLE SET ATTRIBUTE TABLE)

| | |
|---|---|
| | ATS-ATRTI (ATS-ATRT INFORMATION) |
| n | ATS-ATR-SRP#1 (ATS#1-ATS-ATR SEARCH POINTER) |
| | ⋮ |
| | ATS-ATR-SRP#n |
| n | ATS-ATR#1 (ATS#1-ATS ATTRIBUTE) |
| | ⋮ |
| | ATS-ATR#n |

FIG. 7

ATS-ATR (ATS ATTRIBUTE)

| | |
|---|---|
| ATS-ATR-EA (END ADDRESS) | 4 BYTES |
| ATS-CAT (CATEGORY) | 4 BYTES |
| ATS-ATR I (ATS-ATR INFORMATION) | 768 BYTES |

FIG. 8

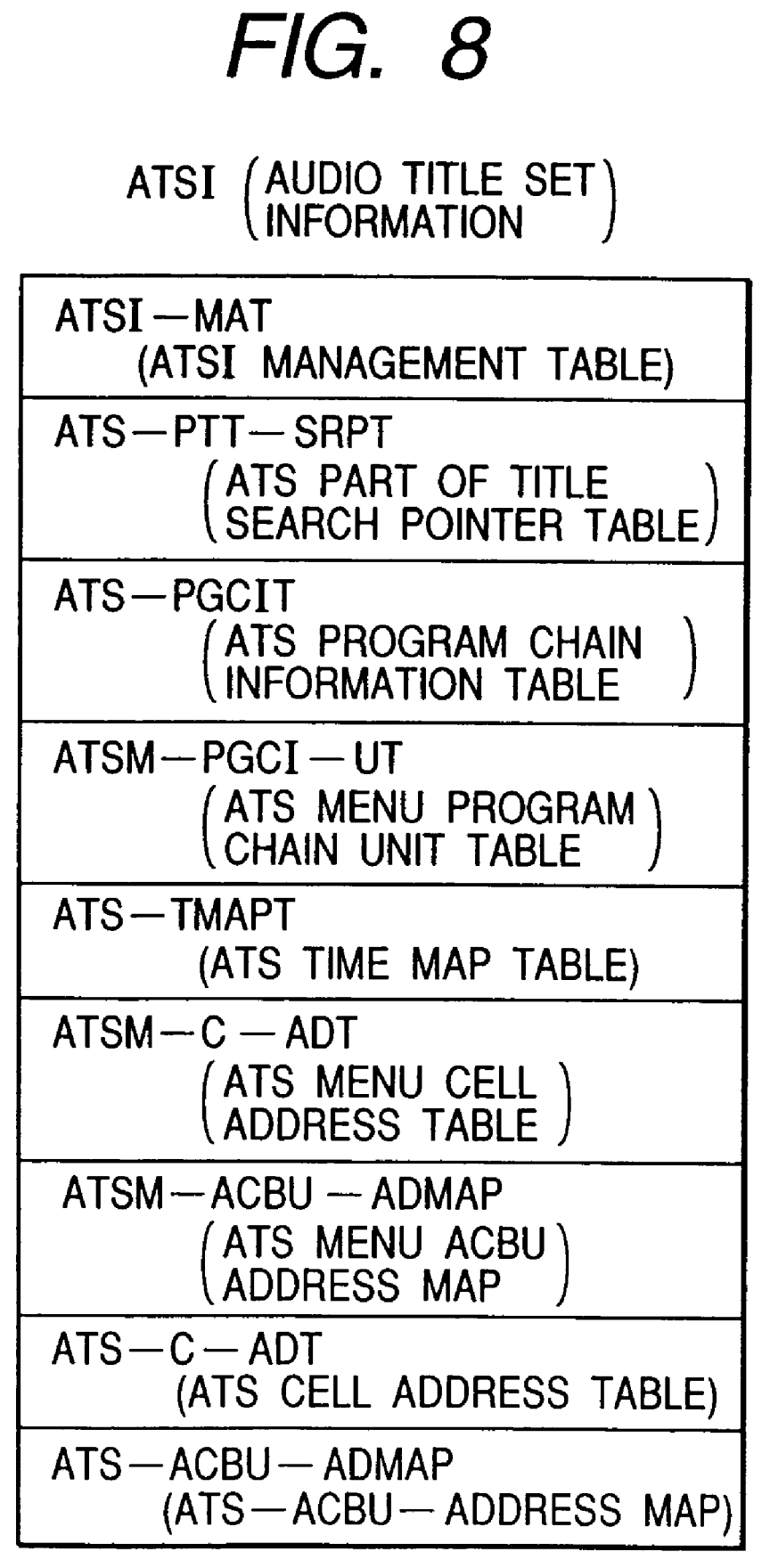

ATSI (AUDIO TITLE SET INFORMATION)

| |
|---|
| ATSI—MAT (ATSI MANAGEMENT TABLE) |
| ATS—PTT—SRPT (ATS PART OF TITLE SEARCH POINTER TABLE) |
| ATS—PGCIT (ATS PROGRAM CHAIN INFORMATION TABLE) |
| ATSM—PGCI—UT (ATS MENU PROGRAM CHAIN UNIT TABLE) |
| ATS—TMAPT (ATS TIME MAP TABLE) |
| ATSM—C—ADT (ATS MENU CELL ADDRESS TABLE) |
| ATSM—ACBU—ADMAP (ATS MENU ACBU ADDRESS MAP) |
| ATS—C—ADT (ATS CELL ADDRESS TABLE) |
| ATS—ACBU—ADMAP (ATS—ACBU—ADDRESS MAP) |

FIG. 9

ATSI—MAT
(ATSI MANAGEMENT TABLE)

| |
|---|
| ATS—ID (IDENTIFIER) |
| ATS—EA (END ADDRESS) |
| ATSI—EA |
| VERN (VERSION NUMBER) |
| ATS—CAT (CATEGORY) |
| ATSI—MAT—EA |
| ATSM—ACBS—SA (START ADDRESS) |
| ATSA—ACBS—SA |
| ATS—PTT—SRPT—SA |
| ATS—PGCIT—SA |
| ATSM—PGCI—UT—SA |
| ATS—TMAPT—SA |
| ATSM—C—ADT—SA |
| ATSM—ACBU—ADMAP—SA |
| ≈ |
| ATSM—AST—ATR (ATSM AUDIO STREAM ATTRIBUTE) |
| ATS—AST—Ns (ATS AUDIO STREAM NUMBER) |
| ATS—AST—ATRT (ATS AUDIO STREAM ATTRIBUTE TABLE) |
| |

ATSM—AST—ATR (AUDIO TITLE SET MENU AUDIO STREAM ATTRIBUTE DATA)

FIG. 11

ATS—AST—ATRT

| | | |
|---|---|---|
| AUDIO STREAM (AST) #0 | ATS—AST—ATR | 8 BYTES |
| AUDIO STREAM (AST) #1 | ATS—AST—ATR | 8 BYTES |
| AUDIO STREAM (AST) #2 | ATS—AST—ATR | 8 BYTES |
| AUDIO STREAM (AST) #3 | ATS—AST—ATR | 8 BYTES |
| AUDIO STREAM (AST) #4 | ATS—AST—ATR | 8 BYTES |
| AUDIO STREAM (AST) #5 | ATS—AST—ATR | 8 BYTES |
| AUDIO STREAM (AST) #6 | ATS—AST—ATR | 8 BYTES |
| AUDIO STREAM (AST) #7 | ATS—AST—ATR | 8 BYTES |

FIG. 12

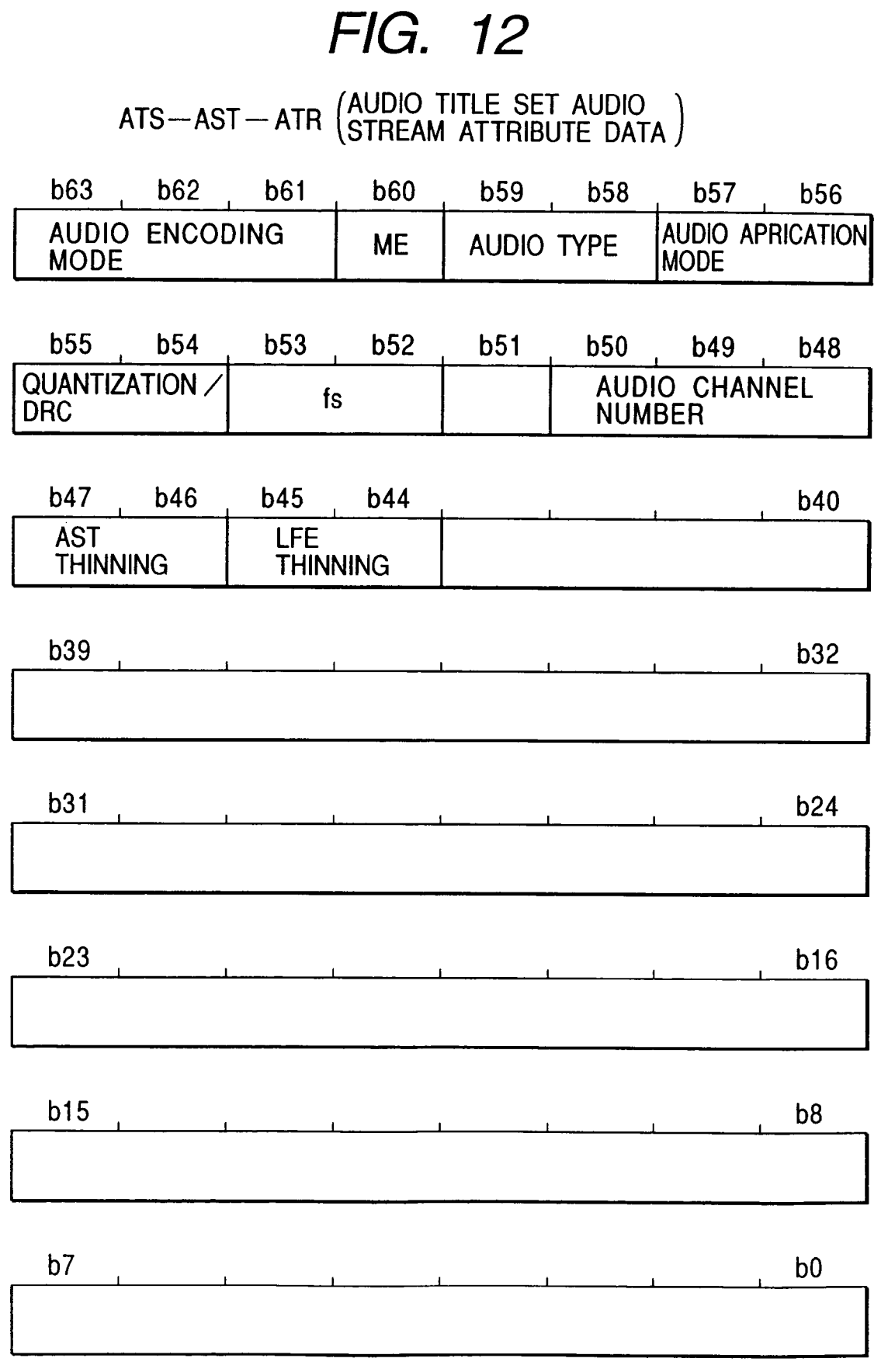

ATS—AST—ATR (AUDIO TITLE SET AUDIO STREAM ATTRIBUTE DATA)

| b63 | b62 | b61 | b60 | b59 | b58 | b57 | b56 |
|---|---|---|---|---|---|---|---|
| AUDIO ENCODING MODE | | | ME | AUDIO TYPE | | AUDIO APRICATION MODE | |

| b55 | b54 | b53 | b52 | b51 | b50 | b49 | b48 |
|---|---|---|---|---|---|---|---|
| QUANTIZATION / DRC | | fs | | | AUDIO CHANNEL NUMBER | | |

| b47 | b46 | b45 | b44 | | | | b40 |
|---|---|---|---|---|---|---|---|
| AST THINNING | | LFE THINNING | | | | | |

| b39 | | | | | | | b32 |
|---|---|---|---|---|---|---|---|
| | | | | | | | |

| b31 | | | | | | | b24 |
|---|---|---|---|---|---|---|---|
| | | | | | | | |

| b23 | | | | | | | b16 |
|---|---|---|---|---|---|---|---|
| | | | | | | | |

| b15 | | | | | | | b8 |
|---|---|---|---|---|---|---|---|
| | | | | | | | |

| b7 | | | | | | | b0 |
|---|---|---|---|---|---|---|---|
| | | | | | | | |

AUDIO PACK (VIDEO PACK)

FIG. 16

ACD (636 BYTES)

| | | |
|---|---|---|
| GENERAL INFORMATION | 48 BYTES | |
| NAME SPACE | 93 BYTES | 93 BYTES |
| FREE SPACE 1 | 93 BYTES | 93 BYTES |
| FREE SPACE 2 | 93 BYTES | 93 BYTES |
| DATA POINTER | 15 BYTES | 15 BYTES |
| TOTAL | 294 BYTES | 294 BYTES |
| | FIRST LANGUAGE | SECOND LANGUAGE |

FIG. 17

キョクモクカイセツ
前作のエディング曲
" FORGET-ME-NOT "

FIG. 29

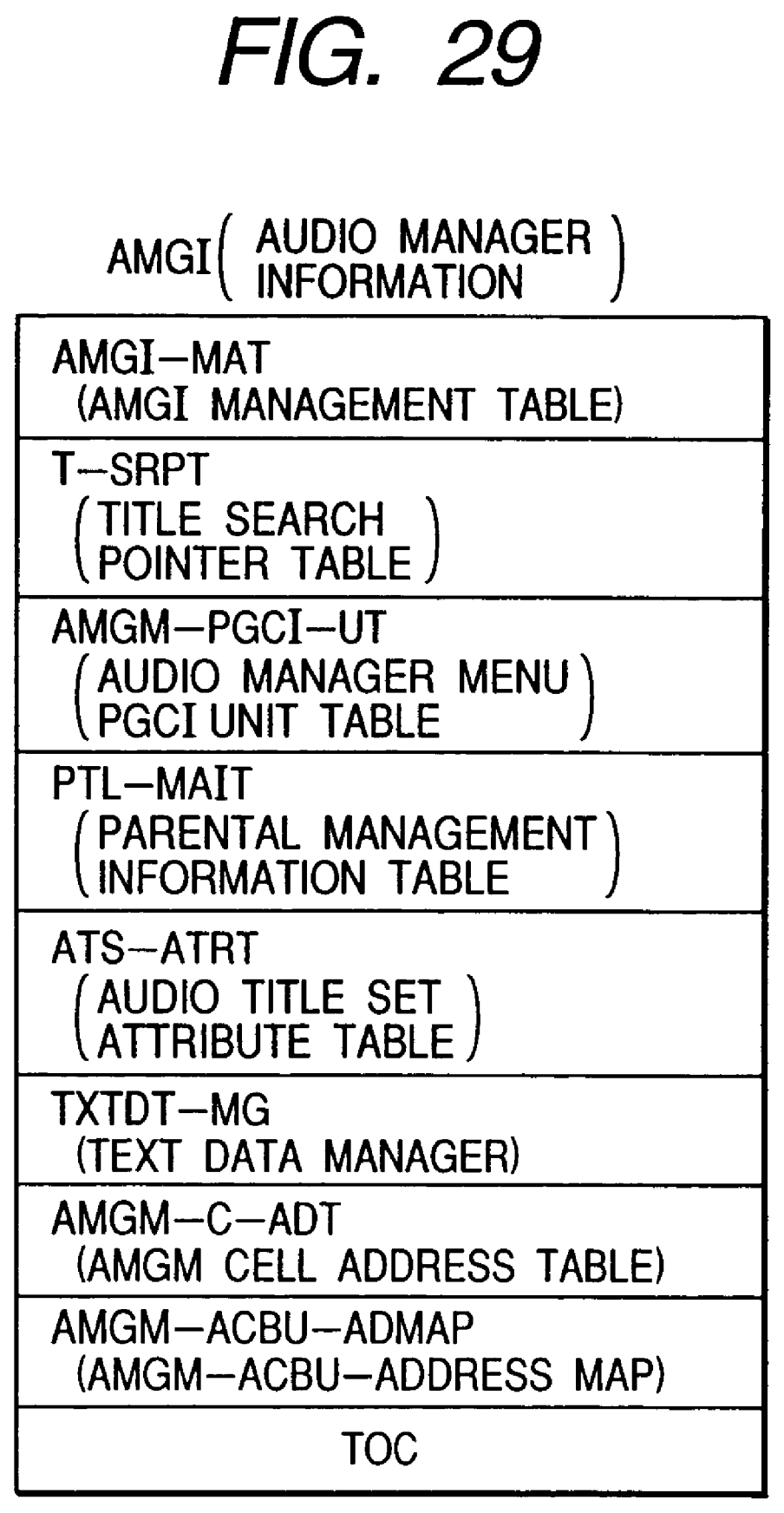

AMGI (AUDIO MANAGER INFORMATION)

| |
|---|
| AMGI-MAT (AMGI MANAGEMENT TABLE) |
| T-SRPT (TITLE SEARCH POINTER TABLE) |
| AMGM-PGCI-UT (AUDIO MANAGER MENU PGCI UNIT TABLE) |
| PTL-MAIT (PARENTAL MANAGEMENT INFORMATION TABLE) |
| ATS-ATRT (AUDIO TITLE SET ATTRIBUTE TABLE) |
| TXTDT-MG (TEXT DATA MANAGER) |
| AMGM-C-ADT (AMGM CELL ADDRESS TABLE) |
| AMGM-ACBU-ADMAP (AMGM-ACBU-ADDRESS MAP) |
| TOC |

FIG. 30

| FRAME NUMBER | POINT | PMIN, | PSEC, | PFRAME | |
|---|---|---|---|---|---|
| n | 01 | 00, | 02, | 32 | |
| n+1 | 01 | 00, | 02, | 32 | |
| n+2 | 01 | 00, | 02, | 32 | |
| n+3 | 02 | 10, | 15, | 12 | |
| n+4 | 02 | 10, | 15, | 12 | |
| n+5 | 02 | 10, | 15, | 12 | |
| n+6 | 03 | 16, | 28, | 63 | |
| n+7 | 03 | 16, | 28, | 63 | |
| n+8 | 03 | 16, | 28, | 63 | |
| n+9 | 04 | | | | |
| n+10 | 04 | · | · | | |
| n+11 | 04 | · | · | | |
| n+12 | 05 | · | · | | 1 SET |
| n+13 | 05 | · | · | | |
| n+14 | 05 | | | | |
| n+15 | 06 | 49, | 10, | 03 | |
| n+16 | 06 | 49, | 10, | 03 | |
| n+17 | 06 | 49, | 10, | 03 | |
| n+18 | A0 | 01, | 00, | 00 | |
| n+19 | A0 | 01, | 00, | 00 | |
| n+20 | A0 | 01, | 00, | 00 | |
| n+21 | A1 | 06, | 00, | 00 | |
| n+22 | A1 | 06, | 00, | 00 | |
| n+23 | A1 | 06, | 00, | 00 | |
| n+24 | A2 | 52, | 48, | 41 | |
| n+25 | A2 | 52, | 48, | 41 | |
| n+26 | A2 | 52, | 48, | 41 | |
| n+27 | 01 | 00, | 02, | 32 | |
| n+28 | 01 | 00, | 02, | 32 | |
| · | · | · | · | | |

FIG. 31

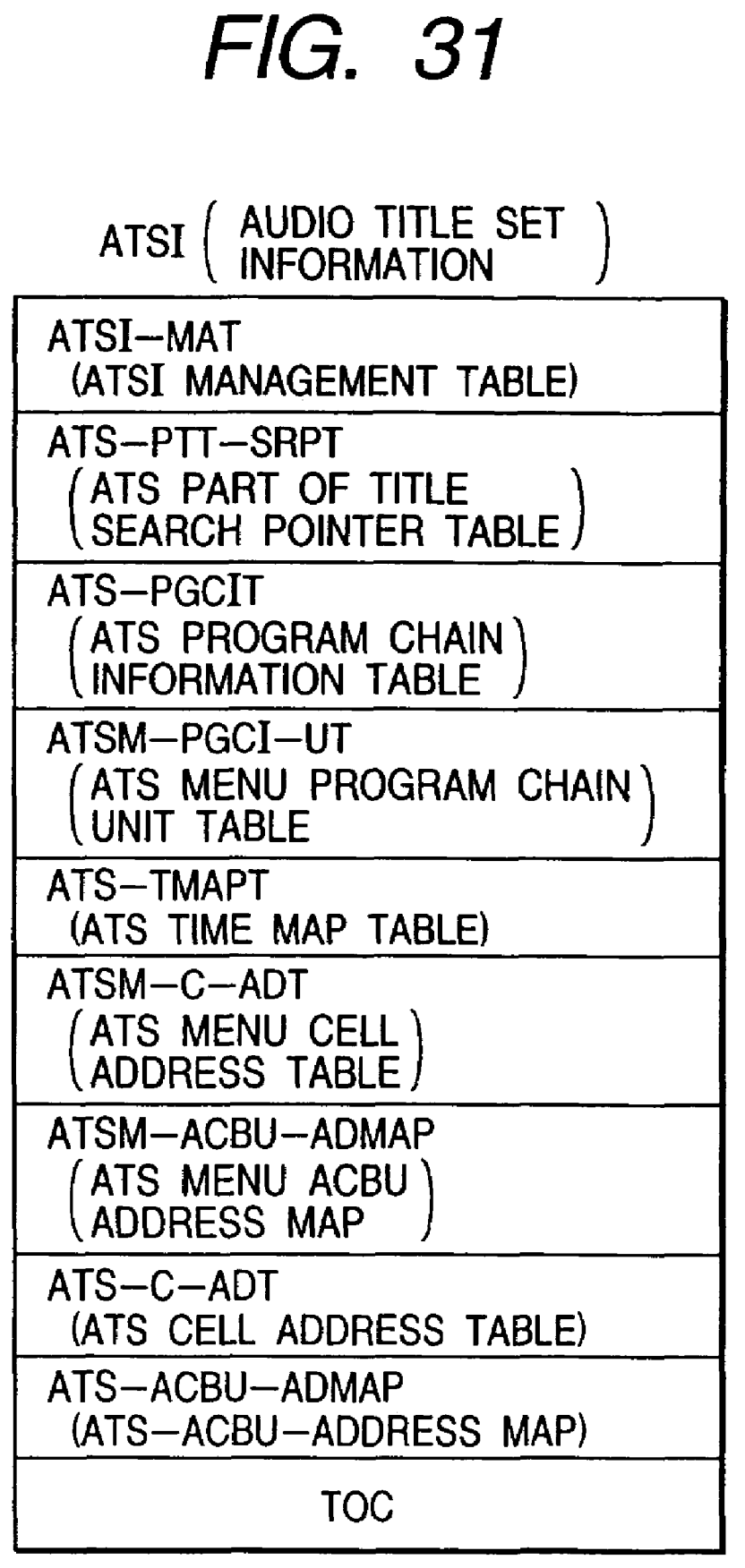

ATSI (AUDIO TITLE SET INFORMATION)

| |
|---|
| ATSI-MAT (ATSI MANAGEMENT TABLE) |
| ATS-PTT-SRPT (ATS PART OF TITLE SEARCH POINTER TABLE) |
| ATS-PGCIT (ATS PROGRAM CHAIN INFORMATION TABLE) |
| ATSM-PGCI-UT (ATS MENU PROGRAM CHAIN UNIT TABLE) |
| ATS-TMAPT (ATS TIME MAP TABLE) |
| ATSM-C-ADT (ATS MENU CELL ADDRESS TABLE) |
| ATSM-ACBU-ADMAP (ATS MENU ACBU ADDRESS MAP) |
| ATS-C-ADT (ATS CELL ADDRESS TABLE) |
| ATS-ACBU-ADMAP (ATS-ACBU-ADDRESS MAP) |
| TOC |

FIG. 42

AOTT–AOB–ATR

| b63 | b62 | b61 | b60 | b59 | b58 | b57 | b56 |
|---|---|---|---|---|---|---|---|
| AUDIO ENCODING MODE | | | | D–M | MULTICHANNEL STRUCTURE TYPE | | |

| b55 | b54 | b53 | b52 | b51 | b50 | b49 | b48 |
|---|---|---|---|---|---|---|---|
| Q1 | | | | Q2 | | | |

| b47 | b46 | b45 | b44 | b43 | b42 | b41 | b40 |
|---|---|---|---|---|---|---|---|
| fs1 | | | | fs2 | | | |

| b39 | | b37 | b36 | | | | b32 |
|---|---|---|---|---|---|---|---|
| RESERVED | | | CHANNEL ASSIGNMENT | | | | |

| b31 | | | | | | | b24 |
|---|---|---|---|---|---|---|---|
| RESERVED | | | | | | | |

| b23 | | | | | | | b16 |
|---|---|---|---|---|---|---|---|
| RESERVED | | | | | | | |

| b15 | | | | | | | b8 |
|---|---|---|---|---|---|---|---|
| RESERVED | | | | | | | |

| b7 | | | | | | | b0 |
|---|---|---|---|---|---|---|---|
| RESERVED | | | | | | | |

FIG. 43

LINEAR PCM PRIVATE HEADER

| FILED | BIT NUMBER | BYTE NUMBER |
|---|---|---|
| SUB STREAM ID | 8 | 1 |
| RESERVED | 4 | 2 |
| ISRC NUMBER | 4 | |
| ISRC DATA | 8 | |
| PRIVATE HEADER LENGTH | 8 | 1 |
| FIRST ACCESS UNIT POINTER | 16 | 2 |
| AUDIO EMPHASIS FLAG F1 | 1 | 1 |
| AUDIO EMPHASIS FLAG F2 | 1 | |
| RESERVED | 1 | |
| DOWN MIX CODE | 5 | |
| QUANTIZATION WORD LENGTH 1 | 4 | 1 |
| QUANTIZATION WORD LENGTH 2 | 4 | |
| AUDIO SAMPLING FREQUENCY fs 1 | 4 | 1 |
| AUDIO SAMPLING FREQUENCY fs 2 | 4 | |
| RESERVED | 4 | 1 |
| MULTICHANNEL TYPE | 4 | |
| CHANNEL ASSIGNMENT 1 | 4 | 1 |
| CHANNEL ASSIGNMENT 2 | 4 | |
| DYNAMIC RANGE CONTROL | 8 | 1 |
| STUFFING BYTE | — | 0—7 |

LINEAR PCM AUDIO PACK

FIG. 60

LINEAR PCM PRIVATE HEADER

| | FILED | BIT NUMBER | BYTE NUMBER |
|---|---|---|---|
| | SUB STREAM ID | 8 | 1 |
| | RESERVED | 3 | 2 |
| | UPC/EAN-ISRC NUMBER | 5 | |
| | UPC/EAN-ISRC DATA | 8 | |
| | PRIVATE HEADER LENGTH | 8 | 1 |
| | FIRST ACCESS UNIT POINTER | 16 | 2 |
| ADI | AUDIO EMPHASIS FLAG | 1 | 1 |
| ADI | RESERVED | 1 | |
| ADI | DOWN MIX CODE | 1 | |
| ADI | DOWN MIX CODE EFFECTIVENESS | 1 | |
| ADI | DOWN MIX CODE | 4 | |
| ADI | QUANTIZATION WORD LENGTH 1 | 4 | 1 |
| ADI | QUANTIZATION WORD LENGTH 2 | 4 | |
| ADI | AUDIO SAMPLING FREQUENCY fs 1 | 4 | 1 |
| ADI | AUDIO SAMPLING FREQUENCY fs 2 | 4 | |
| ADI | RESERVED | 4 | 1 |
| ADI | MULTICHANNEL TYPE | 4 | |
| ADI | BIT SHFT OF CHANNEL GROUP 2 | 3 | 1 |
| ADI | CHANNEL ASSIGNMENT | 5 | |
| ADI | DYNAMIC RANGE CONTROL | 8 | 1 |
| ADI | RESERVED | 8 | 2 |
| ADI | RESERVED | 8 | |
| | STUFFING BYTE | — | 8 |

FIG. 61

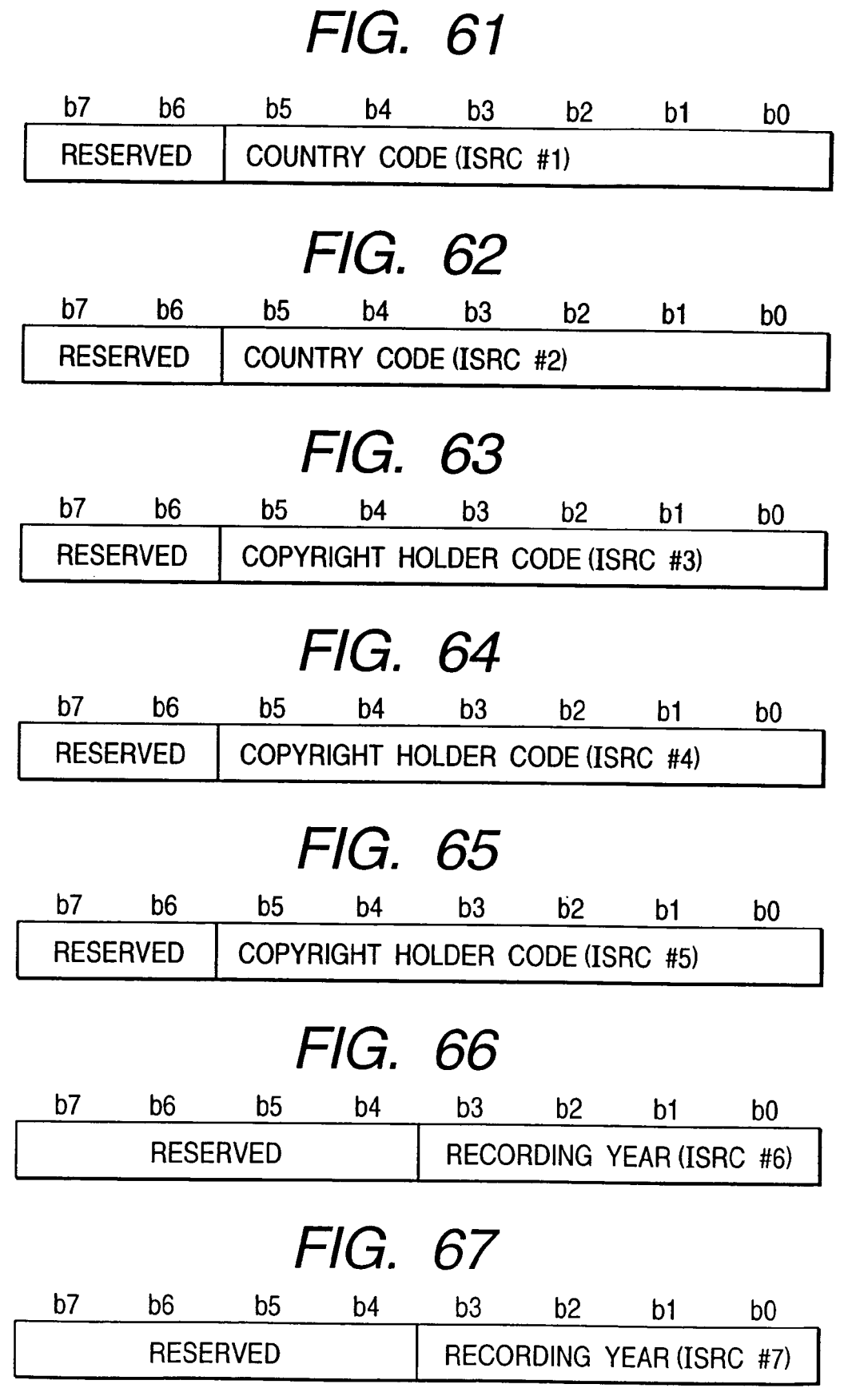

| b7 | b6 | b5 | b4 | b3 | b2 | b1 | b0 |
|---|---|---|---|---|---|---|---|
| RESERVED | | COUNTRY CODE (ISRC #1) | | | | | |

FIG. 62

| b7 | b6 | b5 | b4 | b3 | b2 | b1 | b0 |
|---|---|---|---|---|---|---|---|
| RESERVED | | COUNTRY CODE (ISRC #2) | | | | | |

FIG. 63

| b7 | b6 | b5 | b4 | b3 | b2 | b1 | b0 |
|---|---|---|---|---|---|---|---|
| RESERVED | | COPYRIGHT HOLDER CODE (ISRC #3) | | | | | |

FIG. 64

| b7 | b6 | b5 | b4 | b3 | b2 | b1 | b0 |
|---|---|---|---|---|---|---|---|
| RESERVED | | COPYRIGHT HOLDER CODE (ISRC #4) | | | | | |

FIG. 65

| b7 | b6 | b5 | b4 | b3 | b2 | b1 | b0 |
|---|---|---|---|---|---|---|---|
| RESERVED | | COPYRIGHT HOLDER CODE (ISRC #5) | | | | | |

FIG. 66

| b7 | b6 | b5 | b4 | b3 | b2 | b1 | b0 |
|---|---|---|---|---|---|---|---|
| RESERVED | | | | RECORDING YEAR (ISRC #6) | | | |

FIG. 67

| b7 | b6 | b5 | b4 | b3 | b2 | b1 | b0 |
|---|---|---|---|---|---|---|---|
| RESERVED | | | | RECORDING YEAR (ISRC #7) | | | |

FIG. 73

ATSI-MAT

| RBP | | BYTE NUMBER |
|---|---|---|
| 0~11 | ATS IDENTIFIER (ATS-ID) | 12 |
| 12~15 | ATS END ADRS (ATS-EA) | 4 |
| 16~27 | RESERVED | 12 |
| 28~31 | ATSI END ADRS (ATSI-EA) | 4 |
| 32, 33 | VERSION NO (VERN) | 2 |
| 34~127 | RESERVED | 94 |
| 128~131 | ATSI-MAT END ADRS | 4 |
| 132~191 | RESERVED | 60 |
| 192~195 | AOTT VTS START ADRS | 4 |
| 196~199 | AOTT AOBS START ADRS (AOTT VOBS START ADRS) | 4 |
| 200~203 | RESERVED | 4 |
| 204~207 | ATS-PGCIT START ADRS | 4 |
| 208~255 | RESERVED | 48 |
| 256~383 | AOTT-AOB-ATR AOTT-VOB-AST-ATR | 128 |
| 384~671 | ATS-DM-COEFT#0~#15 | 288 |
| 672~703 | RESERVED | 32 |
| 704~705 | STILL PICTURE DATA ATTRIBUTE (ATS-SPCT-ART) | 2 |
| 706~2047 | RESERVED | 1342 |

FIG. 74

AOTT—AOB—ATR

| | | | | | | | |
|---|---|---|---|---|---|---|---|
| b127 | b126 | b125 | b124 | b123 | b122 | b121 | b120 |
| AUDIO ENCODING MODE | | | | | | | |
| b119 | b118 | b117 | b116 | b115 | b114 | b113 | b112 |
| RESERVED | | | | | | | |
| b111 | b110 | b109 | b108 | b107 | b106 | b105 | b104 |
| Q1 | | | | Q2 | | | |
| b103 | b102 | b101 | b100 | b99 | b98 | b97 | b96 |
| fs1 | | | | fs2 | | | |
| b95 | b94 | b93 | b92 | b91 | b90 | b89 | b88 |
| MULTICHANNEL STRUCTURE TYPE | | | CHANNEL ASSIGNMENT | | | | |
| b87 | b86 | b85 | b84 | b83 | b82 | b81 | b80 |
| RESERVED | | | | | | | |
| b79 | b78 | b77 | b76 | b75 | b74 | b73 | b72 |
| RESERVED | | | | | | | |
| b71 | b70 | b69 | b68 | b67 | b66 | b65 | b64 |
| RESERVED | | | | | | | |
| b63 | b62 | b61 | b60 | b59 | b58 | b57 | b56 |
| RESERVED | | | | | | | |
| b55 | b54 | b53 | b52 | b51 | b50 | b49 | b48 |
| RESERVED | | | | | | | |
| b47 | b46 | b45 | b44 | b43 | b42 | b41 | b40 |
| RESERVED | | | | | | | |
| b39 | b38 | b37 | b36 | b35 | b34 | b33 | b32 |
| RESERVED | | | | | | | |
| b31 | b30 | b29 | b28 | b27 | b26 | b25 | b24 |
| RESERVED | | | | | | | |
| b23 | b22 | b21 | b20 | b19 | b18 | b17 | b16 |
| RESERVED | | | | | | | |
| b15 | b14 | b13 | b12 | b11 | b10 | b9 | b8 |
| RESERVED | | | | | | | |
| b7 | b6 | b5 | b4 | b3 | b2 | b1 | b0 |
| RESERVED | | | | | | | |

FIG. 75

| CHANNEL ASSIGNMENT INFORMATION (BIT PATTERN) | CHANNEL STRUCTURE OF GROUPS 1, 2 | | | | | | CHANNEL NUMBER IN GROUP 1 | CHANNEL NUMBER IN GROUP 2 |
|---|---|---|---|---|---|---|---|---|
| | ACH0 | ACH1 | ACH2 | ACH3 | ACH4 | ACH5 | | |
| 00000b | C(mono) | none | none | none | none | none | 1 | 0 |
| 00001b | L | R | none | none | none | none | 2 | 0 |
| 00010b | Lf | Rf | S | none | none | none | 2 | 1 |
| 00011b | Lf | Rf | Ls | Rs | none | none | 2 | 2 |
| 00100b | Lf | Rf | LFE | none | none | none | 2 | 1 |
| 00101b | Lf | Rf | LFE | S | none | none | 2 | 2 |
| 00110b | Lf | Rf | LFE | Ls | Rs | none | 2 | 3 |
| 00111b | Lf | Rf | C | none | none | none | 2 | 1 |
| 01000b | Lf | Rf | C | S | none | none | 2 | 2 |
| 01001b | Lf | Rf | C | Ls | Rs | none | 2 | 3 |
| 01010b | Lf | Rf | C | LFE | none | none | 2 | 2 |
| 01011b | Lf | Rf | C | LFE | S | none | 2 | 3 |
| 01100b | Lf | Rf | C | LFE | Ls | Rs | 2 | 4 |
| 01101b | Lf | Rf | C | S | none | none | 3 | 1 |
| 01110b | Lf | Rf | C | Ls | Rs | none | 3 | 2 |
| 01111b | Lf | Rf | C | LFE | none | none | 3 | 1 |
| 10000b | Lf | Rf | C | LFE | S | none | 3 | 2 |
| 10001b | Lf | Rf | C | LFE | Ls | Rs | 3 | 3 |
| 10010b | Lf | Rf | Ls | Rs | LFE | none | 4 | 1 |
| 10011b | Lf | Rf | Ls | Rs | C | none | 4 | 1 |
| 10100b | Lf | Rf | Ls | Rs | C | LFE | 4 | 2 |
| OTHERS | RESERVED | | | | | | | |

← CHANNEL GROUP 1 | CHANNEL GROUP 2 →

FIG. 76

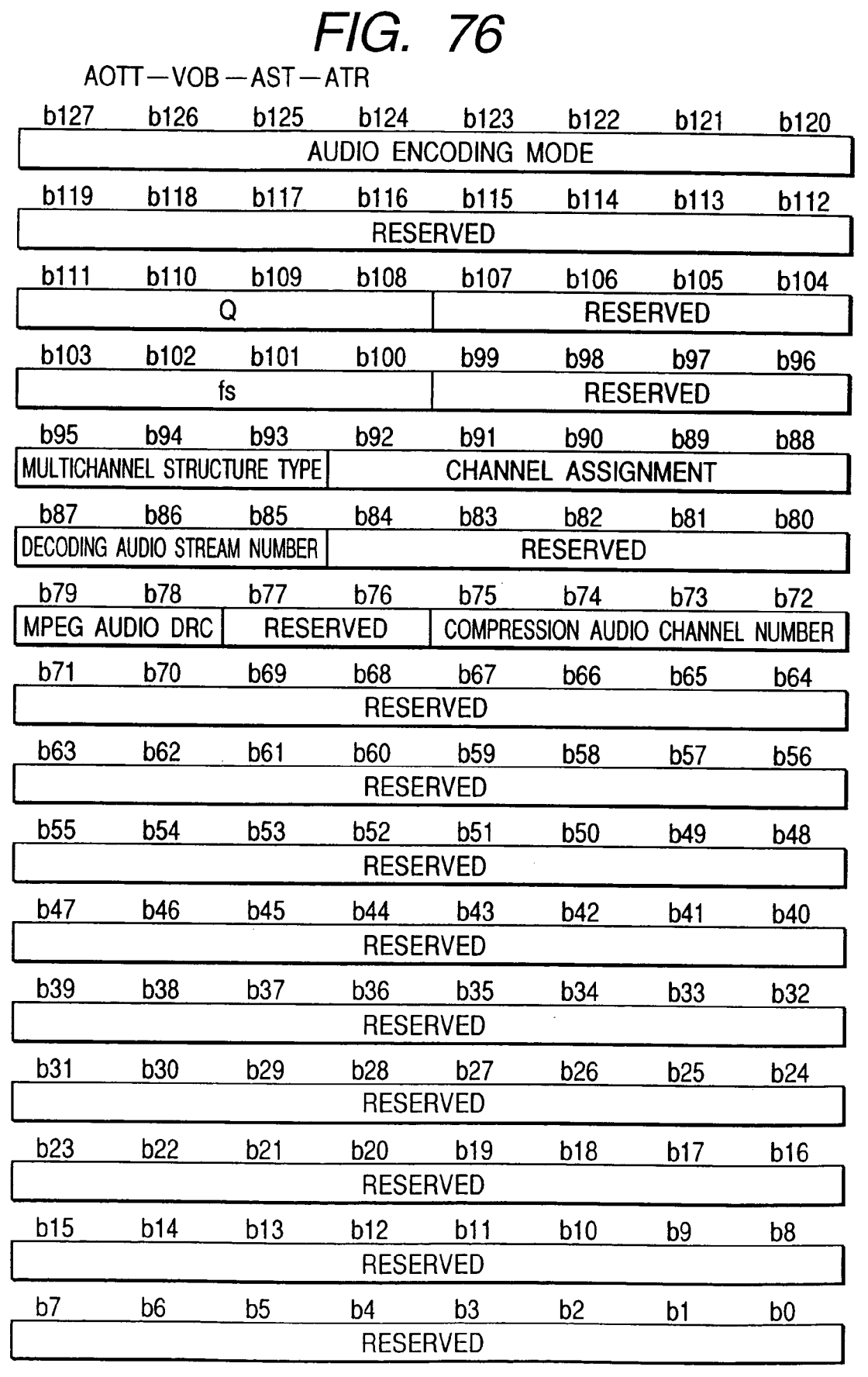

AOTT—VOB—AST—ATR

| | | | | | | | |
|---|---|---|---|---|---|---|---|
| b127 | b126 | b125 | b124 | b123 | b122 | b121 | b120 |
| AUDIO ENCODING MODE | | | | | | | |
| b119 | b118 | b117 | b116 | b115 | b114 | b113 | b112 |
| RESERVED | | | | | | | |
| b111 | b110 | b109 | b108 | b107 | b106 | b105 | b104 |
| Q | | | | RESERVED | | | |
| b103 | b102 | b101 | b100 | b99 | b98 | b97 | b96 |
| fs | | | | RESERVED | | | |
| b95 | b94 | b93 | b92 | b91 | b90 | b89 | b88 |
| MULTICHANNEL STRUCTURE TYPE | | | CHANNEL ASSIGNMENT | | | | |
| b87 | b86 | b85 | b84 | b83 | b82 | b81 | b80 |
| DECODING AUDIO STREAM NUMBER | | | RESERVED | | | | |
| b79 | b78 | b77 | b76 | b75 | b74 | b73 | b72 |
| MPEG AUDIO DRC | | RESERVED | | COMPRESSION AUDIO CHANNEL NUMBER | | | |
| b71 | b70 | b69 | b68 | b67 | b66 | b65 | b64 |
| RESERVED | | | | | | | |
| b63 | b62 | b61 | b60 | b59 | b58 | b57 | b56 |
| RESERVED | | | | | | | |
| b55 | b54 | b53 | b52 | b51 | b50 | b49 | b48 |
| RESERVED | | | | | | | |
| b47 | b46 | b45 | b44 | b43 | b42 | b41 | b40 |
| RESERVED | | | | | | | |
| b39 | b38 | b37 | b36 | b35 | b34 | b33 | b32 |
| RESERVED | | | | | | | |
| b31 | b30 | b29 | b28 | b27 | b26 | b25 | b24 |
| RESERVED | | | | | | | |
| b23 | b22 | b21 | b20 | b19 | b18 | b17 | b16 |
| RESERVED | | | | | | | |
| b15 | b14 | b13 | b12 | b11 | b10 | b9 | b8 |
| RESERVED | | | | | | | |
| b7 | b6 | b5 | b4 | b3 | b2 | b1 | b0 |
| RESERVED | | | | | | | |

FIG. 77

ATS—DM—COEFT#0—#15

| CONTENTS | BYTE NUMBER |
|---|---|
| DOWN MIX COEFFICIENT OF TABLE NUMBER 0 | 18 |
| DOWN MIX COEFFICIENT OF TABLE NUMBER 1 | 18 |
| DOWN MIX COEFFICIENT OF TABLE NUMBER 2 | 18 |
| DOWN MIX COEFFICIENT OF TABLE NUMBER 3 | 18 |
| DOWN MIX COEFFICIENT OF TABLE NUMBER 4 | 18 |
| DOWN MIX COEFFICIENT OF TABLE NUMBER 5 | 18 |
| DOWN MIX COEFFICIENT OF TABLE NUMBER 6 | 18 |
| DOWN MIX COEFFICIENT OF TABLE NUMBER 7 | 18 |
| DOWN MIX COEFFICIENT OF TABLE NUMBER 8 | 18 |
| DOWN MIX COEFFICIENT OF TABLE NUMBER 9 | 18 |
| DOWN MIX COEFFICIENT OF TABLE NUMBER 10 | 18 |
| DOWN MIX COEFFICIENT OF TABLE NUMBER 11 | 18 |
| DOWN MIX COEFFICIENT OF TABLE NUMBER 12 | 18 |
| DOWN MIX COEFFICIENT OF TABLE NUMBER 13 | 18 |
| DOWN MIX COEFFICIENT OF TABLE NUMBER 14 | 18 |
| DOWN MIX COEFFICIENT OF TABLE NUMBER 15 | 18 |

ATS—SPCT—ATR

| b15 | b14 | b13 | b12 | b11 | b10 | b9 | b8 |
|---|---|---|---|---|---|---|---|
| VIDEO COMPRESSION MODE | | TV SYSTEM | | ASPECT RATIO | | DISPLAY MODE | |

| b7 | b6 | b5 | b4 | b3 | b2 | b1 | b0 |
|---|---|---|---|---|---|---|---|
| RESERVED | | SOURCE PICTURE RESOLUTION | | | RESERVED | | |

FIG. 80

ATS-PGCITI

| RBP | | BYTE NUMBER |
|---|---|---|
| 0~1 | ATS-PGCI-SRP NUMBER | 2 |
| 2~3 | RESERVED | 2 |
| 4~7 | ATS-PGCIT END ADRS | 4 |

FIG. 81

ATS-PGCI-SRP

| RBP | | BYTE NUMBER |
|---|---|---|
| 0~3 | ATS-PGC CATEGORY (ATS-PGC-CAT) | 4 |
| 4~7 | ATS-PGCI END ADRS | 4 |

FIG. 82

ATS-PGC-CAT

| b31 | b30 | b29 | b28 | b27 | b26 | b25 | b24 |
|---|---|---|---|---|---|---|---|
| ENTRY TYPE | ATS-TTN | | | | | | |

| b23 | b22 | b21 | b20 | b19 | b18 | b17 | b16 |
|---|---|---|---|---|---|---|---|
| BLOCK MODE | | BLOCK TYPE | | AUDIO CHANNEL NUMBER | | | |

| b15 | b14 | b13 | b12 | b11 | b10 | b9 | b8 |
|---|---|---|---|---|---|---|---|
| AUDIO ENCODING MODE | | | | | | | |

| b7 | | | | | | | b0 |
|---|---|---|---|---|---|---|---|
| RESERVED | | | | | | | |

ATS-PGC-GI

| RBP | | BYTE NUMBER |
|---|---|---|
| 0~3 | ATS-PGC CONTENTS (ATS-PGC-CNT) | 4 |
| 4~7 | ATS-PGC PLAYBACK TIME (ATS-PGC-PB-TM) | 4 |
| 8~9 | RESERVED | 2 |
| 10~11 | ATS-PGIT START ADDRESS | 2 |
| 12~13 | ATS-C-PBIT START ADDRESS | 2 |
| 14~15 | RESERVED | 2 |

FIG. 87

ATS-PGI

| RBP | | BYTE NUMBER |
|---|---|---|
| 0~3 | ATS-PG CONTENTS (ATS-PG-CNT) | 4 |
| 4 | ATS-PG ENTRY CELL NUMBER | 1 |
| 5 | RESERVED | 1 |
| 6~9 | FAC-S-PTM | 4 |
| 10~13 | ATS-PG PLAYBACK TIME | 4 |
| 14~17 | ATS-PG PAUSE TIME | 4 |
| 18 | COPYRIGHT MANAGEMENT INFO CMI | 1 |
| 19 | RESERVED | 1 |

FIG. 88

ATS-PG-CNT

| b31 | b30 | b29 | b28 | b27 | b26 | b25 | b24 |
|---|---|---|---|---|---|---|---|
| R/A | STC-F | ATRN | | | ChGr2 BIT SHIFT | | |

| b23 | b22 | b21 | b20 | b19 | b18 | b17 | b16 |
|---|---|---|---|---|---|---|---|
| RESERVED | | D-M | D-M EFFECT | DM-COEFTN | | | |

| b15 | b14 | b13 | b12 | b11 | b10 | b9 | b8 |
|---|---|---|---|---|---|---|---|
| F15 | F14 | F13 | F12 | F11 | F10 | F9 | F8 |

| b7 | b6 | b5 | b4 | b3 | b2 | b1 | b0 |
|---|---|---|---|---|---|---|---|
| F7 | F6 | F5 | F4 | F3 | F2 | F1 | F0 |

ATS-C-PBI

| RBP | | BYTE NUMBER |
|---|---|---|
| 0 | ATS-C INDEX NUMBER | 1 |
| 1 | ATS-C TYPE (ATS-C-TY) | 1 |
| 2~3 | RESERVED | 2 |
| 4~7 | ATS-C START ADDRESS | 4 |
| 8~11 | ATS-C END ADDRESS | 4 |

ATS-C-TY

| b7 | b6 | b5 | b4 | b3 | b2 | b1 | b0 |
|---|---|---|---|---|---|---|---|
| ATS-C-COMP | | RESERVED | | ATS-C Usage | | | |

RECORDING MEDIUM AND SIGNAL PROCESSING APPARATUS

BACKGROUND OF THE INVENTION

1. Field of the Invention

This invention relates to a recording medium such as a digital signal recording disc, a digital video disc, a digital versatile disc, or an IC memory. Also, this invention relates to a signal encoding apparatus. Furthermore, this invention relates to a player for a recording medium such as a digital signal recording disc. In addition, this invention relates to a signal decoding apparatus and a signal decoding method.

2. Description of the Related Art

Optical discs for storing information include digital video discs and digital versatile discs (DVD's). A standard DVD stores a combination of an audio signal and a video signal. The audio-signal recording capacity of the standard DVD is significantly smaller than the video-signal recording capacity thereof. It is difficult to manage time-related information of the audio signal recorded on the standard DVD. It is difficult to read out information of the titles of tunes represented by the audio signal recorded on the standard DVD.

SUMMARY OF THE INVENTION

It is a first object of this invention to provide an improved recording medium.

It is a second object of this invention to provide an improved signal encoding apparatus.

It is a third object of this invention to provide an improved player for a recording medium.

It is a fourth object of this invention to provide an improved signal decoding apparatus.

It is a fifth object of this invention to provide an improved signal decoding method.

A first aspect of this invention provides a digital signal recording medium having a first area storing an audio title set, the audio title set having data representing audio information and data representing a still picture, the audio title set being void of a pack of data for playback control, the first area also storing information for managing the audio title set, the digital signal recording medium being void of a second area storing a video title set and information for managing the video title set.

A second aspect of this invention is based on the first aspect thereof, and provides a digital signal recording medium wherein the data representing the audio information in the audio title set results from analog-to-digital conversion of an analog audio signal at a predetermined sampling frequency.

A third aspect of this invention is based on the first aspect thereof, and provides a digital signal recording medium wherein the data representing the audio information in the audio title set includes first sub data and second sub data, the first sub data having a frame rate of 1/600 second and resulting from analog-to-digital conversion of an analog audio signal at a sampling frequency equal to a multiple of 48 kHz, the second sub data having a frame rate of 1/551.25 second and resulting from analog-to-digital conversion of an analog audio signal at a sampling frequency equal to a multiple of 44.1 kHz.

A fourth aspect of this invention provides a signal encoding apparatus comprising means for generating first information of management of an audio title set in response to first data representing audio information and second data representing a still picture; and means for combining and formatting the first data, the second data, and the first information into a data structure; wherein the data structure has a first area containing an audio title set, the audio title set having the first data and the second data, the audio title set being void of a pack of data for playback control, the first area also containing the first information, the data structure being void of a second area containing a video title set and second information of management of the video title set.

A fifth aspect of this invention provides a signal encoding apparatus comprising means for generating first information of management of an audio title set in response to first data representing audio information and second data representing a still picture; and means for combining and formatting the first data, the second data, and the first information into a data structure; wherein the data structure has a first area containing an audio title set, the audio title set having the first data and the second data, the audio title set being void of a pack of data for playback control, the first area also containing the first information, the data structure being void of a second area containing a video title set and second information of management of the video title set; and wherein the first data results from analog-to-digital conversion of an analog audio signal at a predetermined sampling frequency.

A sixth aspect of this invention provides a signal encoding apparatus comprising means for generating first information of management of an audio title set in response to first data representing audio information and second data representing a still picture; and means for combining and formatting the first data, the second data, and the first information into a data structure; wherein the data structure has a first area containing an audio title set, the audio title set having the first data and the second data, the audio title set being void of a pack of data for playback control, the first area also containing the first information, the data structure being void of a second area containing a video title set and second information of management of the video title set; and wherein the first data includes first sub data and second sub data, the first sub data having a frame rate of 1/600 second and resulting from analog-to-digital conversion of an analog audio signal at a sampling frequency equal to a multiple of 48 kHz, the second sub data having a frame rate of 1/551.25 second and resulting from analog-to-digital conversion of an analog audio signal at a sampling frequency equal to a multiple of 44.1 kHz.

A seventh aspect of this invention provides a signal encoding apparatus comprising means for generating first information of management of an audio title set in response to first data representing audio information and second data representing a still picture; means for combining and formatting the first data, the second data, and the first information into a data structure; wherein the data structure has a first area containing an audio title set, the audio title set having the first data and the second data, the audio title set being void of a pack of data for playback control, the first area also containing the first information, the data structure being void of a second area containing a video title set and second information of management of the video title set; wherein the first data includes first sub data and second sub data, the first sub data having a frame rate of 1/600 second and resulting from analog-to-digital conversion of an analog audio signal at a sampling frequency equal to a multiple of 48 kHz, the second sub data having a frame rate of 1/551.25 second and resulting from analog-to-digital conversion of an analog audio signal at a sampling frequency equal to a multiple of 44.1 kHz; and means for placing second information in the first area, the second information representing that emphasis reproduction is inhibited when the sampling frequency related to the first sub data is equal to 192 kHz, and when the sampling frequency related to the second sub data is equal to 176.4 kHz.

An eighth aspect of this invention provides a player for a digital signal recording medium having a first area storing an audio title set, the audio title set having data representing audio information and data representing a still picture, the audio title set being void of a pack of data for playback control, the first area also storing information for managing the audio title set, the digital signal recording medium being void of a second area storing a video title set and information for managing the video title set. The player comprises means for detecting the managing information from the first area of the digital signal recording medium; and means for reproducing the data representing the audio information and the data representing the still picture from the digital signal recording medium in response to the detected managing information.

A ninth aspect of this invention provides a player for a digital signal recording medium having a first area storing an audio title set, the audio title set having data representing audio information and data representing a still picture, the audio title set being void of a pack of data for playback control, the first area also storing information for managing the audio title set, the digital signal recording medium being void of a second area storing a video title set and information for managing the video title set, wherein the data representing the audio information in the audio title set includes first sub data and second sub data, the first sub data having a frame rate of 1/600 second and resulting from analog-to-digital conversion of an analog audio signal at a sampling frequency equal to a multiple of 48 kHz, the second sub data having a frame rate of 1/551.25 second and resulting from analog-to-digital conversion of an analog audio signal at a sampling frequency equal to a multiple of 44.1 kHz. The player comprises means for reproducing the first sub data and the second sub data from the digital signal recording medium; means for implementing digital-to-analog conversion of the reproduced first sub data to recover a corresponding analog audio signal; and means for implementing digital-to-analog conversion of the reproduced second sub data to recover a corresponding analog audio signal.

A tenth aspect of this invention is based on the ninth aspect thereof, and provides a player further comprising means for indicating the sampling frequencies related to the first sub data and the second sub data.

An eleventh aspect of this invention provides a digital signal recording medium having a first area storing audio title sets having data representing audio information and data representing a still-picture; a second area storing menu information; a third area storing information for managing the audio title sets; a fourth area storing information for managing the audio title sets and the menu information; and a fifth area storing TOC information.

A twelfth aspect of this invention provides a signal encoding apparatus comprising means for generating first information of management of an audio title set in response to first data representing audio information and second data representing a still picture; means for generating second information of management of the audio title set and menu information in response to the first data, the second data, and the menu information; and means for combining and formatting the first data, the second data, the first information, the second information, and TOC information into a data structure; wherein the data structure has a first area containing audio title sets having the first data and the second data, a second area containing the menu information, a third area containing the first information, a fourth area containing the second information, and a fifth area containing the TOC information.

A thirteenth aspect of this invention provides a player comprising means for dividing an input signal into packs; means for separating the packs into first packs, second packs, and third packs, the first packs including audio data, the second packs containing real-time information data, the third packs still-picture data; means for decoding the first packs into the audio data; means for decoding the second packs into the real-time information data; and means for decoding the third packs into the still-picture data.

A fourteenth aspect of this invention is based on the thirteenth aspect thereof, and provides a player further comprising means for outputting the audio data while outputting the still-picture data.

A fifteenth aspect of this invention is based on the fourteenth aspect thereof, and provides a player further comprising means for synchronizing the outputting of the audio data and the outputting of the still-picture data.

A sixteenth aspect of this invention is based on the fourteenth aspect thereof, and provides a player as recited further comprising means for changing a page of a picture represented by the still-picture data in response to a page change command.

A seventeenth aspect of this invention provides a player for a digital signal recording medium storing first audio data, second audio data, and sampling frequency information, the first audio data having a first predetermined sampling frequency, the second audio data having a second predetermined sampling frequency, the sampling frequency information representing the first predetermined frequency of the first audio data and the second sampling frequency of the second audio data. The player comprises means for reproducing the first audio data and the sampling frequency information from the digital signal recording medium; means for detecting a sampling frequency of the reproduced first audio data in response to the reproduced sampling frequency information; means for converting the reproduced first audio data into third audio data having a sampling frequency equal to the second predetermined sampling frequency; and means for implementing digital-to-analog conversion of the third audio data in response to a sampling clock signal having a frequency equal to the second predetermined sampling frequency.

An eighteenth aspect of this invention is based on the seventeenth aspect thereof, and provides a player wherein the first audio data and the second audio data correspond to respective channels of a multiple-channel audio signal.

A nineteenth aspect of this invention is based on the seventeenth aspect thereof, and provides a player further comprising means for indicating the sampling frequency of the first audio data when the first audio data is reproduced.

A twentieth aspect of this invention provides a player for a digital signal recording medium storing audio data, copyright data related to the audio data, and still-picture data. The player comprises means for reproducing the audio data, the copyright data, and the still-picture data from the digital signal recording medium; means for combining the reproduced copyright data and the reproduced still-picture data into a composite picture signal; and means for outputting the reproduced audio data while outputting the composite picture data.

A twenty-first aspect of this invention is based on the thirteenth aspect thereof, and provides a player further comprising means for reproducing information from a digital signal recording medium, and means for using the reproduced information as the input signal.

A twenty-second aspect of this invention is based on the thirteenth aspect thereof, and provides a player further comprising means for receiving the input signal from a transmission line.

A twenty-third aspect of this invention provides a signal encoding apparatus comprising means for generating audio packs containing audio data; means for generating management packs containing information of management of the audio packs; and means for placing character information and display time control data in the management packs, the character information relating to the audio data, the display time control data relating to a display time of the character information.

A twenty-fourth aspect of this invention provides a digital signal recording medium having first areas storing audio packs containing audio data; and second areas storing management packs containing information of management of the audio packs, the management packs also containing character information and display time control data, the character information relating to the audio data, the display time control data relating to a display time of the character information.

A twenty-fifth aspect of this invention provides a player for a digital signal recording medium having first areas storing audio packs containing audio data, and second areas storing management packs containing information of management of the audio packs, the management packs also containing character information and display time control data, the character information relating to the audio data, the display time control data relating to a display time of the character information. The player comprises means for reproducing the management packs from the digital signal recording medium; means for decoding the reproduced management packs into the character information; means for decoding the reproduced management packs into the display time control data; and means for indicating the character information in response to the display time control data.

A twenty-sixth aspect of this invention provides a signal encoding apparatus comprising means for generating audio packs containing audio data; means for generating character display packs containing character information and display time control data, the character information relating to the audio data, the display time control data relating to a display time of the character information; and means for generating management packs containing information of management of the audio packs and the character display packs.

A twenty-seventh aspect of this invention provides a digital signal recording medium having first areas storing audio packs containing audio data; second areas storing character display packs containing character information and display time control data, the character information relating to the audio data, the display time control data relating to a display time of the character information; and third areas storing management packs containing information of management of the audio packs and the character display packs.

A twenty-eighth aspect of this invention provides a player for a digital signal recording medium having first areas storing audio packs containing audio data, second areas storing character display packs containing character information and display time control data, the character information relating to the audio data, the display time control data relating to a display time of the character information, and third areas storing management packs containing information of management of the audio packs and the character display packs. The player comprises means for reproducing the character display packs from the digital signal recording medium; means for decoding the reproduced character display packs into the character information; means for decoding the reproduced character display packs into the display time control data; and means for indicating the character information in response to the display time control data.

A twenty-ninth aspect of this invention provides a signal encoding apparatus comprising means for generating audio packs containing audio data, means for generating character display packs containing character information relating to the audio data; and means for generating management packs containing information of management of the audio packs and display time control data relating to a display time of the character information.

A thirtieth aspect of this invention provides a digital signal recording medium having first areas storing audio packs containing audio data; second areas storing character display packs containing character information relating to the audio data; and third areas storing management packs containing information of management of the audio packs and display time control data relating to a display time of the character information.

A thirty-first aspect of this invention provides a player for a digital signal recording medium having first areas storing audio packs containing audio data, second areas storing character display packs containing character information relating to the audio data, and third areas storing management packs containing information of management of the audio packs and display time control data relating to a display time of the character information. The player comprises means for reproducing the character display packs and the management packs from the digital signal recording medium; means for decoding the reproduced character display packs into the character information; means for decoding the management packs into the display time control data; and means for indicating the character information in response to the display time control data.

A thirty-second aspect of this invention is based on the twenty-third aspect thereof, and provides a signal encoding apparatus wherein the display time control data represents a display start time and a display end time in terms of addresses of the audio packs.

A thirty-third aspect of this invention is based on the twenty-fourth aspect thereof, and provides a digital signal recording medium wherein the display time control data represents a display start time and a display end time in terms of addresses of the audio packs.

A thirty-fourth aspect of this invention is based on the twenty-fifth aspect thereof, and provides a player wherein the display time control data represents a display start time and a display end time in terms of addresses of the audio packs.

A thirty-fifth aspect of this invention provides a digital signal recording medium having a first area storing audio title sets comprising data representing audio information, data representing still picture and data representing real-time text, the audio title set being void of pack of data for playback control, the first area also storing menu information and information for managing the audio title sets and the menu information, the digital signal recording medium being void of a second area storing a video title set and information for managing the video title set.

A thirty-sixth aspect of this invention provides a signal encoding apparatus for encoding a signal into a format which corresponds to a digital signal recording medium having a first area storing audio title sets comprising data representing audio information, data representing still picture and data representing real-time text, the audio title set being void of pack of data for playback control, the first area also storing menu information and information for managing the audio title sets and the menu information, the digital signal recording medium being void of a second area storing a video title set and information for managing the video title set.

A thirty-seventh aspect of this invention provides a signal encoding method for encoding a signal into a format which corresponds to a digital signal recording medium having a first area storing audio title sets comprising data representing audio information, data representing still picture and data representing real-time text, the audio title set being void of pack of data for playback control, the first area also storing menu information and information for managing the audio title sets and the menu information, the digital signal recording medium being void of a second area storing a video title set and information for managing the video title set.

A thirty-eighth aspect of this invention provides a signal decoding apparatus for decoding a signal reproduced from a digital signal recording medium having a first area storing audio title sets comprising data representing audio information, data representing still picture and data representing real-time text, the audio title set being void of pack of data for playback control, the first area also storing menu information and information for managing the audio title sets and the menu information, the digital signal recording medium being void of a second area storing a video title set and information for managing the video title set.

A thirty-ninth aspect of this invention provides a signal decoding method for decoding a signal reproduced from a digital signal recording medium having a first area storing audio title sets comprising data representing audio information, data representing still picture and data representing real-time text, the audio title set being void of pack of data for playback control, the first area also storing menu information and information for managing the audio title sets and the menu information, the digital signal recording medium being void of a second area storing a video title set and information for managing the video title set.

BRIEF DESCRIPTION OF THE DRAWINGS

FIG. 5 is a diagram of the structure of an AMGI area in FIG. 3.

FIG. 6 is a diagram of the structure of an ATS-ATRT area in FIG. 5.

FIG. 7 is a diagram of the structure of an ATS-ATR area in FIG. 6.

FIG. 8 is a diagram of the structure of an ATSI area in FIG. 4.

FIG. 9 is a diagram of the structure of an ATSI-MAT area in FIG. 8.

FIG. 11 is a diagram of the structure of an ATS-AST-ATRT area in FIG. 9.

FIG. 12 is a diagram of the structure of an ATS-AST-ATR area in FIG. 11.

FIG. 16 is a diagram of the structure of an ACD area in FIG. 15.

FIG. 17 is a diagram of the indication of an English-added Japanese tune name.

FIG. 29 is a diagram of the structure of an AMGI area in a fifth embodiment of this invention.

FIG. 30 is a diagram of the details of TOC information in FIG. 29.

FIG. 31 is a diagram of the structure of an ATSI area in a sixth embodiment of this invention.

FIG. 42 is a diagram of the structure of an AOTT-AOB-ATR area.

FIG. 43 is a diagram of a linear PCM audio pack private header.

FIG. 60 is a diagram of the structure of a private header in the linear PCM audio pack of FIG. 59.

FIGS. 61, 62, 63, 64, 65, 66, and 67 are diagrams of the structures of UPC/EAN-ISRC data which correspond to different UPC/EAN-ISRC numbers, respectively.

FIG. 73 is a diagram of the structure of an ATSI-MAT area.

FIG. 74 is a diagram of the structure of an AOTT-AOB-ATR area.

FIG. 75 is a diagram of channel assignment.

FIG. 76 is a diagram of the structure of an AOTT-VOB-AST-ATR area.

FIG. 77 is a diagram of the structure of a 288-byte area for multiple channel audio data down mix coefficients ATS-DM-COEFT#0-#15 in FIG. 73.

FIG. 80 is a diagram of the structure of an ATS-PGCITI area.

FIG. 81 is a diagram of the structure of an ATS-PGCI-SRP area.

FIG. 82 is a diagram of the structure of an ATS-PGC-CAT area.

FIG. 87 is a diagram of the structure of an ATS-PGI area.

FIG. 88 is a diagram of the structure of an ATS-PG-CNT area.

DESCRIPTION OF THE PREFERRED EMBODIMENTS

First Embodiment

Figure 1:
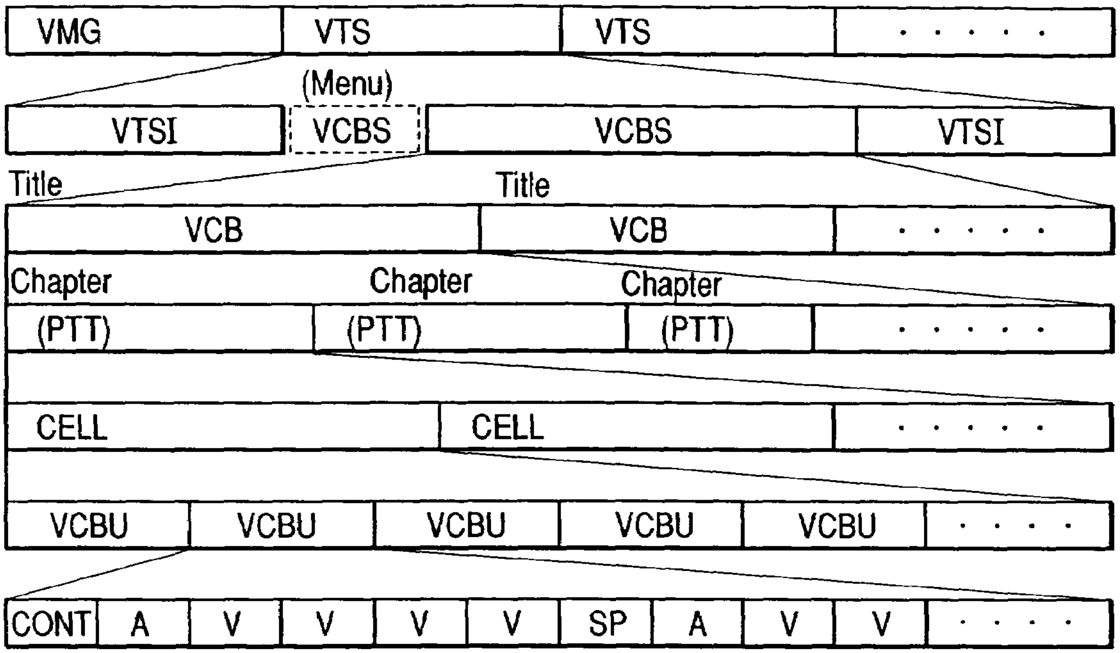
FIG. 1 is a diagram of the signal recording format of a DVD-Video.

FIG. 1 shows the signal recording format of a DVD-Video (a digital video disc-video or a digital versatile disc-video). As shown in FIG. 1, the DVD-Video has a first area assigned to a video manager VMG. The VMG area is followed by a sequence of second and later areas assigned to video title sets VTS respectively.

Each VTS area has a sequence of an area assigned to VTS information VTSI, one or more areas assigned to respective video contents block sets VCBS, and an area assigned to VTS information VTSI. The first video contents block set VCBS stores menu information for indicating a menu picture.

Each VCBS area has a sequence of areas assigned to video contents blocks VCB respectively. Each video contents block VCB corresponds to one video title.

Each VCB area has a sequence of areas corresponding to chapters respectively. Each chapter contains information representing a part of a title which is denoted by PTT.

Each chapter has a sequence of cells. Each cell has a sequence of VCB units VCBU. Each VCB unit VCBU has a sequence of packs. Each pack has 2,048 bytes.

In each VCB unit VCBU, a first pack is a control pack CONT followed by a sequence of packs including video packs V, audio packs A, and sub picture packs SP. The control pack CONT is assigned to information for controlling video packs V following the control pack CONT. The control information includes video-pack-synchronizing information. The video packs V are assigned to video data and non-audio data such as closed caption (CC) data. Each audio pack A is assigned to audio data.

Figure 2:
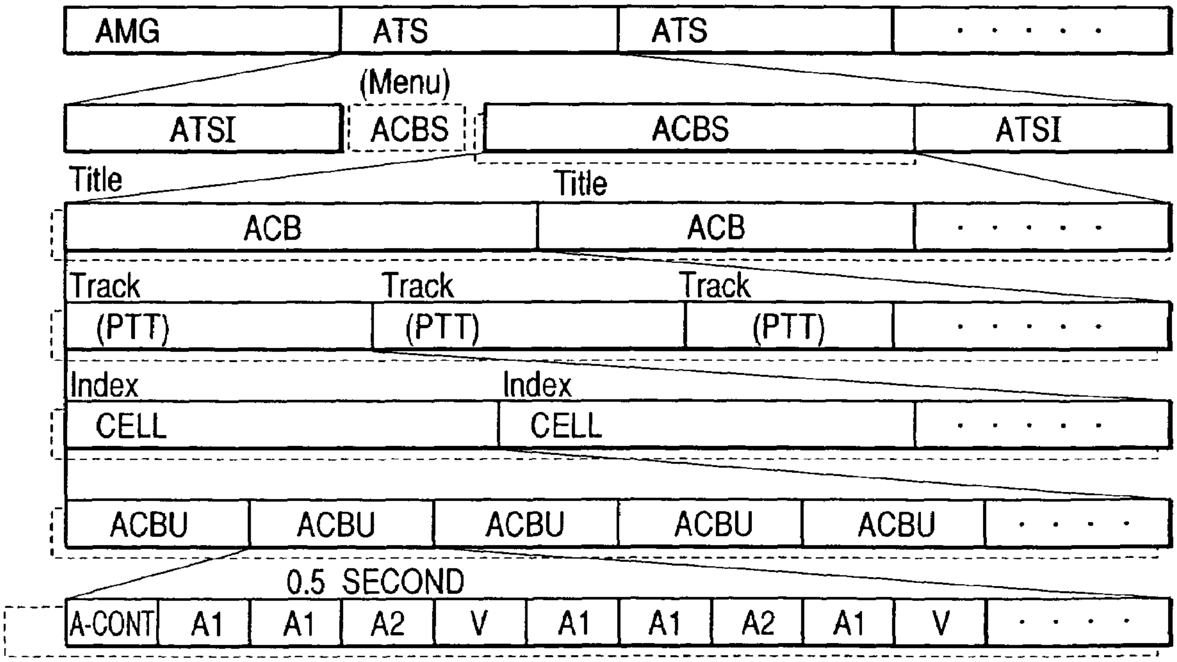
FIG. 2 is a diagram of the signal recording format of a DVD-Audio according to a first embodiment of this invention.

FIG. 2 shows the signal recording format of a DVD-Audio (a digital video disc-audio or a digital versatile disc-audio) according to a first embodiment of this invention. The DVD-Audio is compatible with a DVD-Video (see FIG. 1). As shown in FIG. 2, the DVD-Audio has a first area assigned to an audio manager AMG. The AMG area is followed by a sequence of second and later areas assigned to audio title sets ATS respectively.

Each ATS area has a sequence of an area assigned to ATS information ATSI, one or more areas assigned to respective audio contents block sets ACBS, and an area assigned to ATS information ATSI. The ATS information ATSI indicates play time lengths of respective tunes represented by audio data in the audio contents block sets ACBS. The play time lengths of the respective tunes are expressed in terms of real time. The first audio contents block set ACBS stores menu information for indicating a menu picture.

Each ACBS area has a sequence of areas assigned to audio contents blocks ACB respectively. Each audio contents block ACB corresponds to one audio title.

Each ACB area has a sequence of areas corresponding to tracks respectively. Each track contains information representing a part of a title which is denoted by PTT.

Each track has a sequence of indexes (cells). Each index has a sequence of ACB units ACBU. Each ACB unit ACBU has a sequence of packs. Each pack has 2,048 bytes.

In each ACB unit ACBU, a first pack is an audio control pack A-CONT followed by a sequence of packs including audio packs A1 and A2 and video packs V. The audio control pack A-CONT is assigned to information for managing an audio signal (audio data) in audio packs A1 and A2 following the audio control pack A-CONT. The managing information in the audio control pack A-CONT is basically similar to TOC (table of contents) information in a compact disc (CD). The managing information contains audio-pack-synchronizing information. Each audio pack A1 or A2 is assigned to audio data. The video packs V are assigned to video data and non-audio data such as closed caption (CC) data. The video packs V may be omitted from the ACB unit ACBU.

It should be noted that each ACB unit ACBU may further include a control pack CONT.

Figure 3:
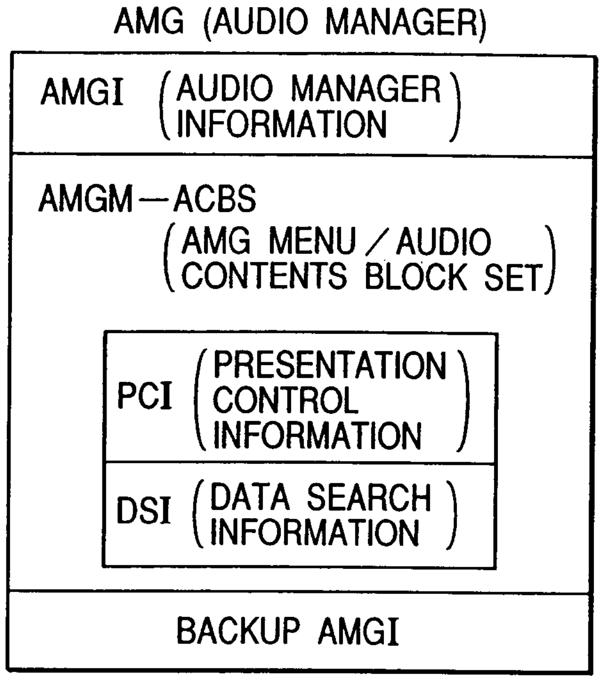
FIG. 3 is a diagram of the structure of an AMG area in FIG. 2.

As shown in FIG. 3, the AMG area (see FIG. 2) stores audio manager information AMGI, an audio contents block set AMGM-ACBS for an AMG menu, and backup audio manager information AMGI. The audio manager information AMGI may have TOC (table of contents) information. The audio contents block set AMGM-ACBS has presentation control information PCI and data search information DSI which are control information pieces respectively.

Figure 4:
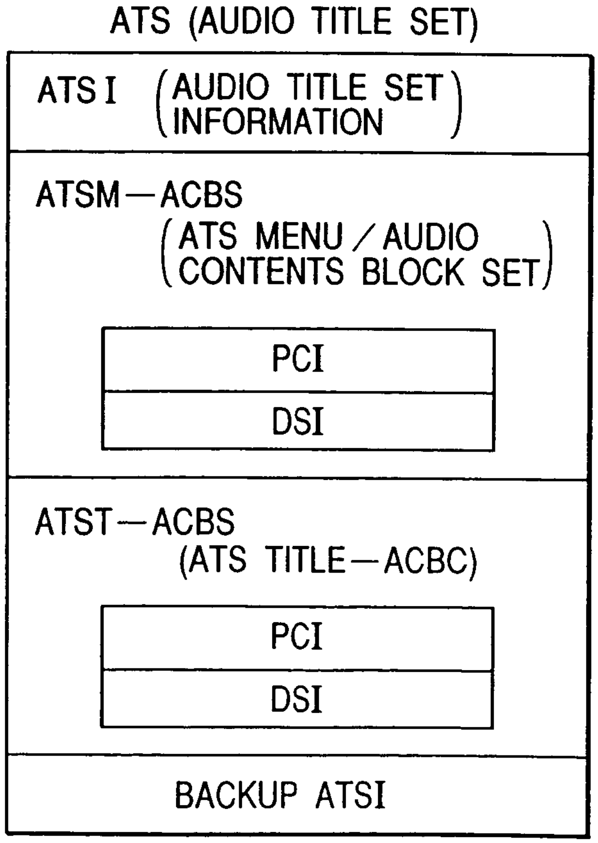
FIG. 4 is a diagram of the structure of an ATS area in FIG. 2.

As shown in FIG. 4, the ATS area (see FIG. 2) stores audio title set information ATSI, an audio contents block set ATSM-ACBS for an ATS menu, an audio contents block set ATST-ACBS for an ATS title, and backup audio title set information ATSI. The audio title set information ATSI may have TOC (table of contents) information. Each of the audio contents block sets ATSM-ACBS and ATST-ACBS has presentation control information PCI and data search information DSI.

As shown in FIG. 5, the audio manager information AMGI (see FIG. 3) has a management table AMGI-MAT therefor, a title search pointer table T-SRPT, an audio manager menu program chain information unit table AMGM-PGCI-UT, a parental management information table PTL-MAIT, an audio title set attribute table ATS-ATRT, a text data manager TXTDT-MG, an audio manager menu cell (index) address table AMGM-C-ADT, and an audio manager menu audio contents block unit address map AMGM-ACBU-ADMAP.

As shown in FIG. 6, the audio title set attribute table ATS-ATRT (see FIG. 5) has audio title set attribute table information ATS-ATRTI, audio title set attribute search pointers ATS-ATR-SRP#1, ATS-ATR-SRP#2, . . . , ATS-ATR-SRP#n for respective "n" audio title sets ATS, and audio title set attribute data pieces ATS-ATR-#1, ATS-ATR-#2, . . . , ATS-ATR-#n for the respective "n" audio title sets ATS.

As shown in FIG. 7, each of the audio title set attribute data pieces ATS-ATR-#1, ATS-ATR-#2, . . . , ATS-ATR-#n (see FIG. 6) represents an end address ATS-ATR-EA of the audio title set attribute, a category ATS-CAT of the audio title set, and audio title set attribute information ATS-ATRI.

As shown in FIG. 8, the audio title set information ATSI (see FIG. 4) has a management table ATSI-MAT for the audio title set information ATSI, a part-of-title search pointer table ATS-PTT-SRPT for the audio title set, a program chain information table ATS-PGCIT for the audio title set, a PGCI unit table ATSM-PGCI-UT for the audio title set menu, a time map table ATS-TMAPT for the audio title set, a cell (index) address table ATSM-C-ADT for the audio title set menu, an audio contents block unit address map ATSM-ACBU-ADMAP for the audio title set menu, a cell (index) address table ATS-C-ADT for the audio title set, and an audio contents block unit address map ATS-ACBU-ADMAP for the audio title set.

As shown in FIG. 9, the audio title set information management table ATSI-MAT (see FIG. 8) has an identifier ATS-ID for the audio title set, an end address ATS-EA of the audio title set, an end address ATSI-EA for the audio title set information, a version number VERN of the specifications of the DVD-Audio, a category ATS-CAT of the audio title set, an end address ATSI-MAT-EA of the audio title set information management table, a start address ATSM-ACBS-SA of the ATS menu audio contents block set, a start address ATSA-ACBS-SA of the ATS title audio contents block set, a start address ATS-PTT-SRPT-SA of the audio title set part-of-title search pointer table, a start address ATS-PGCIT-SA of the audio title set program chain information table, a start address ATSM-PGCI-UT-SA of the audio title set menu program chain information unit table, a start address ATS-TMAPT-SA of the audio title set time map table, a start address ATSM-C-ADT-SA of the audio title set menu cell address table, a start address ATSM-ACBU-ADMAP-SA of the ATS menu audio contents block unit address map, an ATS menu audio stream attribute ATSM-AST-ATR, the number ATS-AST-Ns of audio streams in the audio title set, and an ATS audio stream attribute table ATS-AST-ATRT.

Figure 10:
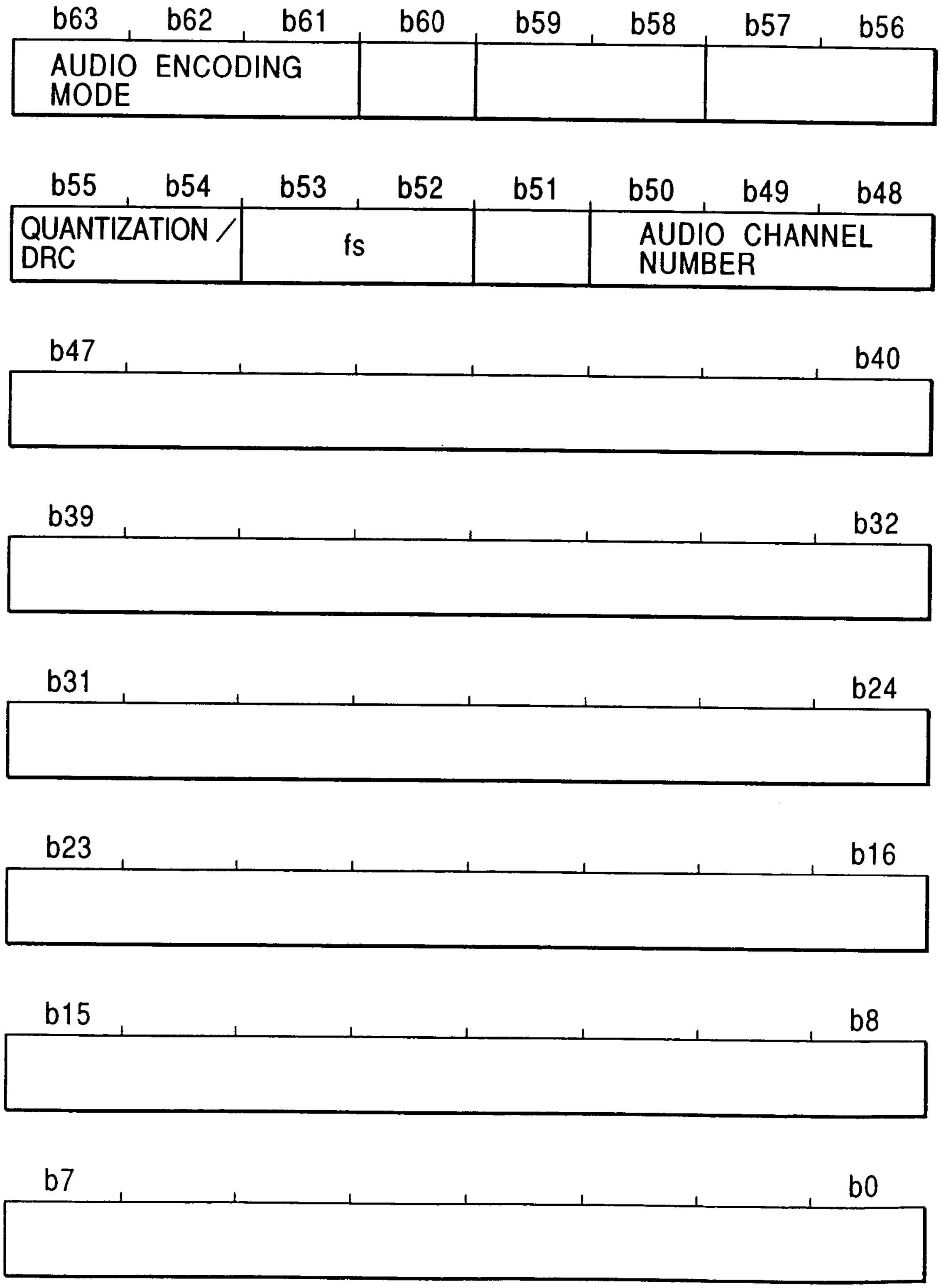
FIG. 10 is a diagram of the structure of an ATSM-AST-ATR area in FIG. 9.

As shown in FIG. 10, the ATS menu audio stream attribute ATSM-AST-ATR (see FIG. 9) has a sequence of 8 bytes, that is, 64 bits b63, b62, b61, . . . , b1, b0. A set of the bits b63, b62, and b61 represents an audio encoding mode selected from among a Dolby AC-3 encoding mode, an encoding mode corresponding to MPEG-1 or MPEG-2 without any extension bit stream, an encoding mode corresponding to MPEG-2 with an extension bit stream, a first linear PCM audio encoding mode, and a second linear PCM audio encoding mode. The second linear PCM audio encoding mode is of a type containing a sub type corresponding to 2 channels plus 5 channels, a sub type corresponding to 2 channels plus 6 channels, and a sub type corresponding to 2 channels plus 8 channels. Specifically, a bit sequence of "000" is assigned to the Dolby AC-3 encoding mode. A bit sequence of "010" is assigned to the encoding mode corresponding to MPEG-1 or MPEG-2 without any extension bit stream. A bit sequence of "011" is assigned to the encoding mode corresponding to MPEG-2 with an extension bit stream. A bit sequence of "100" is assigned to the first linear PCM audio encoding mode. A bit sequence of "101" is assigned to the second linear PCM audio encoding mode.

A set of the bits b55 and b54 in the ATS menu audio stream attribute ATSM-AST-ATR represents information of quantization/dynamic range control (DRC). When the audio encoding mode is "000", the information of quantization/DRC is set to "11". When the audio encoding mode is "010" or "011", a bit sequence of "00" which relates to the information of quantization/DRC represents the absence of dynamic control data from the MPEG audio stream. When the audio encoding mode is "010" or "011", a bit sequence of "01" which relates to the information of quantization/DRC represents the presence of dynamic control data in the MPEG audio stream. When the audio encoding mode is "100" or "101", a bit sequence of "00" which relates to the information of quantization/DRC represents that each of channels (two stereophonic channels) has 16 bits for every signal sample. When the audio encoding mode is "100" or "101", a bit sequence of "01" which relates to the information of quantization/DRC represents that each of channels (two stereophonic channels) has 20 bits for every signal sample. When the audio encoding mode is "100" or "101", a bit sequence of "10" which relates to the information of quantization/DRC represents that each of channels (two stereophonic channels) has 24 bits for every signal sample.

A set of the bits b53 and b52 in the ATS menu audio stream attribute ATSM-AST-ATR represents a sampling frequency "fs" related to each of two stereophonic channels. Specifically a bit sequence of "00" indicates that the sampling frequency "fs" is equal to 48 kHz. A bit sequence of "01" indicates that the sampling frequency "fs" is equal to 96 kHz. A bit sequence of "10" indicates that the sampling frequency "fs" is equal to 192 kHz.

A set of the bits b50, b49, and b48 in the ATS menu audio stream attribute ATSM-AST-ATR represents the number of audio channels. Specifically, a bit sequence of "000" indicates that there is only one channel ("monaural"). A bit sequence of "001" indicates that there are two stereophonic channels. A bit sequence of "010" indicates that there are three channels. A bit sequence of "011" indicates that there are four channels. A bit sequence of "100" indicates that there are two stereophonic channels plus five channels. A bit sequence of "101" indicates that there are two stereophonic channels plus six channels. A bit sequence of "110" indicates that there are seven channels. A bit sequence of "111" indicates that there are two stereophonic channels plus eight channels.

As shown in FIG. 11, the ATS audio stream attribute table ATS-AST-ATRT (see FIG. 9) has attributes ATS-AST-ATR of respective ATS audio streams ATS-AST#0, ATS-AST#1, . . . , ATS-AST#7. Each of the ATS audio stream attributes ATS-AST-ATR has 8 bytes. Accordingly, the total number of bytes representing the ATS audio stream attribute table ATS-AST-ATRT is equal to 64.

As shown in FIG. 12, each ATS audio stream attribute ATS-AST-ATR (see FIG. 11) has a sequence of 8 bytes, that is, 64 bits b63, b62, b61, . . . , b1, b0. A set of the bits b63, b62, and b61 in the ATS audio stream attribute ATS-AST-ATR represents an audio encoding mode as in the ATS menu audio stream attribute ATSM-AST-ATR (see FIG. 10). A set of the bits b55 and b54 in the ATS audio stream attribute ATS-AST-ATR represents information of quantization/dynamic range control (DRC) as in the ATS menu audio stream attribute ATSM-AST-ATR (see FIG. 10). A set of the bits b53 and b52 in the ATS audio stream attribute ATS-AST-ATR represents a sampling frequency "fs" as in the ATS menu audio stream attribute ATSM-AST-ATR (see FIG. 10). A set of the bits b50, b49, and b48 in the ATS audio stream attribute ATS-AST-ATR represents the number of audio channels as in the ATS menu audio stream attribute ATSM-AST-ATR (see FIG. 10).

The bit b60 in the ATS audio stream attribute ATS-AST-ATR represents information of multichannel extension ME. A set of the bits b59 and b58 in the ATS audio stream attribute ATS-AST-ATR represents an audio type.

A set of the bits b57 and b56 in the ATS audio stream attribute ATS-AST-ATR represents an audio application mode. Specifically, a bit sequence of "01" indicates a karaoke mode. A bit sequence of "10" indicates a surround mode. A bit sequence of "11" indicates a 2-channel plus surround mode. In this embodiment, the bits b57 and b56 are set to, for example, "11" indicating the 2-channel plus surround mode.

A set of the bits b47 and b46 in the ATS audio stream attribute ATS-AST-ATR represents information of thinning (decimating) the related audio stream AST. Specifically, a bit sequence of "00" indicates that thinning corresponds to "full" (1/1, absence of thinning). A bit sequence of "01" indicates that thinning corresponds to "half" (½). A bit sequence of "10" indicates that thinning corresponds to "quarter" (¼).

A set of the bits b45 and b44 in the ATS audio stream attribute ATS-AST-ATR represents information of thinning (decimating) data in the related low frequency effect (LFE) channel. Specifically, a bit sequence of "00" indicates that thinning corresponds to "full" (1/1, absence of thinning). A bit sequence of "01" indicates that thinning corresponds to "half" (½). A bit sequence of "10" indicates that thinning corresponds to "quarter" (¼).

For the audio stream AST#0, the bits b50, b49, and b48 in the ATS menu audio stream attribute ATSM-AST-ATR (see FIG. 10) are fixed to "001" indicating that there are two stereophonic channels. For the audio stream AST#1, the bits b50, b49, and b48 in the ATS menu audio stream attribute ATSM-AST-ATR (see FIG. 10) are fixed to "010" indicating that there are three channels.

In the case where a recorded audio signal of one title has two stereophonic channels plus six channels, 2-channel stereophonic signals are assigned to the audio stream AST#0 and 3-channel front signals among 6-channel signals are assigned to the audio stream AST#1, and 2-channel rear signals and a 1-channel LFE signal are assigned to the audio stream AST#2. In this case, a signal of "3" indicating use of three audio streams (the audio stream AST#0, AST#1, and AST#2) is placed in the management table AMGI-MAT within the audio manager information AMGI of FIG. 5 and also the management table ATSI-MAT within the audio title set information ATSI of FIG. 8.

An explanation will be given of the case where an original analog audio signal has two stereophonic channels plus six channels, and the original analog audio signal is processed into a digital audio signal under conditions indicated below before the digital audio signal is recorded. The 2-channel analog stereophonic signals are sampled at a frequency “fs” of 48 kHz, and are quantized with a quantization bit number of 20. The 3-channel analog front signals are sampled at a frequency “fs” of 96 kHz, and are quantized with a quantization bit number of 16. The 2-channel analog rear signals and the 1-channel analog LFE signal are sampled at a frequency “fs” of 48 kHz, and are quantized with a quantization bit number of 16. The resultant 8-channel digital signals are unthinned. In this case, information pieces of attributes of stereophonic two channels are set in the ATS menu audio stream attribute ATSM-AST-ATR of FIG. 10 as follows. The bits b63, b62, and b61 in the ATS menu audio stream attribute ATSM-AST-ATR are set to “101” representing the second linear PCM audio encoding mode which is of the type containing the sub type corresponding to 2 channels plus 5 channels, the sub type corresponding to 2 channels plus 6 channels, and the sub type corresponding to 2 channels plus 8 channels. The bits b55 and b54 in the ATS menu audio stream attribute ATSM-AST-ATR are set to “01” representing that each of two stereophonic channels has 20 bits for every signal sample. The bits b53 and b52 in the ATS menu audio stream attribute ATSM-AST-ATR are set to “00” indicating that the sampling frequency “fs” is equal to 48 kHz. The bits b50, b49, and b48 in the ATS menu audio stream attribute ATSM-AST-ATR are set to “101” indicating that there are two stereophonic channels plus six channels.

In the above-mentioned case, information pieces of attributes are set in the ATS audio stream attribute ATS-AST-ATR of FIG. 12 for the audio stream AST#0 as follows. The bits b63, b62, and b61 in the ATS audio stream attribute ATS-AST-ATR are set to “101” representing the second linear PCM audio encoding mode which is of the type containing the sub type corresponding to 2 channels plus 5 channels, the sub type corresponding to 2 channels plus 6 channels, and the sub type corresponding to 2 channels plus 8 channels. The bits b55 and b54 in the ATS audio stream attribute ATS-AST-ATR are set to “01” representing that each of two stereophonic channels has 20 bits for every signal sample. The bits b53 and b52 in the ATS audio stream attribute ATS-AST-ATR are set to “00” indicating that the sampling frequency “fs” is equal to 48 kHz. The bits b50, b49, and b48 in the ATS audio stream attribute ATS-AST-ATR are set to “001” indicating that there are two stereophonic channels. The bits b57 and b56 in the ATS audio stream attribute ATS-AST-ATR are set to “11” indicating the 2-channel plus surround mode. As information of thinning the related audio stream AST#0, the bits b47 and b46 in the ATS audio stream attribute ATS-AST-ATR are set to “00” indicating that thinning corresponds to “full” (1/1, absence of thinning). As information of thinning data in the related LFE channel, the bits b45 and b44 in the ATS audio stream attribute ATS-AST-ATR are set to “00” indicating that thinning corresponds to “full” (1/1, absence of thinning).

In the above-mentioned case, information pieces of attributes are set in the ATS audio stream attribute ATS-AST-ATR of FIG. 12 for the audio stream AST#1 as follows. The bits b63, b62, and b61 in the ATS audio stream attribute ATS-AST-ATR are set to “101” representing the second linear PCM audio encoding mode which is of the type containing the sub type corresponding to 2 channels plus 5 channels, the sub type corresponding to 2 channels plus 6 channels, and the sub type corresponding to 2 channels plus 8 channels. The bits b55 and b54 in the ATS audio stream attribute ATS-AST-ATR are set to “00” representing that each channel has 16 bits for every signal sample. The bits b53 and b52 in the ATS audio stream attribute ATS-AST-ATR are set to “01” indicating that the sampling frequency “fs” is equal to 96 kHz. The bits b50, b49, and b48 in the ATS audio stream attribute ATS-AST-ATR are set to “010” indicating that there are three channels. The bits b57 and b56 in the ATS audio stream attribute ATS-AST-ATR are set to “11” indicating the 2-channel plus surround mode. As information of thinning the related audio stream AST#1, the bits b47 and b46 in the ATS audio stream attribute ATS-AST-ATR are set to “00” indicating that thinning corresponds to “full” (1/1, absence of thinning). As information of thinning data in the related LFE channel, the bits b45 and b44 in the ATS audio stream attribute ATS-AST-ATR are set to “00” indicating that thinning corresponds to “full” (1/1, absence of thinning).

In the above-mentioned case, information pieces of attributes are set in the ATS audio stream attribute ATS-AST-ATR of FIG. 12 for the audio stream AST#2 as follows. The bits b63, b62, and b61 in the ATS audio stream attribute ATS-AST-ATR are set to “101” representing the second linear PCM audio encoding mode which is of the type containing the sub type corresponding to 2 channels plus 5 channels, the sub type corresponding to 2 channels plus 6 channels, and the sub type corresponding to 2 channels plus 8 channels. The bits b55 and b54 in the ATS audio stream attribute ATS-AST-ATR are set to “00” representing that each channel has 16 bits for every signal sample. The bits b53 and b52 in the ATS audio stream attribute ATS-AST-ATR are set to “00” indicating that the sampling frequency “fs” is equal to 48 kHz. The bits b50, b49, and b48 in the ATS audio stream attribute ATS-AST-ATR are set to “010” indicating that there are three channels. The bits b57 and b56 in the ATS audio stream attribute ATS-AST-ATR are set to “11” indicating the 2-channel plus surround mode. As information of thinning the related audio stream AST#2, the bits b47 and b46 in the ATS audio stream attribute ATS-AST-ATR are set to “00” indicating that thinning corresponds to “full” (1/1, absence of thinning). As information of thinning data in the related LFE channel, the bits b45 and b44 in the ATS audio stream attribute ATS-AST-ATR are set to “00” indicating that thinning corresponds to “full” (1/1, absence of thinning).

Figure 13:
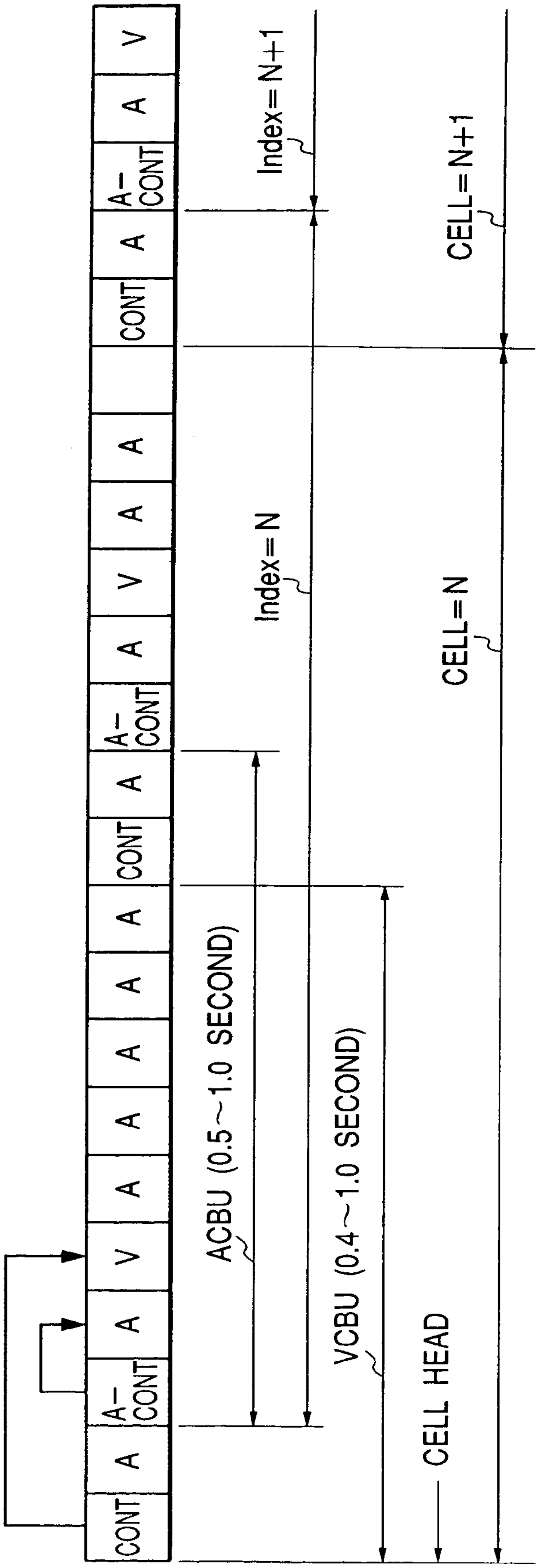
FIG. 13 is a diagram of a sequence of packs.

With reference to FIG. 13, there is a sequence of packs containing control packs CONT, audio packs A, audio control packs A-CONT, and video packs V. Audio streams are recorded in the audio packs A. Each VCB unit VCBU has a set of successive packs which corresponds to a time length of 0.4 second to 1.0 second. The total number of packs in one VCB unit VCBU is arbitrary. The first pack in each VCB unit VCBU is a control pack CONT. On the other hand, each ACB unit ACBU has a set of successive packs which corresponds to a time length of 0.5 second to 1.0 second. The total number of packs in one ACB unit ACBU is arbitrary. The first pack in each ACB unit ACBU is an audio control pack A-CONT. An audio control pack A-CONT in each ACB unit ACBU in a DVD-Audio is located at a place corresponding to a third pack in a VCB unit VCBU in a DVD-Video.

Basically, audio control packs A-CONT are spaced at intervals corresponding to 0.5 second. In the boundary between indexes (cells), audio control packs A-CONT are spaced at intervals corresponding to a time of 0.5 second to 1.0 second.

Time (GOF, group of audio frames) related to audio is represented by each audio control pack A-CONT, and a related data position is decided by an audio frame number, a first access unit pointer, and the number of frame headers. Audio packs A immediately before audio control packs A-CONT may be padded to provide 0.5-second intervals between the audio control packs A-CONT.

Audio signal segments stored in respective neighboring audio packs A have a predetermined relation with each other.

In the case where a recorded audio signal is of the stereophonic type, neighboring audio packs A store a left-channel signal segment and a right-channel signal segment, respectively. In the case where a recorded audio signal is of the multiple-channel type (the 5-channel type, the 6-channel type, or the 8-channel type), neighboring audio packs A store different channel signal segments, respectively.

Each video pack V stores information of a picture which relates to audio signal segments in audio packs A near the video pack V.

Figure 14:
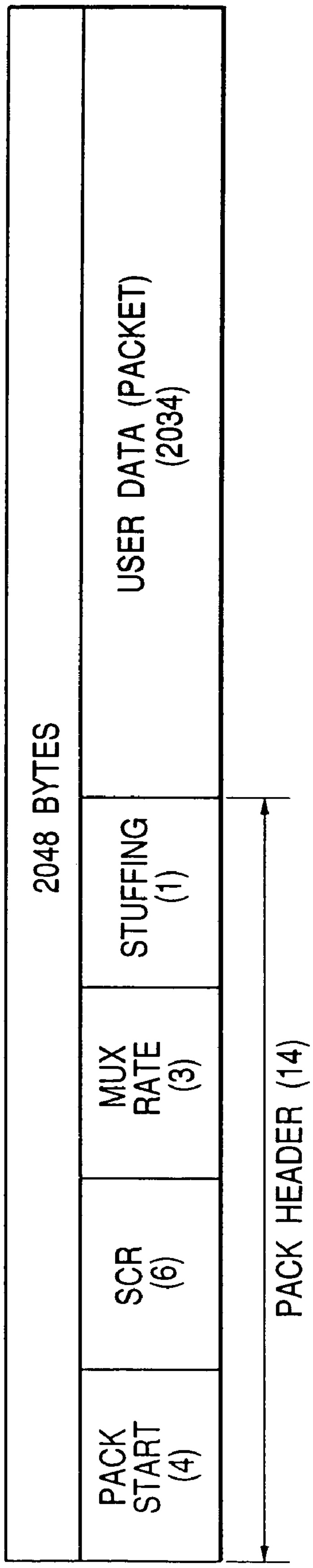
FIG. 14 is a diagram of the structure of an audio pack A or a video pack V.

As shown in FIG. 14, each of audio packs A and video packs V has a sequence of 4-byte pack start information, 6-byte SCR (system clock reference) information, 3-byte mux rate information, 1-byte stuffing data, and 2,034-byte packet-form user data. Thus, each of audio packs A and video packs V has 2,048 bytes. In each audio pack A or video pack V, pack start information, SCR information, mux rate information, and stuffing data compose a 14-byte pack header. SCR information in each audio pack A or video pack V serves as a time stamp.

A time stamp in a first audio pack A among audio packs related to one title is set to “1”. Time stamps in second and later audio packs related to the same title are set to serial numbers “2”, “3”, “4”, . . . , respectively. The serially-numbered time stamps enable management of times of audio packs A related to the same title.

Figure 15:
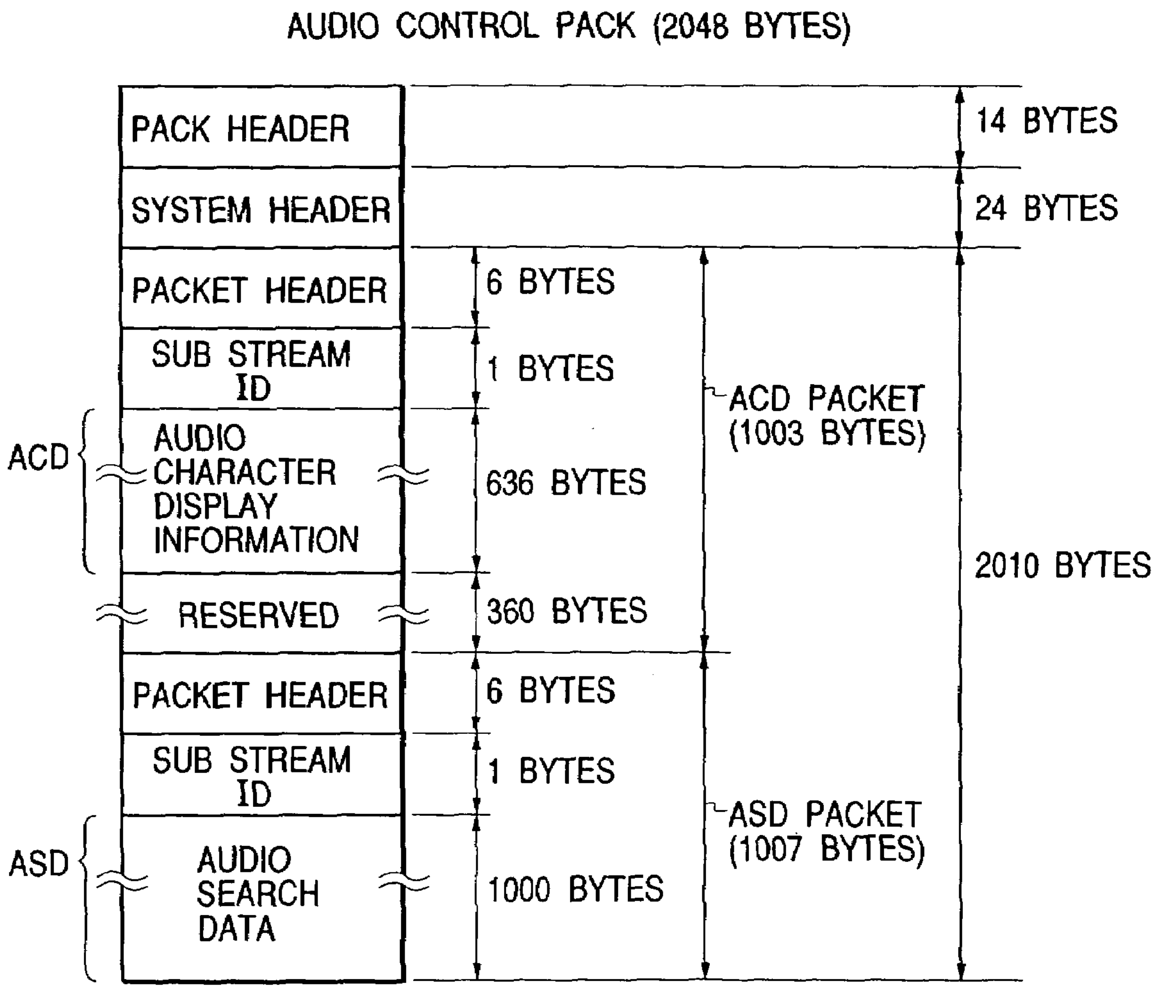
FIG. 15 is a diagram of the structure of an audio control pack A-CONT.

As shown in FIG. 15, each audio control pack A-CONT has a sequence of a 14-byte pack header, a 24-byte system header, a 1003-byte audio character display (ACD) packet, and a 1007-byte audio search data (ASD) packet. The ACD packet has a sequence of a 6-byte packet header, a 1-byte area assigned to sub stream identification (ID) information, a 636-byte area assigned to audio character display (ACD) information, and a 360-byte reserved area. The ASD packet has a sequence of a 6-byte packet header, a 1-byte area assigned to sub stream identification (ID) information, and a 1000-byte area assigned to audio search data (ASD).

As shown in FIG. 16, the 636-byte ACD information area has a 48-byte area assigned to general information, a 294-byte area for a first language, and a 294-byte area for a second language. The 294-byte area for the first language is divided into a 93-byte name space area, a first 93-byte free space area, a second 93-byte free space area, and a 15-byte data pointer area. Similarly, the 294-byte area for the second language is divided into a 93-byte name space area, a first 93-byte free space area, a second 93-byte free space area, and a 15-byte data pointer area. In the case where the first language is Japanese, the 93-byte name space area for the first language stores data representing an English-added Japanese tune name as shown in FIG. 17. In the case where the second language is English, the 93-byte name space area for the second language stores data representing an English tune name. The first and second languages may be decided by the publisher of the present DVD-Audio.

The 48-byte general information area in the ACD information area of FIG. 16 has a 16-byte area assigned to service level information, a 12-byte area assigned to language code information, a 6-byte area assigned to character set code information, a 6-byte area assigned to display item information, a 2-byte area assigned to information of the difference from the previous ACD information, and a 6-byte reserved area. The 16-byte service level information represents a display size, a display type, a discrimination among audio, video, and sub picture SP, and a stream. Characters designated by the 48-byte general information are mandatory while bit maps designated thereby are optional. The 12-byte language code information has a first 2-byte information piece designating the first language, and a second 2-byte information piece designating the second language. Eight or less languages can be designated in one file. Regarding the first and second languages, the English language is mandatory.

The 6-byte character set code information represents 15 or less character code words corresponding to language code words. The 6-byte character set code information has a 1-byte information piece representing whether the first and second languages are present or absent, and also representing the types of the first and second languages. For example, a first language code word corresponds to the “ISO646” standards and a second language code word corresponds to the “ISO8859-1” standards while a third language code word corresponds to the “MS-JIS” standards.

The 6-byte display item information represents whether the free spaces (see FIG. 16) for the first and second languages and the data pointers (see FIG. 16) for the first and second languages are present or absent. The 6-byte display item information contains related ID (identification) information. It should be noted that the name spaces (see FIG. 16) for the first and second languages are mandatory. An information piece of a title name, an information piece of a music name, and an information piece of an artist name are stored in the name space areas for the first and second languages.

Figure 18:
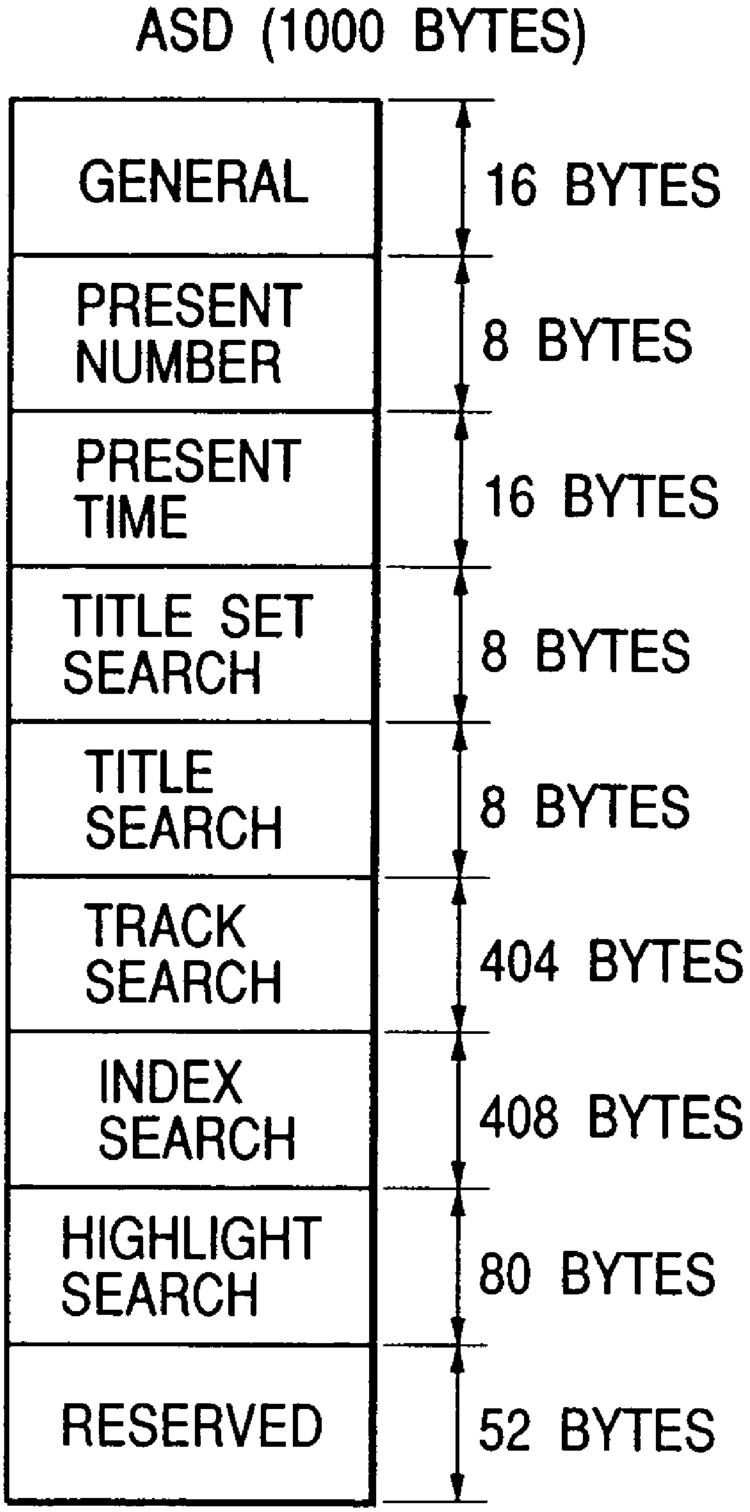
FIG. 18 is a diagram of the structure of an ASD area in FIG. 15.

As shown in FIG. 18, the 1000-byte audio search data (ASD) area (see FIG. 15) is divided into a 16-byte area assigned to general information, an 8-byte area assigned to information of the present number, a 16-byte area assigned to information of the present time, an 8-byte area assigned to title set search information, an 8-byte area assigned to title search information, a 404-byte area assigned to track search information, a 408-byte area assigned to index search information, an 80-byte area assigned to highlight search information, and a 52-byte reserved area.

The 8-byte present number information area in FIG. 18 is divided into a 2-byte area assigned to BCD information of the present title number of the related title set, a 2-byte area assigned to BCD information of the present track number of the related title set, a 2-byte area assigned to BCD information of the present index number of the related track, and a 2-byte reserved area.

The 16-byte present time information area in FIG. 18 is divided into a 4-byte area assigned to BCD information of a playback time of the related track, a 4-byte area assigned to BCD information of a remaining playback time of the related track, a 4-byte area assigned to BCD information of an absolute time of the related title, and a 4-byte area assigned to BCD information of a remaining absolute time of the related title.

The 8-byte title set search information area in FIG. 18 is divided into a 4-byte area assigned to information of an order number of a first sector regarding the related title set, and a 4-byte area assigned to information of an order number of a final sector regarding the related title set.

The 8-byte title search information area in FIG. 18 is divided into a 4-byte area assigned to information of an order number of a first sector in the related title, and a 4-byte area assigned to information of an order number of a final sector in the related title.

The 404-byte track search information area in FIG. 18 is divided into a 4-by-99-byte area assigned to information of order numbers of sectors and order numbers of tracks in the related title, a 4-byte area assigned to information of an order number of a first track in the related title, and a 4-byte area assigned to information of an order number of a final track in the related title.

The 408-byte index search information area in FIG. 18 is divided into a 4-by-100-byte area assigned to information of order numbers of sectors and order numbers of indexes in the related track, a 4-byte area assigned to information of an order number of a first index in the related track, and a 4-byte area assigned to information of an order number of a final index in the related track.

The 80-byte highlight search information area in FIG. 18 is divided into a 4-by-10-byte area assigned to information of order numbers of in-sectors in the related track, and a 4-by-10-byte area assigned to information of order numbers of out-sectors in the related track.

With reference back to FIGS. 2 and 13, in the DVD-Audio, an audio control pack A-CONT precedes a plurality of audio packs A. The audio control pack A-CONT stores information for managing audio signal segments stored in the following audio packs A. In the DVD-Audio, audio data can be independent of video data. The DVD-Audio has a greater audio recording capacity than that of the DVD-Video. Audio control packs A-CONT in the DVD-Audio enable management of audio-related time. Character information representing, for example, a tune name, can be read out from an audio control pack A-CONT.

In the DVD-Audio, each audio control pack A-CONT stores managing information (TOC information) representing a title, a start address, and a play time. During playback of the audio signal from the DVD-Audio, information requested by the user can be read out from audio control packs A-CONT and be indicated on a display of a DVD-Audio player. The user can decide a desired position of restart of playback by referring to the indicated information. Playback can be restarted from the desired position in response to user's request.

In the DVD-Audio, audio manager information AMGI and audio title set information ATSI have TOC information. Before playback of the audio signal from the DVD-Audio, the TOC information can be read out from the DVD-Audio and be stored into a memory within a DVD-Audio player. TOC information requested by the user can be read out from the memory and be indicated on a display of the DVD-Audio player. The user can decide a desired position of start of playback by referring to the indicated TOC information. Playback can be started from the desired position in response to user's request.

Regarding the DVD-Audio, it is possible to implement a search for and a random access to a title, a tune, and an index. In addition, it is possible to implement a random access, a time search, and a tune-head search in unit of GOF (group of audio frames). Furthermore, it is possible to manage title-related time, tune-related time, and index-related time on a real-time basis.

Video packs V in the DVD-Audio make it possible to manage and indicate the present time and the remaining play time of a tune or a title.

Figure 19:
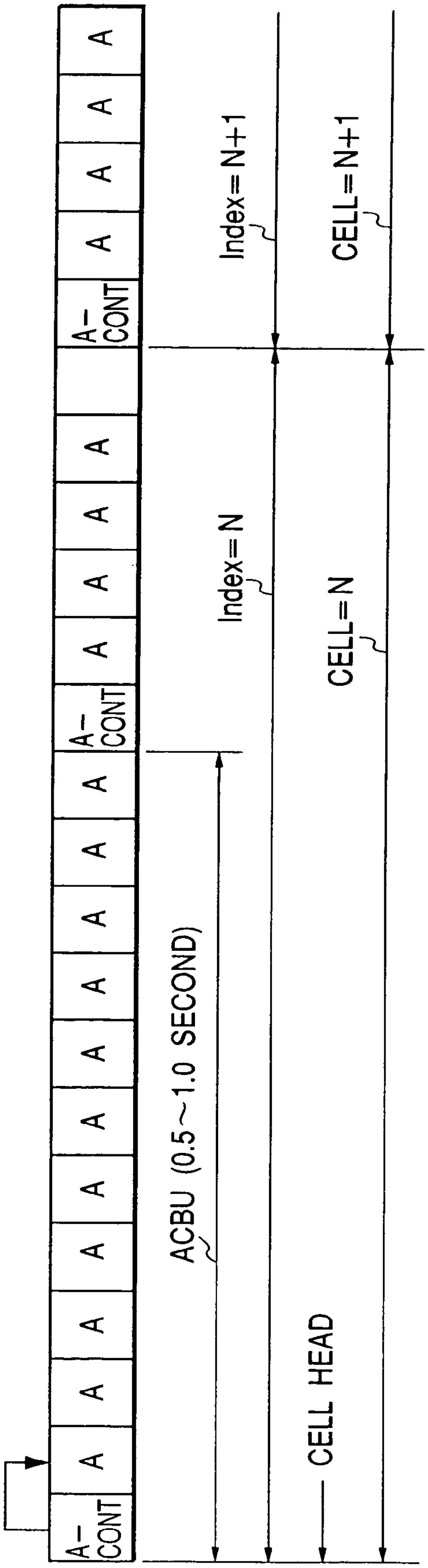
FIG. 19 is a diagram of a sequence of packs.

It should be noted that the pack sequence of FIG. 13 may be replaced by a pack sequence of FIG. 19 from which video packs V and control packs CONT are omitted.

Figure 20:
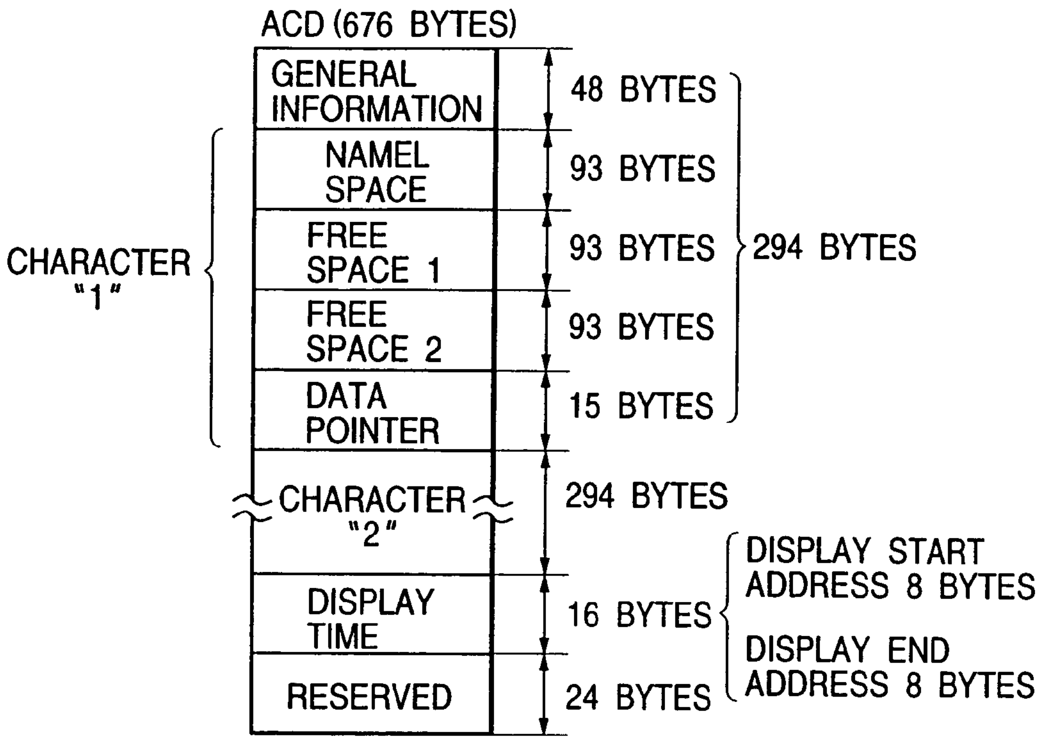
FIG. 20 is a diagram of the structure of an ACD area.

It should be noted that the 636-byte ACD information area in FIG. 16 may be replaced by a 676-byte ACD information area in FIG. 20. The 676-byte ACD information area in FIG. 20 has a 48-byte area assigned to general information, a 294-byte area for a first language, a 294-byte area for a second language, a 16-byte area assigned to display time data (indication time data), and a 24-byte reserved area.

With reference to FIG. 20, the 294-byte area for the first language is divided into a 93-byte name space area, a first 93-byte free space area, a second 93-byte free space area, and a 15-byte data pointer area. Similarly, the 294-byte area for the second language is divided into a 93-byte name space area, a first 93-byte free space area, a second 93-byte free space area, and a 15-byte data pointer area. In the case where the first language is Japanese, the 93-byte name space area for the first language stores data representing an English-added Japanese tune name as shown in FIG. 17. The 16-byte display time data area is loaded with 8-byte information of the address of an audio pack A corresponding to display start time (indication start time), and also 8-byte information of the address of an audio pack A corresponding to display end time (indication end time).

The 48-byte general information area in the ACD information area of FIG. 20 has a 16-byte area assigned to service level information, a 12-byte area assigned to language code information, a 6-byte area assigned to character set code information, a 6-byte area assigned to display item information, a 2-byte area assigned to information of the difference from the previous ACD information, and a 6-byte reserved area. The 16-byte service level information represents a display size, a display type, a discrimination among audio, video, and sub picture SP, and a stream. Characters designated by the 48-byte general information are mandatory while bit maps designated thereby are optional. The 12-byte language code information has a first 2-byte information piece designating the first language, and a second 2-byte information piece designating the second language. Eight or less languages can be designated in one file. Regarding the first and second languages, the English language is mandatory.

Figure 21:
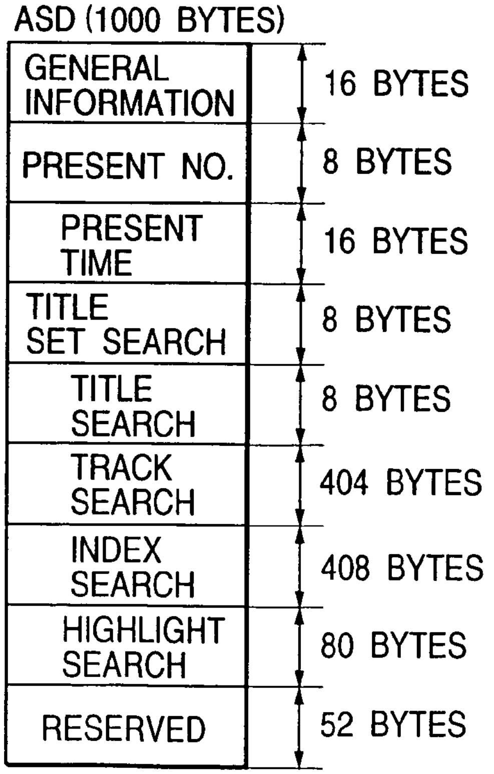
FIG. 21 is a diagram of the structure of an ASD area.

It should be noted that the 1000-byte ASD area in FIG. 18 may be replaced by a 1000-byte ASD area in FIG. 21. The 1000-byte ASD area in FIG. 21 is divided into a 16-byte area assigned to general information, an 8-byte area assigned to information of the present number, a 16-byte area assigned to information of the present time, an 8-byte area assigned to title set search information, an 8-byte area assigned to title search information, a 404-byte area assigned to track search information, a 408-byte area assigned to index search information, an 80-byte area assigned to highlight search information, and a 52-byte reserved area.

Figure 22:
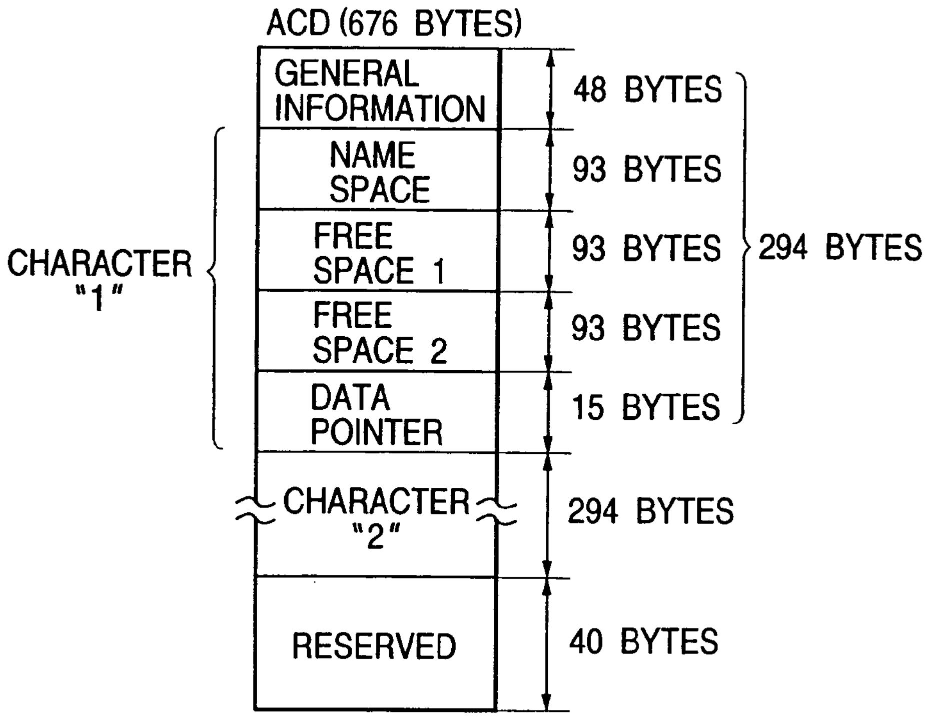
FIG. 22 is a diagram of the structure of an ACD area.

It should be noted that the 636-byte ACD information area in FIG. 16 or the 676-byte ACD information area in FIG. 20 may be replaced by a 676-byte ACD information area in FIG. 22. The 676-byte ACD information area in FIG. 22 has a 48-byte area assigned to general information, a 294-byte area for a first language, a 294-byte area for a second language, and a 40-byte reserved area. The 676-byte ACD information area in FIG. 22 is similar to the 676-byte ACD information area in FIG. 20 except that a 16-byte area assigned to display time data (indication time data) is replaced by a reserved area.

Figure 23:
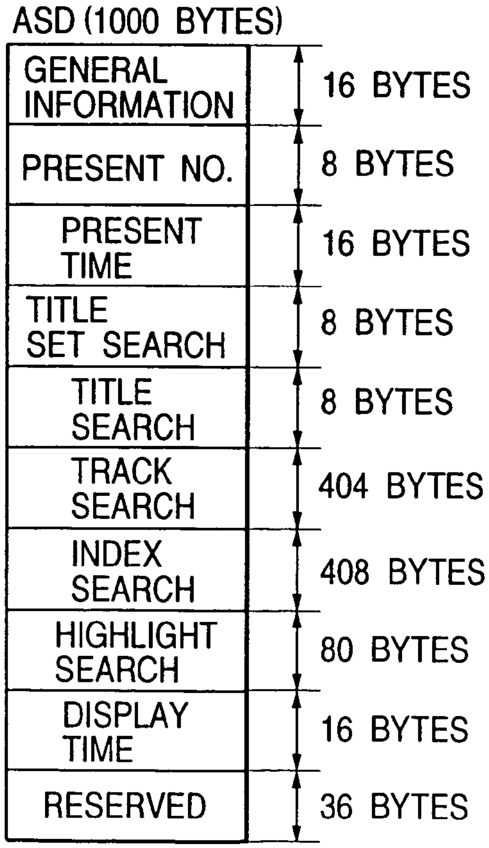
FIG. 23 is a diagram of the structure of an ASD area.

Preferably, the 676-byte ACD information area in FIG. 22 is used together with a 1000-byte ASD area in FIG. 23 which replaces either the 1000-byte ASD area in FIG. 18 or the 1000-byte ASD area in FIG. 21. The 1000-byte ASD area in FIG. 23 is similar to the 1000-byte ASD area in FIG. 21 except for the following point. The 1000-byte ASD area in FIG. 23 has a 16-byte area assigned to display time data (indication time data), and a 36-byte reserved area.

Second Embodiment

Figure 24:
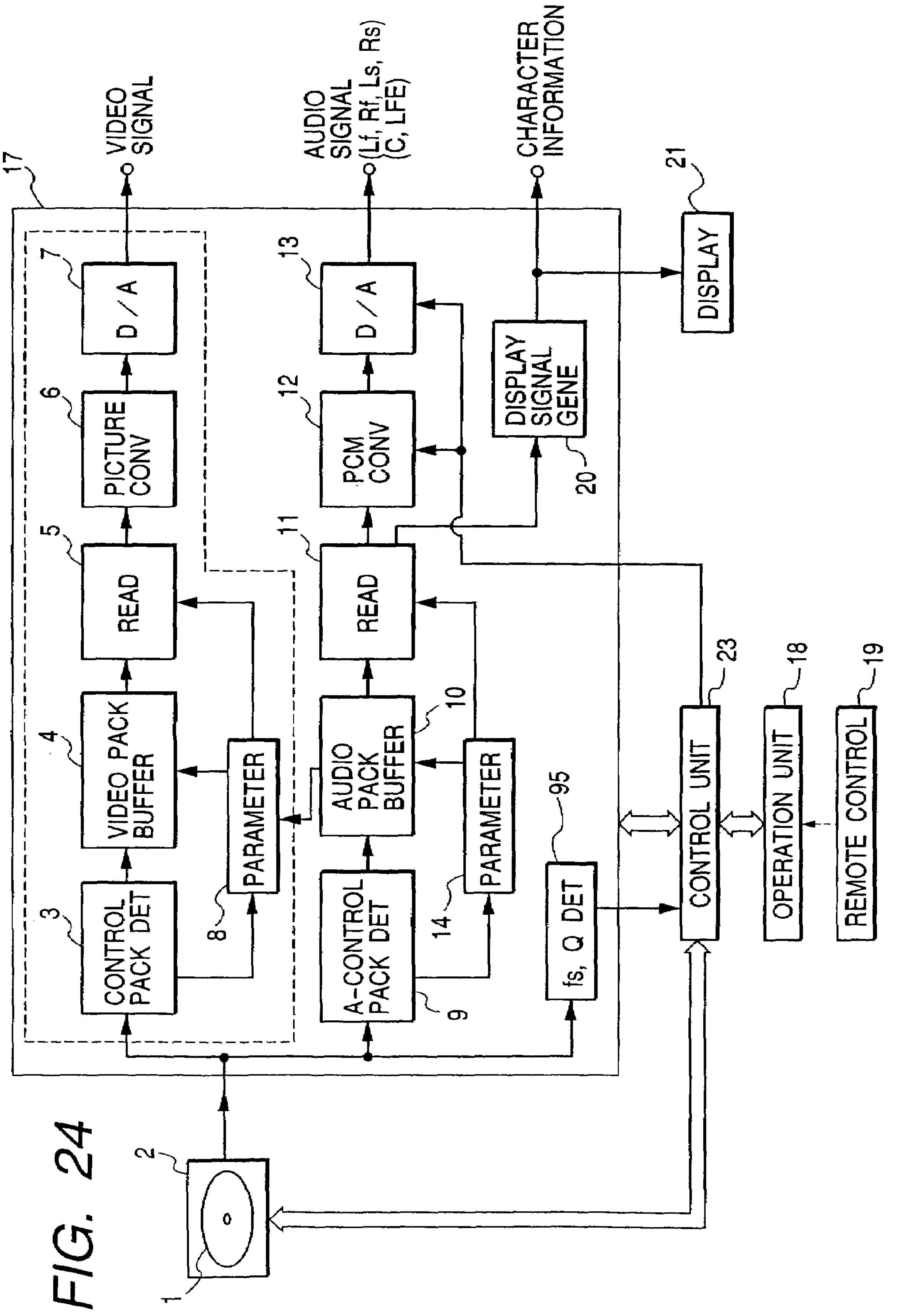
FIG. 24 is a block diagram of a DVD-Audio player including an audio-signal decoding apparatus according to a second embodiment of this invention.

FIG. 24 shows a DVD-Audio player including a signal decoding apparatus according to a second embodiment of this invention. The player in FIG. 24 is designed for a DVD-Audio in the embodiment of FIGS. 2-23.

The player in FIG. 24 operates on a DVD-Audio 1. The player in FIG. 24 includes an operation unit 18 and a remote control unit 19. The remote control unit 19 can communicate with the operation unit 18 by wireless. The operation unit 18 is connected to a control unit 23. The control unit 23 includes a CPU. The control unit 23 is connected to a drive unit 2 and a reproduced signal processing unit 17. The drive unit 2 is connected to the reproduced signal processing unit 17.

The CPU 23 operates in accordance with a control program stored in an internal ROM. When the user actuates the operation unit 18 or the remote control unit 19 to request tune selection, playback, fast feed, or stop, the CPU 23 controls the drive unit 2 and the reproduced signal processing unit 17 to implement the requested operation mode.

During playback, the drive unit 2 reads out a signal from the DVD-Audio 1. The drive unit 2 includes a demodulator which subjects the readout signal to given demodulation (for example, EFM demodulation). The drive unit 2 outputs the demodulation-resultant signal to the reproduced signal processing unit 17 as a reproduced signal.

The reproduced signal processing circuit 17 includes a control pack detector 3 which receives the reproduced signal from the drive unit 2. The control pack detector 3 detects every control pack CONT in the reproduced signal. The control pack detector 3 generates control parameters in response to the detected control pack CONT. The control pack detector 3 sets the control parameters in a parameter unit (a parameter memory) 8. The control pack detector 3 selects video packs V from the reproduced signal in response to the detected control pack CONT. The control pack detector 3 sequentially writes the video packs V into a video pack buffer 4.

The reproduced signal processing circuit 17 includes a reading unit 5 connected to the video pack buffer 4. The reading unit 5 reads out user data (video information and sub picture information) from the video packs V in the video pack buffer 4 in an order determined by SCR information (see FIG. 14) in each of the video packs V. The reading unit 5 outputs a stream of the user data to a picture converter 6. The picture converter 6 changes the user data stream into a corresponding digital video signal. The picture converter 6 outputs the digital video signal to a digital-to-analog (D/A) converter 7. The D/A converter 7 changes the digital video signal into a corresponding analog video signal. The D/A converter 7 outputs the analog video signal to an external device (not shown). The analog video signal outputted from the D/A converter 7 contains the video information and the sub picture information.

It should be noted that the reading unit 5 may read out user data from the video packs V in the video pack buffer 4 in an order determined by PTS (presentation time stamp) information in a control pack CONT. To this end, the control pack detector 3 feeds the PTS information in the detected control pack CONT to the reading unit 5.

The reproduced signal processing circuit 17 includes an audio control pack detector 9 which receives the reproduced signal from the drive unit 2. The audio control pack detector 9 detects every audio control pack A-CONT in the reproduced signal. The audio control pack detector 9 generates control parameters in response to the detected audio control pack A-CONT. The audio control pack detector 9 sets the control parameters in a parameter unit (a parameter memory) 14. The audio control pack detector 9 selects audio packs A from the reproduced signal in response to the detected audio control pack A-CONT. The audio control pack detector 9 sequentially writes the audio packs A into an audio pack buffer 10.

The reproduced signal processing circuit 17 includes a reading unit 11 connected to the audio pack buffer 10. The reading unit 11 reads out user data (audio data) from the audio packs A in the audio pack buffer 10 in an order determined by SCR information (see FIG. 14) in each of the audio packs A. The reading unit 11 outputs a stream of the user data (the audio data) to a PCM converter 12. The PCM converter 12 changes the user data stream (the audio data stream) into a corresponding digital audio signal by a PCM decoding process. The PCM converter 12 outputs the digital audio signal to a digital-to-analog (D/A) converter 13. The D/A converter 13 changes the digital audio signal into a corresponding analog audio signal. The analog audio signal has, for example a left front channel Lf, a right front channel Rf, a center channel C, a left surround channel Is, and a right surround channel Rs. The D/A converter 13 outputs the analog audio signal to an external device (not shown).

It should be noted that the reading unit 11 may read out user data (audio data) from the audio packs A in the audio pack buffer 10 in an order determined by present-time information in audio search data ASD (see FIG. 18) in an audio control pack A-CONT. To this end, the audio control pack detector 9 feeds the present-time information in the detected audio control pack A-CONT to the reading unit 11.

Audio character display information (ACD information in FIG. 15) in every detected audio control pack A-CONT is transmitted to from the audio control pack detector 9 to a display signal generator 20 via the parameter unit 14 and the reading unit 11. The display signal generator 20 converts the audio character display information into a corresponding display signal. The display signal generator 20 outputs the display signal to a display device 21. The display device 21 indicates the display signal. The display signal generator 20 may output the display signal to an external device (not shown).

The reproduced signal processing unit 17 includes a detector 95 which receives the reproduced signal from the drive unit 2. The detector 95 extracts information of sampling frequencies "fs" (fs1 and fs2) and information of quantization bit numbers Q (Q1 and Q2) from the reproduced signal. The detector 95 feeds the information of the sampling frequencies "fs" (fs1 and fs2) and the information of the quantization bit numbers Q (Q1 and Q2) to the CPU 23. The CPU 23 controls the PCM converter 12 and the D/A converter 13 in response to the information of the sampling frequencies "fs" (fs1 and fs2) and the information of the quantization bit numbers Q (Q1 and Q2). Accordingly, conditions of the inverse quantization (the signal decoding) implemented by the PCM converter 12 and the D/A converter 13 depend on the information of the sampling frequencies "fs" (fs1 and fs2) and the information of the quantization bit numbers Q (Q1 and Q2). Thus, the inverse quantization can be on a channel by channel basis or a channel-group by channel-group basis.

Figure 25:
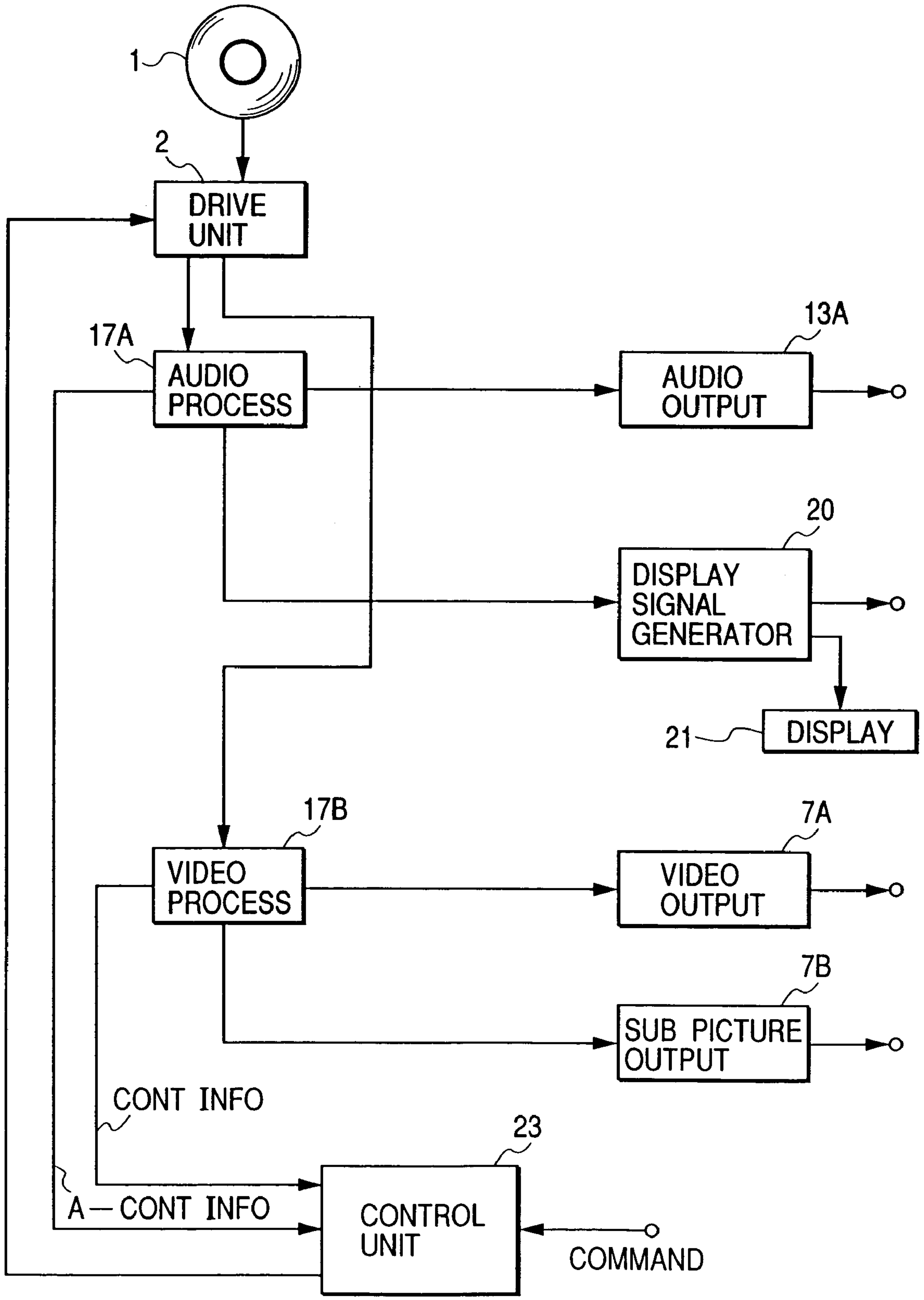
FIG. 25 is an operation flow diagram of the DVD-Audio player in FIG. 24.

FIG. 25 shows the flow of operation of the DVD-Audio player in FIG. 24. With reference to FIG. 25, an audio processing block 17A following the drive unit 2 corresponds to the audio control pack detector 9, the audio pack buffer 10, the reading unit 11, and the parameter unit 14 in FIG. 24. The audio processing block 17A is followed by an audio output block 13A which corresponds to the PCM converter 12 and the D/A converter 13 in FIG. 24. The audio processing block 17A is connected to the display signal generator 20. The display signal generator 20 is connected to the display device 21. A video processing block 17B following the drive unit 2 corresponds to the control pack detector 3, the video pack buffer 4, the reading unit 5, and the parameter unit 8 in FIG. 24. The video processing block 17B is followed by a video output block 7A and a sub picture output block 7B. The video output block 7A corresponds to the picture converter 6 and the D/A converter 7. The sub picture output block 7B also corresponds to the picture converter 6 and the D/A converter 7. The control unit 23 is connected to the audio processing block 17A and the video processing block 17B. The control unit 23 is also connected to the drive unit 2.

In FIG. 25, the control unit 23 receives a command signal from the operation unit 18 or the remote control unit 19 which represents a tune requested by the user. The control unit 23 generates an address control signal in response to the received command signal, and outputs the generated address control signal to the drive unit 2. The drive unit 2 accesses the DVD-Audio 1 in response to the address control signal, and reproduces a signal from the DVD-Audio 1 which represents the requested tune. The drive unit 2 outputs the reproduced signal to the audio processing block 17A and the video processing block 17B. The audio processing block 17A extracts information from every audio control pack A-CONT represented by the reproduced signal. The audio processing block 17A feeds the extracted A-CONT information to the control unit 23. The video processing block 17B extracts information from every control pack CONT represented by the reproduced signal. The video processing block 17B feeds the extracted CONT information to the control unit 23. In addition, the video processing block 17B extracts video information and sub picture information from the reproduced signal. The video processing block 17B feeds the extracted video information to the video output block 7A. The video processing block 17B feeds the extracted sub picture information to the sub picture output block 7B.

Figure 26:
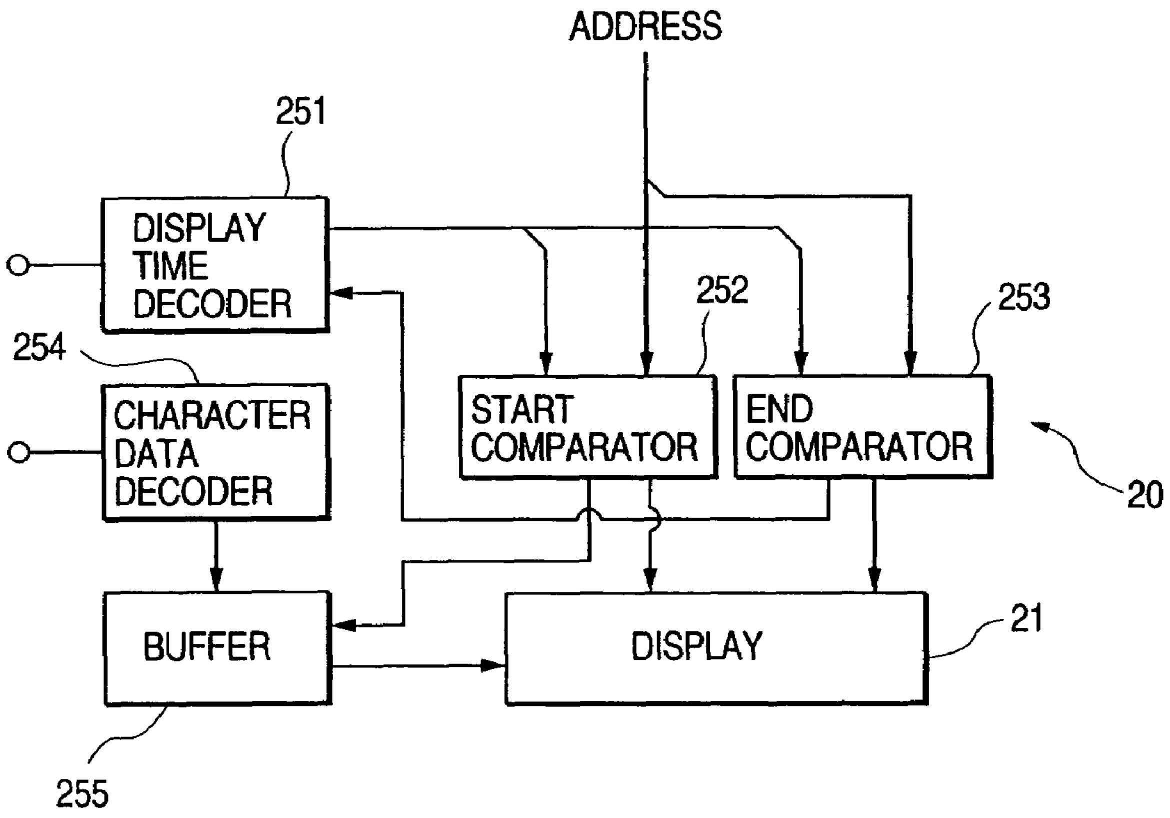
FIG. 26 is a block diagram of a display signal generator in FIG. 24.

The display signal generator 20 and the display device 21 will be further explained. As shown in FIG. 26, the display signal generator 20 includes a display time decoder 251 which receives display time data in every audio control pack A-CONT. The display time decoder 251 separates the display time data into display start time data and display end time data which are expressed in terms of audio pack addresses. The display time decoder 251 applies the display start time data to a start comparator 252. The display time decoder 251 applies the display end time data to an end comparator 253.

With reference to FIG. 26, the display signal generator 20 includes a character data decoder 254 receiving character data, that is, audio character display (ACD) information, in every audio control pack A-CONT. The character data decoder 254 converts the received character data into dot matrix character data. The character data decoder 254 stores the dot matrix character data into a buffer 255. The buffer 255 is connected to the display device 21. The start comparator 252 and the end comparator 253 are connected to the display device 21. The display device 21 includes a flat-face dot matrix display.

The start comparator 252 compares the display start time data and the address of a currently-reproduced audio pack A. When the address of the currently-reproduced audio pack A becomes equal to the display start time data, the start comparator 252 outputs a read start signal to the buffer 255. At the same time, the start comparator 252 outputs a display-on control signal to the display device 21. The dot matrix character data starts to be transferred from the buffer 255 to the display device 21 in response to the read start signal. The display device 21 starts to operate in response to the display-on control signal. The display device 21 indicates the dot matrix character data after the start of its operation.

The end comparator 253 compares the display end time data and the address of a currently-reproduced audio pack A. When the address of the currently-reproduced audio pack A becomes equal to the display end time data, the end comparator 253 feeds the display time decoder 251 with a timing signal for the outputting of next display start time data and next display end time data. At the same time, the end comparator 23 outputs a display-off control signal to the display device 21. The display device 21 suspends its operation in response to the display-off control signal.

Third Embodiment

Figure 27:
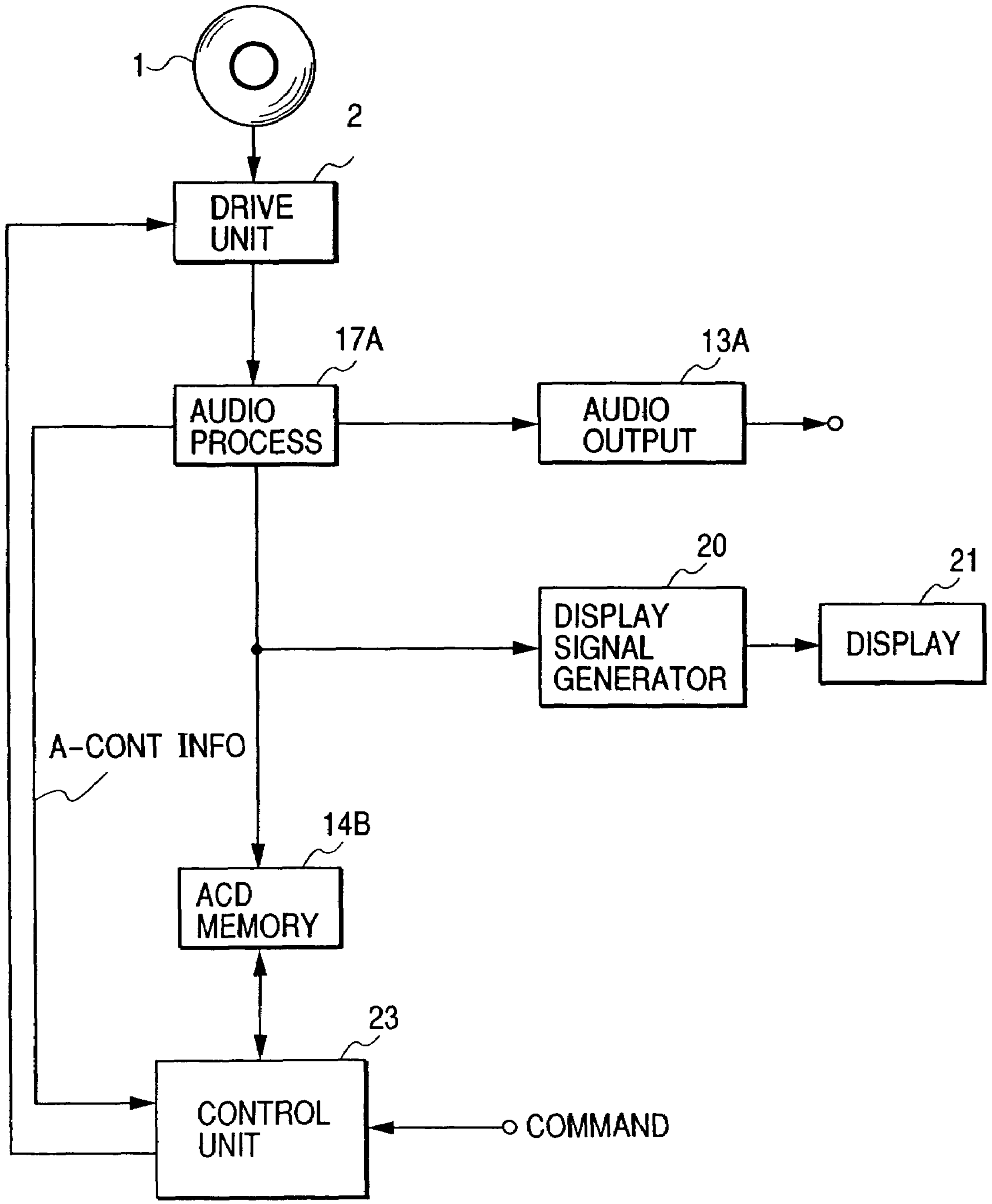
FIG. 27 is an operation flow diagram of a DVD-Audio player including an audio-signal decoding apparatus according to a third embodiment of this invention.

FIG. 27 shows a third embodiment of this invention which is similar to the embodiment of FIG. 25 except for design changes indicated later. The embodiment of FIG. 27 is designed to operate on a DVD-Audio 1 loaded with a digital signal including a sequence of audio packs A and audio control packs A-CONT which has neither video packs V nor control packs CONT.

The video output block 7A, the sub picture output block 7B, and the video processing block 17B (see FIG. 25) are omitted from the embodiment of FIG. 27. On the other hand, the embodiment of FIG. 27 includes an ACD information memory 14B connected among the audio processing block 17A, the display signal generator 20, and the control unit 23.

In the embodiment of FIG. 27, the audio processing block 17A extracts ACD information from an audio control pack A-CONT which precedes the audio control pack A-CONT for controlling the audio pack A currently outputted from the audio output block 13A. The audio processing block 17A stores the extracted ACD information into the ACD information memory 14B. The display signal generator 20 reads out the ACD information from the ACD information memory 14B, and converts the readout ACD information into dot matrix character data. The display signal generator 20 outputs the dot matrix character data to the display device 21. The display device 21 indicates the dot matrix character data.

Fourth Embodiment

Figure 28:
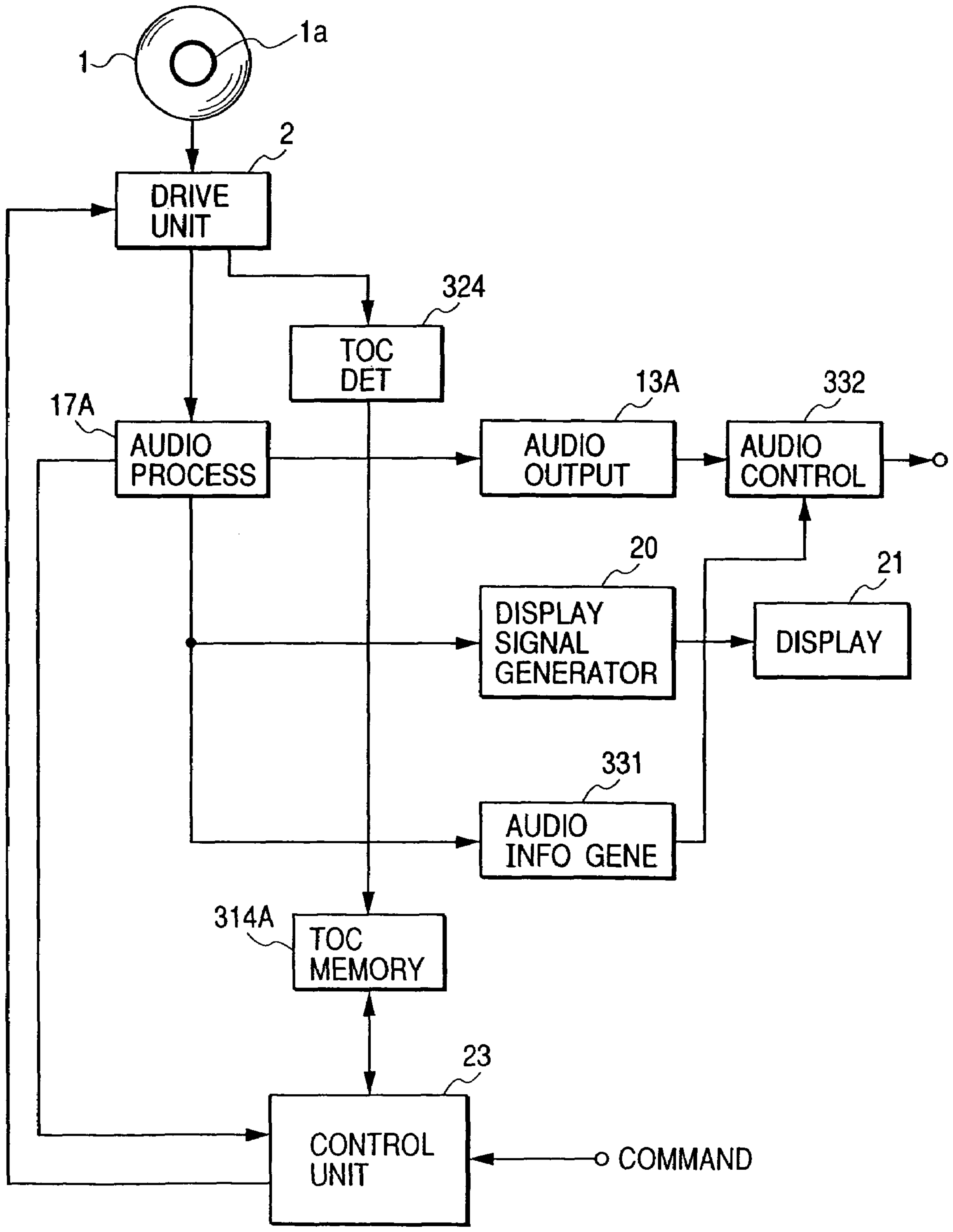
FIG. 28 is an operation flow diagram of a DVD-Audio player including an audio-signal decoding apparatus according to a fourth embodiment of this invention.

FIG. 28 shows a fourth embodiment of this invention which is similar to the embodiment of FIG. 27 except for design changes indicated later. The embodiment of FIG. 28 is designed to operate on a DVD-Audio 1 having a TOC (table of contents) area 1*a* loaded with TOC information. The TOC area 1*a* is located in a lead-in area which extends in an innermost part of the DVD-Audio 1.

The ACD information memory 14B (see FIG. 27) is omitted from the embodiment of FIG. 28. On the other hand, the embodiment of FIG. 28 includes a TOC detector 324, a TOC information memory 314A, an audio control information generating block 331, and an audio control device 332.

The TOC detector 324 is connected between the drive unit 2 and the TOC information memory 314A. The TOC information memory 314A is connected to the control unit 23. The audio control information generating block 331 follows the audio processing block 17A. The audio control device 332 follows the audio output block 13A. The audio control device 332 is connected to the audio control information generating block 331.

At the start of playback, the drive unit 2 accesses the TOC area 1*a* of the DVD-Audio 1, and the TOC detector 324 reproduces the TOC information from the output signal of the drive unit 2. The TOC detector 324 stores the reproduced TOC information into the TOC information memory 314A. The control unit 23 reads out the TOC information from the TOC information memory 314A, and implements suitable processes in response to the TOC information.

During playback, the audio processing block 17A extracts ACD information from the output signal of the drive unit 2. The audio processing block 17A outputs the extracted ACD information to the display signal generator 20 and also the audio control information generating block 331.

The audio control information generating block 331 extracts audio control information from the ACD information. The audio control information indicates a desired tone quality and a desired audio level which correspond to optimal conditions of the reproduction of sounds. The audio control information generating block 331 feeds the extracted audio control information to the audio control device 332.

The audio control device 332 receives the audio signal from the audio output block 13A. The audio control device 332 includes a tone controller and a level controller. The audio control device 332 controls the tone quality and the level of the received audio signal in accordance with the desired tone quality and the desired audio level represented by the audio control information. The audio control device 332 outputs the resultant audio signal.

Time control of the audio control information may be implemented in response to control start time data and control end time data by a structure similar to the corresponding structure in FIG. 26.

Fifth Embodiment

A DVD-Audio in a fifth embodiment of this invention is similar to a DVD-Audio in the embodiment of FIGS. 2-23 except for the following design change. The DVD-Audio in the fifth embodiment of this invention is loaded with audio manager information AMGI which contains TOC (table of contents) information as shown in FIG. 29.

FIG. 30 shows an example of the details of the TOC information. In the TOC information, a point of "00" to a point of "99" are assigned to different tunes (or different movements) respectively. For each point, that is, for each movement, the absolute time of its head is denoted by "minute" PMIN, "second" PSEC, and "frame" PFRAME. A point of "A0" corresponds to the first movement while a point of "A1" corresponds to the last movement. A point of "A2" corresponds to the absolute time of a starting end of a lead-out area which is denoted by "minute" PMIN, "second" PSEC, and "frame" PFRAME. The TOC information in FIG. 30 indicates that six tunes identified by a point of "01" to a point of "06" are recorded on the DVD-Audio.

Sixth Embodiment

A DVD-Audio in a sixth embodiment of this invention is similar to a DVD-Audio in the embodiment of FIGS. 2-23 except for the following design change. The DVD-Audio in the sixth embodiment of this invention is loaded with audio title set information ATSI which contains TOC (table of contents) information as shown in FIG. 31.

Seventh Embodiment

A DVD-Audio in a seventh embodiment of this invention is similar to a DVD-Audio in the embodiment of FIGS. 2-23 except for the following design change. The DVD-Audio in the seventh embodiment of this invention stores audio control packs A-CONT in which TOC (table of contents) information is recorded on a 360-byte reserved area in each ACD packet.

Eighth Embodiment

Figure 32:
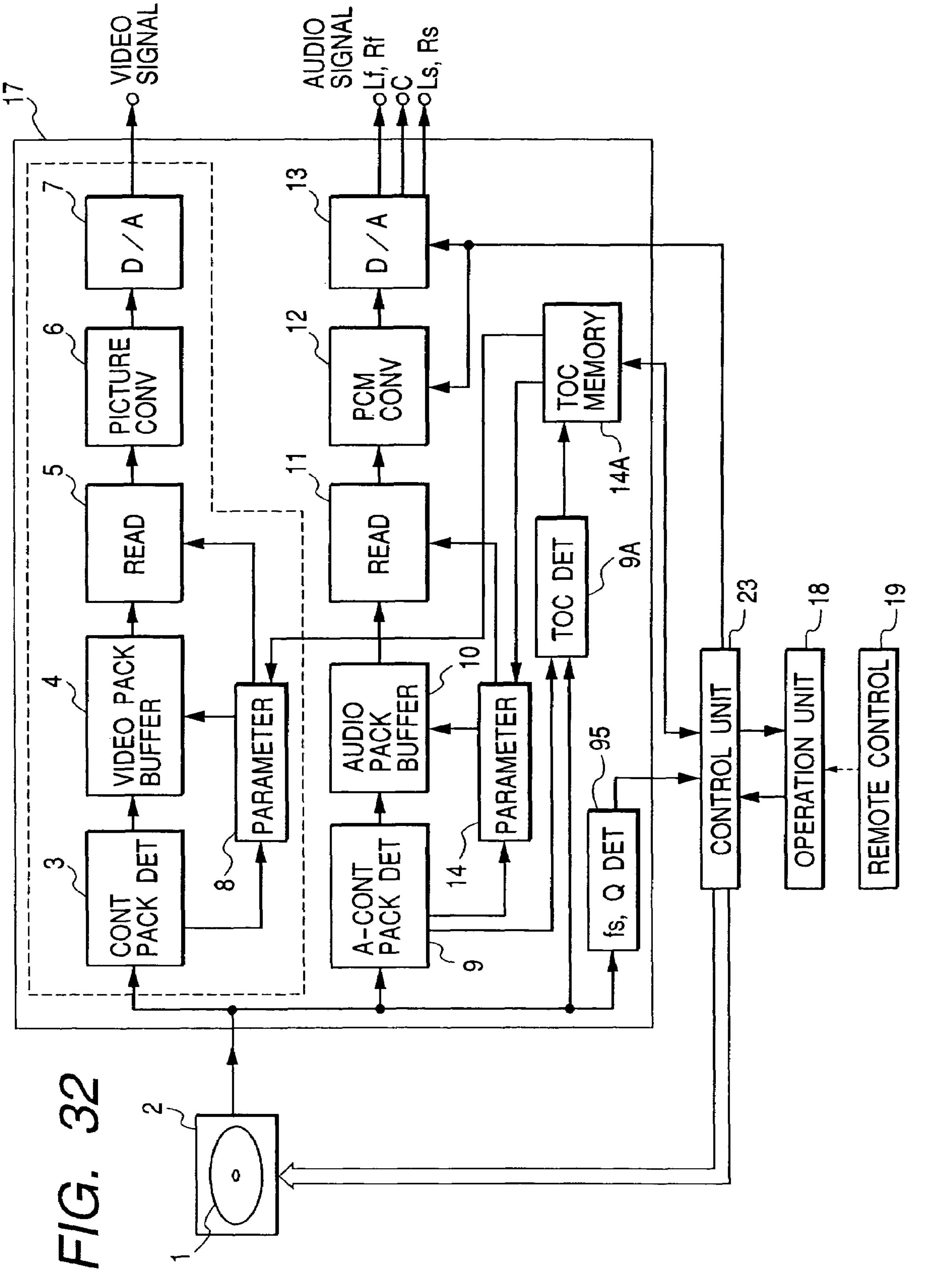
FIG. 32 is a block diagram of a DVD-Audio player including an audio-signal decoding apparatus according to an eighth embodiment of this invention.

FIG. 32 shows a DVD-Audio player including an audio-signal decoding apparatus according to an eighth embodiment of this invention. The player in FIG. 32 is designed for a DVD-Audio in one of the fifth, sixth, and seventh embodiments of this invention.

The player in FIG. 32 operates on a DVD-Audio 1. The player in FIG. 32 includes an operation unit 18 and a remote control unit 19. The remote control unit 19 can communicate with the operation unit 18 by wireless. The operation unit 18 is connected to a control unit 23 including a CPU. The control unit 23 is connected to a drive unit 2 and a reproduced signal processing unit 17. The drive unit 2 is connected to the reproduced signal processing unit 17.

The CPU 23 operates in accordance with a control program stored in an internal ROM. When the user actuates the operation unit 18 or the remote control unit 19 to request tune selection, playback, fast feed, or stop, the CPU 23 controls the drive unit 2 and the reproduced signal processing unit 17 to implement the requested operation mode.

During playback, the drive unit 2 reads out a signal from the DVD-Audio 1. The drive unit 2 includes a demodulator which subjects the readout signal to given demodulation (for example, EFM demodulation). The drive unit 2 outputs the demodulation-resultant signal to the reproduced signal processing unit 17 as a reproduced signal.

The reproduced signal processing circuit 17 includes a control pack detector 3 which receives the reproduced signal from the drive unit 2. The control pack detector 3 detects every control pack CONT in the reproduced signal. The control pack detector 3 generates control parameters in response to the detected control pack CONT. The control pack detector 3 sets the control parameters in a parameter unit (a parameter memory) 8. The control pack detector 3 selects video packs V from the reproduced signal in response to the detected control pack CONT. The control pack detector 3 sequentially writes the video packs V into a video pack buffer 4.

The reproduced signal processing circuit 17 includes a reading unit 5 connected to the video pack buffer 4. The reading unit 5 reads out user data from the video packs V in the video pack buffer 4 in an order determined by SCR information (see FIG. 14) in each of the video packs V. The reading unit 5 outputs a stream of the user data to a picture converter 6. The picture converter 6 changes the user data stream into a corresponding digital video signal. The picture converter 6 outputs the digital video signal to a digital-to-analog (D/A) converter 7. The D/A converter 7 changes the digital video signal into a corresponding analog video signal. The D/A converter 7 outputs the analog video signal to an external device (not shown).

It should be noted that the reading unit 5 may read out user data from the video packs V in the video pack buffer 4 in an order determined by PTS (presentation time stamp) information in a control pack CONT. To this end, the control pack detector 3 feeds the PTS information in the detected control pack CONT to the reading unit 5.

The reproduced signal processing circuit 17 includes an audio control pack detector 9 which receives the reproduced signal from the drive unit 2. The audio control pack detector 9 detects every audio control pack A-CONT in the reproduced signal. The audio control pack detector 9 generates control parameters in response to the detected audio control pack A-CONT. The audio control pack detector 9 sets the control parameters in a parameter unit (a parameter memory) 14. The audio control pack detector 9 selects audio packs A from the reproduced signal in response to the detected audio control pack A-CONT. The audio control pack detector 9 sequentially writes the audio packs A into an audio pack buffer 10.

The reproduced signal processing circuit 17 includes a reading unit 11 connected to the audio pack buffer 10. The reading unit 11 reads out user data (audio data) from the audio packs A in the audio pack buffer 10 in an order determined by SCR information (see FIG. 14) in each of the audio packs A. The reading unit 11 outputs a stream of the user data (the audio data) to a PCM converter 12. The PCM converter 12 changes the user data stream (the audio data stream) into a corresponding digital audio signal by a PCM decoding process. The PCM converter 12 outputs the digital audio signal to a digital-to-analog (D/A) converter 13. The D/A converter 13 changes the digital audio signal into a corresponding analog audio signal. The analog audio signal has, for example a left front channel Lf, a right front channel Rf, a center channel C, a left surround channel Ls, and a right surround channel Rs. The D/A converter 13 outputs the analog audio signal to an external device (not shown).

It should be noted that the reading unit 11 may read out user data (audio data) from the audio packs A in the audio pack buffer 10 in an order determined by present-time information in audio search data ASD (see FIG. 18) in an audio control pack A-CONT. To this end, the audio control pack detector 9 feeds the present-time information in the detected audio control pack A-CONT to the reading unit 11.

The reproduced signal processing unit 17 includes a TOC detector 9A. At the start of playback, the control unit 23 activates the drive unit 2 to scan a TOC-recorded portion of the DVD-Audio 1. Accordingly, in this case, the drive unit 2 outputs a reproduced signal which contains TOC information. The TOC detector 9A receives the reproduced signal from the drive unit 2. The TOC detector 9A extracts the TOC information from audio manager information AMGI or audio title set information ATSI represented by the reproduced signal. The TOC detector 9A receives every detected audio control pack A-CONT from the audio control pack detector 9. The TOC detector 9A can extract TOC information from every detected audio control pack A-CONT. The TOC detector 9A outputs the extracted TOC information.

The reproduced signal processing unit 17 includes a memory 14A which stores the TOC information fed from the TOC detector 9A at the start of playback. The memory 14A is connected to the parameter units 8 and 14, and the control unit 23. When the user actuates the operation unit 18 or the remote control unit 19 to select a desired tune, the control unit 23 refers to the TOC information in the memory 14A and controls the drive unit 2 and the reproduced signal processing unit 17 in response to the TOC information to start playback of the desired tune from its head.

The reproduced signal processing unit 17 includes a detector 95 which receives the reproduced signal from the drive unit 2. The detector 95 extracts information of sampling frequencies "fs" (fs1 and fs2) and information of quantization bit numbers Q (Q1 and Q2) from the reproduced signal. The detector 95 feeds the information of the sampling frequencies "fs" (fs1 and fs2) and the information of the quantization bit numbers Q (Q1 and Q2) to the CPU 23. The CPU 23 controls the PCM converter 12 and the D/A converter 13 in response to the information of the sampling frequencies "fs" (fs1 and fs2) and the information of the quantization bit numbers Q (Q1 and Q2). Accordingly, conditions of the inverse quantization (the signal decoding) implemented by the PCM converter 12 and the D/A converter 13 depend on the information of the sampling frequencies "fs" (fs1 and fs2) and the information of the quantization bit numbers Q (Q1 and Q2). Thus, the inverse quantization can be on a channel by channel basis or a channel-group by channel-group basis.

Ninth Embodiment

Figure 33:
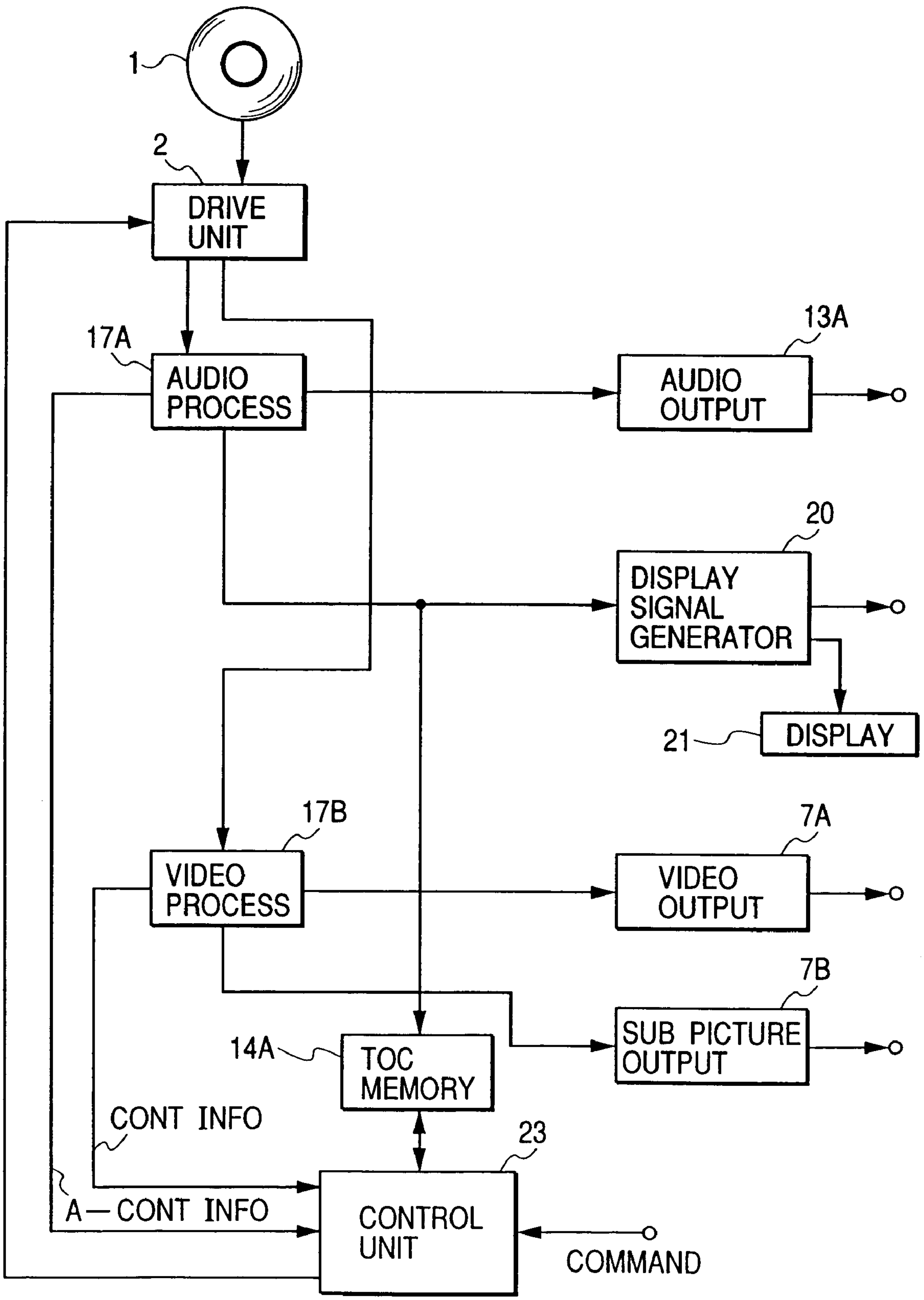
FIG. 33 is an operation flow diagram of a DVD-Audio player including an audio-signal decoding apparatus according to a ninth embodiment of this invention.

FIG. 33 shows a DVD-Audio player including an audio-signal decoding apparatus according to a ninth embodiment of this invention. The player in FIG. 33 is designed for a DVD-Audio in one of the fifth, sixth, and seventh embodiments of this invention. The player in FIG. 33 is similar to the player in FIG. 25 except for design changes indicated below.

In the player in FIG. 33, an audio processing block 17A has a function of extracting TOC information from the output signal of a drive unit 2. The player in FIG. 33 includes a memory 14A connected between the audio processing block 17A and a control unit 23. At the start of playback, the audio processing block 17A stores the extracted TOC information into the memory 14A.

When the control unit 23 receives a command signal to select a desired tune, the control unit 23 refers to the TOC information in the memory 14A and controls the drive unit 2 in response to the TOC information so that playback of the desired tune will be started from its head.

Tenth Embodiment

Figure 34:
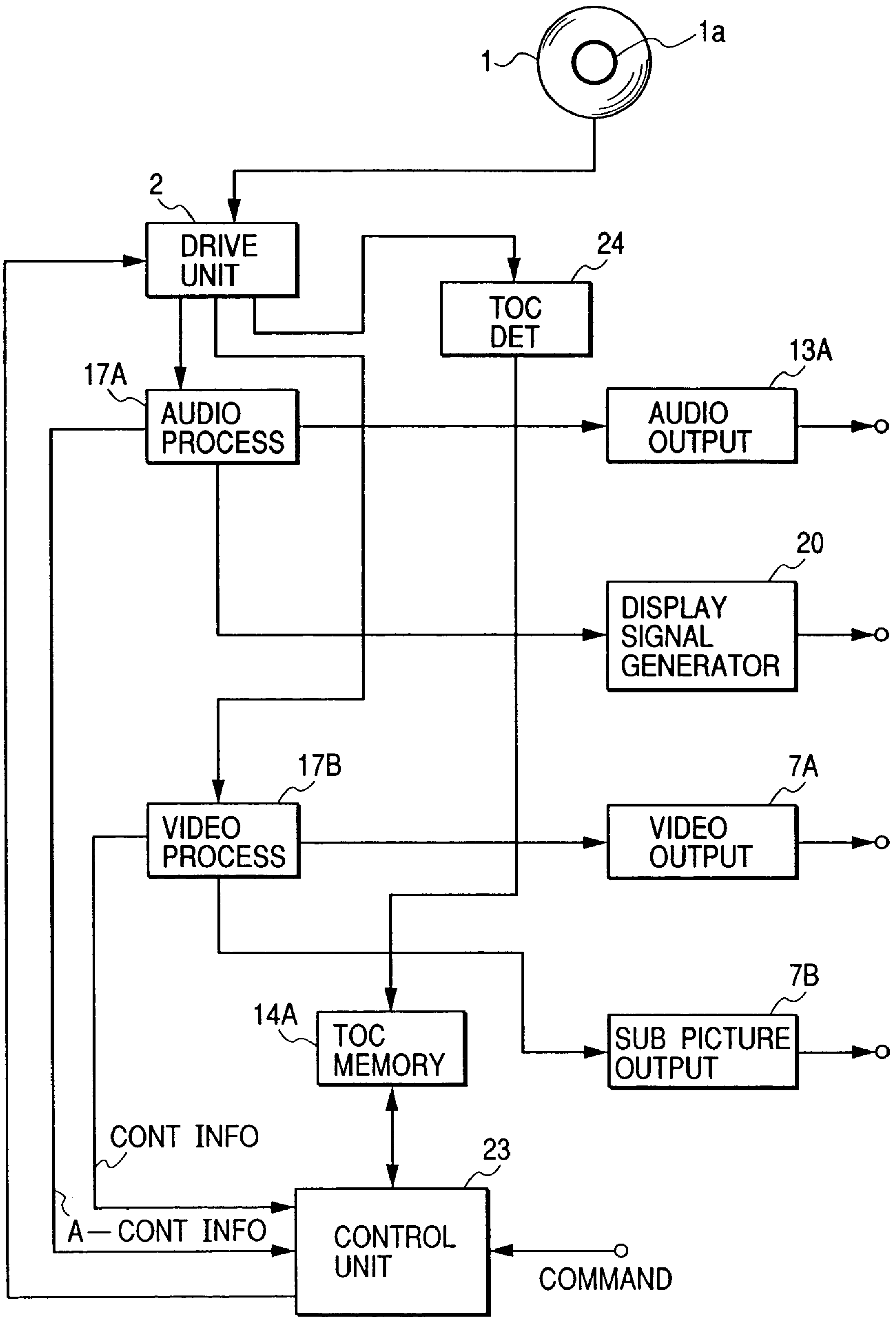
FIG. 34 is an operation flow diagram of a DVD-Audio player including an audio-signal decoding apparatus according to a tenth embodiment of this invention.

FIG. 34 shows a DVD-Audio player including an audio-signal decoding apparatus according to a tenth embodiment of this invention. The player in FIG. 34 is similar to the player in FIG. 25 except for design changes indicated later.

The player in FIG. 34 operates on a DVD-Audio 1 which has a TOC area 1*a* loaded with TOC information. The TOC area 1*a* may be omitted from the DVD-Audio 1. The player in FIG. 34 includes a control unit 23 connected to an operation unit (not shown). The control unit 23 includes a CPU. A remote control unit (not shown) can communicate with the operation unit by wireless. The control unit 23 is connected to a drive unit 2.

The drive unit 2 is connected to a TOC detector 24, an audio processing block 17A, and a video processing block 17B. The TOC detector 24 is connected to a memory 14A. The memory 14A is connected to the control unit 23. The audio processing block 17A and the video processing block 17B are connected to the control unit 23. The audio processing block 17A is connected to an audio output block 13A and a display signal generator 20. The video processor 17B is connected to a video output block 7A and a sub picture output block 7B.

When the DVD-Audio 1 is set in position within the player of FIG. 34, the drive unit 2 reads out a signal from the TOC area 1*a* of the DVD-Audio 1. The drive unit 2 outputs the readout signal to the TOC detector 24. The TOC detector 24 detects TOC information in the readout signal. The TOC detector 24 stores the detected TOC information into the memory 14A.

When the user actuates the operation unit or the remote control unit to select a desired tune, the control unit 23 refers to the TOC information in the memory 14A and controls the drive unit 2 in response to the TOC information to start playback of the desired tune from its head.

During playback, the drive unit 2 reads out a signal from the DVD-Audio 1. The drive unit 2 outputs the readout signal to the audio processing block 17A and the video processing block 17B as a reproduced signal. The audio processing block 17A separates audio data from the reproduced signal. The audio processing block 17A feeds the audio data to the audio output block 13A. The audio output block 13A converts the audio data into a corresponding audio signal. The audio output block 13A feeds the audio signal to an external device (not shown). In addition, the audio processing block 17A separates character information from the reproduced signal. The audio processing block 17A feeds the character information to the display signal generator 20. The display signal generator 20 converts the character information into a corresponding character signal. The display signal generator 20 feeds the character signal to a built-in display device or an external device (not shown). Furthermore, the audio processing block 17A separates information in every audio control pack A-CONT from the reproduced signal. The audio processing block 17A feeds the audio control pack information to the control unit 23.

During playback, the video processing block 17B separates video data from the reproduced signal. The video processing block 17B feeds the video data to the video output block 7A. The video output block 7A converts the video data into a corresponding video signal. The video output block 7A feeds the video signal to an external device (not shown). In addition, the video processing block 17B separates sub picture information from the reproduced signal. The video processing block 17B feeds the sub picture information to the sub picture output block 7B. The sub picture output block 7B converts the sub picture information into a corresponding sub picture signal. The sub picture output block 7B feeds the sub picture signal to an external device (not shown). Furthermore, the video processing block 17B separates information in every control pack CONT from the reproduced signal. The video processing block 17B feeds the control pack information to the control unit 23.

Eleventh Embodiment

A DVD-Audio player in an eleventh embodiment of this invention is based on one of the DVD-Audio players in FIGS. 28, 32, 33, and 34. In the DVD-Audio player of the eleventh embodiment of this invention, a control unit 23 operates in accordance with a control program having a segment (a subroutine) which is shown in FIG. 35.

Figure 35:
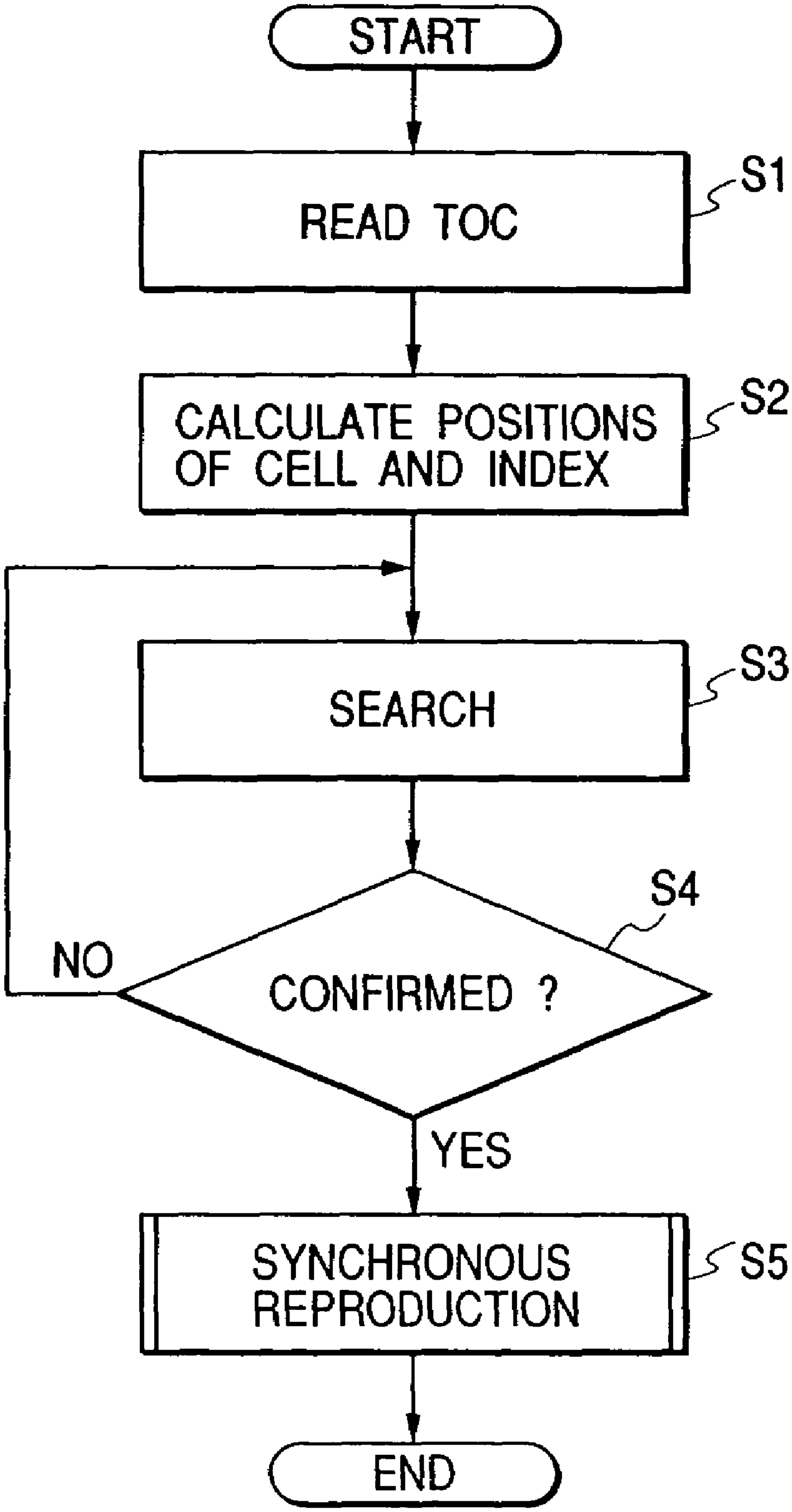
FIG. 35 is a flowchart of a segment of a control program for a control unit in an eleventh embodiment of this invention.

The program segment in FIG. 35 is started when playback of a desired tune from its head is requested. As shown in FIG. 35, a first step S1 of the program segment reads out TOC information in a related memory.

A step S2 following the step S1 calculates the location of a cell (an index), which corresponds to the head of the desired tune, from the readout TOC information. After the step S2, the program advances to a step S3.

The step S3 controls a drive unit 2 in response to the calculated cell location to search for the head of the desired tune.

A step S4 following the step S3 decides whether or not the head of the desired tune has been successfully found. When the head of the desired tune has been successfully found, the program advances from the step S4 to a synchronous reproduction block S5. Otherwise, the program returns from the step S4 to the step S3.

After the synchronous reproduction block S5, the current execution cycle of the program segment ends.

Figure 36:
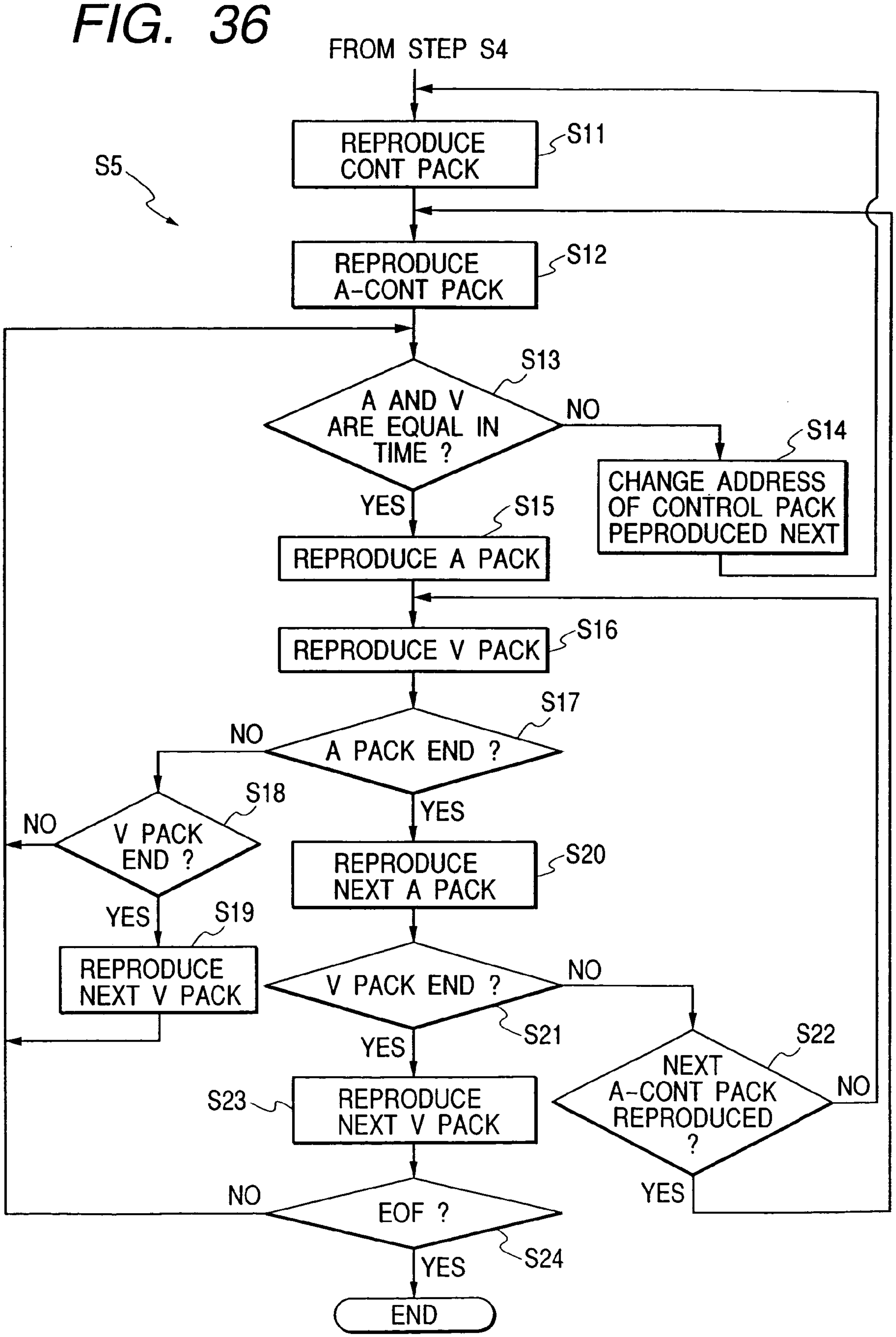
FIG. 36 is a flowchart of the details of a block in FIG. 35.

As shown in FIG. 36, the synchronous reproduction block S5 includes a step S11 which follows the step S4 in FIG. 35. The step S11 enables the reproduction of a control pack CONT. After the step S11, the program advances to a step S12.

The step S12 enables the reproduction of an audio control pack A-CONT. After the step S12, the program advances to a step S13.

The step S13 decides whether or not the time represented by the time information in the reproduced control pack CONT and the time represented by the time information in the reproduced audio control pack A-CONT are equal to each other. When they are equal, the program advances from the step S13 to a step S15. Otherwise, the program advances from the step S13 to a step S14.

The step S14 changes at least one of address information designating a control pack CONT to be reproduced next and address information designating an audio control pack A-CONT to be reproduced next by a positive-direction or negative-direction amount corresponding to one control pack CONT or one audio control pack A-CONT. After the step S14, the program returns to the step S11. Accordingly, in this case, the steps S11 and S12 enable the reproduction of a set of a control pack CONT and an audio control pack A-CONT which at least partially differs from the set of the previously-reproduced control pack CONT and the previously-reproduced audio control pack A-CONT.

The step S15 enables the reproduction of an audio pack A controlled by the latest reproduced audio control pack A-CONT. In addition, the step S15 increments audio pack address (SCR information) by "1". After the step S15, the program advances to a step S16.

The step S16 enables the reproduction of a video pack V controlled by the latest reproduced control pack CONT. In addition, the step S16 increments video pack address (SCR information) by "1".

A step S17 following the step S16 decides whether or not the reproduction of the audio pack A has been completed. When the reproduction of the audio pack A has been completed, the program advances from the step S17 to a step S20. Otherwise, the program advances from the step S17 to a step S18.

The step S18 decides whether or not the reproduction of the video pack V has been completed. When the reproduction of the video pack V has been completed, the program advances from the step S18 to a step S19. Otherwise, the program returns from the step S18 to the step S13.

The step S19 enables the reproduction of a next video pack V controlled by the latest reproduced control pack CONT. In addition, the step S19 increments the video pack address (the SCR information) by "1". After the step S19, the program returns to the step S13.

The step S20 enables the reproduction of a next audio pack A controlled by the latest reproduced audio control pack A-CONT. In addition, the step S20 increments the audio pack address (the SCR information) by "1".

A step S21 following the step S20 decides whether or not the reproduction of the video pack V has been completed. When the reproduction of the video pack V has been completed, the program advances from the step S21 to a step S23. Otherwise, the program advances from the step S21 to a step S22.

The step S22 decides whether or not the latest reproduced audio pack A is a final audio pack controlled by the latest reproduced audio control pack A-CONT. When the latest reproduced audio pack A is the final audio pack controlled by the latest reproduced audio control pack A-CONT, the program returns from the step S22 to the step S12. Otherwise, the program returns from the step S22 to the step S16.

The step S23 enables the reproduction of a next video pack V controlled by the latest reproduced control pack CONT. In addition, the step S23 increments the video pack address (the SCR information) by "1".

A step S24 following the step S23 decides whether or not current frame information indicates an end of frame (EOF). When the current frame information indicates the end of frame (EOF), the program exits from the step S24 and then the current execution cycle of the program segment ends. Otherwise, the program returns from the step S24 to the step S13.

Twelfth Embodiment

Figure 37:
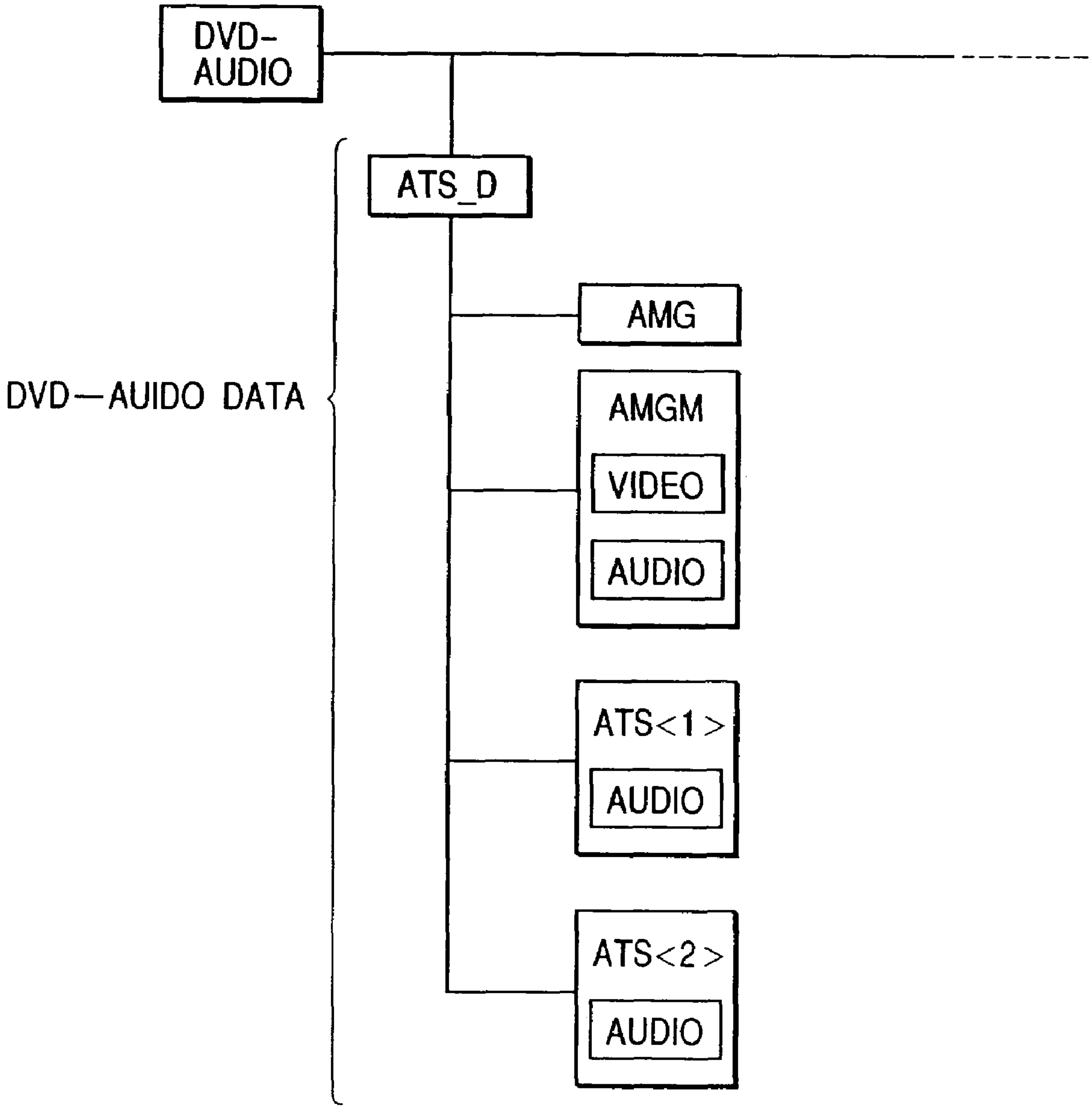
FIG. 37 is a diagram of the signal recording format of a DVD-Audio according to a twelfth embodiment of this invention.

FIG. 37 shows the signal recording format of a DVD-Audio (digital video disc-audio) according to a twelfth embodiment of this invention. The DVD-Audio in FIG. 37 has an area assigned to an audio title set directory ATS_D including a number of audio title sets ATS. The DVD-Audio in FIG. 37 does not have any area assigned to a video title set VTS.

The ATS_D area has an area assigned to an audio manager AMG, an area assigned to an audio manager menu AMGM, an area assigned to a first audio title set ATS<1>, and an area assigned to a second audio title set ATS<2>. The audio manager AMG contains audio manager information AMGI for managing the audio title sets ATS<1> and ATS<2>. The audio manager AMG has a structure similar to that in FIG. 3.

The audio title sets ATS<1> and ATS<2> are similar in structure. Thus, only the audio title set ATS<1> will be explained hereinafter.

Figure 38:
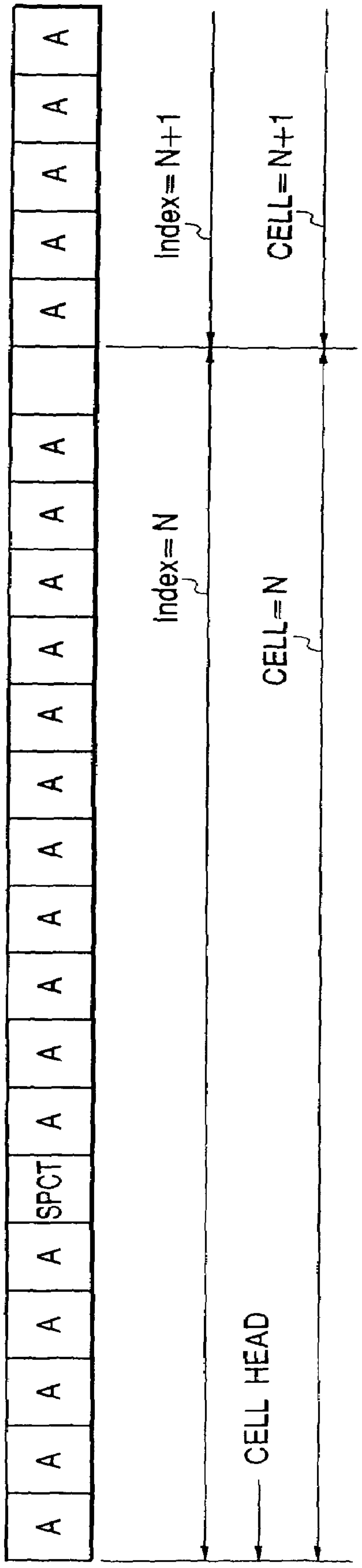
FIG. 38 is a diagram of a sequence of packs.

As shown in FIG. 38, the audio title set ATS<1> has a sequence of packs including audio packs A and still-picture packs SPCT. The pack sequence in the audio title set ATS<1> may include real-time information packs RTI. The pack sequence in the audio title set ATS<1> does not have any audio control pack A-CONT. There is about one still-picture pack SPCT per track. The still-picture packs SPCT are video packs V of a given type. Each of the still-picture packs. SPCT has a sequence of a pack header, a packet header, and data representative of a still picture. The real-time information packs RTI correspond to ACD packets in audio control packs A-CONT, respectively. Each of the real-time information packs RTI has a sequence of a pack header, a packet header, sub stream identification information, ISRC information, private header length information, identification information for real-time information, stuffing bytes, and data representative of real time (audio character display data).

Figure 39:
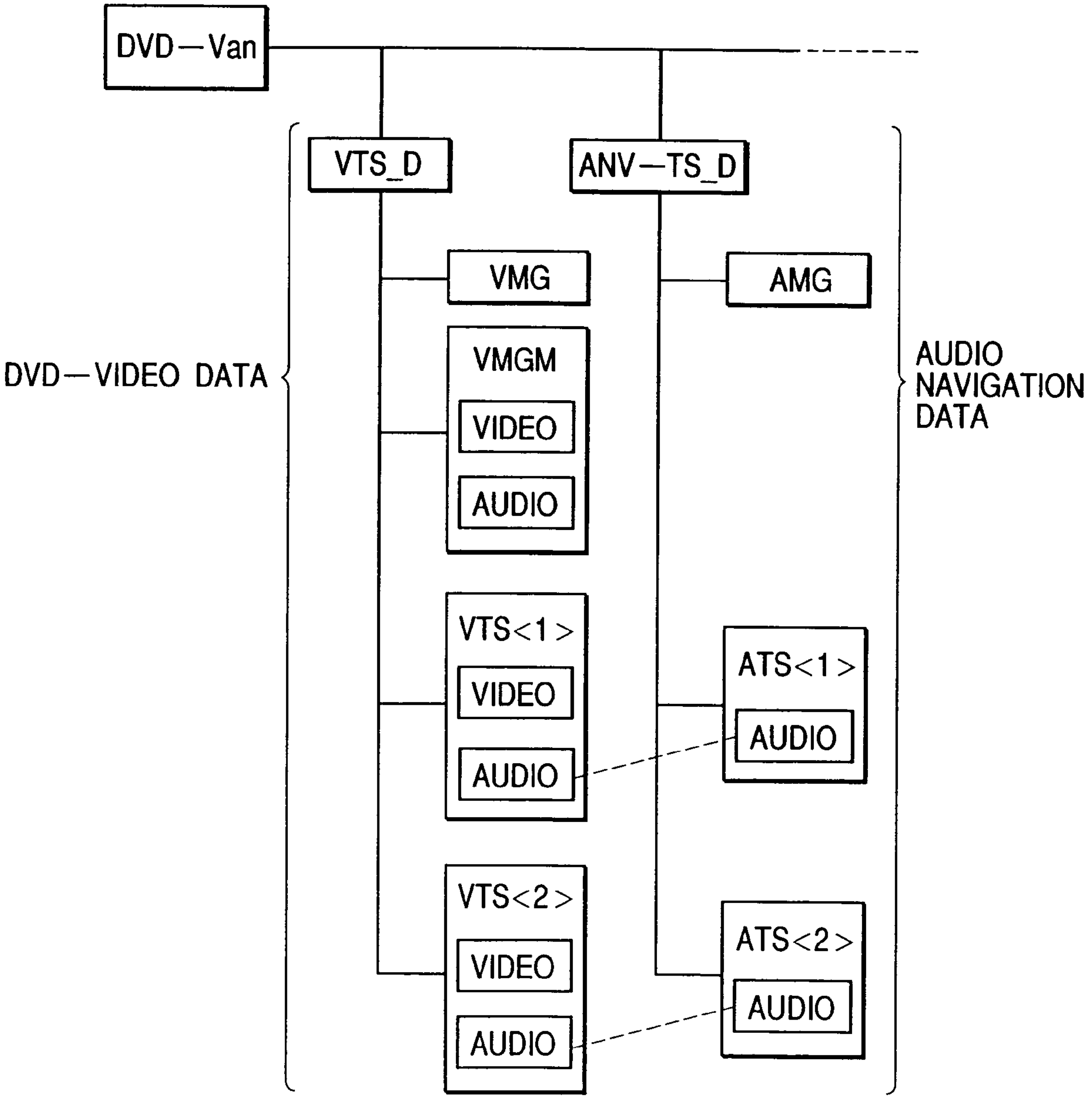
FIG. 39 is a diagram of the signal recording format of a DVD-Van.

FIG. 39 shows the signal recording format of a DVD-Van (digital video disc-video plus audio navigation). The DVD-Van in FIG. 39 has an area assigned to a video title set directory VTS_D including a number of video title sets VTS, and an area assigned to an audio navigation title set directory ANV-TS_D. The video title set VTS corresponds to DVD video data while the audio navigation title set ANV-TS corresponds to audio navigation data. The video title set VTS has a structure similar to that in FIG. 1.

The VTS_D area in FIG. 39 has an area assigned to a video manager VMG, an area assigned to a video manager menu VMGM, an area assigned to a first video title set VTS<1>, and an area assigned to a second video title set VTS<2>. The video manager VMG contains video manager information VMGI for managing the video title sets VTS<1> and VTS<2>. Each of the video title sets VTS<1> and VTS<2> has a sequence of packs including video packs V and audio packs A.

The ANV-TS_D area in FIG. 39 has an area assigned to an audio manager AMG, an area assigned to a first audio title set ATS<1>, and an area assigned to a second audio title set ATS<2>. The audio manager AMG contains audio manager information AMGI for managing the audio title sets ATS<1> and ATS<2>. The audio manager AMG has a structure similar to that in FIG. 3. Each of the audio title sets ATS<1> and ATS<2> has a sequence of packs including audio packs A. The first audio title set ATS<1> forms a pair with the first video title set VTS<1>. The second audio title set ATS<2> forms a pair with the second video title set VTS<2>.

Figure 40:
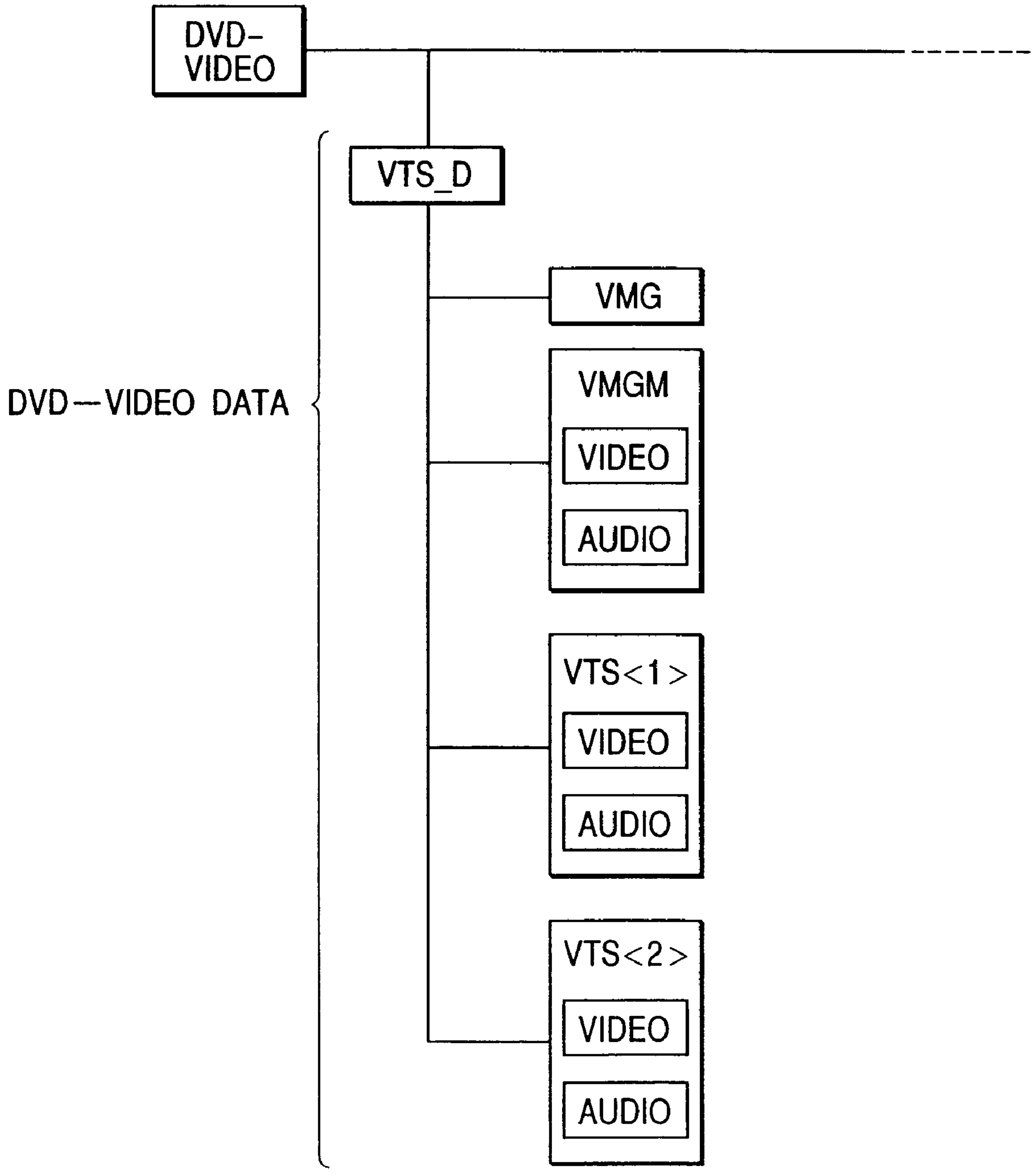
FIG. 40 is a diagram of the signal recording format of a DVD-Video.

FIG. 40 shows the signal recording format of a DVD-Video (digital video disc-video). The DVD-Video in FIG. 40 has an area assigned to a video title set directory VTS_D. The video title set VTS corresponds to DVD video data. The video title set VTS has a structure similar to that in FIG. 1. The DVD-Video in FIG. 40 does not have any area assigned to an audio title set directory ATS_D. The DVD-Video in FIG. 40 does not have any area assigned to an audio navigation title set directory ANV-TS_D.

The VTS_D area in FIG. 40 has an area assigned to a video manager VMG, an area assigned to a video manager menu VMGM, an area assigned to a first video title set VTS<1>, and an area assigned to a second video title set VTS<2>. The video manager VMG contains video manager information VMGI for managing the video title sets VTS<1> and VTS<2>. Each of the video title sets VTS<1> and VTS<2> has a sequence of packs including video packs V and audio packs A.

Figure 41:
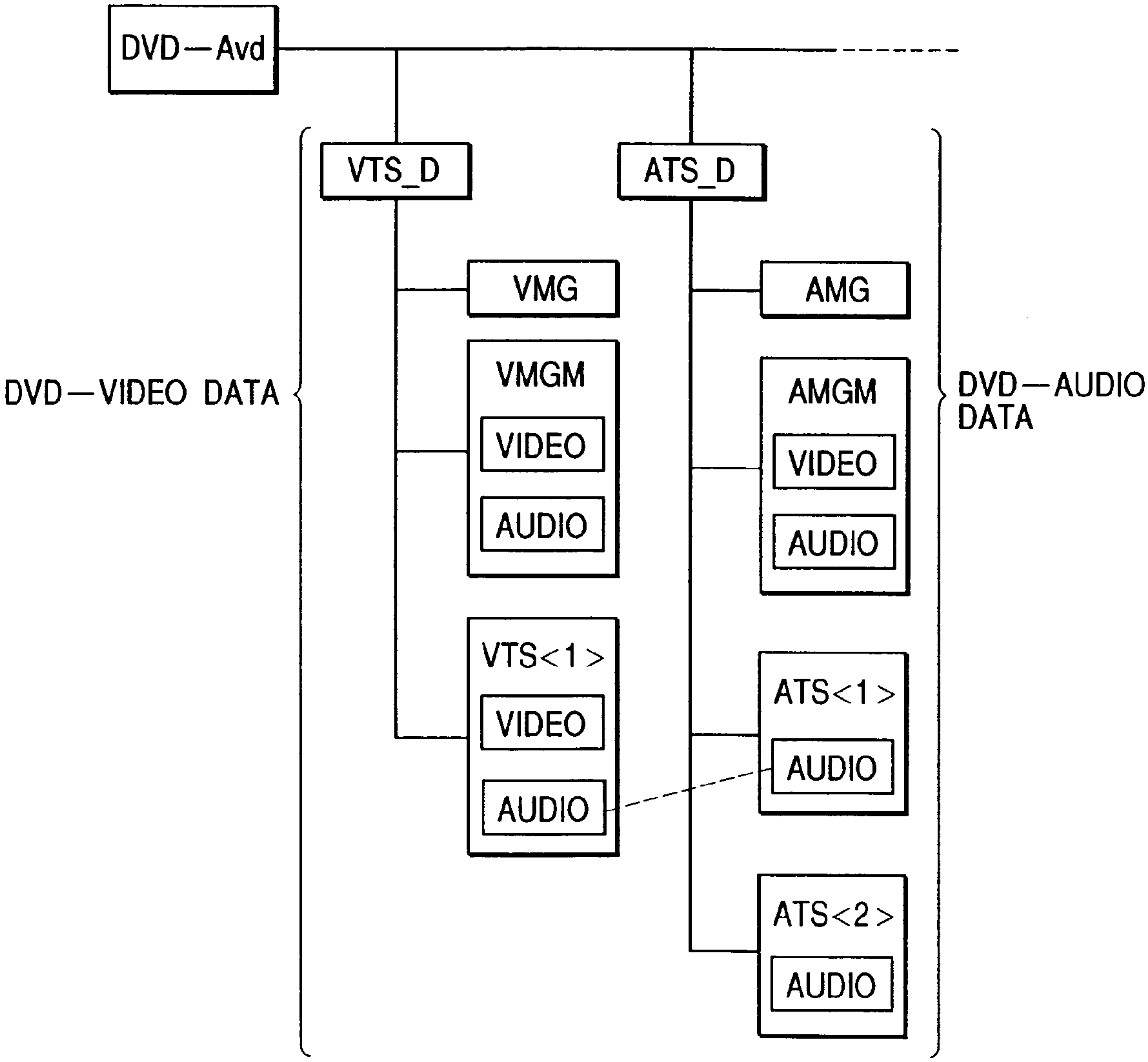
FIG. 41 is a diagram of the signal recording format of a DVD-Avd.

FIG. 41 shows the signal recording format of a DVD-Avd (digital video disc-audio plus AV data). The DVD-Avd in FIG. 41 has an area assigned to a video title set directory VTS_D, and an area assigned to an audio title set directory ATS_D. The video title set VTS corresponds to DVD video data while the audio title set ATS corresponds to DVD audio data. The video title set VTS has a structure similar to that in FIG. 1.

The VTS_D area in FIG. 41 has an area assigned to a video manager VMG, an area assigned to a video manager menu VMGM, and an area assigned to a video title set VTS<1>. The video manager VMG contains video manager information VMGI for managing the video title set VTS<1>. The video title set VTS<1> has a sequence of packs including video packs V and audio packs A.

The ATS_D area in FIG. 41 has an area assigned to an audio manager AMG, an area assigned to an audio manager menu AMGM, an area assigned to a first audio title set ATS<1>, and an area assigned to a second audio title set ATS<2>. The audio manager AMG contains audio manager information AMGI for managing the audio title sets ATS<1> and ATS<2>. The audio manager AMG has a structure similar to that in FIG. 3. The first audio title set ATS<1> has a sequence of packs including audio packs A. The first audio title set ATS<1> forms a pair with the video title set VTS<1>. The second audio title set ATS<2> has a sequence of packs including audio packs A and still-picture packs SPCT. The pack sequence in the second audio title set ATS<2> may include real-time information packs RTI. The pack sequence in the second audio title set ATS<2> does not have any audio control pack A-CONT.

Each of the audio title sets ATS<1> and ATS<2> in the DVD-Audio of FIG. 37 contains audio title set information ATSI. The audio title set information ATSI contains a management table ATSI-MAT having an audio-only-title audio-object attribute AOTT-AOB-ATR.

As shown in FIG. 42, the audio-only-title audio-object attribute AOTT-AOB-ATR has a sequence of 8 bytes, that is, 64 bits b63, b62, b61, . . . , b1, b0. A set of the bits b63, b62, b61, and b60 represents an audio encoding mode. The bit b59 represents a down mix (D-M) mode. A set of the bits b58, b57, and b56 represents a multiple channel type. A set of the bits b55, b54, b53, and b52 represents a quantization bit number Q1 of a channel group "1". A set of the bits b51, b50, b49, and b48 represents a quantization bit number Q2 of a channel group "2". A set of the bits b47, b46, b45, and b44 represents a sampling frequency fs1 of the channel group "1". A set of the bits b43, b42, b41, and b40 represents a sampling frequency fs2 of the channel group "2". A set of the bits b36, b35, b34, b33, and b32 represents channel assignment. The other bits form reserved areas.

The audio encoding mode represented by the bits b63, b62, b61, and b60 in FIG. 42 can be selected from among a linear PCM audio encoding mode, a Dolby digital encoding mode, an MPEG-2 encoding mode without any extension, an MPEG-2 encoding mode with an extension, a DTS encoding mode, and an SDDS encoding mode. Specifically, a bit sequence of "0000" is assigned to the linear PCM audio encoding mode. A bit sequence of "0001" is assigned to the Dolby digital encoding mode. A bit sequence of "0010" is assigned to the MPEG-2 encoding mode without any extension. A bit sequence of "0011" is assigned to the MPEG-2 encoding mode with an extension. A bit sequence of "0100" is assigned to the DTS encoding mode. A bit sequence of "0101" is assigned to the SDDS encoding mode.

Normally, the bits b63, b62, b61, and b60 in FIG. 42 are set to "0000" representing the linear PCM audio encoding mode.

The down mix mode represented by the bit b59 in FIG. 42 can be changed between the allowance of down mix stereophonic output and the inhibition of down mix stereophonic output. Specifically, a bit of "0" is assigned to the allowance of down mix stereophonic output. A bit of "1" is assigned to the inhibition of down mix stereophonic output.

Normally, the bits b58, b57, and b56 in FIG. 42 are set to "000" representing that the multiple channel type agrees with a type "1".

The quantization bit number Q1 of the channel group "1" which is represented by the bits b55, b54, b53, and b52 in FIG. 42 can be changed among 16 bits, 20 bits, and 24 bits. Specifically, a bit sequence of "0000" is assigned to 16 bits. A bit sequence of "0001" is assigned to 20 bits. A bit sequence of "0010" is assigned to 24 bits.

The quantization bit number Q2 of the channel group "2" which is represented by the bits b51, b50, b49, and b48 in FIG. 42 can be changed among 16 bits, 20 bits, and 24 bits. Specifically, a bit sequence of "0000" is assigned to 16 bits. A bit sequence of "0001" is assigned to 20 bits. A bit sequence of "0010" is assigned to 24 bits.

The state of the set of the bits b51, b50, b49, and b48 has the following relation with the state of the set of the bits b55, b54, b53, and b52. When the set of the bits b55, b54, b53, and b52 is "0000", the set of the bits b51, b50, b49, and b48 is also "0000". In other words, when the quantization bit number Q1 for the channel group "1" is equal to 16 bits, the quantization bit number Q2 for the channel group "2" is also equal to 16 bits. When the set of the bits b55, b54, b53, and b52 is "0001", the set of the bits b51, b50, b49, and b48 is "0000" or "0001. In other words, when the quantization bit number Q1 for the channel group "1" is equal to 20 bits, the quantization bit number Q2 for the channel group "2" is equal to 16 bits or 20 bits. When the set of the bits b55, b54, b53, and b52 is "0010", the set of the bits b51, b50, b49, and b48 is "0000", "0001, or "0010". In other words, when the quantization bit number Q1 for the channel group "1" is equal to 24 bits, the quantization bit number Q2 for the channel group "2" is equal to 16 bits, 20 bits, or 24 bits.

The sampling frequency fs1 of the channel group "1" which is represented by the bits b47, b46, b45, and b44 can be changed among 48 kHz, 96 kHz, 192 kHz, 44.1 kHz, 88.2 kHz, and 176.4 kHz. Specifically, a bit sequence of "0000" is assigned to 48 kHz. A bit sequence of "0001" is assigned to 96 kHz. A bit sequence of "0010" is assigned to 192 kHz. A bit sequence of "1000" is assigned to 44.1 kHz. A bit sequence of "1001" is assigned to 88.2 kHz. A bit sequence of "1010" is assigned to 176.4 kHz.

The sampling frequency fs2 of the channel group "2" which is represented by the bits b43, b42, b41, and b40 can be changed among 48 kHz, 96 kHz, 192 kHz, 44.1 kHz, 88.2 kHz, and 176.4 kHz. Specifically, a bit sequence of "0000" is assigned to 48 kHz. A bit sequence of "0001" is assigned to 96 kHz. A bit sequence of "0010" is assigned to 192 kHz. A bit sequence of "1000" is assigned to 44.1 kHz. A bit sequence of "1001" is assigned to 88.2 kHz. A bit sequence of "1010" is assigned to 176.4 kHz.

The state of the set of the bits b43, b42, b41, and b40 has the following relation with the state of the set of the bits b47, b46, b45, and b44. When the set of the bits b47, b46, b45, and b44 is "0000", the set of the bits b43, b42, b41, and b40 is also "0000". In other words, when the sampling frequency "fs" of the channel group "1" is equal to 48 kHz, the sampling frequency "fs" of the channel group "2" is also equal to 48 kHz. When the set of the bits b47, b46, b45, and b44 is "0001", the set of the bits b43, b42, b41, and b40 is "0000" or "0001". In other words, when the sampling frequency "fs" of the channel group "1" is equal to 96 kHz, the sampling frequency "fs" of the channel group "2" is equal to 48 kHz or 96 kHz. When the set of the bits b47, b46, b45, and b44 is "0010", the set of the bits b43, b42, b41, and b40 is "0000", "0001", or "0010". In other words, when the sampling frequency "fs" of the channel group "1" is equal to 192 kHz, the sampling frequency "fs" of the channel group "2" is equal to 48 kHz, 96 kHz, or 192 kHz. When the set of the bits b47, b46, b45, and b44 is "1000", the set of the bits b43, b42, b41, and b40 is also "1000". In other words, when the sampling frequency "fs" of the channel group "1" is equal to 44.1 kHz, the sampling frequency "fs" of the channel group "2" is also equal to 44.1 kHz. When the set of the bits b47, b46, b45, and b44 is "1001", the set of the bits b43, b42, b41, and b40 is "1000" or "1001". In other words, when the sampling frequency "fs" of the channel group "1" is equal to 88.2 kHz, the sampling frequency "fs" of the channel group "2" is equal to 44.1 kHz or 88.2 kHz. When the set of the bits b47, b46, b45, and b44 is "1010", the set of the bits b43, b42, b41, and b40 is "1000", "1001", or "1010". In other words, when the sampling frequency "fs" of the channel group "1" is equal to 176.4 kHz, the sampling frequency "fs" of the channel group "2" is equal to 44.1 kHz, 88.2 kHz, or 176.4 kHz.

In general, the linear PCM audio encoding mode is used by the DVD-Audio in FIG. 37. According to the linear PCM audio encoding mode, each audio pack A has a private header. As shown in FIG. 43, the linear PCM audio pack private header includes an 8-bit area assigned to sub stream identification (ID) information, a 4-bit area assigned to an ISRC number, an 8-bit area assigned to ISRC data, an 8-bit area assigned to a private header length, a 16-bit area assigned to a first access unit pointer, a 1-bit area assigned to an audio emphasis flag F1, and a 1-bit area assigned to an audio emphasis flag F2.

When the sampling frequency "fs" is equal to 96 kHz or 88.2 kHz, the audio emphasis flag F1 is set to "0" representing an emphasis off state. When the sampling frequency "fs" is equal to other values, the audio emphasis flag F1 is set to "1" representing an emphasis on state.

When the sampling frequency "fs" is equal to 192 kHz or 176.4 kHz, the audio emphasis flag F2 is set to "0" representing an emphasis off state. When the sampling frequency "fs" is equal to other values, the audio emphasis flag F2 is set to "1" representing an emphasis on state.

Thirteenth Embodiment

A DVD-Audio player in a thirteenth embodiment of this invention is designed to reproduce information from a DVD-Audio in FIG. 37. The DVD-Audio player in the thirteenth embodiment of this invention is based on one of the DVD- Audio players in FIGS. 24, 25, 27, 28, 32, 33, and 34. The DVD-Audio player in the thirteenth embodiment of this invention includes an audio emphasis circuit for processing reproduced audio data. In the DVD-Audio player of the thirteenth embodiment of this invention, a control unit 23 operates in accordance with a control program having a first segment (a first subroutine) which is shown in FIG. 44.

Figure 44:
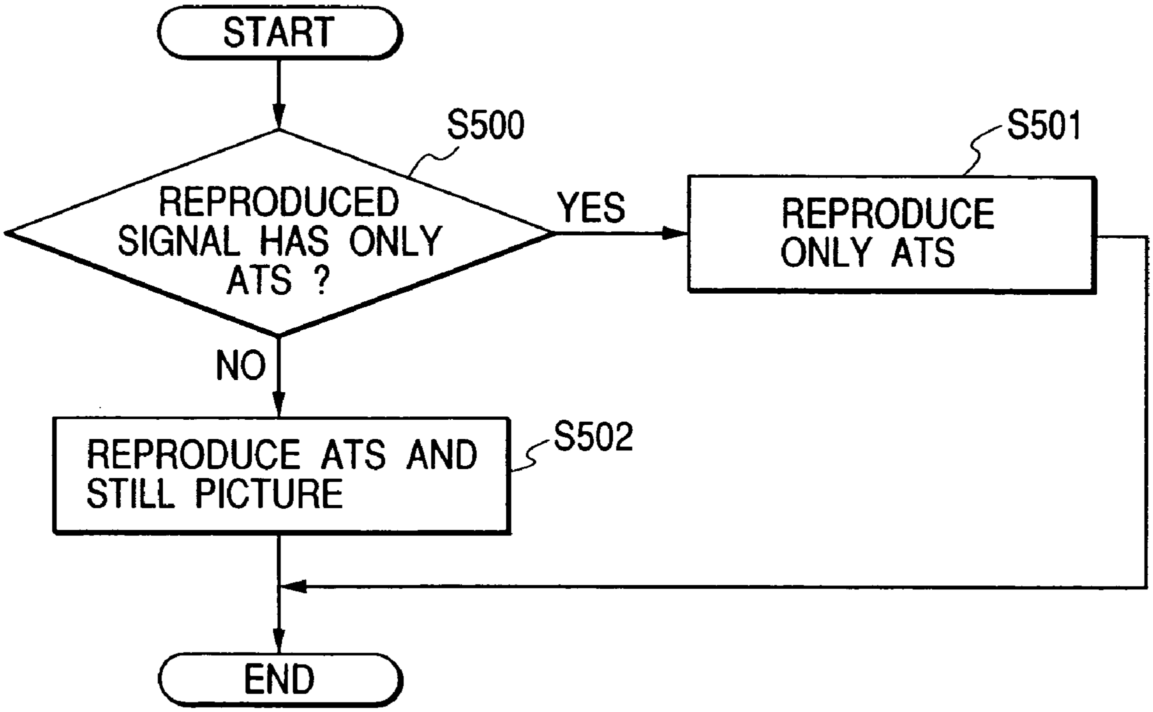
FIG. 44 is a flowchart of a first segment of a control program for a control unit in a thirteenth embodiment of this invention.

As shown in FIG. 44, a first step S500 of the program segment decides whether a reproduced signal has only data of audio title sets (ATS) or both data of audio title sets (ATS) and data of still pictures. When the reproduced signal has only data of audio title sets (ATS), the program advances from the step S500 to a step S501. When the reproduced signal has both data of audio title sets (ATS) and data of still pictures, the program advances from the step S500 to a step S502.

The step S501 enables the reproduction of the audio title sets (ATS). After the step S501, the current execution cycle of the program segment ends.

The step S502 enables the reproduction of the audio title sets (ATS) and the still pictures. After the step S502, the current execution cycle of the program segment ends.

Figure 45:
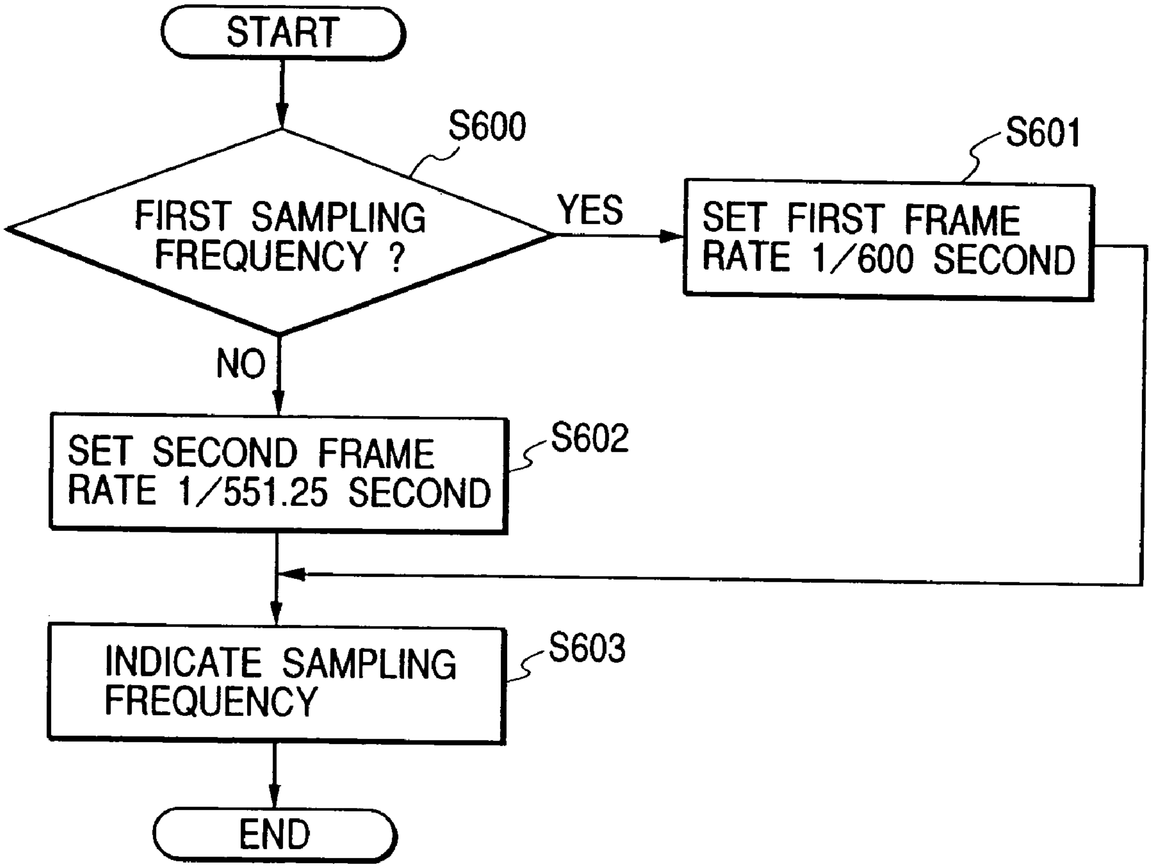
FIG. 45 is a flowchart of a second segment of the control program for the control unit in the thirteenth embodiment of this invention.

The control program for the control unit 23 has a second segment which is shown in FIG. 45. A first step S600 in the program segment of FIG. 45 decides whether the sampling frequency "fs" is equal to a multiple of 48 kHz or a multiple of 44.1 kHz. When the sampling frequency "fs" is equal to a multiple of 48 kHz, the program advances from the step S600 to a step S601. When the sampling frequency "fs" is equal to a multiple of 44.1 kHz, the program advances from the step S600 to a step S602.

The step S601 sets a frame rate (a frame speed) to 1/600 second. After the step S601, the program advances to a step S603.

The step S602 sets a frame rate (a frame speed) to 1/551.25 second. After the step S602, the program advances to the step S603.

The step S603 indicates information of the sampling frequency "fs". After the step S603, the current execution cycle of the program segment ends.

Figure 46:
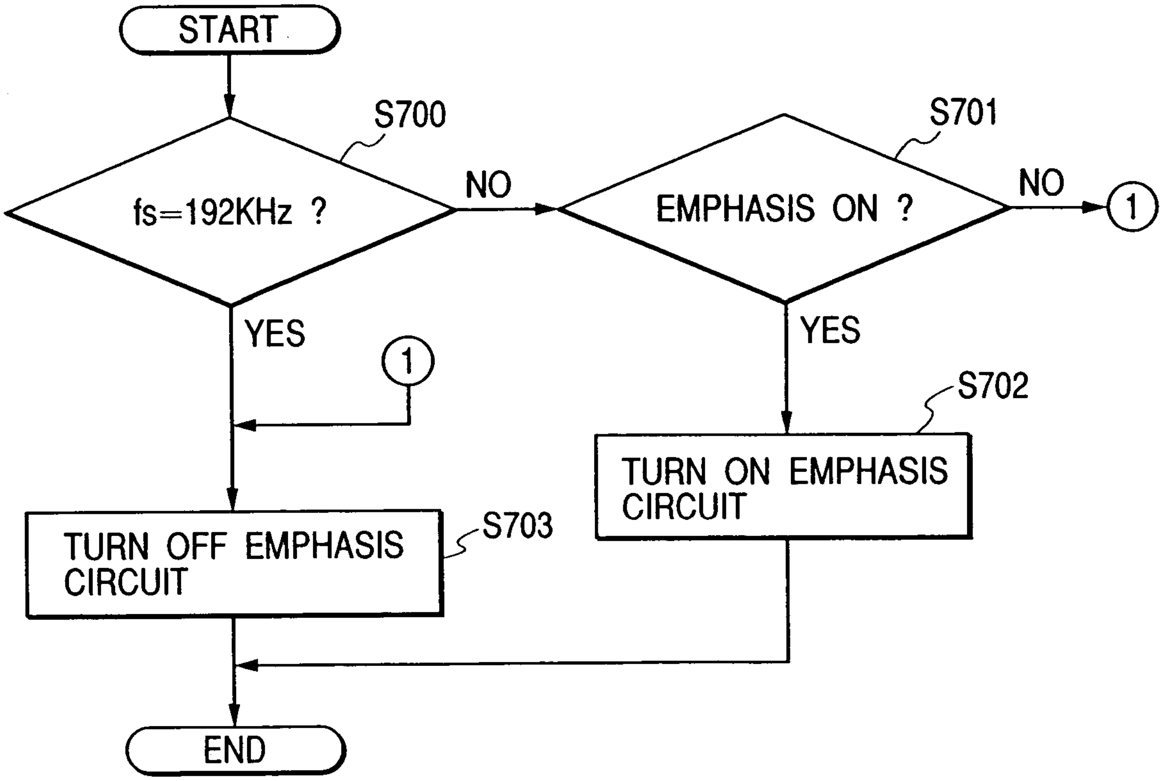
FIG. 46 is a flowchart of a third segment of the control program for the control unit in the thirteenth embodiment of this invention.

The control program for the control unit 23 has a third segment which is shown in FIG. 46. A first step S700 in the program segment of FIG. 46 decides whether or not the sampling frequency "fs" is equal to 192 kHz. When the sampling frequency "fs" is equal to 192 kHz, the program advances from the step S700 to a step S703. Otherwise, the program advances from the step S700 to a step S701.

The step S701 decides whether or not the audio emphasis flag is in the on sate ("1"). When the audio emphasis flag is in the on state, the program advances from the step S701 to a step S702. Otherwise, the program advances from the step S701 to the step S703.

The step S702 turns on the emphasis circuit. After the step S702, the current execution cycle of the program segment ends.

The step S703 turns off the emphasis circuit. After the step S703, the current execution cycle of the program segment ends.

Figure 47:
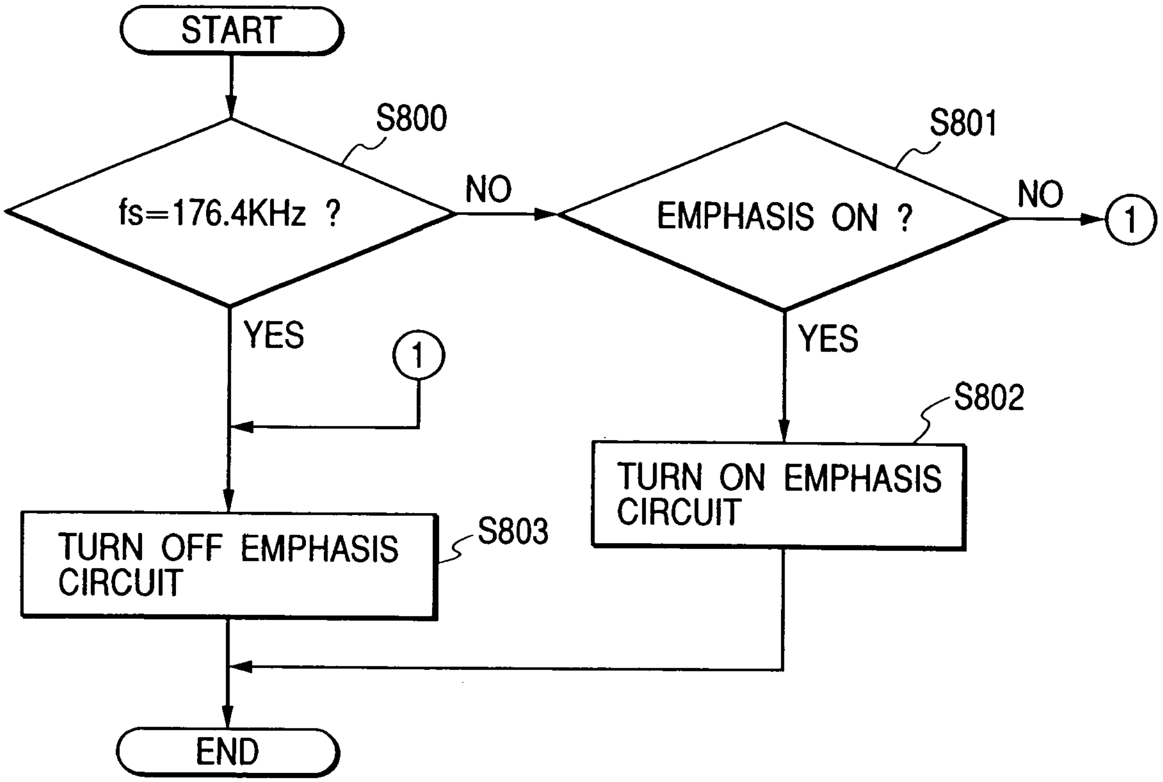
FIG. 47 is a flowchart of a fourth segment of the control program for the control unit in the thirteenth embodiment of this invention.

The control program for the control unit 23 has a fourth segment which is shown in FIG. 47. A first step S800 in the program segment of FIG. 47 decides whether or not the sampling frequency "fs" is equal to 176.4 kHz. When the sampling frequency "fs" is equal to 176.4 kHz, the program advances from the step S800 to a step S803. Otherwise, the program advances from the step S800 to a step S801.

The step S801 decides whether or not the audio emphasis flag is in the on sate ("1"). When the audio emphasis flag is in the on state, the program advances from the step S801 to a step S802. Otherwise, the program advances from the step S801 to the step S803.

The step S802 turns on the emphasis circuit. After the step S802, the current execution cycle of the program segment ends.

The step S803 turns off the emphasis circuit. After the step S803, the current execution cycle of the program segment ends.

Fourteenth Embodiment

Figure 48:
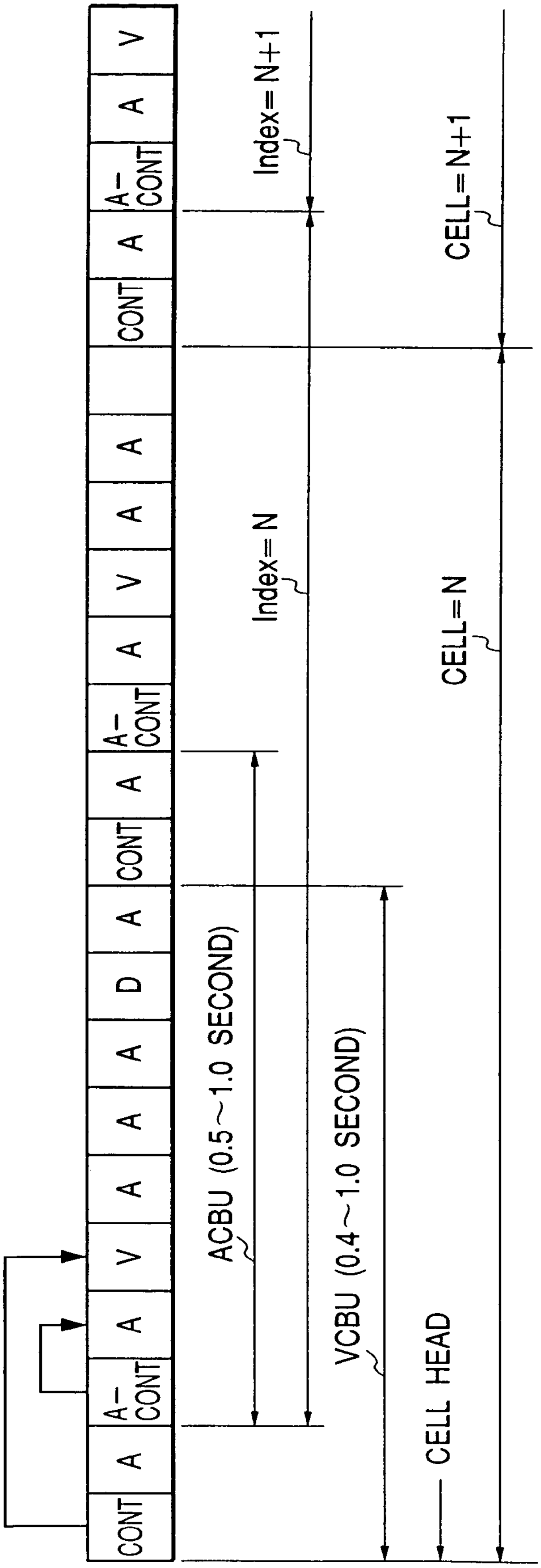
FIG. 48 is a diagram of a sequence of packs in a fourteenth embodiment of this invention.

FIG. 48 shows a pack sequence recorded on a DVD-Audio according to a fourteenth embodiment of this invention. The pack sequence in FIG. 48 is similar to the pack sequence in FIG. 13 except display packs D replace some of audio packs respectively. Each display pack D has audio display information containing audio character display (ACD) information.

Fifteenth Embodiment

Figure 49:
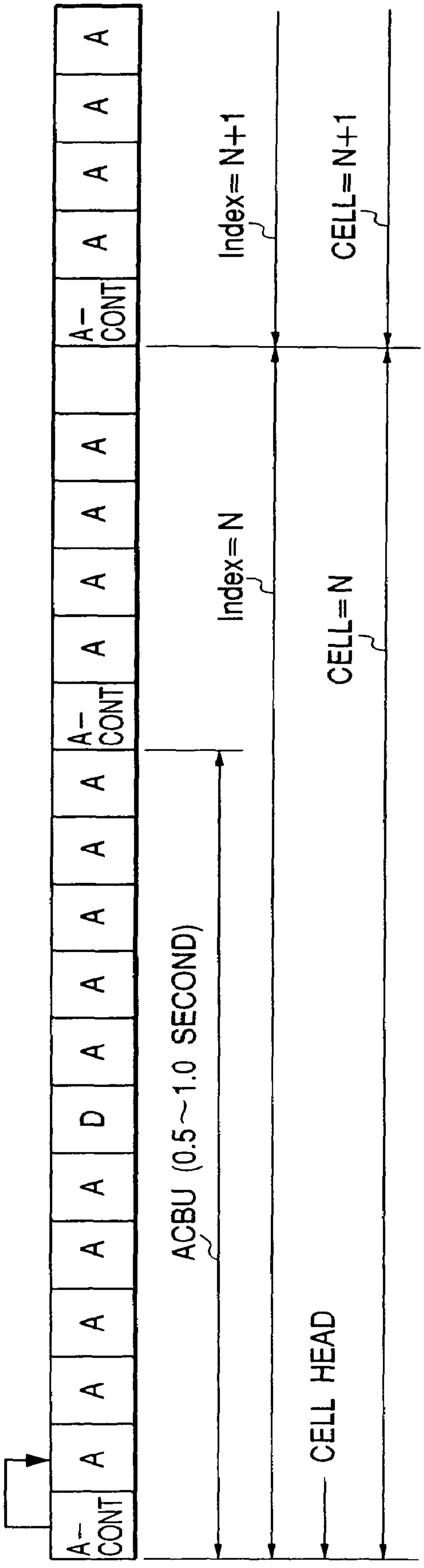
FIG. 49 is a diagram of a sequence of packs in a fifteenth embodiment of this invention.

FIG. 49 shows a pack sequence recorded on a DVD-Audio according to a fifteenth embodiment of this invention. The pack sequence in FIG. 49 is similar to the pack sequence in FIG. 19 except display packs D replace some of audio packs respectively. Each display pack D has audio display information containing audio character display (ACD) information.

Sixteenth Embodiment

Figure 50:
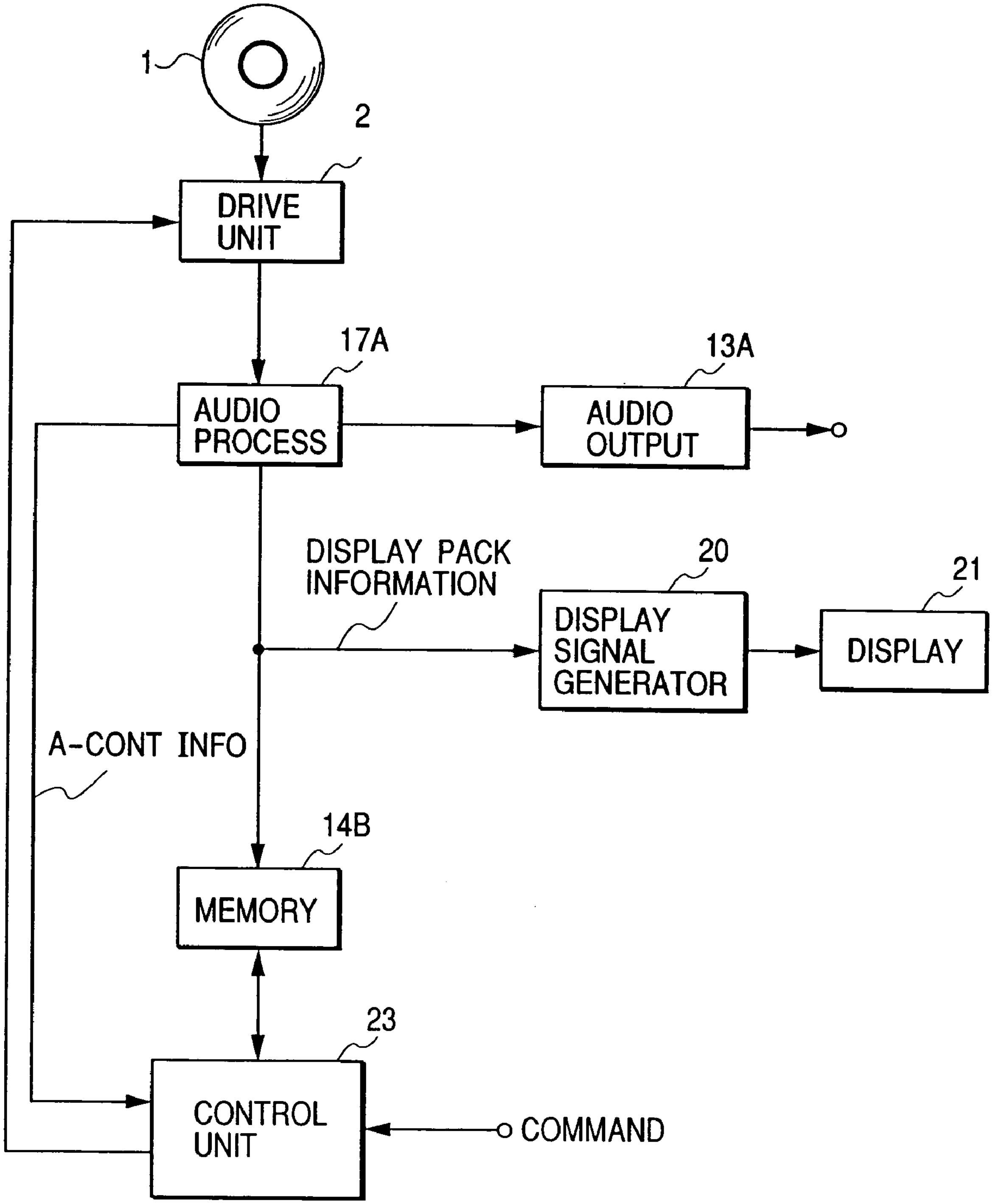
FIG. 50 is an operation flow diagram of a DVD-Audio player including an audio-signal decoding apparatus according to a sixteenth embodiment of this invention.

FIG. 50 shows a DVD-Audio player according to a sixteenth embodiment of this invention. The player in FIG. 50 is similar to the player in FIG. 27 except for design changes indicated later. The player in FIG. 50 is designed to reproduce information from the DVD-Audio in FIG. 48 or FIG. 49.

In the player of FIG. 50, the audio processing block 17A extracts display data (ACD information) from a display pack D in the output signal of the drive unit 2. The audio processing block 17A stores the extracted display data (the extracted ACD information) into the ACD information memory 14B. The display signal generator 20 reads out the ACD information from the ACD information memory 14B, and converts the readout ACD information into dot matrix character data. The display signal generator 20 outputs the dot matrix character data to the display device 21. The display device 21 indicates the dot matrix character data.

Seventeenth Embodiment

Figure 51:
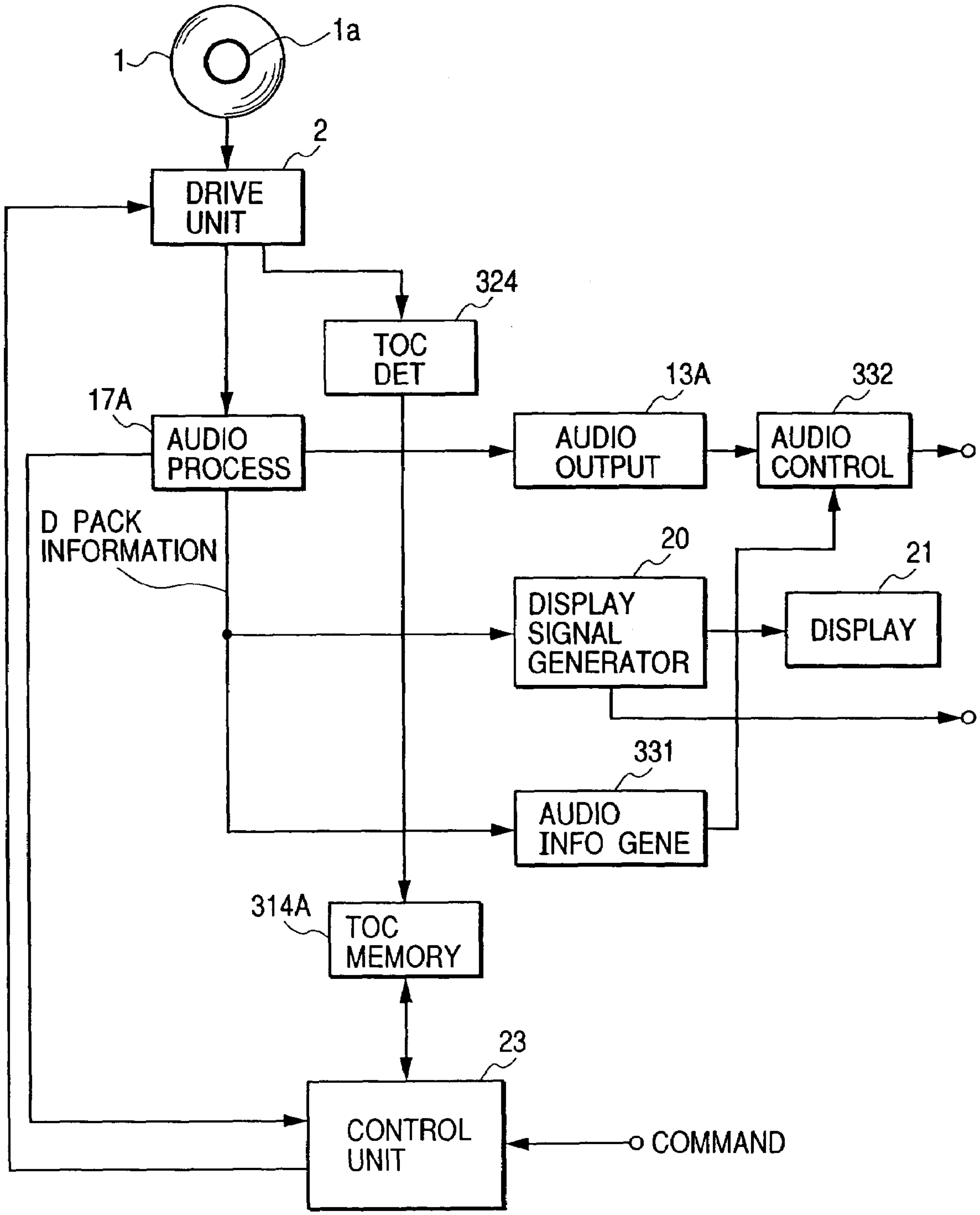
FIG. 51 is an operation flow diagram of a DVD-Audio player including an audio-signal decoding apparatus according to a seventeenth embodiment of this invention.

FIG. 51 shows a seventeenth embodiment of this invention which is similar to the embodiment of FIG. 28 except for design changes indicated later. The embodiment of FIG. 51 is designed to operate on a DVD-Audio 1 having a TOC (table of contents) area 1*a* loaded with TOC information. The TOC area 1*a* is located in a lead-in area which extends in an innermost part of the DVD-Audio 1. The DVD-Audio 1 stores a pack sequence having display pack D as the DVD-Audio in the embodiment of FIG. 48 or FIG. 49 does.

The embodiment of FIG. 51 operates as follows. During playback, the audio processing block 17A extracts display data (ACD information) from a display pack D in the output signal of the drive unit 2. The audio processing block 17A outputs the extracted display data (the extracted ACD information) to the display signal generator 20 and also the audio control information generating block 331.

The audio control information generating block 331 extracts audio control information from the ACD information. The audio control information indicates a desired tone quality and a desired audio level which correspond to optimal conditions of the reproduction of sounds. The audio control information generating block 331 feeds the extracted audio control information to the audio control device 332.

The audio control device 332 receives the audio signal from the audio output block 13A. The audio control device 332 includes a tone controller and a level controller. The audio control device 332 controls the tone quality and the level of the received audio signal in accordance with the desired tone quality and the desired audio level represented by the audio control information. The audio control device 332 outputs the resultant audio signal.

Figure 52:
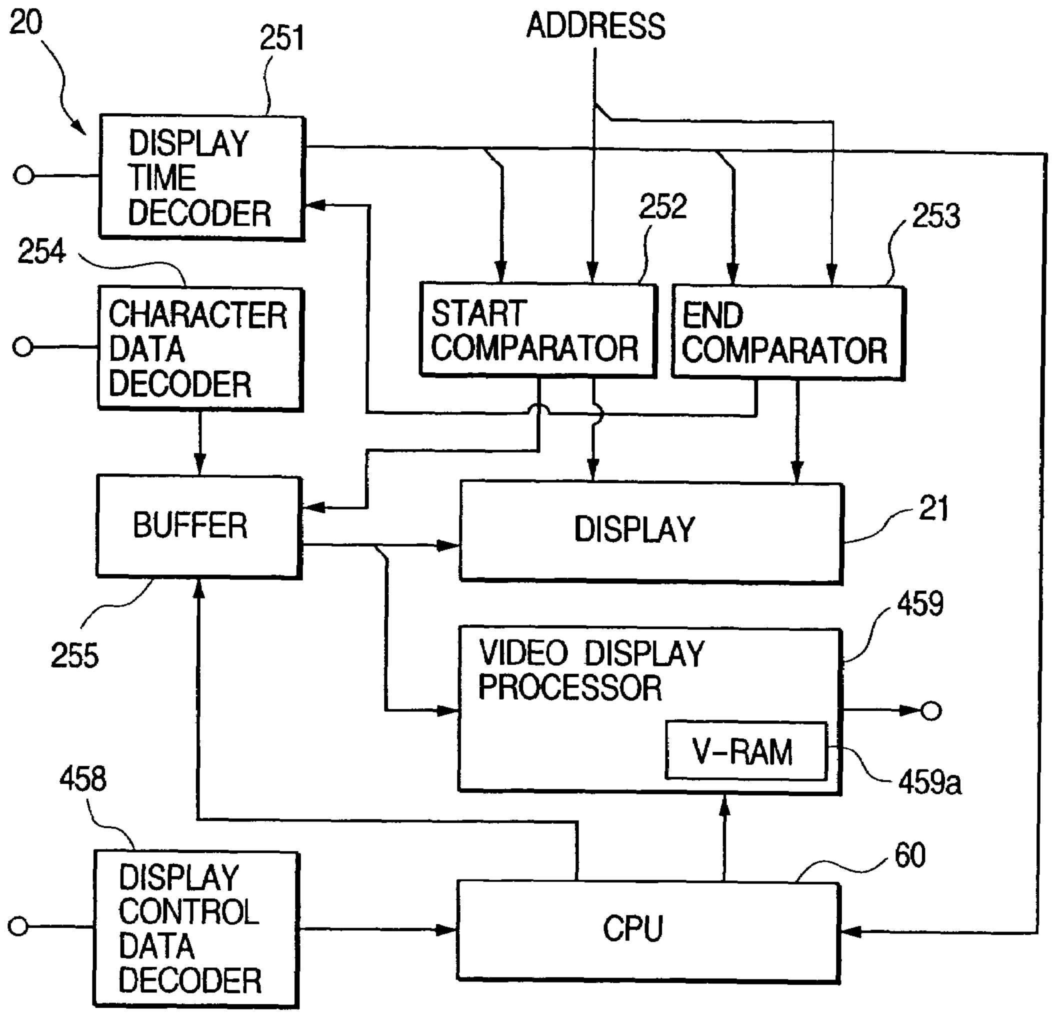
FIG. 52 is a block diagram of a display signal generator in FIG. 51.

The display signal generator 20 and the display device 21 will be further explained. As shown in FIG. 52, the display signal generator 20 includes a display time decoder 251, a start comparator 252, an end comparator 253, a character data decoder 254, a buffer 255, a display control data decoder 458, a video display processor 459, and a CPU 60. The display time decoder 251, the start comparator 252, the end comparator 253, the character data decoder 254, the buffer 255, and the display device 21 are connected in a way similar to that in the embodiment of FIG. 26. The display device 21 includes a flat-face dot matrix display. The video display processor 459 is connected to the buffer 255. The CPU 60 is connected to the display time decoder 251, the buffer 255, the display control data decoder 458, and the video display processor 459. The video display processor 459 includes a video RAM 459*a*. The CPU 60 may be formed by the control unit 23.

Figure 53:
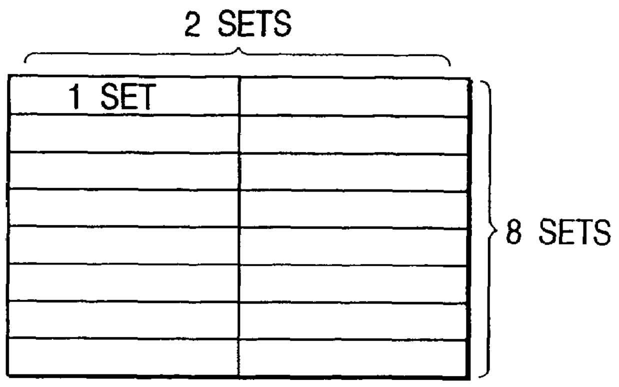
FIG. 53 is a diagram of the structure of a video RAM in FIG. 52.

The display device 21 has a screen size or a frame size of, for example, 31 characters by 2.5 lines which is referred to as one set. The video RAM 459*a* has a capacity corresponding to, for example, 2 by 8 sets as shown in FIG. 53.

Operation of the combinations of the display signal generator 20 and the display device 21 can be changed between a normal mode and a special mode. During the normal mode of operation, character information corresponding to one set is indicated on the display device 21. During the special mode of operation, character information corresponding to 2 by 8 sets is outputted to an external display device from the video display processor 459.

During the normal mode of operation, the display time decoder 251 receives display time data in every display pack D. The display time decoder 251 separates the display time data into display start time data and display end time data which are expressed in terms of audio pack addresses. The display time decoder 251 applies the display start time data to the start comparator 252. The display time decoder 251 applies the display end time data to the end comparator 253.

During the normal mode of operation, the character data decoder 254 receives character data, that is, audio character display (ACD) information, in every display pack D. The character data decoder 254 converts the received character data into dot matrix character data. The character data decoder 254 stores the dot matrix character data into the buffer 255.

During the normal mode of operation, the start comparator 252 compares the display start time data and the address of a currently-reproduced audio pack A. When the address of the currently-reproduced audio pack A becomes equal to the display start time data, the start comparator 252 outputs a read start signal to the buffer 255. At the same time, the start comparator 252 outputs a display-on control signal to the display device 21. The dot matrix character data starts to be transferred from the buffer 255 to the display device 21 in response to the read start signal. The display device 21 starts to operate in response to the display-on control signal. The display device 21 indicates the dot matrix character data after the start of its operation.

During the normal mode of operation, the end comparator 253 compares the display end time data and the address of a currently-reproduced audio pack A. When the address of the currently-reproduced audio pack A becomes equal to the display end time data, the end comparator 253 feeds the display time decoder 251 with a timing signal for the outputting of next display start time data and next display end time data. At the same time, the end comparator 253 outputs a display-off control signal to the display device 21. The display device 21 suspends its operation in response to the display-off control signal.

During the special mode of operation, the display time decoder 251 receives display time data in every display pack D. The display time decoder 251 separates the display time data into display start time data and display end time data which are expressed in terms of audio pack addresses. The display time decoder 251 applies the display start time data to the start comparator 252. The display time decoder 251 applies the display end time data to the end comparator 253. In addition, the display time decoder 251 feeds the display start time data and the display end time data to the CPU 60.

During the special mode of operation, the character data decoder 254 receives character data, that is, audio character display (ACD) information, in every display pack D. The character data decoder 254 converts the received character data into dot matrix character data. The character data decoder 254 stores the dot matrix character data into the buffer 255.

During the special mode of operation, the display control data decoder 458 separates display start address data and division number data from every audio control pack A-CONT. The display control data decoder 458 applies the display start address data and the division number data to the CPU 60.

During the special mode of operation, the start comparator 252 compares the display start time data and the address of a currently-reproduced audio pack A. When the address of the currently-reproduced audio pack A becomes equal to the display start time data, the start comparator 252 outputs a read start signal to the buffer 255. The dot matrix character data starts to be transferred from the buffer 255 to the video display processor 459 in response to the read start signal.

During the special mode of operation, the end comparator 253 compares the display end time data and the address of a currently-reproduced audio pack A. When the address of the currently-reproduced audio pack A becomes equal to the display end time data, the end comparator 253 feeds the display time decoder 251 with a timing signal for the outputting of next display start time data and next display end time data.

During the special mode of operation, the CPU 60 generates reference display start time data and a desired address signal for each set in response to the display start address data and the division number data fed from the display control data decoder 458. The CPU 60 compares the reference display start time data and the display time start data fed from the display time decoder 251. When the display time start data fed from the display time decoder 251 becomes equal to the reference display start time data, the CPU 60 controls the video RAM 459*a* and outputs the desired address signal thereto so that a dot matrix data piece corresponding to one set will be written into a storage segment of the video RAM 459*a* which is designated by the desired address signal. Similarly, later dot matrix data pieces corresponding to fifteen sets are sequentially written into the video RAM 459*a*. The video display processor 459 generates a 1-frame-corresponding video signal in response to the 16-set-corresponding dot matrix data in the video RAM 459*a*. The video display processor 459 outputs the 1-frame-corresponding video signal to the external display device.

Eighteenth Embodiment

Figure 54:
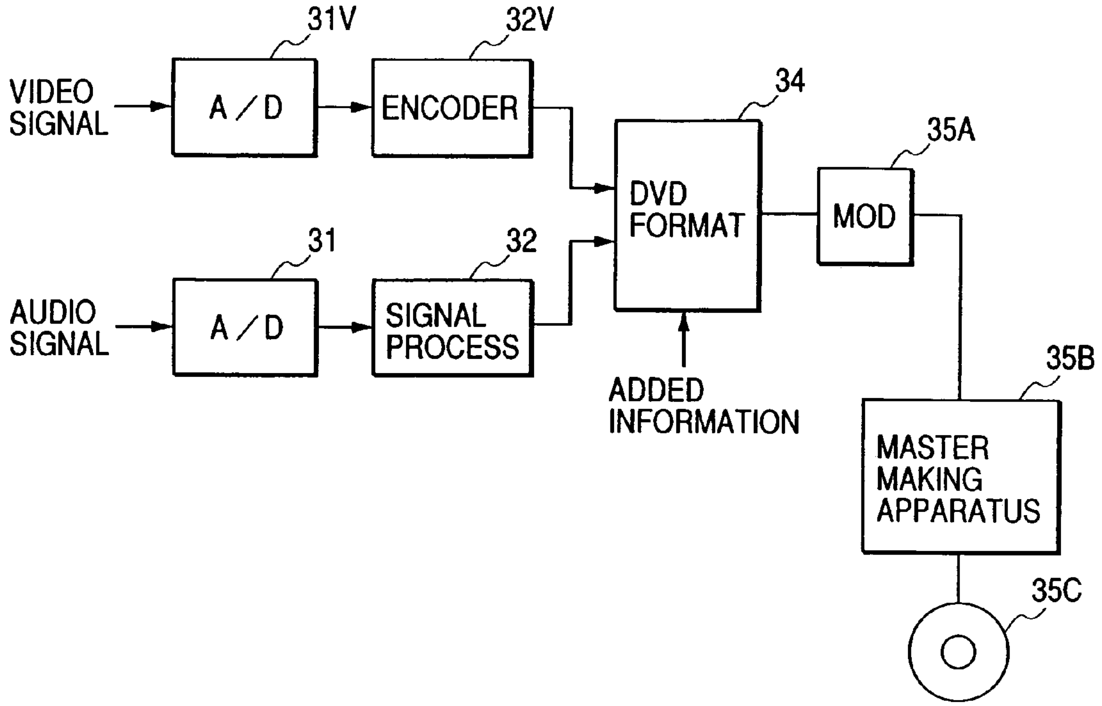
FIG. 54 is a block diagram of an audio-signal encoding apparatus according to an eighteenth embodiment of this invention.

FIG. 54 shows an audio-signal encoding apparatus according to an eighteenth embodiment of this invention. The apparatus of FIG. 54 includes analog-to-digital (A/D) converters 31 and 31V, a signal processing circuit 32, a video encoder 32V, and a DVD formatting section 34.

An analog video signal is applied to the A/D converter 31V. The A/D converter 31V is followed by the video encoder 32V. The video encoder 32V is followed by the DVD formatting section 34.

An analog audio signal is applied to the A/D converter 31. In general, the analog audio signal has multiple channels including, for example, front and rear channels. The analog audio signal may be of the monaural type. The A/D converter 31 is followed by the signal processing circuit 32. The signal processing circuit 32 is followed by the DVD formatting section 34.

The DVD formatting section 34 is successively followed by a modulation circuit 35A and a master making apparatus 35B.

Figure 55:
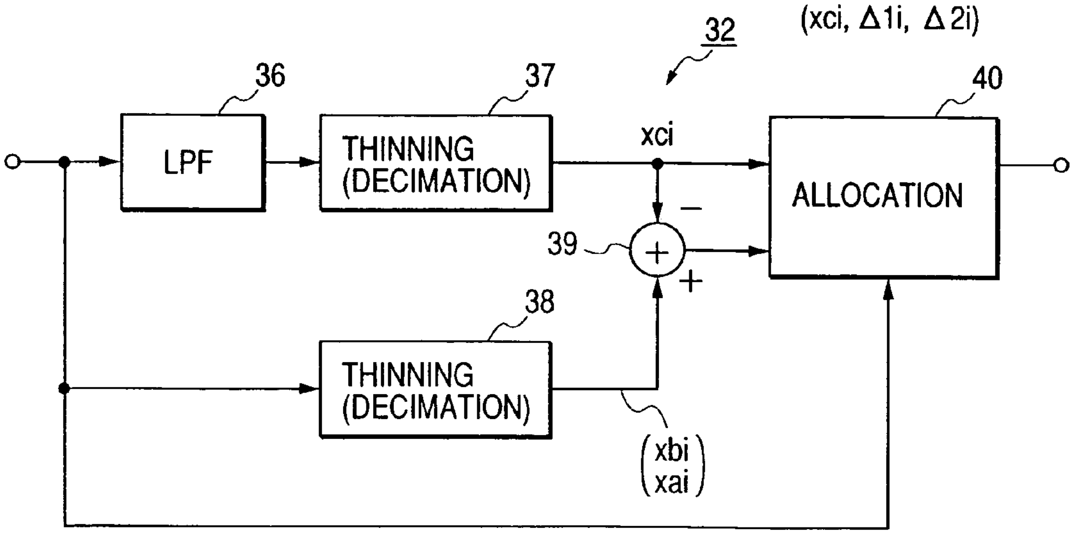
FIG. 55 is a block diagram of a signal processing circuit in FIG. 54.

As shown in FIG. 55, the signal processing circuit 32 includes a low pass filter (LPF) 36, thinning circuits (decimating circuits) 37 and 38, a subtracter 39, and an allocation circuit 40. The low pass filter 36, the thinning circuit 38, and the allocation circuit 40 follow the A/D converter 31 (see FIG. 54). The low pass filter 36 is followed by the thinning circuit 37. A first input terminal of the subtracter 39 is connected to the output terminal of the thinning circuit 37. A second input terminal of the subtracter 39 is connected to the output terminal of the thinning circuit 38. The output terminal of the subtracter 39 is connected to the allocation circuit 40. The output terminal of the thinning circuit 37 is connected to the allocation circuit 40. The allocation circuit 40 is followed by the DVD formatting section 34 (see FIG. 54).

The A/D converter 31 samples the analog audio signal at a given sampling frequency "fs", and changes every sample of the analog audio signal into a corresponding digital sample. Thus, the A/D converter 31 changes the analog audio signal into a corresponding digital audio signal (for example, a PCM audio signal) with a given quantization bit number. In other words, the A/D converter 31 quantizes the analog audio signal into the corresponding digital audio signal. The quantization implemented by the A/D converter 31 may vary from channel to channel. For example, the A/D converter 31 quantizes front-channel components of the analog audio signal at a first predetermined sampling frequency and a first predetermined quantization bit number. The A/D converter 31 quantizes rear-channel components of the analog audio signal at a second predetermined sampling frequency and a second predetermined bit number which are equal to or different from the first predetermined sampling frequency and the first predetermined quantization bit number respectively. The A/D converter 31 outputs the digital audio signal to the signal processing circuit 32.

Operation of the signal processing circuit 32 can be changed between first and second modes which correspond to the absence and the presence of thinning respectively.

During operation of the signal processing circuit 32 in the first mode (the absence of thinning), the digital audio signal is directly transmitted from the A/D converter 31 to the allocation circuit 40. The device 40 allocates the digital audio signal to audio data which can be placed in audio packs A (see FIG. 14). The allocation circuit 40 outputs the audio data to the DVD formatting section 34.

During operation of the signal processing circuit 32 in the second mode (the presence of thinning), the digital audio signal is transmitted from the A/D converter 31 to the low pass filter 36 and the thinning circuit 38. The low pass filter 36 conducts only a half of the frequency band of the digital audio signal. The low pass filter 36 outputs the resultant signal to the thinning circuit 37. The thinning circuit 37 selects one fourth of samples of the output signal of the low pass filter 36. The thinning circuit 37 outputs only the selected signal samples to the subtracter 39 and the allocation circuit 40. The selected samples are spaced at 4-sample intervals.

During operation of the signal processing circuit 32 in the second mode (the presence of thinning), the thinning circuit 38 selects alternate ones of samples of the digital audio signal. The thinning circuit 38 outputs only the selected signal samples to the subtracter 39.

A sequence of samples of the output signal from the thinning circuit 37 is now expressed as:

xc1, xc2, xc3, . . . , xci, . . .

On the other hand, a sequence of samples of the output signal from the thinning circuit 38 is expressed as:

xb1, xa1, xb2, xa2, . . . , xbi, xai, . . .

During operation of the signal processing circuit 32 in the second mode (the presence of thinning), the subtracter 39 calculates differences Δ1*i* and Δ2*i* between the output signals of the thinning circuits 37 and 38. The differences Δ1*i* and Δ2*i* are given as follows.

$$\Delta 1i = xbi - xci$$

$$\Delta 2i = xai - xci$$

The subtracter 39 informs the allocation circuit 40 of the calculated differences Δ1*i* and Δ2*i*.

During operation of the signal processing circuit 32 in the second mode (the presence of thinning), the allocation circuit 40 combines the output signal of the thinning circuit 37 and the information of the differences Δ1*i* and Δ2*i* into audio user data which can be placed in audio packs A (see FIG. 14). The allocation circuit 40 outputs the audio user data to the DVD formatting section 34.

The A/D converter 31V changes the analog video signal into a corresponding digital video signal. The A/D converter 31V outputs the digital video signal to the video encoder 32V. The video encoder 32V changes the digital video signal into an MPEG-format signal. The video encoder 32V packs the MPEG-format signal into video user data which can be placed in video packs V. The video encoder 32V outputs the video user data to the DVD formatting section 34.

The DVD formatting section 34 receives control data from suitable devices (not shown). The control data represents character information, display time information, sampling-frequency information, quantization-bit-number information, thinning information, and other information to be added. The DVD formatting section 34 packs the audio data (or the audio user data), the video user data, and the added information into a composite signal of a DVD-Audio format corresponding to the signal recording format of the DVD-Audio in FIG. 2 or the signal recording format of the DVD-Audio in FIG. 37. The DVD formatting section 34 outputs the composite signal of the DVD-Audio format to the modulation circuit 35A. It should be noted that the DVD formatting section 34 may output the composite signal of the DVD-Audio format to a transmission line or a communication line. The modulation circuit 35A subjects the composite signal of the DVD-Audio format to given modulation (for example, EFM modulation) suited to a DVD-Audio. The modulation circuit 35A outputs the modulation-resultant signal to the master making apparatus 35B. The apparatus 35B makes a master disc 35C in response to the output signal of the modulation circuit 35A. The maser disc 35C stores the output signal of the modulation circuit 35A. DVD-Audios are made by a DVD making apparatus (not shown) on the basis of the master disc 35C.

Nineteenth Embodiment

Figure 56:
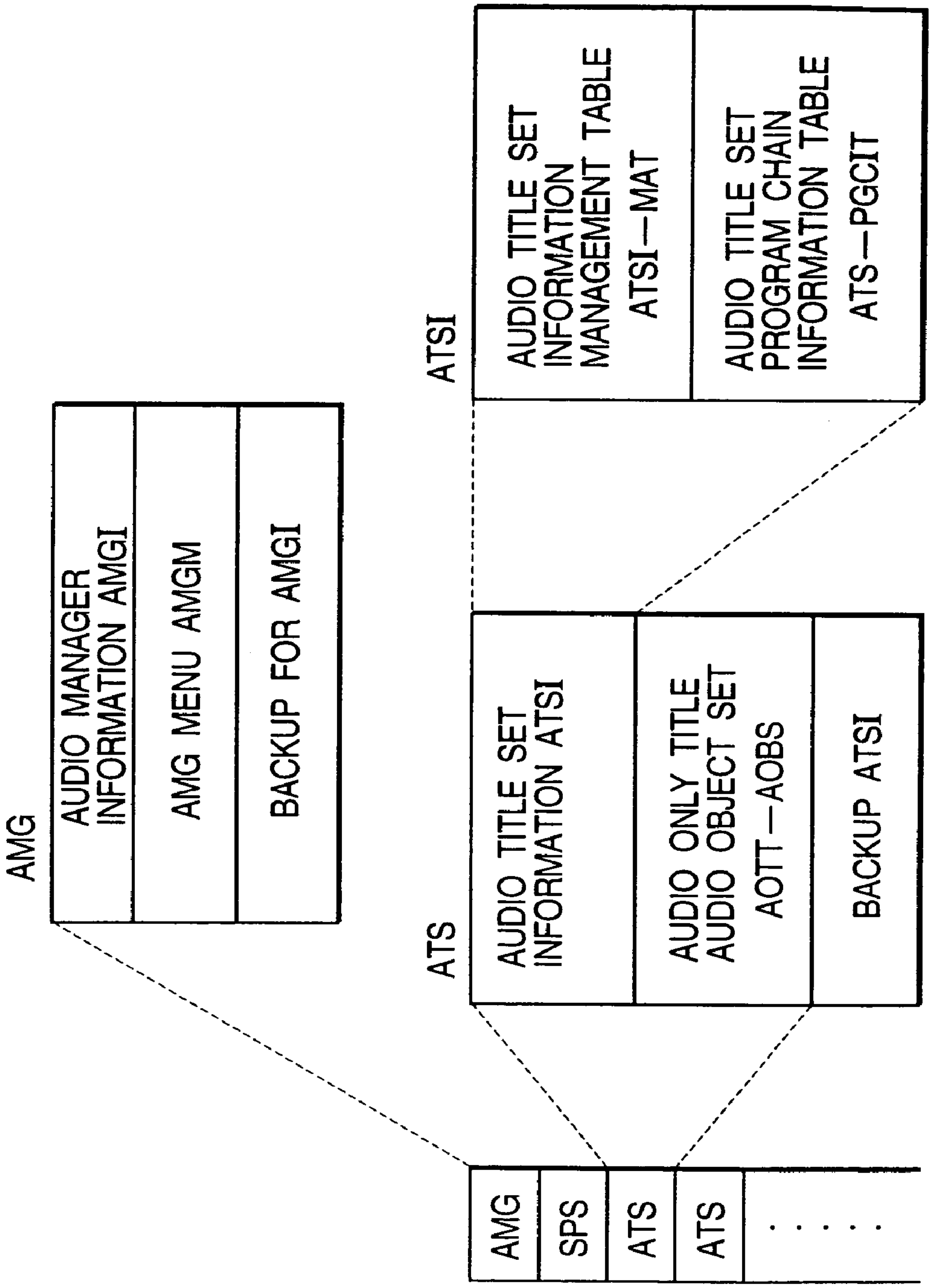
FIG. 56 is a diagram of the structure of an ATS area in a nineteenth embodiment of this invention.

FIG. 56 shows the structure of data recorded on a DVD-Audio according to a nineteenth embodiment of this invention. The data structure in FIG. 56 includes a sequence of an audio manager AMG, a still picture set SPS, and plural audio title sets ATS.

The audio manager AMG has audio manager information AMGI, an audio manager menu AMGM, and backup audio manager information AMGI. The still picture set has a sequence of still-picture address information SPAI and still picture units SPU shown in FIG. 71.

Each audio title set ATS has a sequence of audio title set (ATS) information ATSI, an audio only title audio object set AOTT-AOBS, and backup audio title set information ATSI. The audio title set information ATSI has a sequence of an audio title set information management table ATSI-MAT, and an audio title set program chain information table ATS-PGCIT.

Figure 57:
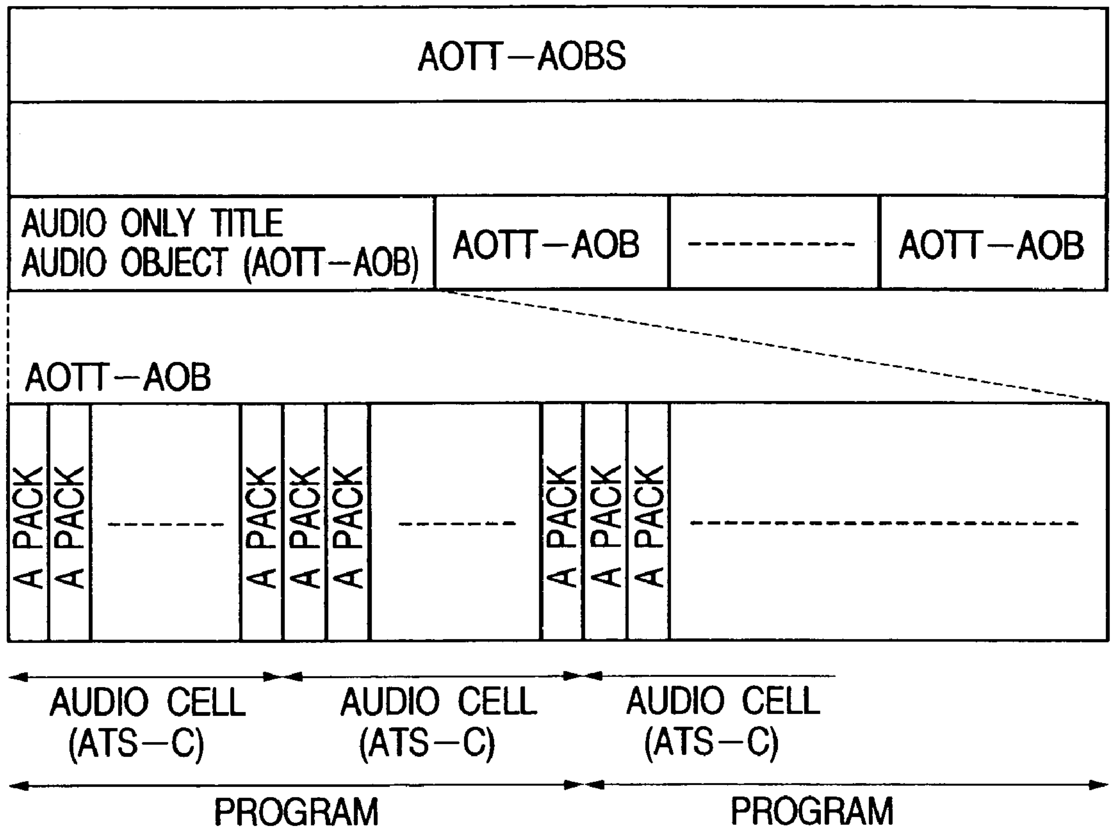
FIG. 57 is a diagram of the structure of an AOTT-AOBS area.

As shown in FIG. 57, the audio only title audio object set AOTT-AOBS has a sequence of audio only title audio objects AOTT-AOB. Each of the audio only title audio objects AOTT-AOB is formed by a plurality of programs (tunes or movements) PG. Each of the programs PG is formed by a plurality of cells ATS-C.

Generally, audio only title audio objects AOTT-AOB are of first and second types. Each audio only title audio object AOTT-AOB of the first type contains only audio data. Each audio only title audio object AOTT-AOB of the second type contains not only audio data but also real-time information data (RTI data). Audio only title audio objects AOTT-AOB of at least one type are stored in the DVD-Audio or a tune therein.

With reference to FIG. 57, each program PG in an audio only title audio object AOTT-AOB of the first type is formed by a plurality of audio cells ATS-C. Each of the audio cells ATS-C is composed of only audio packs A.

Figure 58:
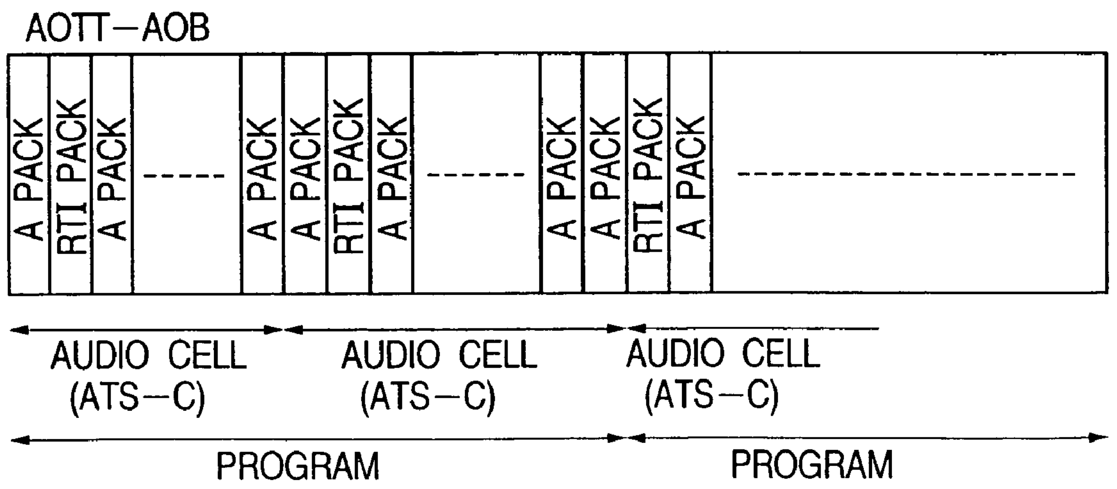
FIG. 58 is a diagram of a sequence of packs in an AOTT-AOB area.

As shown in FIG. 58, each program PG in an audio only title audio object AOTT-AOB of the second type is formed by a plurality of audio cells ATS-C. Each of the audio cells ATS-C has a pack sequence of a real-time information pack RTI and audio packs A. Regarding the pack sequence in each audio cell ATS-C, the real-time information pack RTI occupies the second place while the audio packs A occupy the other places.

According to the linear PCM audio encoding mode, every audio pack A has 2,048 bytes or less.

Figure 59:
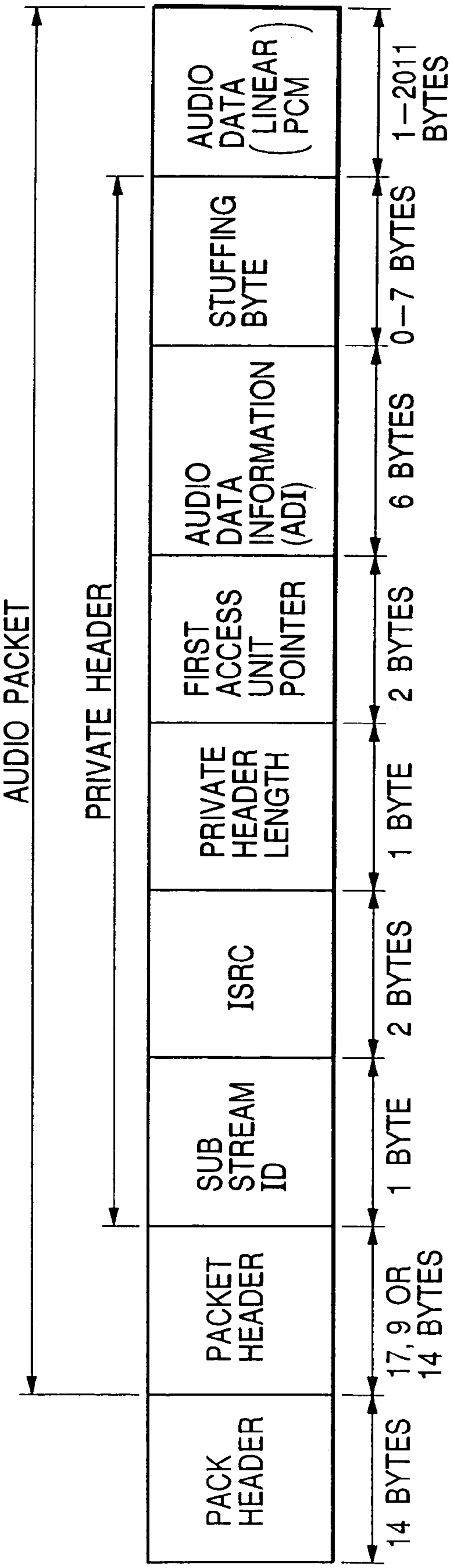
FIG. 59 is a diagram of the structure of a linear PCM audio pack.

As shown in FIG. 59, a linear PCM audio pack A has a 14-byte pack header and an audio packet. The pack header is followed by the audio packet. The audio packet has a sequence of a packet header, a private header, and audio data (linear PCM audio data). The packet header has 9 bytes, 14 bytes, or 17 bytes. The audio data has 1 byte to 2,011 bytes.

As shown in FIGS. 59 and 60, the private header has a sequence of 8-bit sub stream ID (identification) information, a 3-bit reserved area, 5-bit information of an UPC/EAN-ISRC (Universal Product Code/European Article Number-International Standard Recording Code) number, 8-bit information of UPC/EAN-ISRC data, 8-bit information of the private header length, a 16-bit first access unit pointer, 8-byte audio data information ADI, and 0 to 8 stuffing bytes.

As shown in FIG. 60, the audio data information ADI (see FIG. 59) has a sequence of a 1-bit audio emphasis flag, a 1-bit reserved area, 1-bit information of a down mix mode, 1-bit information of down mix code effectiveness, a 4-bit down mix code, 4-bit information of the quantization word length (the quantization bit number) in the channel group "1", 4-bit information of the quantization word length (the quantization bit number) in the channel group "2", 4-bit information of the audio sampling frequency fs1 in the channel group "1", 4-bit information of the audio sampling frequency fs2 in the channel group "2", a 4-bit reserved area, 4-bit information of a multiple channel type, 3-bit information of a bit shift in the channel group "2", 5-bit channel assignment information, 8-bit dynamic-range control information, and a 16-bit reserved area.

With reference to FIG. 60, the 8-bit UPC/EAN-ISRC data is changed among eight different states in accordance with the UPC/EAN-ISRC number. The 8 bits representing the UPC/EAN-ISRC data are denoted by b7, b6, b5, b4, b3, b2, b1, and b0 respectively.

In the case where the UPC/EAN-ISRC number is equal to "1", the bits b7 and b6 of the UPC/EAN-ISRC data are reserved while the other bits b5-b0 thereof are assigned to a country code (ISRC #1) as shown in FIG. 61.

In the case where the UPC/EAN-ISRC number is equal to "2", the bits b7 and b6 of the UPC/EAN-ISRC data are reserved while the other bits b5-b0 thereof are assigned to a country code (ISRC #2) as shown in FIG. 62.

In the case where the UPC/EAN-ISRC number is equal to "3", the bits b7 and b6 of the UPC/EAN-ISRC data are reserved while the other bits b5-b0 thereof are assigned to a copyright holder code (ISRC #3) as shown in FIG. 63.

In the case where the UPC/EAN-ISRC number is equal to "4", the bits b7 and b6 of the UPC/EAN-ISRC data are reserved while the other bits b5-b0 thereof are assigned to a copyright holder code (ISRC #4) as shown in FIG. 64.

In the case where the UPC/EAN-ISRC number is equal to "5", the bits b7 and b6 of the UPC/EAN-ISRC data are reserved while the other bits b5-b0 thereof are assigned to a copyright holder code (ISRC #5) as shown in FIG. 65.

In the case where the UPC/EAN-ISRC number is equal to "6", the bits b7-b4 of the UPC/EAN-ISRC data are reserved while the other bits b3-b0 thereof are assigned to a recording year (ISRC #6) as shown in FIG. 66.

In the case where the UPC/EAN-ISRC number is equal to "7", the bits b7-b4 of the UPC/EAN-ISRC data are reserved while the other bits b3-b0 thereof are assigned to a recording year (ISRC #7) as shown in FIG. 67.

Preferably, the number of bits of signal samples of audio channels in the group "2" is reduced in comparison with the number of bits of signal samples of audio channels in the group "1" to implement data compression. Thus, the word length of signal samples of audio channels in the group "2" is reduced in comparison with the word length of signal samples of audio channels in the group "1". Regarding every linear PCM audio pack (see FIG. 59), reduction-resultant linear PCM audio data for the channel group "2" is located in the audio data area.

Figure 68:
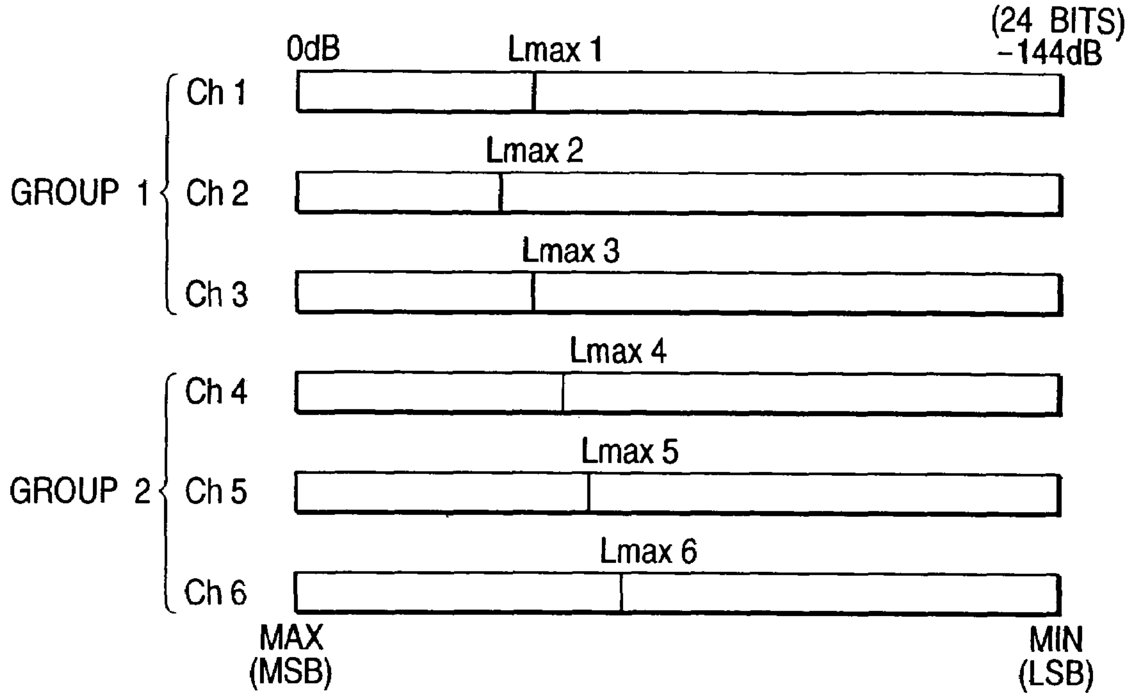
FIG. 68 is a diagram of an unreduced state of 24-bit signal samples in audio channels Ch1, Ch2, Ch3, Ch4, Ch5, and Ch6.

FIG. 68 shows an unreduced state of 24-bit signal samples in audio channels Ch1, Ch2, Ch3, Ch4, Ch5, and Ch6. The channels Ch1, Ch2, and Ch3 are in the group "1" while the channels Ch4, Ch5, and Ch6 are in the group "2". The signal levels represented by signal samples of the channels Ch1, Ch2, Ch3, Ch4, Ch5, and Ch6 are equal to or less than upper limits Lmax1, Lmax2, Lmax3, Lmax4, Lmax5, and Lmax6 respectively. According to the unreduced state in FIG. 68, the upper level limits Lmax1, Lmax2, Lmax3, Lmax4, Lmax5, and Lmax6 have the following relation.

Lmax2>Lmax1=Lmax3>Lmax4>Lmax5>Lmax6

In this case, each of signal samples in the channels Ch4, Ch5, and Ch6 in the group "2" is shifted up and reduced by an amount corresponding to a given bit number depending on the upper limit level Lmax2.

Figure 69:
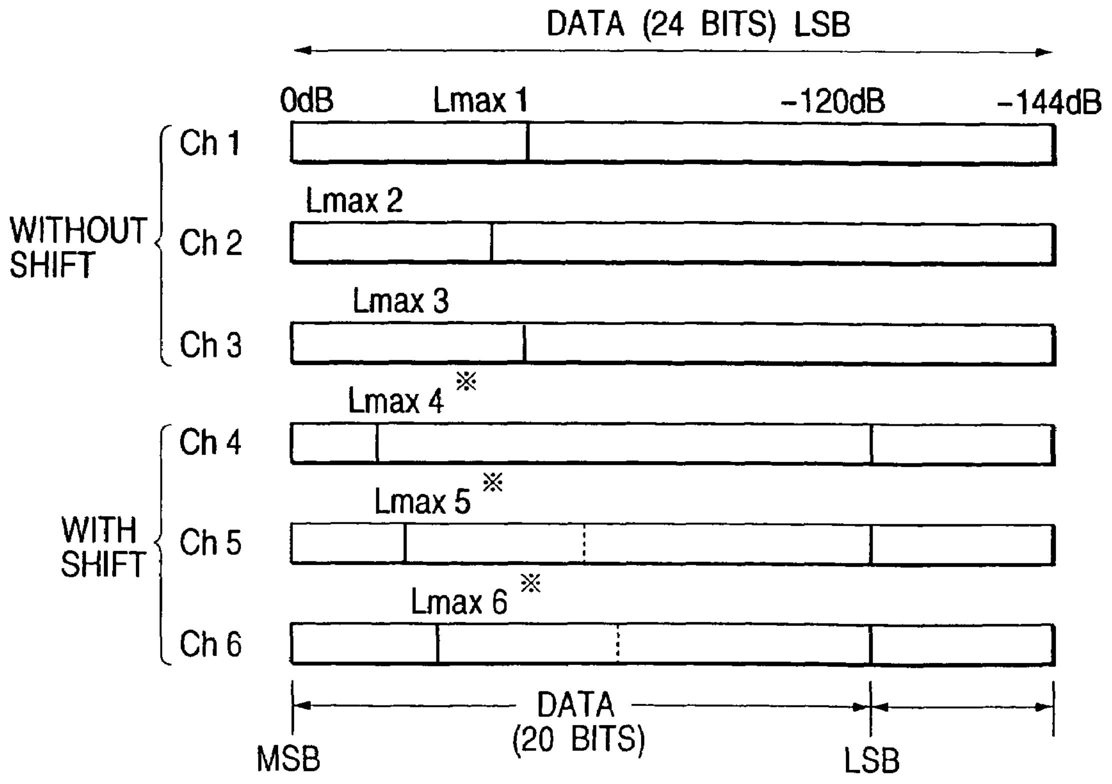
FIG. 69 is a diagram of a reduction-resultant state of signal samples which originates from the unreduced state in FIG. 68.

FIG. 69 shows a reduction-resultant state of signal samples which originates from the unreduced state in FIG. 68. With reference to FIG. 69, each of signal samples in the channels Ch4, Ch5, and Ch6 in the group "2" results from up shift by 4 bits, and thus has 20 bits.

Figure 70:
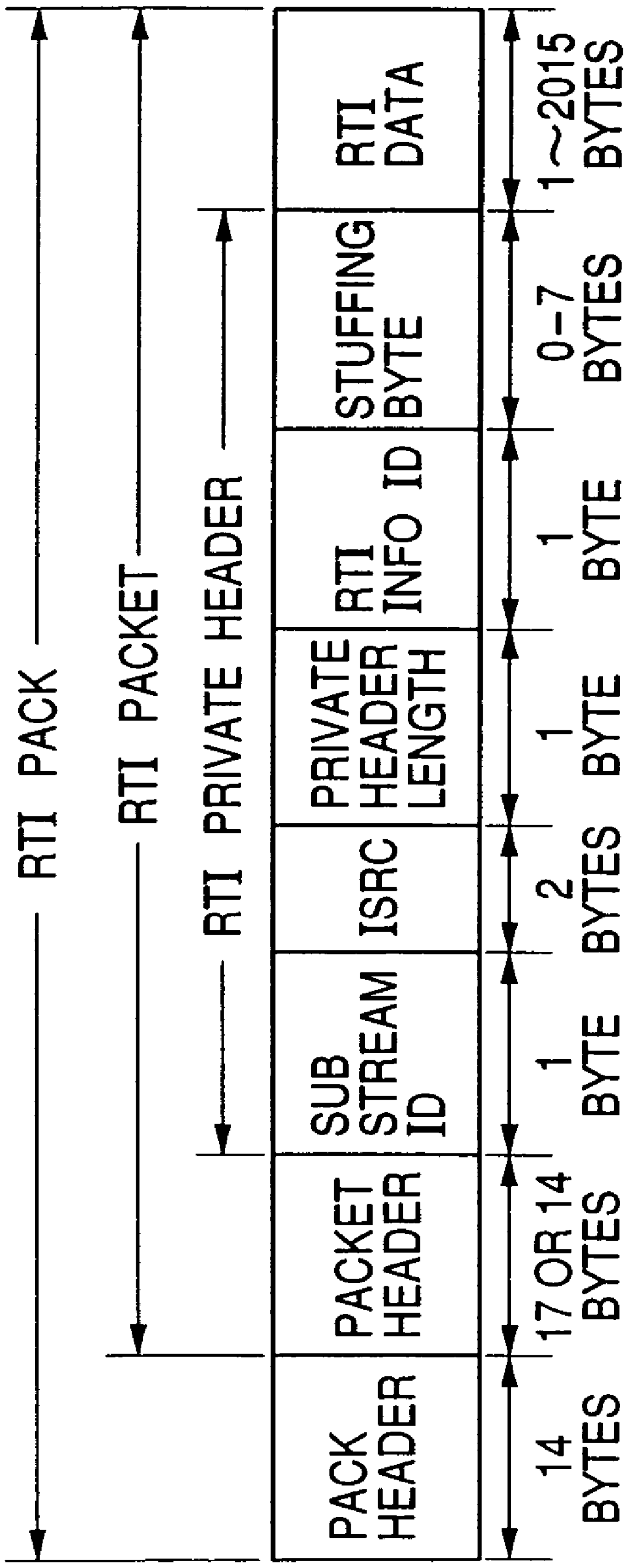
FIG. 70 is a diagram of the structure of a real-time information pack.

As shown in FIG. 70, a real-time information pack RTI has a 14-byte pack header and a real-time information packet. The pack header is followed by the real-time information packet. The real-time information packet has a sequence of a packet header, a private header, and real-time information data. The packet header has 14 bytes or 17 bytes. The real-time information data has 1 byte to 2,015 bytes. The real-time information contains reproduction control information and character information related to audio data.

As shown in FIG. 70, the private header of the real-time information packet has a sequence of 1-byte sub stream ID (identification) information, 2-byte ISRC information, 1-byte information of the private header length, 1-byte real-time information identification (ID) data, and 0 to 7 stuffing bytes. The 2-byte ISRC information contains information of an UPC/EAN-ISRC (Universal Product Code/European Article Number-International Standard Recording Code) number, and information of UPC/EAN-ISRC data. The UPC/EAN-ISRC number and data relate to the copyright on still pictures represented by still-picture packs SPCT which will be explained later.

Figure 71:
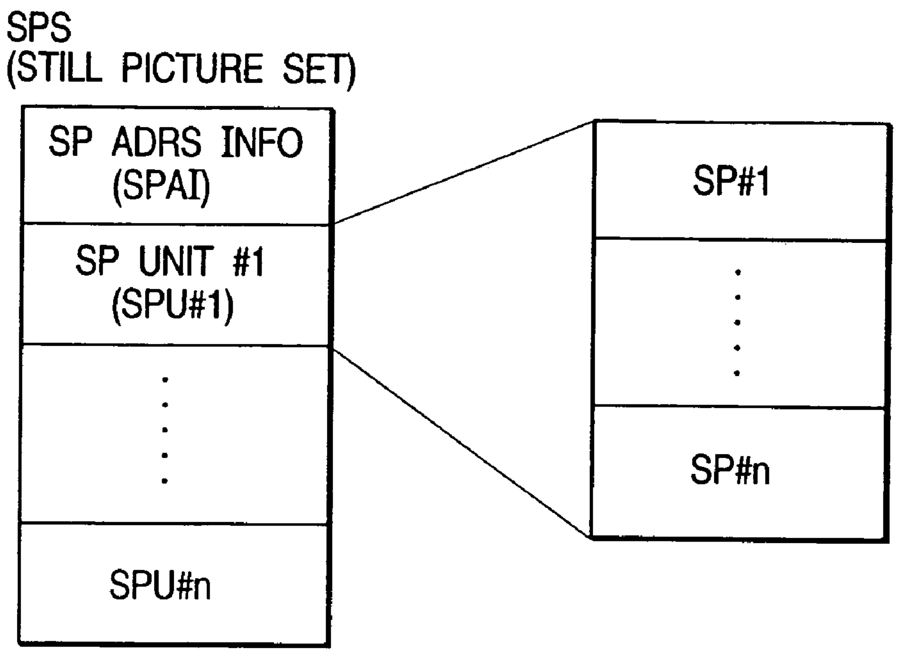
FIG. 71 is a diagram of the structure of an SPS area.

As shown in FIG. 71, the still picture set SPS has a sequence of still-picture address information SPAI and still picture units SPU#1-SPU#n. Each of the still picture units SPU#1-SPU#n has a sequence of segments corresponding to still pictures SP#1-SP#n respectively. Each of the still pictures SP#1-SP#n has a sequence of still-picture packs SPCT.

Figure 72:
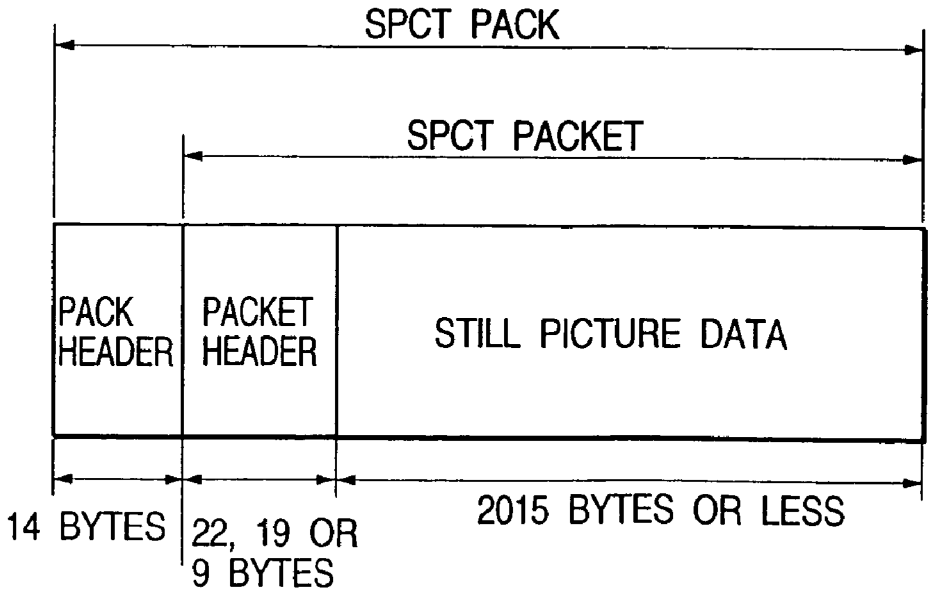
FIG. 72 is a diagram of the structure of a still-picture pack.

As shown in FIG. 72, a still-picture pack SPCT has a 14-byte pack header and a still-picture packet. The pack header is followed by the still-picture packet. The still-picture packet has a sequence of a packet header and still-picture data. The packet header has 9 bytes, 19 bytes, or 22 bytes. The still-picture data has 1 byte to 2,015 bytes. Here, each still picture is represented by an intra-coded picture resulting from data compression according to the MPEG-1 standards or the MPEG-2 standards. Data representing a still picture is divided into pieces located in still-picture packs SPCT respectively. The UPC/EAN-ISRC number and data related to the copyright on a still picture may be contained in the packet header of a still-picture pack SPCT.

FIG. 73 shows the details of the audio title set information management table ATSI-MAT in FIG. 56. As shown in FIG. 73, the audio title set information management table ATSI-MAT has 2,048 bytes in relative byte positions RBP0-RBP2047. Specifically, the audio title set information management table ATSI-MAT has a sequence of a 12-byte ATS identifier ATS-ID, a 4-byte ATS end address ATS-EA, a 12-byte reserved area, a 4-byte ATSI end address ATSI-EA, a 2-byte version number VERN, a 94-byte reserved area, a 4-byte ATSI-MAT end address, a 60-byte reserved area, a 4-byte AOTT VTS start address, a 4-byte AOTT AOBS start address or a 4-byte AOTT VOBS start address, a 4-byte reserved area, a 4-byte ATS-PGCIT start address, a 48-byte reserved area, a 128-byte AOTT AOB attribute AOTT-AOB-ATR or a 128-byte AOTT VOB audio stream attribute AOTT-VOB-AST-ATR, a 288-byte area for multiple channel audio data down mix coefficients ATS-DM-COEFT#0-#15, a 32-byte reserved area, a 2-byte AOTT AOBS still-picture data attribute ATS-SPCT-ATR, and a 1342-byte reversed area.

One of the 128-byte AOTT AOB attribute AOTT-AOB-ATR and the 128-byte AOTT VOB audio stream attribute AOTT-VOB-AST-ATR is used in the audio title set information management table ATSI-MAT of FIG. 73. When the related audio title set has an audio only title audio object set AOTT-AOBS, the AOTT AOB attribute AOTT-AOB-ATR is used.

As shown in FIG. 74, the AOTT AOB attribute (the audio-only-title audio-object attribute) AOTT-AOB-ATR contains a sequence of 16 bytes, that is, 128 bits b127, b126, b125, . . . , b1, b0. A set of the bits b127, b126, b125, b124, b123, b122, b121, and b120 represents an audio encoding mode. A set of the bits b111, b110, b109, and b108 represents a quantization bit number Q1 of a channel group "1". A set of the bits b107, b106, b105, and b104 represents a quantization bit number Q2 of a channel group "2". A set of the bits b103, b102, b101, and b100 represents a sampling frequency fs1 of the channel group "1". A set of the bits b99, b98, b97, and b96 represents a sampling frequency fs2 of the channel group "2". A set of the bits b95, b94, and b93 represents a multiple channel type. A set of the bits b92, b91, b90, b89, and b88 represents channel assignment. The other bits form reserved areas.

The audio encoding mode represented by the bits b127, b126, b125, b124, b123, b122, b121, and b120 in FIG. 74 can be selected from among a linear PCM audio encoding mode, a Dolby digital encoding mode, an MPEG-2 encoding mode without any extension, an MPEG-2 encoding mode with an extension, a DTS encoding mode, and an SDDS encoding mode. Specifically, a bit sequence of "00000000" is assigned to the linear PCM audio encoding mode. A bit sequence of "00000001" is assigned to the Dolby digital encoding mode. A bit sequence of "00000010" is assigned to the MPEG-2 encoding mode without any extension. A bit sequence of "00000011" is assigned to the MPEG-2 encoding mode with an extension. A bit sequence of "00000100" is assigned to the DTS encoding mode. A bit sequence of "00000101" is assigned to the SDDS encoding mode.

Normally, the bits b127, b126, b125, b124, b123, b122, b121, and b120 in FIG. 74 are set to "00000000" representing the linear PCM audio encoding mode.

The quantization bit number Q1 of the channel group "1" which is represented by the bits b111, b110, b109, and b108 in FIG. 74 can be changed among 16 bits, 20 bits, and 24 bits. Specifically, a bit sequence of "0000" is assigned to 16 bits. A bit sequence of "0001" is assigned to 20 bits. A bit sequence of "0010" is assigned to 24 bits.

The quantization bit number Q2 of the channel group "2" which is represented by the bits b107, b106, b105, and b104 in FIG. 74 can be changed among 16 bits, 20 bits, and 24 bits. Specifically, a bit sequence of "0000" is assigned to 16 bits. A bit sequence of "0001" is assigned to 20 bits. A bit sequence of "0010" is assigned to 24 bits.

The sampling frequency fs1 of the channel group "1" which is represented by the bits b103, b102, b101, and b100 in FIG. 74 can be changed among 48 kHz, 96 kHz, 192 kHz, 44.1 kHz, 88.2 kHz, and 176.4 kHz. Specifically, a bit sequence of "0000" is assigned to 48 kHz. A bit sequence of "0001" is assigned to 96 kHz. A bit sequence of "0010" is assigned to 192 kHz. A bit sequence of "1000" is assigned to 44.1 kHz. A bit sequence of "1001" is assigned to 88.2 kHz. A bit sequence of "1010" is assigned to 176.4 kHz.

The sampling frequency fs2 of the channel group "2" which is represented by the bits b99, b98, b97, and b96 in FIG. 74 can be changed among 48 kHz, 96 kHz, 192 kHz, 44.1 kHz, 88.2 kHz, and 176.4 kHz. Specifically, a bit sequence of "0000" is assigned to 48 kHz. A bit sequence of "0001" is assigned to 96 kHz. A bit sequence of "0010" is assigned to 192 kHz. A bit sequence of "1000" is assigned to 44.1 kHz. A bit sequence of "1001" is assigned to 88.2 kHz. A bit sequence of "1010" is assigned to 176.4 kHz.

Normally, the bits b95, b94, and b93 in FIG. 74 are set to "000" representing that the multiple channel type agrees with a type "1".

The channel assignment represented by the bits b92, b91, b90, b89, and b88 in FIG. 74 can be changed among 21 different types shown in FIG. 75. A bit sequence of "00000" is assigned to a first type of the channel assignment in which a first channel ACH0 forms a monaural channel C(mono), and second and later channels ACH1, ACH2, ACH3, ACH4, and ACH5 are unused. According to the first type of the channel assignment, the monaural channel C(mono) is in the group "1". Thus, the channel number in the group "1" is equal to one while the channel number in the group "2" is equal to zero. A bit sequence of "00001" is assigned to a second type of the channel assignment in which the first and second channels ACH0 and ACH1 form a left channel L and a right channel R respectively, and the third and later channels ACH2, ACH3, ACH4, and ACH5 are unused. According to the second type of the channel assignment, the left channel L and the right channel R are in the group "1". Thus, the channel number in the group "1" is equal to two while the channel number in the group "2" is equal to zero. A bit sequence of "00010" is assigned to a third type of the channel assignment in which the first, second, and third channels ACH0, ACH1, and ACH2 form a left front channel Lf, a right front channel Rf, and a surround channel S respectively, and the fourth and later channels ACH3, ACH4, and ACH5 are unused. According to the third type of the bit assignment, the left front channel Lf and the right front channel Rf are in the group "1" while the surround channel S is in the group "2". Thus, the channel number in the group "1" is equal to two while the channel number in the group "2" is equal to one. A bit sequence of "00011" is assigned to a fourth type of the channel assignment in which the first, second, third, and fourth channels ACH0, ACH1, ACH2, and ACH3 form a left front channel Lf, a right front channel Rf, a left surround channel Ls, and a right surround channel Rs respectively, and the fifth and sixth channels ACH4 and ACH5 are unused. According to the fourth type of the channel assignment, the left front channel Lf and the right front channel Rf are in the group "1" while the left surround channel Ls and the right surround channel Rs are in the group "2". Thus, the channel number in the group "1" is equal to two while the channel number in the group "2" is also equal to two. A bit sequence of "00100" is assigned to a fifth type of the channel assignment in which the first, second, and third channels ACH0, ACH1, and ACH2 form a left front channel Lf, a right front channel Rf, and a low frequency effect channel LFE respectively, and the fourth and later channels ACH3, ACH4, and ACH5 are unused. According to the fifth type of the channel assignment, the left front channel Lf and the right front channel Rf are in the group "1" while the low frequency effect channel LFE is in the group "2". Thus, the channel number in the group "1" is equal to two while the channel number in the group "2" is equal to one. A bit sequence of "00101" is assigned to a sixth type of the channel assignment in which the first, second, third, and fourth channels ACH0, ACH1, ACH2, and ACH3 form a left front channel Lf, a right front channel Rf, a low frequency effect channel LFE, and a surround channel S respectively, and the fifth and sixth channels ACH4 and ACH5 are unused. According to the sixth type of the channel assignment, the left front channel Lf and the right front channel Rf are in the group "1" while the low frequency effect channel LFE and the surround channel S are in the group "2". Thus, the channel number in the group "1" is equal to two while the channel number in the group "2" is also equal to two. A bit sequence of "00110" is assigned to a seventh type of the channel assignment in which the first, second, third, fourth, and fifth channels ACH0, ACH1, ACH2, ACH3, and ACH4 form a left front channel Lf, a right front channel Rf, a low frequency effect channel LFE, a left surround channel Ls, and a right surround channel Rs respectively, and the sixth channel ACH5 is unused. According to the seventh type of the channel assignment, the left front channel Lf and the right front channel Rf are in the group "1" while the low frequency effect channel LFE, the left surround channel Ls, and the right surround channel Rs are in the group "2". Thus, the channel number in the group "1" is equal to two while the channel number in the group "2" is equal to three. A bit sequence of "00111" is assigned to an eighth type of the channel assignment in which the first, second, and third channels ACH0, ACH1, and ACH2 form a left front channel Lf, a right front channel Rf, and a center channel C respectively, and the fourth and later channels ACH3, ACH4, and ACH5 are unused. According to the eighth type of the channel assignment, the left front channel Lf and the right front channel Rf are in the group "1" while the center channel C is in the group "2". Thus, the channel number in the group "1" is equal to two while the channel number in the group "2" is equal to one. A bit sequence of "01000" is assigned to a ninth type of the channel assignment in which the first, second, third, and fourth channels ACH0, ACH1, ACH2, and ACH3 form a left front channel Lf, a right front channel Rf, a center channel C, and a surround channel S respectively, and the fifth and sixth channels ACH4 and ACH5 are unused. According to the ninth type of the channel assignment, the left front channel Lf and the right front channel Rf are in the group "1" while the center channel C and the surround channel S are in the group "2". Thus, the channel number in the group "1" is equal to two while the channel number in the group "2" is also equal to two. A bit sequence of "01001" is assigned to a tenth type of the channel assignment in which the first, second, third, fourth, and fifth channels ACH0, ACH1, ACH2, ACH3, and ACH4 form a left front channel Lf, a right front channel Rf, a center channel C, a left surround channel Ls, and a right surround channel Rs respectively, and the sixth channel ACH5 is unused. According to the tenth type of the channel assignment, the left front channel Lf and the right front channel Rf are in the group "1" while the center channel C, the left surround channel Ls, and the right surround channel Rs are in the group "2". Thus, the channel number in the group "1" is equal to two while the channel number in the group "2" is equal to three. A bit sequence of "01010" is assigned to an eleventh type of the channel assignment in which the first, second, third, and fourth channels ACH0, ACH1, ACH2, and ACH3 form a left front channel Lf, a right front channel Rf, a center channel C, and a low frequency effect channel LFE respectively, and the fifth and sixth channels ACH4 and ACH5 are unused. According to the eleventh type of the channel assignment, the left front channel Lf and the right front channel Rf are in the group "1" while the center channel C and the low frequency effect channel LFE are in the group "2". Thus, the channel number in the group "1" is equal to two while the channel number in the group "2" is also equal to two. A bit sequence of "00101" is assigned to a twelfth type of the channel assignment in which the first, second, third, fourth, and fifth channels ACH0, ACH1, ACH2, ACH3, and ACH4 form a left front channel Lf, a right front channel Rf, a center channel C, a low frequency effect channel LFE, and a surround channel S respectively, and the sixth channel ACH5 is unused. According to the twelfth type of the channel assignment, the left front channel Lf and the right front channel Rf are in the group "1" while the center channel C, the low frequency effect channel LFE, and the surround channel S are in the group "2". Thus, the channel number in the group "1" is equal to two while the channel number in the group "2" is equal to three. A bit sequence of "01100" is assigned to a thirteenth type of the channel assignment in which the first, second, third, fourth, fifth, and sixth channels ACH0, ACH1, ACH2, ACH3, ACH4, and ACH5 form a left front channel Lf, a right front channel Rf, a center channel C, a low frequency effect channel LFE, a left surround signal Ls, and a right surround channel Rs respectively. According to the thirteenth type of the channel assignment, the left front channel Lf and the right front channel Rf are in the group "1" while the center channel C, the low frequency effect channel LFE, the left surround signal Ls, and the right surround channel Rs are in the group "2". Thus, the channel number in the group "1" is equal to two while the channel number in the group "2" is equal to four. A bit sequence of "01101" is assigned to a fourteenth type of the channel assignment in which the first, second, third, and fourth channels ACH0, ACH1, ACH2, and ACH3 form a left front channel Lf, a right front channel Rf, a center channel C, and a surround channel S respectively, and the fifth and sixth channels ACH4 and ACH5 are unused. According to the fourteenth type of the channel assignment, the left front channel Lf, the right front channel Rf, and the center channel C are in the group "1" while the surround channel S is in the group "2". Thus, the channel number in the group "1" is equal to three while the channel number in the group "2" is equal to one. A bit sequence of "01110" is assigned to a fifteenth type of the channel assignment in which the first, second, third, fourth, and fifth channels ACH0, ACH1, ACH2, ACH3, and ACH4 form a left front channel Lf, a right front channel Rf, a center channel C, a left surround channel Ls, and a right surround channel Rs respectively, and the sixth channel ACH5 is unused. According to the fifteenth type of the channel assignment, the left front channel Lf, the right front channel Rf, and the center channel C are in the group "1" while the left surround channel Ls and the right surround channel Rs are in the group "2". Thus, the channel number in the group "1" is equal to three while the channel number in the group "2" is equal to two. A bit sequence of "01111" is assigned to a sixteenth type of the channel assignment in which the first, second, third, and fourth channels ACH0, ACH1, ACH2, and ACH3 form a left front channel Lf, a right front channel Rf, a center channel C, and a low frequency effect channel LFE respectively, and the fifth and sixth channels ACH4 and ACH5 are unused. According to the sixteenth type of the channel assignment, the left front channel Lf, the right front channel Rf, and the center channel C are in the group "1" while the low frequency effect channel LFE is in the group "2". Thus, the channel number in the group "1" is equal to three while the channel number in the group "2" is equal to one. A bit sequence of "10000" is assigned to a seventeenth type of the channel assignment in which the first, second, third, fourth, and fifth channels ACH0, ACH1, ACH2, ACH3, and ACH4 form a left front channel Lf, a right front channel Rf, a center channel C, a low frequency effect channel LFE, and a surround channel S respectively, and the sixth channel ACH5 is unused. According to the seventeenth type of the channel assignment, the left front channel Lf, the right front channel Rf, and the center channel C are in the group "1" while the low frequency effect channel LFE and the surround channel S are in the group "2". Thus, the channel number in the group "1" is equal to three while the channel number in the group "2" is equal to two. A bit sequence of "10001" is assigned to an eighteenth type of the channel assignment in which the first, second, third, fourth, fifth, and sixth channels ACH0, ACH1, ACH2, ACH3, ACH4, and ACH5 form a left front channel Lf, a right front channel Rf, a center channel C, a low frequency effect channel LFE, a left surround signal Ls, and a right surround channel Rs respectively. According to the eighteenth type of the channel assignment, the left front channel Lf, the right front channel Rf, and the center channel C are in the group "1" while the low frequency effect channel LFE, the left surround signal Ls, and the right surround channel Rs are in the group "2". Thus, the channel number in the group "1" is equal to three while the channel number in the group "2" is also equal to three. A bit sequence of "10010" is assigned to a nineteenth type of the channel assignment in which the first, second, third, fourth, and fifth channels ACH0, ACH1, ACH2, ACH3, and ACH4 form a left front channel Lf, a right front channel Rf, a left surround channel Ls, a right surround channel Rs, and a low frequency effect channel LFE respectively, and the sixth channel ACH5 is unused. According to the nineteenth type of the channel assignment, the left front channel Lf, the right front channel Rf, the left surround channel Ls, and the right surround channel Rs are in the group "1" while the low frequency effect channel LFE is in the group "2". Thus, the channel number in the group "1" is equal to four while the channel number in the group "2" is equal to one. A bit sequence of "10011" is assigned to a twentieth type of the channel assignment in which the first, second, third, fourth, and fifth channels ACH0, ACH1, ACH2, ACH3, and ACH4 form a left front channel Lf, a right front channel Rf, a left surround channel Ls, a right surround channel Rs, and a center channel C respectively, and the sixth channel ACH5 is unused. According to the twentieth type of the channel assignment, the left front channel Lf, the right front channel Rf, the left surround channel Ls, and the right surround channel Rs are in the group "1" while the center channel C is in the group "2". Thus, the channel number in the group "1" is equal to four while the channel number in the group "2" is equal to one. A bit sequence of "10100" is assigned to a twenty-first type of the channel assignment in which the first, second, third, fourth, fifth, and sixth channels ACH0, ACH1, ACH2, ACH3, ACH4, and ACH5 form a left front channel Lf, a right front channel Rf, a left surround channel Ls, a right surround channel Rs, a center channel C, and a low frequency effect channel LFE respectively. According to the twenty-first type of the channel assignment, the left front channel Lf, the right front channel Rf, the left surround channel Ls, and the right surround channel Rs are in the group "1" while the center channel C and the low frequency effect channel C are in the group "2". Thus, the channel number in the group "1" is equal to four while the channel number in the group "2" is equal to two.

As previously indicated, one of the 128-byte AOTT AOB attribute AOTT-AOB-ATR and the 128-byte AOTT VOB audio stream attribute AOTT-VOB-AST-ATR is used in the audio title set information management table ATSI-MAT of FIG. 73. When the related audio title set does not have an audio only title audio object set AOTT-AOBS, the AOTT VOB audio stream attribute AOTT-VOB-AST-ATR is used.

As shown in FIG. 76, the audio-only-title video-object audio-stream attribute AOTT-VOB-AST-ATR contains a sequence of 16 bytes, that is, 128 bits b127, b126, b125, . . . , b1, b0. A set of the bits b127, b126, b125, b124, b123, b122, b121, and b120 represents an audio encoding mode. A set of the bits b111, b110, b109, and b108 represents a quantization bit number Q. A set of the bits b103, b102, b101, and b100 represents a sampling frequency "fs". A set of the bits b95, b94, and b93 represents a multiple channel type. A set of the bits b92, b91, b90, b89, and b88 represents channel assignment. A set of the bits b87, b86, and b85 represents a decoding audio stream number. A set of the bits b79 and b78 represents information of MPEG audio quantization/dynamic range control (DRC). A set of the bits b75, b74, b73, and b72 represents a compressed audio channel number. The other bits form reserved areas.

The audio encoding mode represented by the bits b127, b126, b125, b124, b123, b122, b121, and b120 in FIG. 76 can be selected from among a linear PCM audio encoding mode, a Dolby digital encoding mode, an MPEG-2 encoding mode without any extension, an MPEG-2 encoding mode with an extension, a DTS encoding mode, and an SDDS encoding mode. Specifically, a bit sequence of "00000000" is assigned to the linear PCM audio encoding mode. A bit sequence of "00000001" is assigned to the Dolby digital encoding mode. A bit sequence of "00000010" is assigned to the MPEG-2 encoding mode without any extension. A bit sequence of "00000011" is assigned to the MPEG-2 encoding mode with an extension. A bit sequence of "00000100" is assigned to the DTS encoding mode. A bit sequence of "00000101" is assigned to the SDDS encoding mode.

Normally, the bits b127, b126, b125, b124, b123, b122, b121, and b120 in FIG. 76 are set to "00000000" representing the linear PCM audio encoding mode.

The quantization bit number Q which is represented by the bits b111, b110, b109, and b108 in FIG. 76 can be changed among 16 bits, 20 bits, and 24 bits. Specifically, a bit sequence of "0000" is assigned to 16 bits. A bit sequence of "0001" is assigned to 20 bits. A bit sequence of "0010" is assigned to 24 bits.

The sampling frequency "fs" which is represented by the bits b103, b102, b101, and b100 in FIG. 76 can be changed among 48 kHz, 96 kHz, 192 kHz, 44.1 kHz, 88.2 kHz, and 176.4 kHz. Specifically, a bit sequence of "0000" is assigned to 48 kHz. A bit sequence of "0001" is assigned to 96 kHz. A bit sequence of "0010" is assigned to 192 kHz. A bit sequence of "1000" is assigned to 44.1 kHz. A bit sequence of "1001" is assigned to 88.2 kHz. A bit sequence of "1010" is assigned to 176.4 kHz.

Normally, the bits b95, b94, and b93 in FIG. 76 are set to "000" representing that the multiple channel type agrees with a type "1".

The channel assignment represented by the bits b92, b91, b90, b89, and b88 in FIG. 76 is similar to that represented by the bits b92, b91, b90, b89, and b88 in FIG. 74, and can be changed among 21 different types shown in FIG. 75.

The decoding audio stream number represented by the bits b87, b86, and b85 in FIG. 76 is set to "0" or "1".

The DRC information represented by the bits b79 and b78 in FIG. 76 indicates either the presence of DRC data in an MPEG audio stream or the absence of DRC data from an MPEG audio stream. Specifically, a bit sequence of "00" is assigned to the absence of DRC data from the MPEG audio stream. A bit sequence of "01" is assigned to the presence of DRC data in the MPEG audio stream.

The compressed audio channel number represented by the bits b75, b74, b73, and b72 in FIG. 76 can be changed among "1", "2", "3", "4", "5", "6", "7", and "8". Specifically, a bit sequence "0000" is assigned to a channel number of "1". A bit sequence "0001" is assigned to a channel number of "2". A bit sequence "0010" is assigned to a channel number of "3". A bit sequence "0011" is assigned to a channel number of "4". A bit sequence "0100" is assigned to a channel number of "5". A bit sequence "0101" is assigned to a channel number of "6". A bit sequence "0110" is assigned to a channel number of "7". A bit sequence "0111" is assigned to a channel number of "8".

FIG. 77 shows the details of the 288-byte area for the multiple channel audio data down mix coefficients ATS-DM-COEFT#0-#15 in FIG. 73. The coefficients ATS-DM-COEFT#0-#15 are designed for down mix of multiple channel audio data into two channels. As shown in FIG. 77, the 288-byte area is divided into sixteen 18-byte sub areas. The first sub area is assigned to the coefficient ATS-DM-COEFT#0 for a table number of "0". The second sub area is assigned to the coefficient ATS-DM-COEFT#1 for a table number of "1". The third sub area is assigned to the coefficient ATS-DM-COEFT#2 for a table number of "2". The fourth sub area is assigned to the coefficient ATS-DM-COEFT#3 for a table number of "3". The fifth sub area is assigned to the coefficient ATS-DM-COEFT#4 for a table number of "4". The sixth sub area is assigned to the coefficient ATS-DM-COEFT#5 for a table number of "5". The seventh sub area is assigned to the coefficient ATS-DM-COEFT#6 for a table number of "6". The eighth sub area is assigned to the coefficient ATS-DM-COEFT#7 for a table number of "7". The ninth sub area is assigned to the coefficient ATS-DM-COEFT#8 for a table number of "8". The tenth sub area is assigned to the coefficient ATS-DM-COEFT#9 for a table number of "9". The eleventh sub area is assigned to the coefficient ATS-DM-COEFT#10 for a table number of "10". The twelfth sub area is assigned to the coefficient ATS-DM-COEFT#11 for a table number of "11". The thirteenth sub area is assigned to the coefficient ATS-DM-COEFT#12 for a table number of "12". The fourteenth sub area is assigned to the coefficient ATS-DM-COEFT#13 for a table number of "13". The fifteenth sub area is assigned to the coefficient ATS-DM-COEFT#14 for a table number of "14". The sixteenth sub area is assigned to the coefficient ATS-DM-COEFT#15 for a table number of "15".

Figures 78, 79:
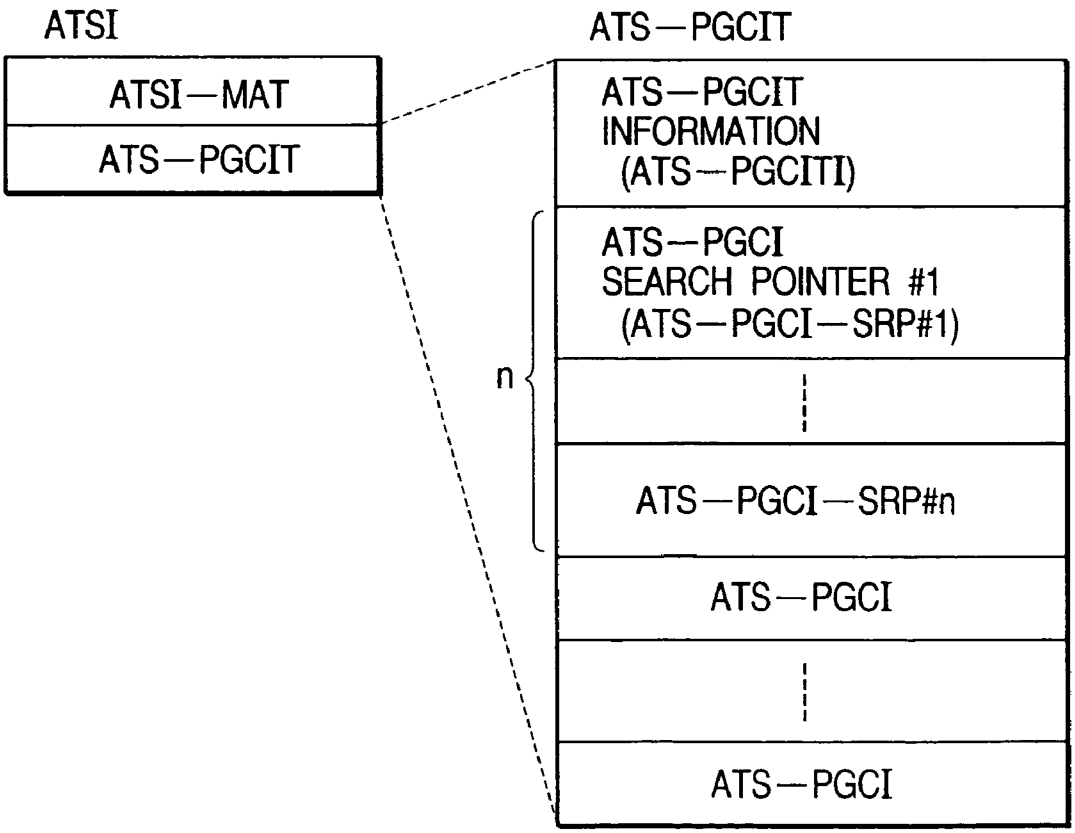
FIG. 78 is a diagram of the structure of an ATS-SPCT-ATR area.
FIG. 79 is a diagram of the structure of an ATS-PGCIT area.

FIG. 78 shows the details of the 2-byte AOTT AOBS still-picture data attribute ATS-SPCT-ATR in FIG. 73. As shown in FIG. 78, the 2-byte AOTT AOBS still-picture data attribute ATS-SPCT-ATR has a sequence of bits b15, b14, b13, . . . , b1, b0. A set of the bits b15 and b14 represents a video compression mode. A set of the bits b13 and b12 represents a television system. A set of the bits b11 and b10 represents an aspect ratio. A set of the bits b9 and b8 represents a display mode. A set of the bits b7 and b6 is reserved. A set of the bits b5, b4, and b3 represents a source picture resolution. A set of the bits b2, b1, and b0 is reserved.

The video compression mode represented by the bits b15 and b14 in FIG. 78 can be changed between an MPEG-1 type and an MPEG-2 type. Specifically, a bit sequence of "00" is assigned to the MPEG-1 type. A bit sequence of "01" is assigned to the MPEG-2 type.

The television system represented by the bits b13 and b12 in FIG. 78 can be changed between a 525/60 type and a 625/60 type. Specifically, a bit sequence of "00" is assigned to the 525/60 type. A bit sequence of "01" is assigned to the 625/60 type.

The aspect ratio represented by the bits b11 and b10 in FIG. 78 can be changed between a 4:3 type and a 16:9 type.

Specifically, a bit sequence of "00" is assigned to the 4:3 type. A bit sequence of "11" is assigned to the 16:9 type.

The display mode represented by the bits b9 and b8 in FIG. 78 can be changed between a first type allowing only a letter box and a second type corresponding to no mention. Specifically, a bit sequence of "10" is assigned to the first type. A bit sequence of "11" is assigned to the second type.

The source picture resolution represented by the bits b5, b4, and b3 in FIG. 78 can be changed between a 720-by-480 type and a 720-by-576 type which correspond to the 525/60 television system and the 625/60 television system respectively. Specifically, a bit sequence of "000" is assigned to the 720-by-480 type. A bit sequence of "001" is assigned to the 720-by-576 type.

FIG. 79 shows the details of the audio title set program chain information table ATS-PGCIT in FIG. 56. As shown in FIG. 79, the audio title set program chain information table ATS-PGCIT has a sequence of audio title set PGCI table information ATS-PGCITI, audio title set PGCI search pointers ATS-PGCI-SRP#1-#n, and audio title set program chain information pieces ATS-PGCI.

As shown in FIG. 80, the audio title set PGCI table information ATS-PGCIT has 8 bytes. Specifically, the audio title set PGCI table information ATS-PGCIT has a sequence of a 2-byte area representing the audio title set PGCI search pointer (ATS-PGCI-SRP) number, a 2-byte reserved area, and a 4-byte area representing an ATS-PGCIT end address.

As shown in FIG. 81, each of the audio title set PGCI search pointers ATS-PGCI-SRP#1-#n has 8 bytes. Specifically, each of the audio title set PGCI search pointers ATS-PGCI-SRP#1-#n has a sequence of a 4-byte area representing an ATS-PGC category ATS-PGC-CAT, and a 4-byte area representing ATS-PGCI end address.

FIG. 82 shows the details of the ATS-PGC category ATS-PGC-CAT in FIG. 81. As shown in FIG. 82, the ATS-PGC category ATS-PGC-CAT has a sequence of 32 bits b31, b30, b29, . . . , b1, b0. The bit b31 represents an entry type. A set of the bits b30, b29, b28, b27, b26, b25, and b24 represents an ATS audio title number ATS-TTN. A set of the bits b23 and b22 represents a block mode. A set of the bits b21 and b20 represents a block type. A set of the bits b19, b18, b17, and b16 represents an audio channel number. A set of the bits b15, b14, b13, b12, b11, b10, b9, and b8 represents an audio encoding mode. A set of the bits b7, b6, b5, b4, b3, b2, b1, and b0 is reserved.

The entry type represented by the bit b31 in FIG. 82 can be changed between a first state not corresponding to an entry PGC and a second type corresponding to an entry PGC. Specifically, a bit of "0" is assigned to the first state. A bit of "1" is assigned to the second state.

The audio title number ATS-TTN represented by the bits b30, b29, b28, b27, b26, b25, and b24 in FIG. 82 can be changed in the range of "1" to "99".

The block mode represented by the bits b23 and b22 in FIG. 82 can be changed among a first type not corresponding to an ATS-PGC in an ATS-PGC block, a second type corresponding to a first ATS-PGC in an ATS-PGC block, and a third type corresponding to a final ATS-PGC in an ATS-PGC block. Specifically, a bit sequence of "00" is assigned to the first type. A bit sequence of "01" is assigned to the second type. A bit sequence of "11" is assigned to the third type.

The block type represented by the bits b21 and b20 FIG. 82 can be changed among a first state not corresponding to a part of the related block, a second state corresponding to a differential block of an audio encoding mode only, a third state corresponding to a differential block of an audio channel only, and a fourth state corresponding to a differential block of both an audio encoding mode and an audio channel. Specifically, a bit sequence of "00" is assigned to the first state. A bit sequence of "01" is assigned to the second state. A bit sequence of "10" is assigned to the third state. A bit sequence of "11" is assigned to the fourth state.

The audio channel number represented by the bits b19, b18, b17, and b16 in FIG. 82 can be changed between a first type indicating two channels or less and a second type indicating three or more channels.

Figures 83, 84:
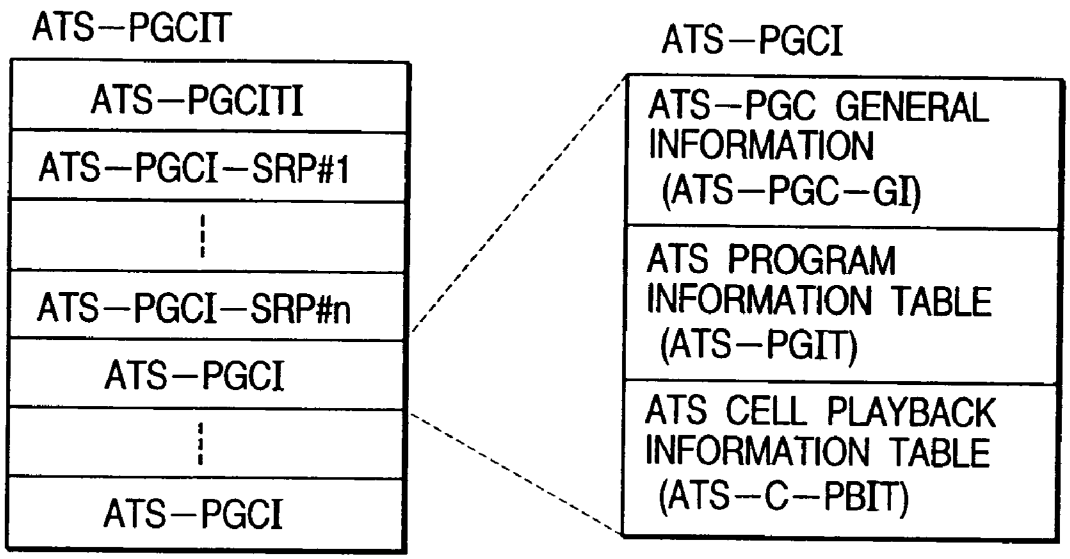
FIG. 83 is a diagram of the structure of an ATS-PGCI area.
FIG. 84 is a diagram of the structure of an ATS-PGC-GI area.

FIG. 83 shows the details of each of the audio title set program chain information pieces ATS-PGCI in FIG. 79. As shown in FIG. 83, each of the audio title set program chain information pieces ATS-PGCI has a sequence of ATS-PGC general information ATS-PGC-GI, an ATS program information table ATS-PGIT, and an ATS cell playback information table ATS-C-PBIT.

As shown in FIG. 84, the ATS-PGC general information ATS-PGC-GI has 16 bytes. The ATS-PGC general information ATS-PGC-GI has a sequence of a 4-byte area representing ATS-PGC contents ATS-PGC-CNT, a 4-byte area representing an ATT-PGC playback time ATS-PGC-PB-TM, a 2-byte reserved area, a 2-byte area representing an ATS-PGIT start address, a 2-byte area representing an ATS-C-PBIT start address, and a 2-byte reserved area.

Figure 85:
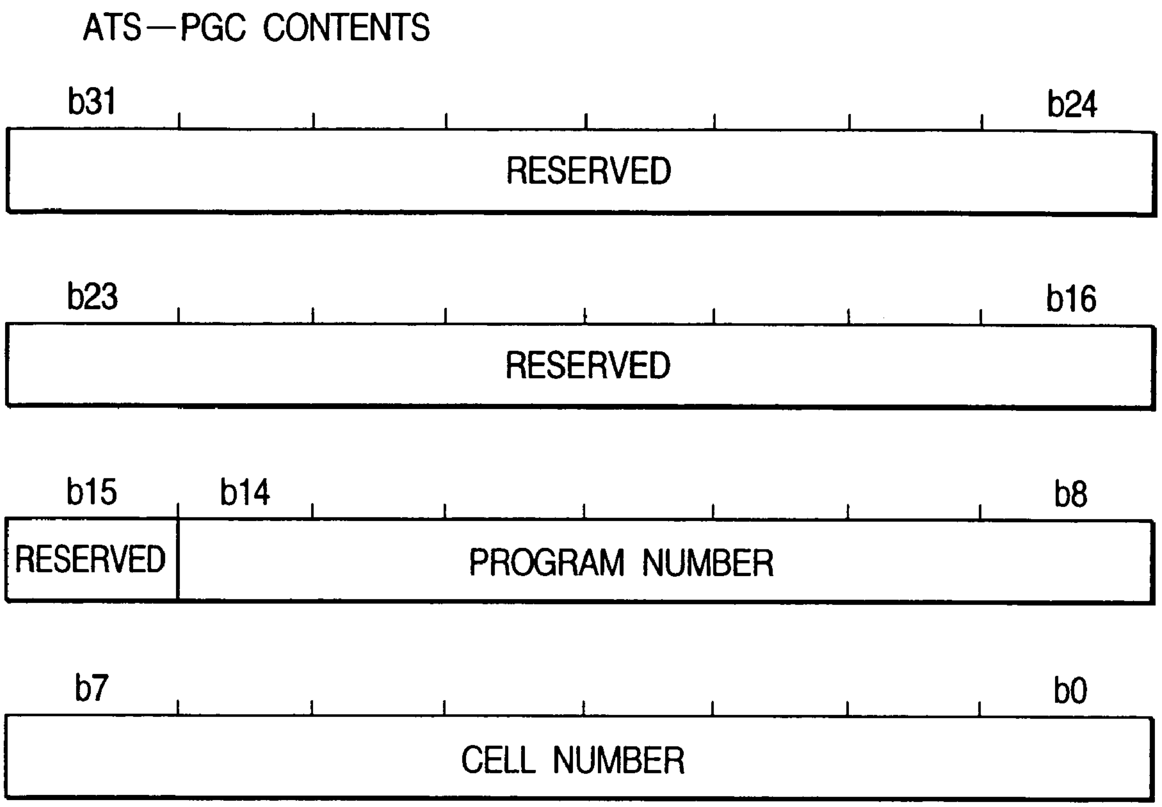
FIG. 85 is a diagram of the structure of ATS-PGC contents.

FIG. 85 shows the details of the ATS-PGC contents ATS-PGC-CNT in FIG. 84. As shown in FIG. 85, the ATS-PGC contents ATS-PGC-CNT has a sequence of 32 bits b31, b30, b29, . . . , b1, b0. A set of the bits b31, b30, b29, . . . , b16, and b15 is reserved. A set of the bits b14, b13, b12, b11, b10, b9, and b8 represents a program number (a tune number or a movement number) which can be changed in the range of "1" to "99". A set of the bits b7, b6, b5, b4, b3, b2, b1, and b0 represents a cell number which can be changed in the range of "1" to "255".

Figure 86:
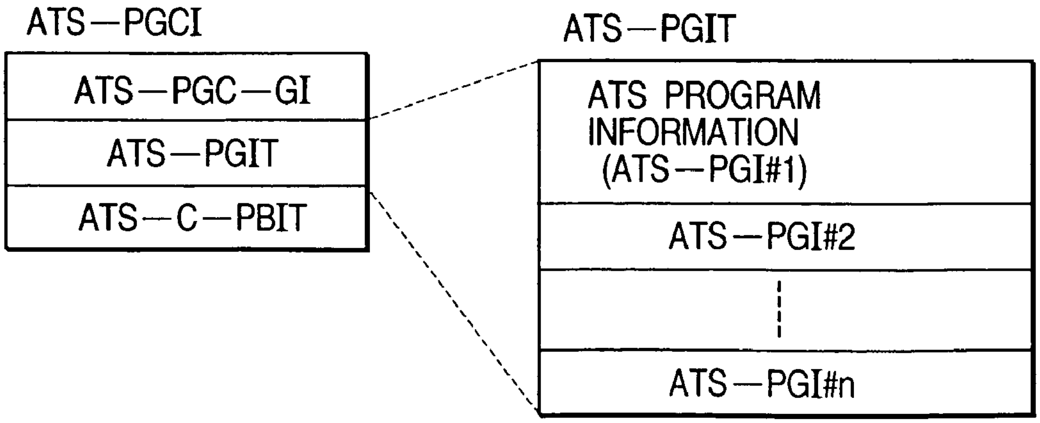
FIG. 86 is a diagram of the structure of an ATS-PGIT area.

FIG. 86 shows the details of the ATS program information table ATS-PGIT in FIG. 83. As shown in FIG. 86, the ATS program information table ATS-PGIT has a sequence of ATS program information pieces ATS-PGI#1-#n.

As shown in FIG. 87, each of the ATS program information pieces ATS-PGI#1-#n has 20 bytes. Specifically, each of the ATS program information pieces ATS-PGI#1-#n has a sequence of a 4-byte area representing ATS-PG contents ATS-PG-CNT, a 1-byte area representing an ATS-PG entry cell number, a 1-byte reserved area, a 4-byte area representing a first ATS-PG audio cell start presentation time FAC-S-PTM, a 4-byte area representing an ATS-PG playback time, a 4-byte area representing an ATS-PG pause time, a 1-byte area assigned to copyright management information CMI, and a 1-byte reserved area.

FIG. 88 shows the details of the ATS-PG contents ATS-PG-CNT in FIG. 87. As shown in FIG. 88, the ATS-PG contents ATS-PG-CNT has a sequence of 32 bits b31, b30, b29, . . . , b1, b0. The bit b31 represents the relation R/A between the present PG and the preceding PG. The bit b30 represents an STC discontinuity flag STC-F. A set of the bits b29, b28, and b27 represents an attribute number ATRN. A set of the bits b26, b25, and b24 represents bit shift data for the channel group "2". A set of the bits b23 and b22 is reserved. The bit b21 represents a down mix mode D-M. The bit represents the effectiveness of down mix coefficients. A set of the bits b19, b18, and b17 represents a down mix coefficient table number DM-COEFTN. The bits b15, b14, b13, . . . , b1, and b0 represent RTI flags F15, F14, F13, . . . , F1, and F0 respectively.

Figures 89, 90, 91:
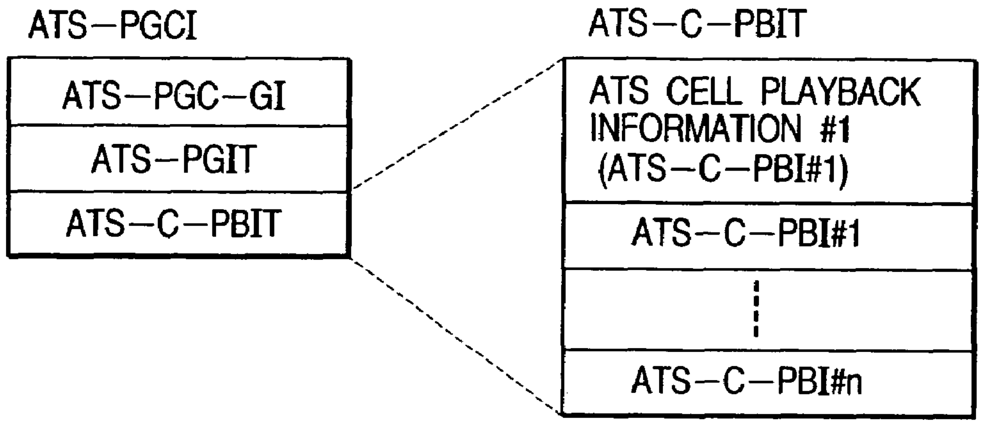
FIG. 89 is a diagram of the structure of an ATS-C-PBIT area.
FIG. 90 is a diagram of the structure of an ATS-C-PBI area.
FIG. 91 is a diagram of the structure of an ATS-C-TY area.

FIG. 89 shows the details of the ATS cell playback information table ATS-C-PBIT in FIG. 83. As shown in FIG. 89, the ATS cell playback information table ATS-C-PBIT has a sequence of ATS cell playback information pieces ATS-C-PBI#1-#n.

As shown in FIG. 90, each of the ATS cell playback information pieces ATS-C-PBI#1-#n has 12 bytes. Specifically, each of the ATS cell playback information pieces ATS-C-PBI#1-#n has a sequence of a 1-byte area representing an ATS-C index number, a 1-byte area representing an ATS-C type ATS-C-TY, a 2-byte reserved area, a 4-byte area representing an ATS-C start address, and a 4-byte area representing an ATS-C end address.

FIG. 91 shows the details of the ATS-C type ATS-C-TY in FIG. 90. As shown in FIG. 91, the ATS-C type ATS-C-TY has a sequence of eight bits b7, b6, b5, b4, b3, b2, b1, and b0. A set of the bits b7 and b6 represents an ATS cell composition ATS-C-COMP. A set of the bits b5 and b4 is reserved. A set of the bits b3, b2, b1, and b0 represents an ATS cell usage ATS-C-Usage.

The ATS cell composition ATS-C-COMP represented by the bits b7 and b6 in FIG. 91 can be changed among a first type corresponding to an audio cell composed of audio data only, a second type corresponding to an audio cell composed of both audio data and real-time information, a third type corresponding to a silence cell composed of only audio data for silence, and a fourth type corresponding to a picture cell composed of still-picture data only. A bit sequence of "00" is assigned to the first type. A bit sequence of "01" is assigned to the second type. A bit sequence of "10" is assigned to the third type. A bit sequence of "11" is assigned to the fourth type.

The ATS cell usage ATS-C-Usage represented by the bits b3, b2, b1, and b0 in FIG. 91 can be changed between a first type corresponding to no mention and a second type corresponding to a spot light part. A bit sequence of "0000" is assigned to the first type. A bit sequence of "0001" is assigned to the second type.

Figure 92:
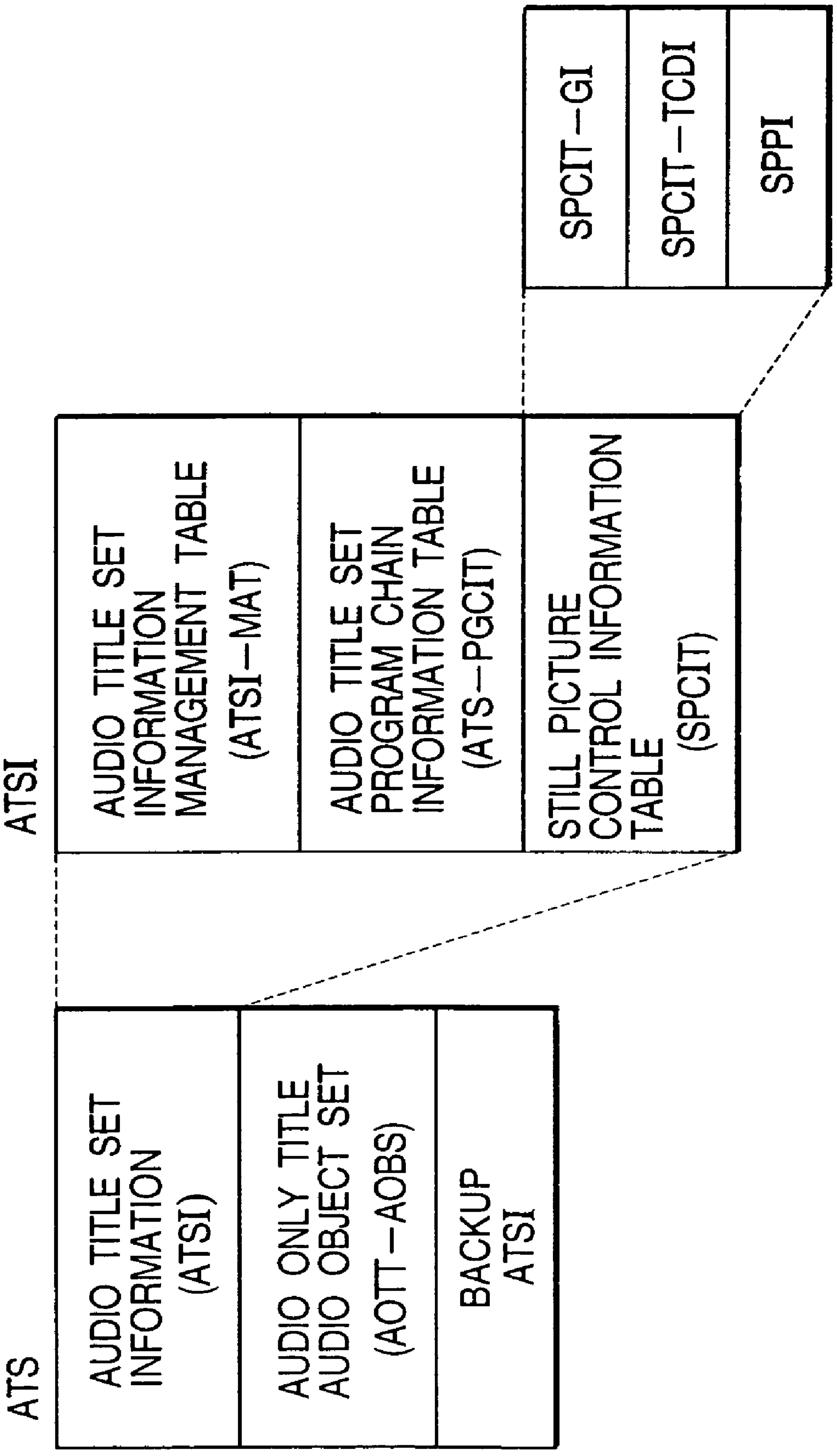
FIG. 92 is a diagram of the structure of an ATSI area.

The audio title set information ATSI in FIG. 56 may be replaced by audio title set information ATSI in FIG. 92. The audio title set information ATSI in FIG. 92 has a sequence of an audio title set information management table ATSI-MAT, an audio title set program chain information table ATS-PGCIT, and a still-picture control information table SPCIT. The still-picture control information table SPCIT has a sequence of SPCIT general information SPCIT-GI, SPCIT time control data information SPCIT-TCDI, and still-picture page control command information SPPI.

Twentieth Embodiment

Figure 93:
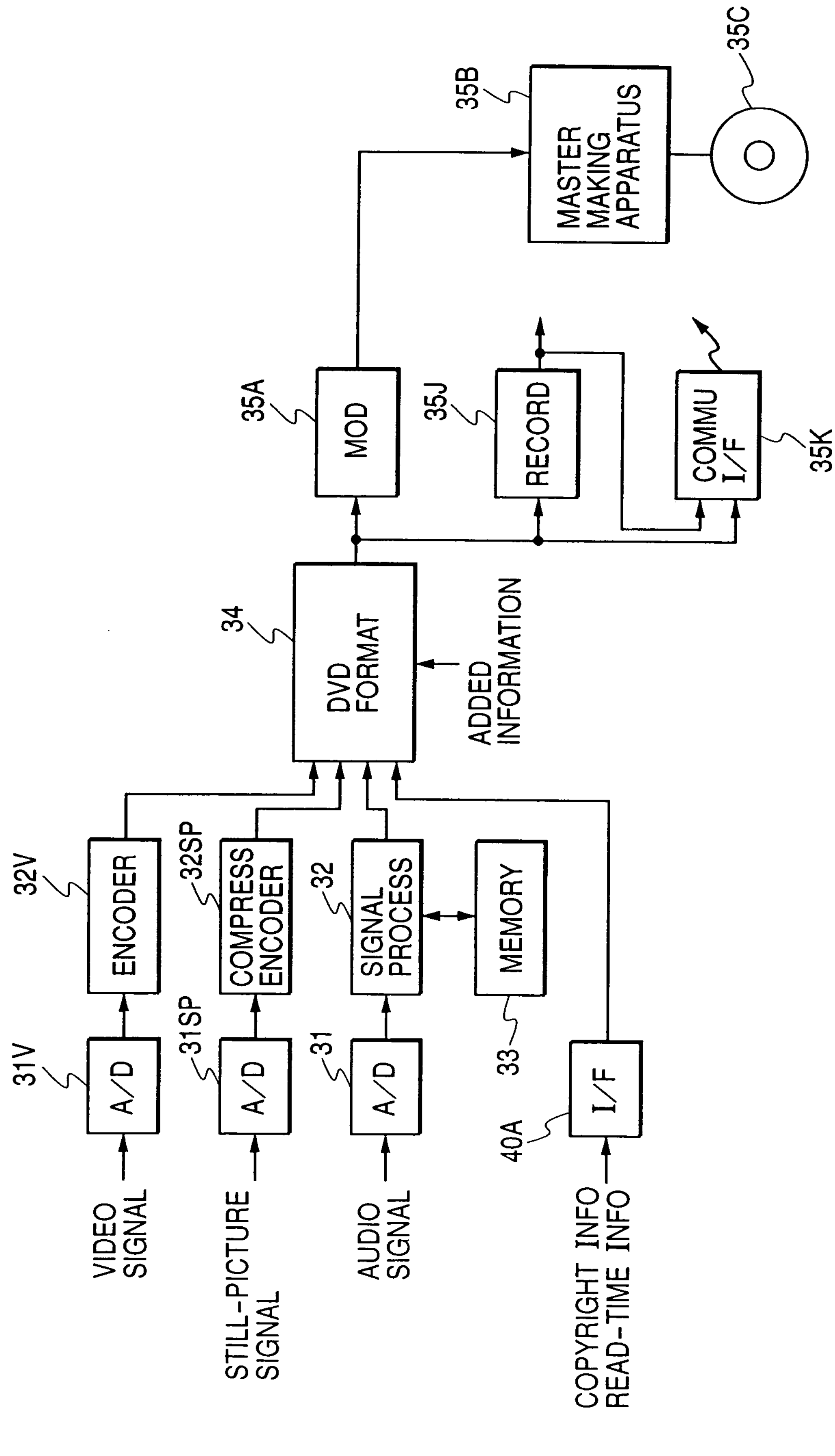
FIG. 93 is a block diagram of an audio-signal encoding apparatus according to a twentieth embodiment of this invention.

FIG. 93 shows an audio-signal encoding apparatus according to a twentieth embodiment of this invention. The apparatus of FIG. 93 includes analog-to-digital (A/D) converters 31, 31V, and 31SP, a signal processing circuit 32, a video encoder 32V, a compressive encoder 32SP, a DVD formatting section 34, and an interface 40A.

An analog video signal is applied to the A/D converter 31V. The A/D converter 31V is followed by the video encoder 32V. The video encoder 32V is followed by the DVD formatting section 34.

An analog audio signal is applied to the A/D converter 31. In general, the analog audio signal has multiple channels including, for example, front and rear channels. The analog audio signal may be of the monaural type. The A/D converter 31 is followed by the signal processing circuit 32. The signal processing circuit 32 is followed by the DVD formatting section 34.

An analog still-picture signal is applied to the A/D converter 31SP. The A/D converter 31SP is followed by the compressive encoder 32SP. The compressive encoder 32SP is followed by the DVD formatting section 34.

Copyright information and real-time text information (real-time information) are applied to the interface 40A. The interface 40A is followed by the DVD formatting section 34.

The DVD formatting section 34 is successively followed by a modulation circuit 35A and a master making apparatus 35B.

The A/D converter 31 samples the analog audio signal at a given sampling frequency "fs" (for example, 192 kHz), and changes every sample of the analog audio signal into a corresponding digital sample. Thus, the A/D converter 31 changes the analog audio signal into a corresponding digital audio signal (for example, a PCM audio signal) with a given quantization bit number (for example, 24 bits). In other words, the A/D converter 31 quantizes the analog audio signal into the corresponding digital audio signal. The quantization implemented by the A/D converter 31 may vary from channel to channel. For example, the A/D converter 31 quantizes front-channel components of the analog audio signal at a first predetermined sampling frequency and a first predetermined quantization bit number. The A/D converter 31 quantizes rear-channel components of the analog audio signal at a second predetermined sampling frequency and a second predetermined bit number which are equal to or different from the first predetermined sampling frequency and the first predetermined quantization bit number respectively. The A/D converter 31 outputs the digital audio signal to the signal processing circuit 32.

Operation of the signal processing circuit 32 can be changed between first and second modes which correspond to the absence and the presence of thinning (or decimation) respectively.

During operation of the signal processing circuit 32 in the first mode (the absence of thinning or decimation), the digital audio signal is transmitted from the A/D converter 31 to the DVD formatting section 34 without being processed.

During operation of the signal processing circuit 32 in the second mode (the presence of thinning or decimation), the digital audio signal is compressed by the signal processing circuit 32. The signal compression implemented by the signal processing circuit 32 is based on a decimating process or a bit shifting process. The compression-resultant digital audio signal is fed from the signal processing circuit 32 to the DVD formatting section 34. Preferably, audio data of channels in a group "2" is compressed by the signal processing circuit 32.

The A/D converter 31V changes the analog video signal into a corresponding digital video signal for a menu picture which corresponds to an audio manager menu AMGM. The A/D converter 31V outputs the digital video signal to the video encoder 32V. The video encoder 32V changes the digital video signal into an MPEG-format video signal. The video encoder 32V outputs the MPEG-format video signal to the DVD formatting section 34.

The A/D converter 31SP changes the analog still-picture signal into a corresponding digital still-picture signal. The A/D converter 31SP outputs the digital still-picture signal to the compressive encoder 32SP. The compressive encoder 32SP changes the digital still-picture signal into an MPEG-format still-picture signal. The compressive encoder 32SP outputs the MPEG-format still-picture signal to the DVD formatting section 34.

The copyright information and the real-time text information are transmitted to the DVD formatting section 34 via the interface 40A.

The DVD formatting section 34 receives character information, disc identifier information, and control data from suitable devices (not shown). The control data represents display time information, sampling-frequency information, quantization-bit-number information, thinning information (decimating information), and other information to be added. The DVD formatting section 34 packs the digital audio signal, the MPEG-format video signal, the MPEG-format still-picture signal, the copyright information, the real-time text information, the character information, the disc identifier information, and the control data into a composite signal of the DVD-Audio format in the embodiment of FIGS. 56-92.

The DVD formatting section 34 outputs the composite signal of the DVD-Audio format to the modulation circuit 35A. The modulation circuit 35A subjects the composite signal of the DVD-Audio format to given modulation (for example, EFM modulation) suited to a DVD-Audio. The modulation circuit 35A outputs the modulation-resultant signal to the master making apparatus 35B. The apparatus 35B makes a master disc 35C in response to the output signal of the modulation circuit 35A. The maser disc 35C stores the output signal of the modulation circuit 35A. DVD-Audios are made by a DVD making apparatus (not shown) on the basis of the master disc 35C.

A recording and reproducing apparatus 35J may follow the DVD formatting section 34. The recording and reproducing apparatus 35J receives the composite signal of the DVD-Audio format from the DVD formatting section 34. The recording and reproducing apparatus 35J records the composite signal of the DVD-Audio format on a suitable recording medium 35M. The recording and reproducing apparatus 35J reproduces the composite signal of the DVD-Audio format from the recording medium 35M. The recording and reproducing apparatus 35J outputs the reproduced composite signal of the DVD-Audio format.

A communication interface 35K may be connected to the DVD formatting section 34 and the recording and reproducing apparatus 35J. The communication interface 35K receives the composite signal of the DVD-Audio format from the DVD formatting section 34 or the recording and reproducing apparatus 35J. The communication interface 35K transmits the composite signal of the DVD-Audio format to a communication line (including a radio communication line).

Twenty-First Embodiment

Figure 94:
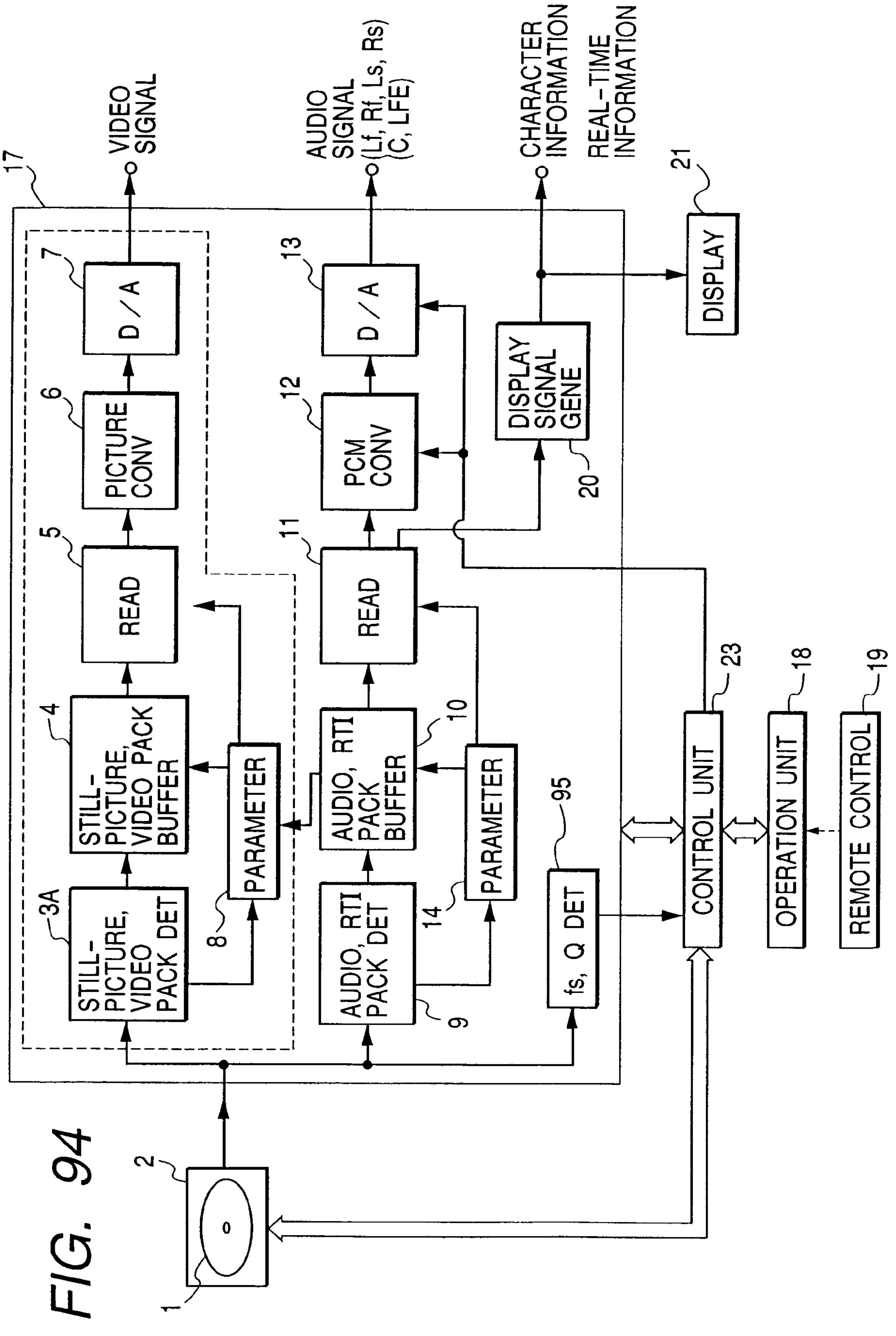
FIG. 94 is a block diagram of a DVD-Audio player including an audio-signal decoding apparatus according to a twenty-first embodiment of this invention.

FIG. 94 shows a DVD-Audio player including an audio-signal decoding apparatus according to a twenty-first embodiment of this invention. The player in FIG. 94 is designed for a DVD-Audio in the embodiment of FIGS. 56-92.

The player in FIG. 94 operates on a DVD-Audio 1. The player in FIG. 94 includes an operation unit 18 and a remote control unit 19. The remote control unit 19 can communicate with the operation unit 18 by wireless. The operation unit 18 is connected to a control unit 23. The control unit 23 includes a CPU. The control unit 23 is connected to a drive unit 2 and a reproduced signal processing unit 17. The drive unit 2 is connected to the reproduced signal processing unit 17.

The CPU 23 operates in accordance with a control program stored in an internal ROM. When the user actuates the operation unit 18 or the remote control unit 19 to request tune selection, playback, fast feed, or stop, the CPU 23 controls the drive unit 2 and the reproduced signal processing unit 17 to implement the requested operation mode.

During playback, the drive unit 2 reads out a signal from the DVD-Audio 1. The drive unit 2 includes a demodulator which subjects the readout signal to given demodulation (for example, EFM demodulation). The drive unit 2 outputs the demodulation-resultant signal to the reproduced signal processing unit 17 as a reproduced signal.

The reproduced signal processing circuit 17 includes a video and still-picture pack detector 3 which receives the reproduced signal from the drive unit 2. The video and still-picture pack detector 3 detects video packs V and still-picture packs SPCT in the reproduced signal. The video and still-picture pack detector 3 generates control parameters in response to the detected video packs V and the detected still-picture packs SPCT. The video and still-picture pack detector 3 sets the control parameters in a parameter unit (a parameter memory) 8. The video and still-picture pack detector 3 sequentially writes the video packs V and the still-picture packs SPCT into a video and still-picture pack buffer 4.

The reproduced signal processing circuit 17 includes a reading unit 5 connected to the video and still-picture pack buffer 4. The reading unit 5 reads out user data and still-picture data from the video packs V and the still-picture packs SPCT in the video and still-picture pack buffer 4 in an order determined by SCR information (see FIG. 14) in each of the video packs V and the still-picture packs SPCT. The reading unit 5 outputs a stream of the user data and the still-picture data to a picture converter 6. The picture converter 6 changes the user and still-picture data stream into a corresponding digital video signal. The picture converter 6 outputs the digital video signal to a digital-to-analog (D/A) converter 7. The D/A converter 7 changes the digital video signal into a corresponding analog video signal. The D/A converter 7 outputs the analog video signal to an external device (not shown).

The reproduced signal processing circuit 17 includes an audio and RTI pack detector 9 which receives the reproduced signal from the drive unit 2. The audio and RTI pack detector 9 detects audio packs A and real-time information packs RTI in the reproduced signal. The audio and RTI pack detector 9 generates control parameters in response to the detected audio packs A and the detected real-time information packs RTI. The audio and RTI pack detector 9 sets the control parameters in a parameter unit (a parameter memory) 14. The audio and RTI pack detector 9 sequentially writes the audio packs A and the real-time information packs RTI into an audio and RTI pack buffer 10.

The reproduced signal processing circuit 17 includes a reading unit 11 connected to the audio pack buffer 10. The reading unit 11 reads out user data (audio data) from the audio packs A in the audio and RTI pack buffer 10 in an order determined by SCR information (see FIG. 14) in each of the audio packs A. The reading unit 11 outputs a stream of the user data (the audio data) to a PCM converter 12. The PCM converter 12 changes the user data stream (the audio data stream) into a corresponding digital audio signal by a PCM decoding process. The PCM converter 12 outputs the digital audio signal to a digital-to-analog (D/A) converter 13. The D/A converter 13 changes the digital audio signal into a corresponding analog audio signal. The analog audio signal has, for example, a left front channel Lf, a right front channel Rf, a left surround channel Ls, a right surround channel Rs, a center channel C, and a low frequency effect channel LFE. The D/A converter 13 outputs the analog audio signal to an external device (not shown).

In addition, the reading unit 11 reads out real-time information (audio character display information or ACD information) from the real-time information packs RTI in the audio and RTI pack buffer 10 in an order determined by ISCR information in each of the real-time information packs RTI. The reading unit 11 outputs the real-time information to a display signal generator 20. The display signal generator 20 converts the real-time information into a corresponding display signal. The display signal generator 20 outputs the display signal to a display device 21. The display device 21 indicates the display signal. The display signal generator 20 may output the display signal to an external device (not shown).

The reproduced signal processing unit 17 includes a detector 95 which receives the reproduced signal from the drive unit 2. The detector 95 extracts information of sampling frequencies “fs” (fs1 and fs2) and information of quantization bit numbers Q (Q1 and Q2) from the reproduced signal. The detector 95 feeds the information of the sampling frequencies “fs” (fs1 and fs2) and the information of the quantization bit numbers Q (Q1 and Q2) to the CPU 23. The CPU 23 controls the PCM converter 12 and the D/A converter 13 in response to the information of the sampling frequencies “fs” (fs1 and fs2) and the information of the quantization bit numbers Q (Q1 and Q2). Accordingly, conditions of the inverse quantization (the signal decoding) implemented by the PCM converter 12 and the D/A converter 13 depend on the information of the sampling frequencies “fs” (fs1 and fs2) and the information of the quantization bit numbers Q (Q1 and Q2). Thus, the inverse quantization can be on a channel by channel basis or a channel-group by channel-group basis.

Twenty-Second Embodiment

Figure 95:
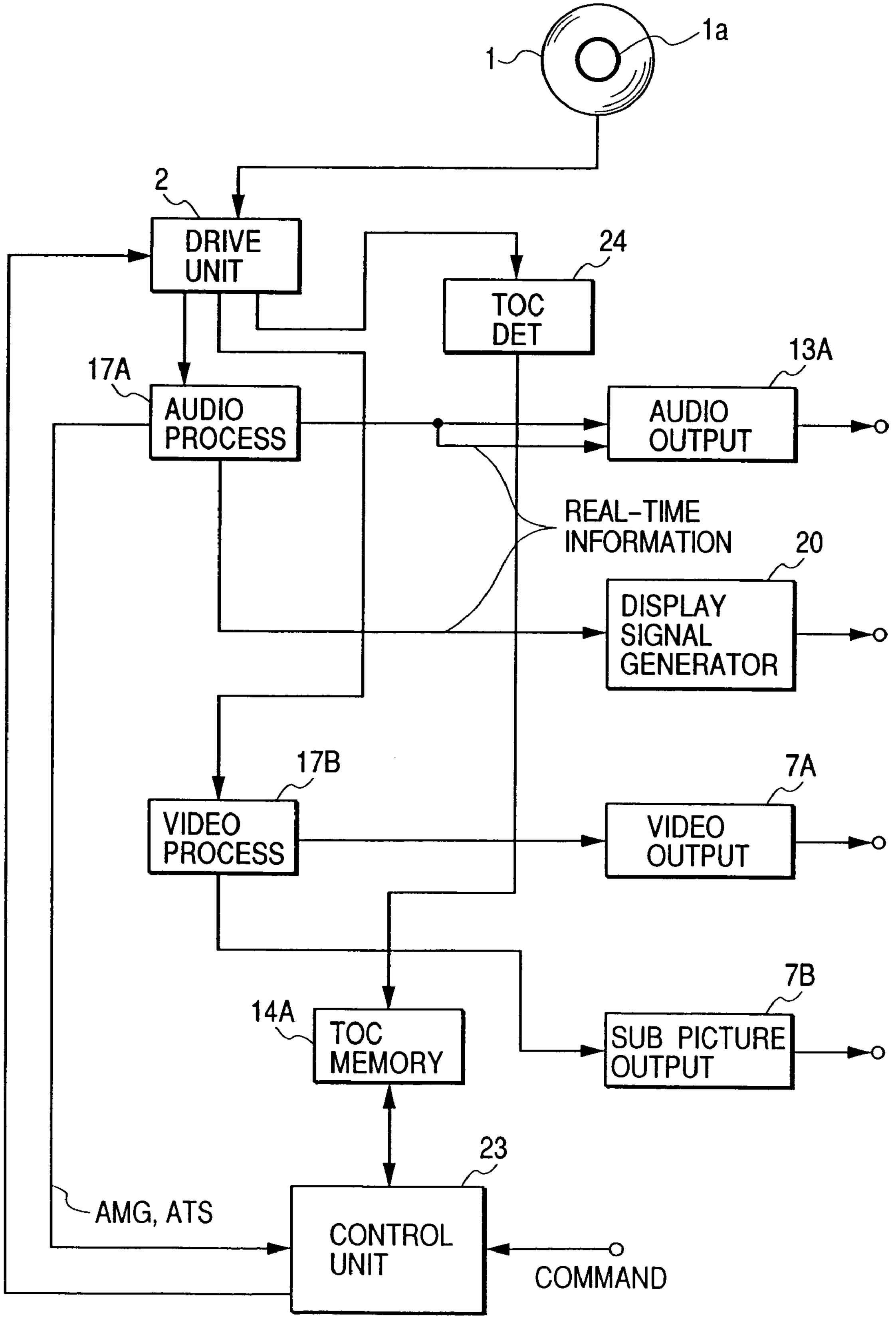
FIG. 95 is an operation flow diagram of a DVD-Audio player including an audio-signal decoding apparatus according to a twenty-second embodiment of this invention.

FIG. 95 shows a DVD-Audio player including an audio-signal decoding apparatus according to a twenty-second embodiment of this invention. The player in FIG. 95 is basically similar to the player in FIG. 94.

The player in FIG. 95 operates on a DVD-Audio 1 which has a TOC area 1*a* loaded with TOC information. The TOC area 1*a* may be included in the lead-in area of the DVD-Audio 1. The player in FIG. 95 includes a control unit 23 connected to an operation unit (not shown). The control unit 23 includes a CPU. A remote control unit (not shown) can communicate with the operation unit by wireless. The control unit 23 is connected to a drive unit 2.

The drive unit 2 is connected to a TOC detector 24, an audio processing block 17A, and a video processing block 17B. The TOC detector 24 is connected to a memory 14A. The memory 14A is connected to the control unit 23. The audio processing block 17A is connected to the control unit 23. The audio processing block 17A is connected to an audio output block 13A and a display signal generator 20. The video processing block 17B is connected to a video output block 7A and a sub picture output block 7B.

When the DVD-Audio 1 is set in position within the player of FIG. 95, the drive unit 2 reads out a signal from the TOC area 1*a* of the DVD-Audio 1. The drive unit 2 outputs the readout signal to the TOC detector 24. The TOC detector 24 detects TOC information in the readout signal. The TOC detector 24 stores the detected TOC information into the memory 14A.

When the user actuates the operation unit or the remote control unit to select a desired tune, the control unit 23 refers to the TOC information in the memory 14A and controls the drive unit 2 in response to the TOC information to start playback of the desired tune from its head.

During playback, the drive unit 2 reads out a signal from the DVD-Audio 1. The drive unit 2 outputs the readout signal to the audio processing block 17A and the video processing block 17B as a reproduced signal. The audio processing block 17A separates audio data from the reproduced signal. The audio processing block 17A feeds the audio data to the audio output device 13A. The audio output device 13A converts the audio data into a corresponding audio signal. The audio output device 13A feeds the audio signal to an external device (not shown). In addition, the audio processing block 17A separates real-time information (audio character display information) from the reproduced signal. The audio processing block 17A feeds the real-time information to the display signal generator 20. The audio processing block 17A may feed the real-time information to the audio output block 13A. The display signal generator 20 converts the real-time information into a corresponding display signal. The display signal generator 20 feeds the display signal to an external device (not shown). Furthermore, the audio processing block 17A separates an audio manager AMG and audio title sets ATS from the reproduced signal. The audio processing block 17A feeds the audio manager AMG and the audio title sets ATS to the control unit 23.

During playback, the video processing block 17B separates video data and still-picture data from the reproduced signal. The video processing block 17B feeds the video data and the still-picture data to the video output block 7A. The video output block 7A converts the video data and the still-picture data into a corresponding video signal. The video output device 7A feeds the video signal to an external device (not shown). In addition, the video processing block 17B separates sub picture information from the reproduced signal. The video processing block 17B feeds the sub picture information to the sub picture output block 7B. The sub picture output block 7B converts the sub picture information into a corresponding sub picture signal. The sub picture output block 7B feeds the sub picture signal to an external device (not shown).

The operation of the player in FIG. 95 will be further explained below. During playback, the DVD-Audio 1 is accessed while data is read out therefrom. The readout data is separated into a video signal, a still-picture signal, an audio signal, a copyright information signal, a real-time text information signal, a character information signal, and a disc identifier information signal. The video signal is decoded into a decoding-resultant video signal. The still-picture signal is decoded into a decoding-resultant still picture signal. The audio signal is decoded into a decoding-resultant audio signal. The copyright information signal is decoded into a decoding-resultant copyright information signal. The real-time text information signal is decoded into a decoding-resultant real-time text information signal. The character information signal is decoded into a decoding-resultant character information signal. The disc identifier information signal is decoded into a decoding-resultant disc identifier information signal. The decoding-resultant video signal, the decoding-resultant still picture signal, the decoding-resultant audio signal, the decoding-resultant copyright information signal, the decoding-resultant real-time text information signal, the decoding-resultant character information signal, and the decoding-resultant disc identifier information signal are subjected to a synchronously reproducing process to recover original information signals in a proper timing relation.

The reproducing process on the decoding-resultant still-picture signal can be changed among the following three types 1), 2), and 3).

1) When the still-picture signal is provided, the reproducing process on the audio signal is interrupted and an audio muting process is implemented.

2) When the still-picture signal is provided, the reproducing process on the still-picture signal is implemented together with the reproducing process on the audio signal in response to a time control signal.

3) When the still-picture signal is provided, the reproducing process on the still-picture signal is implemented on a page change basis in response to a page change command given by a user. In this case, the reproducing process on the audio signal is continued as it is.

Generally, the time control signal which has been mentioned regarding the above-indicated type 2) is placed in the SPCIT time control data information SPCIT-TCDI (see FIG. 92). The page change command which has been mentioned regarding the above-indicated type 3) is placed in the still-picture page control command information SPPI (see FIG. 92).

It should be noted that side information for still-picture page control may be contained in the still-picture data in a still-picture pack SPCT (see FIG. 72). Alternatively, side information for still-picture page control may be contained in the real-time data in a real-time information pack RTI (see FIG. 70).

Twenty-Third Embodiment

Figure 96:
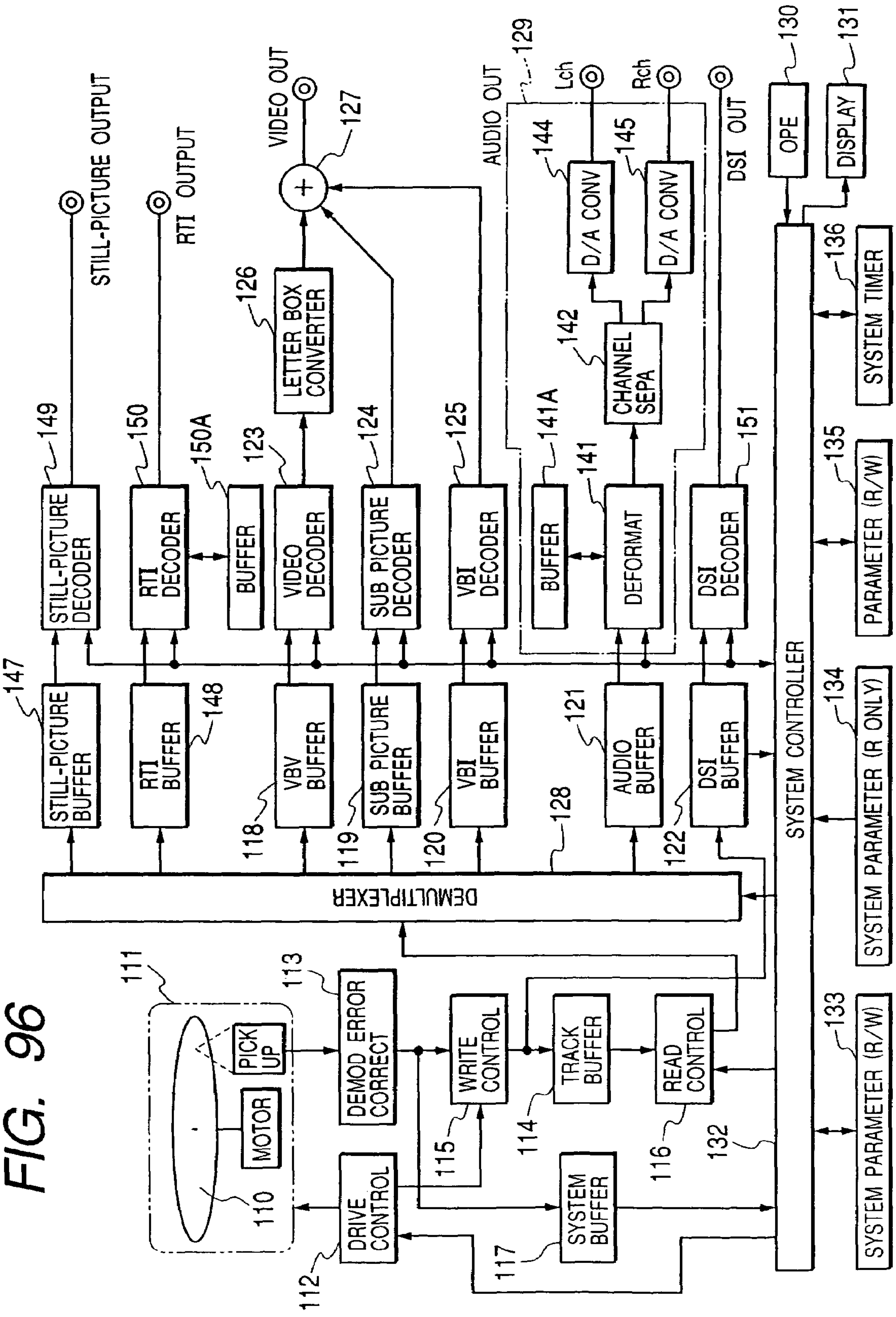
FIG. 96 is a block diagram of a DVD-Audio player including an audio-signal decoding apparatus according to a twenty-third embodiment of this invention.

FIG. 96 shows a DVD-Audio player including an audio-signal decoding apparatus according to a twenty-third embodiment of this invention. The player in FIG. 96 is designed to reproduce information from an DVD-Audio of a format in FIG. 92 which stores time control information and a page change command.

The player in FIG. 96 operates on a DVD-Audio 110. The player in FIG. 96 includes a drive unit 111 which is controlled by a drive control circuit 112. The drive unit 111 drives the DVD-Audio 110, and reads out a signal therefrom. The read-out signal is subjected by a decoding and error correction circuit 113 to an EFM demodulation process and an error correction process, being converted into a bit stream signal. The bit stream signal except control data and DSI (data search information) data is stored into a track buffer 114 by a write control circuit 115. The control data in the bit stream signal is stored into a system buffer 117. The DSI data in the bit stream signal is stored into a DSI buffer 122. The DSI data is transmitted from the DSI buffer 122 to a DSI decoder 151. The DSI decoder 151 subjects the DSI data to a decoding process. The DSI decoder 151 outputs the decoding-resultant DSI signal.

A system controller 132 implements reproduction control in response to the control data in the system buffer 117. The system controller 132 includes a CPU which operates in accordance with a control program stored in an internal ROM. An operation unit 130, a display device 131, a system parameter memory 133, a system parameter memory 134, a general parameter memory 135, and a system timer 136 are connected to the system controller 132. The system parameter memory 133 includes a read/write memory. The system parameter memory 134 includes a read-only memory. The general parameter memory 135 includes a read/write memory.

The bit stream signal is read out from the track buffer 114 by a read control circuit 116. The readout bit stream signal is separated by a demultiplexer 128 into still-picture packs, real-time information packs, VBV packs, sub picture packs, VBI packs, and audio packs. The still-picture packs are stored into a still-picture buffer 147. The real-time information packs are stored into an RTI buffer 148. The VBV packs are stored into a VBV buffer 118. The sub picture packs are stored into a sub picture buffer 119. The VBI packs are stored into a VBI buffer 120. The audio packs are stored into an audio buffer 121.

The still-picture packs are transmitted from the still-picture buffer 147 to a still-picture decoder 149. The still-picture packs are decoded by the still-picture decoder 149 into a still-picture signal. The still-picture signal is outputted from the still-picture decoder 149.

The real-time information packs are transmitted from the RTI buffer 148 to an RTI decoder 150. The real-time information packs are decoded into an RTI signal by a combination of the RTI decoder 150 and a buffer 150A. The RTI decoder 150 outputs the RTI signal.

The VBV packs are transmitted from the VBV buffer 118 to a video decoder 123. The VBV packs are decoded by the video decoder 123 into a video signal. The video signal is transmitted from the video decoder 123 to an adder 127 via a letter box converter 126.

The sub picture packs are transmitted from the sub picture buffer 119 to a sub picture decoder 124. The sub picture packs are decoded by the sub picture decoder 124 into a sub picture signal. The sub picture signal is outputted from the sub picture decoder 124 to the adder 127.

The VBI packs are transmitted from the VBI buffer 120 to a VBI decoder 125. The VBI packs are decoded by the VBI decoder 125 into a VBI signal. The VBI signal is outputted from the VBI decoder 125 to the adder 127.

The video signal, the sub picture signal, and the VBI signal are combined by the adder 127 into a composite video signal. The composite video signal is outputted from the adder 127.

The audio packs are transmitted from the audio buffer 121 to an audio decoder 129. The audio decoder 129 includes a combination of a deformatter 141, a buffer 141A, a channel separator 142, and D/A converters 144 and 145. The audio packs are decoded by the audio decoder 129 into analog audio signals. The analog audio signals are outputted from the audio decoder 129.

Figure 97:
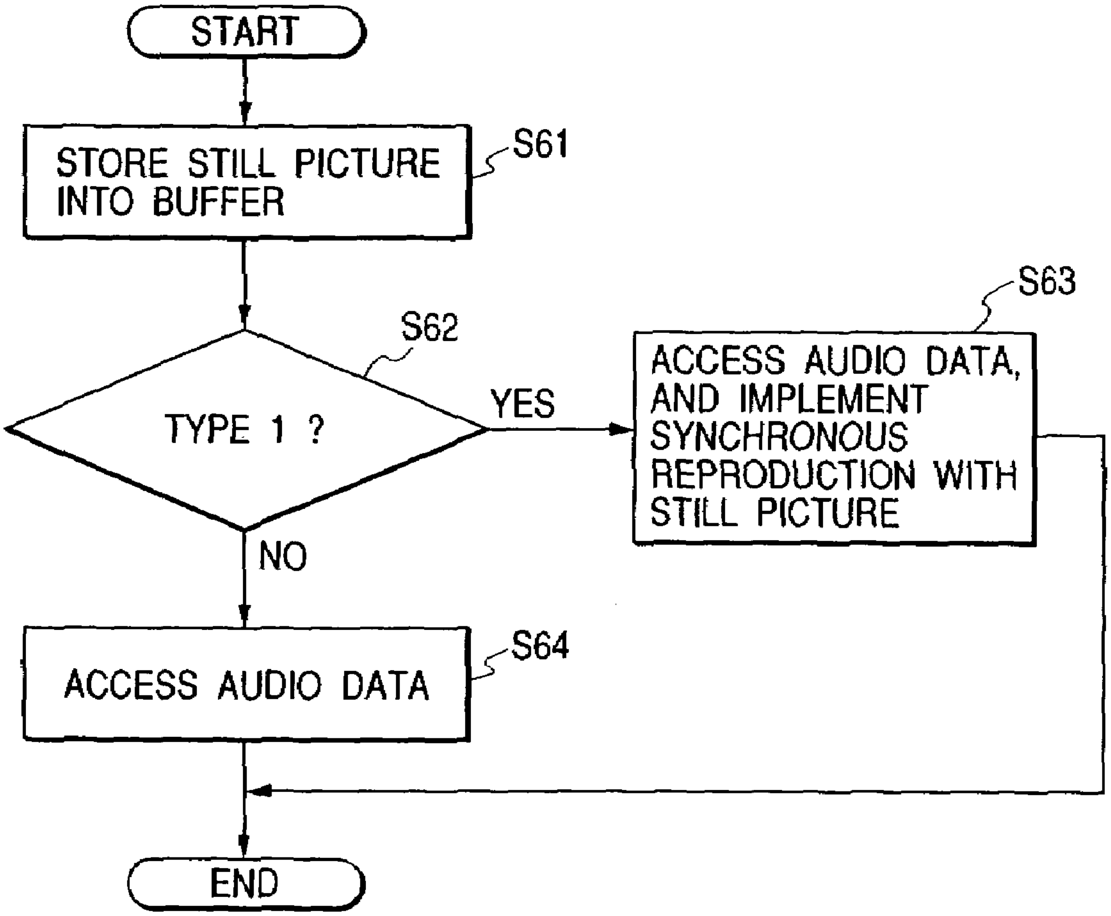
FIG. 97 is a flowchart of a first segment of a control program for a system controller in FIG. 96.

FIG. 97 is a flowchart of a segment (a subroutine) of the control program for the system controller 132 which relates to a reproducing process on still-picture data. As shown in FIG. 97, a first step S61 of the program segment enables still-picture data to be stored into the still-picture buffer 147. The step S61 suspends the reproducing process on audio data to implement an audio muting process for a given time interval, for example, 1-3 seconds.

A step S62 following the step S61 decides whether the reproducing process on the still-picture data should be of the type 2) or the type 3). When the reproducing process on the still-picture data should be of the type 2), the program advances from the step S62 to a step S63. When the reproducing process on the still-picture data should be of the type 3), the program advances from the step S62 to a step S64.

The step S63 enables the reproducing process on the still-picture data and the reproducing process on the audio data to be synchronously implemented in response to the time control information (that is, the time control data information SPCIT-TCDI in FIG. 92). After the step S63, the current execution cycle of the program segment ends.

The step S64 enables the reproducing process on the audio data to be implemented. After the step S64, the current execution cycle of the program segment ends.

Figure 98:
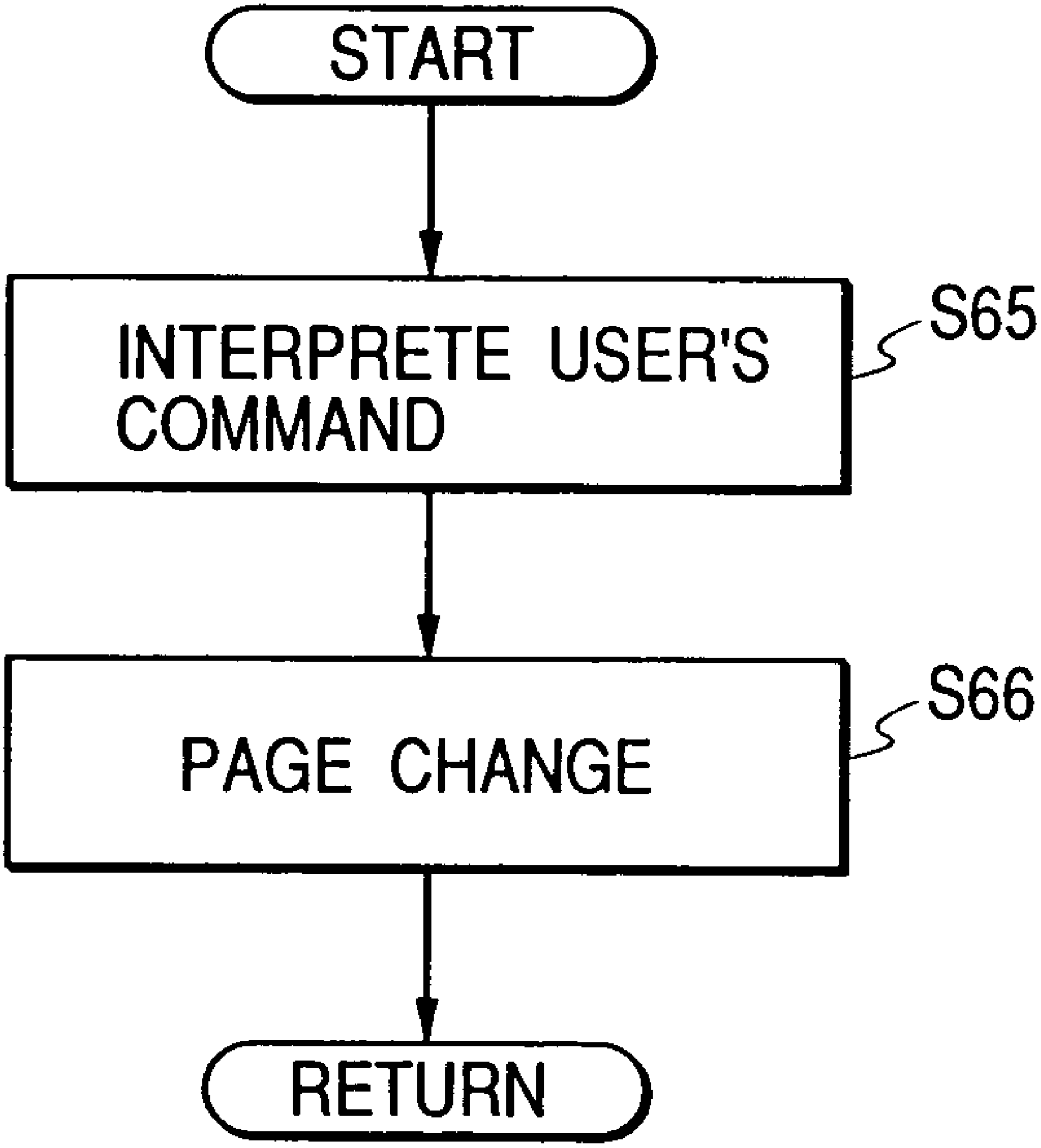
FIG. 98 is a flowchart of a second segment of the control program for the system controller in FIG. 96.

FIG. 98 is a flowchart of a segment (a subroutine) of the control program for the system controller 132 which is started by interruption during the execution of the step S64 in FIG. 97. Specifically, the program segment in FIG. 98 is started in response to a user's command.

As shown in FIG. 98, a first step S65 of the program segment interprets the present user's command. A step S66 following the step S65 implements a process of changing the page of an indicated still picture in a normal order or a reverse order in response to the present user's command and the page change command (that is, the still-picture page control command SPPI in FIG. 92). The step S66 may implement a process of erasing or enlarging the indicated still picture in response to the present user's command. The still-picture processing by the step S66 is out of synchronization with the reproducing process on the audio data. Accordingly, the still-picture processing by the step S66 is prevented from affecting the reproducing process on the audio data. After the step S66, the program returns to a main routine.

Figure 99:
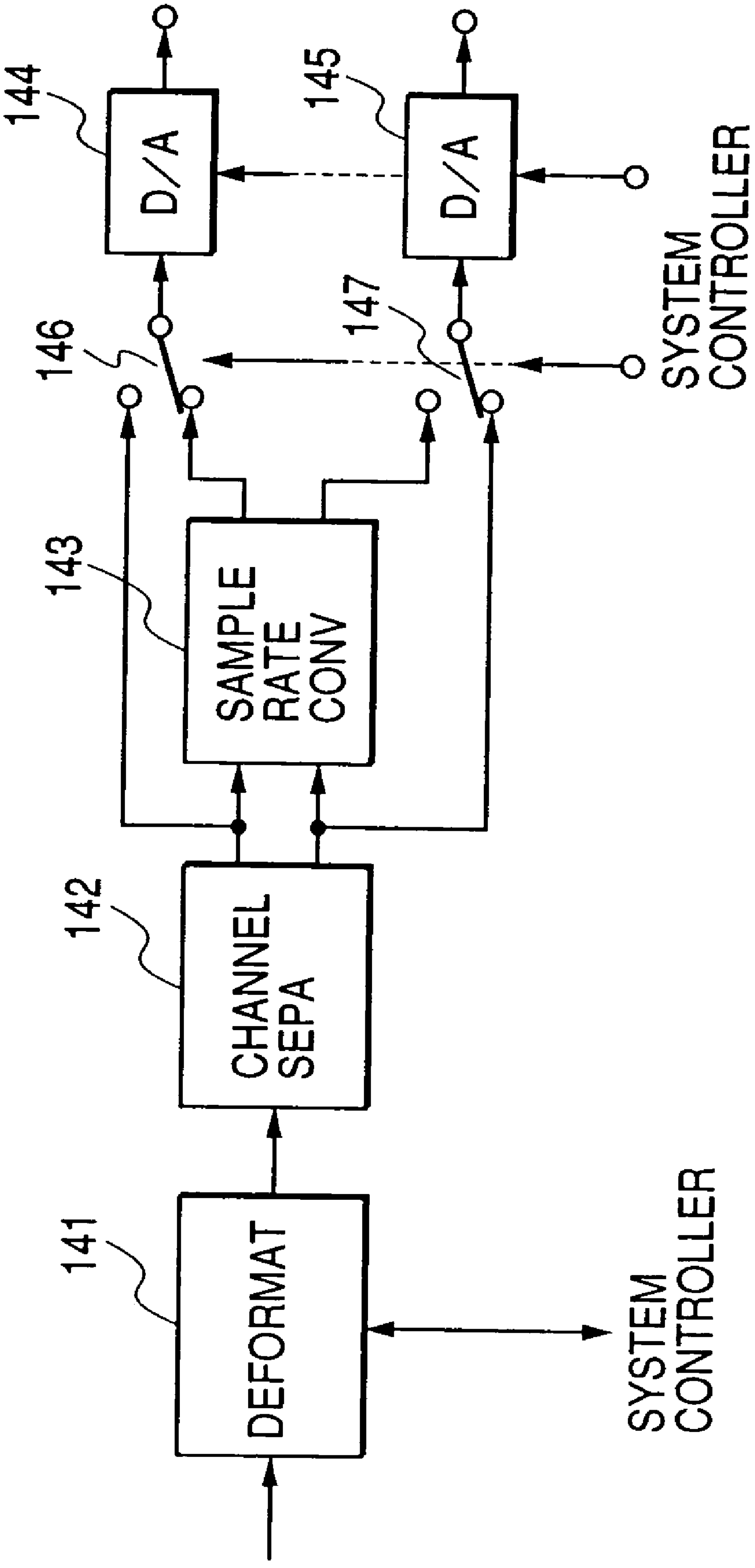
FIG. 99 is a block diagram of an audio decoder.

FIG. 99 shows a modification of the audio decoder 129 in FIG. 96. The audio decoder of FIG. 99 includes a sample rate converter 143. In the audio decoder of FIG. 99, the audio packs are changed by the deformatter 141 into audio data. The audio data is outputted from the deformatter 141 to the channel separator 142. The audio data is separated by the channel separator 142 into PCM data pieces of respective channels. The PCM data pieces of the respective channels are outputted from the channel separator 142 to the sample rate converter 143 and switches 146 and 147.

In the audio decoder of FIG. 99, the sample rate converter 143 subjects the PCM data pieces of the respective channels to an up sampling process. The up-sampling-resultant PCM data pieces of the respective channels are outputted from the sample rate converter 143 to the switches 146 and 147. When the sampling frequency of the input PCM data pieces is equal to 44.1 kHz, the sampling frequency of the up-sampling-resultant PCM data pieces is equal to 48 kHz. When the sampling frequency of the input PCM data pieces is equal to 88.2 kHz, the sampling frequency of the up-sampling-resultant PCM data pieces is equal to 96 kHz.

In the audio decoder of FIG. 99, the deformatter 141 feeds the system controller 132 with information of the sampling frequency "fs" of the PCM data pieces of the respective channels. The system controller 132 detects the sampling frequency "fs" in response to the information fed from the deformatter 141. When the sampling frequency "fs" is equal to 48 kHz, the system controller 132 controls the switches 146 and 147 so that the D/A converters 144 and 145 will receive the PCM data pieces of the respective channels from the channel separator 142. Thus, in this case, the sampling frequency of the PCM data pieces inputted into the D/A converters 144 and 145 is equal to 48 kHz. When the sampling frequency "fs" is equal to 44.1 kHz, the system controller 132 controls the switches 146 and 147 so that the D/A converters 144 and 145 will receive the PCM data pieces of the respective channels from the sample rate converter 143. Thus, also in this case, the sampling frequency of the PCM data pieces inputted into the D/A converters 144 and 145 is equal to 48 kHz. When the sampling frequency "fs" is equal to 96 kHz, the system controller 132 controls the switches 146 and 147 so that the D/A converters 144 and 145 will receive the PCM data pieces of the respective channels from the channel separator 142. Thus, in this case, the sampling frequency of the PCM data pieces inputted into the D/A converters 144 and 145 is equal to 96 kHz. When the sampling frequency "fs" is equal to 88.2 kHz, the system controller 132 controls the switches 146 and 147 so that the D/A converters 144 and 145 will receive the PCM data pieces of the respective channels from the sample rate converter 143. Thus, also in this case, the sampling frequency of the PCM data pieces inputted into the D/A converters 144 and 145 is equal to 96 kHz.

The D/A converters 144 and 145 change the input PCM data pieces into analog audio signals of respective channels in response to a sampling clock signal. The analog audio signals of the respective channels are outputted from the D/A converters 144 and 145. The system controller 132 controls the frequency of the sampling clock signal fed to the D/A converters 144 and 145.

The sample rate converter 143 may implement a down sampling process. According to an example of the down sampling process, the sampling frequency of the down-sampling-resultant PCM data pieces is equal to 44.1 kHz when the sampling frequency of the input PCM data pieces is equal to 48 kHz. In addition, the sampling frequency of the down-sampling-resultant PCM data pieces is equal to 88.2 kHz when the sampling frequency of the input PCM data pieces is equal to 96 kHz.

The sample rate converter 143 may implement another up sampling process. According to the present up sampling process, the sampling frequency of the up-sampling-resultant PCM data pieces is equal to 96 kHz when the sampling frequency of the input PCM data pieces is equal to 48 kHz. The up-sampling-resultant PCM data pieces are fed to the D/A converters 144 and 145. On the other hand, the PCM data pieces having a sampling frequency of 96 kHz are transmitted from the channel separator 142 to the D/A converters 144 and 145 without being processed by the sample rate converter 143.

Twenty-Fourth Embodiment

Figure 100:
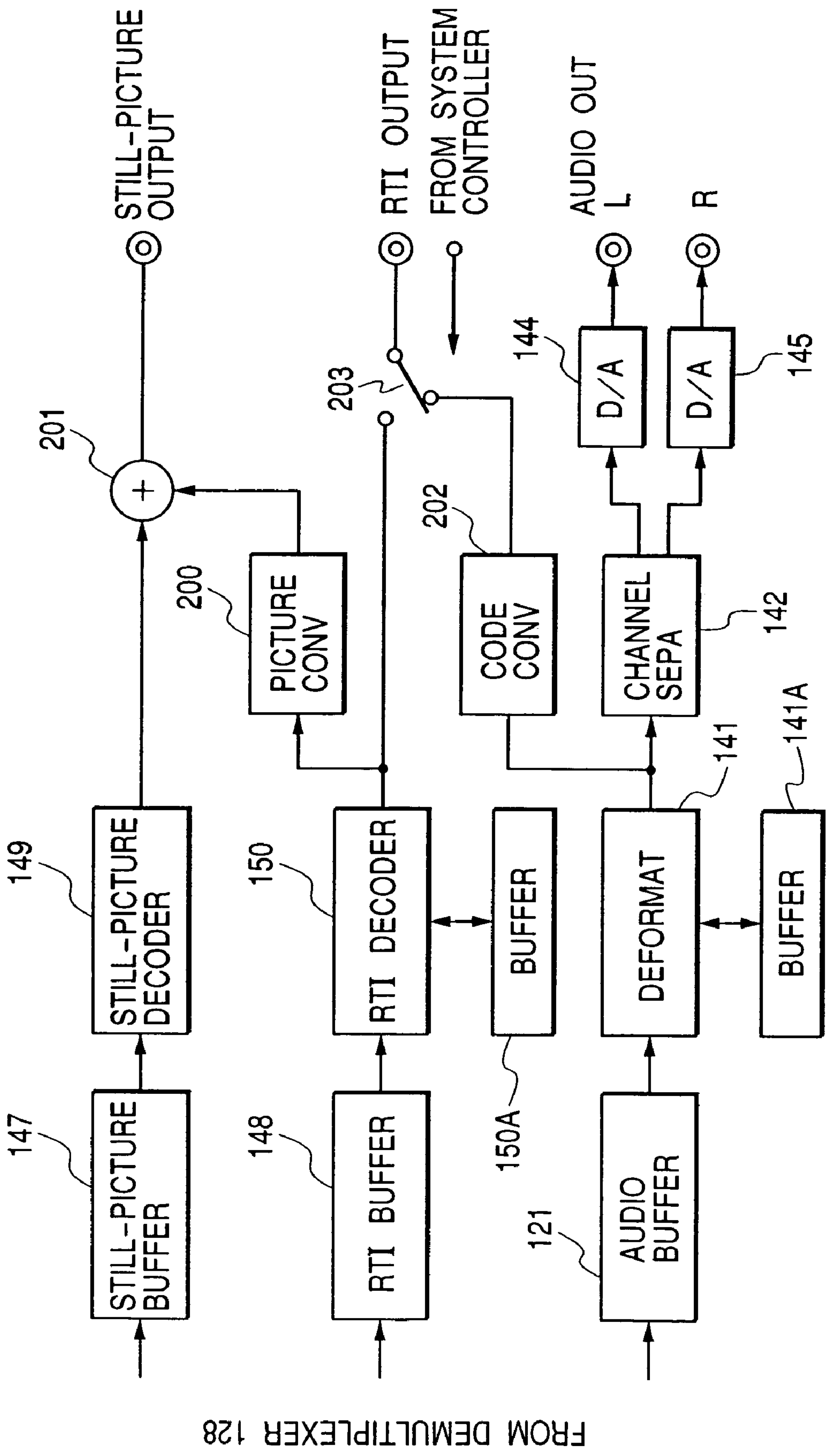
FIG. 100 is a block diagram of a portion of a DVD-Audio player including an audio-signal decoding apparatus according to a twenty-fourth embodiment of this invention.

FIG. 100 shows a portion of a DVD-Audio player including an audio-signal decoding apparatus according to a twenty-fourth embodiment of this invention. The player in FIG. 100 is similar to the player in FIG. 96 except for design changes indicated later. The player in FIG. 100 is designed to superimpose copyright information on a related still picture.

In the player of FIG. 100, still-picture packs are transmitted to the still-picture decoder 149 via the still-picture buffer 147. The still-picture packs are decoded into a still-picture signal by the still-picture decoder 149. The still-picture signal is outputted from the still-picture decoder 149 to an adder 201. Real-time information packs are transmitted to the RTI decoder 150 via the RTI buffer 148. The real-time information packs are decoded into an RTI signal by the combination of the RTI decoder 150 and the buffer 150A. The RTI signal is outputted from the RTI decoder 150 to a picture converter 200 and a switch 203. The RTI signal can be transmitted via the switch 203 to an external device.

In the case where the RTI signal contains copyright information (UPC/EAN-ISRC data in FIGS. 59 and 60), the picture converter 200 extracts the copyright information from the RTI signal and converts the copyright information into a corresponding character picture signal (a corresponding copyright information signal). The picture converter 200 outputs the character picture signal to the adder 201. The still-picture signal and the character picture signal are combined by the adder 201 into a composite picture signal. The composite picture signal is outputted from the adder 201. The composite picture signal represents a composite picture in which the copyright information (a set of characters indicating the copyright) is superimposed on the related still picture.

In the player of FIG. 100, audio packs are transmitted to the deformatter 141 via the audio buffer 121. The audio packs are decoded into a digital audio signal by the combination of the deformatter 141 and the buffer 141A. The deformatter 141 outputs the digital audio signal to the channel separator 142 and a code converter 202.

In the case where the digital audio signal contains copyright information (UPC/EAN-ISRC data in FIGS. 59 and 60), the code converter 202 extracts the copyright information from the digital audio signal and converts the copyright information into a corresponding text character signal (a corresponding copyright information signal). The code converter 202 outputs the text character signal to the switch 203. The text character signal can be transmitted via the switch 203 to an external device as an RTI signal.

The switch 203 selects one of the output signal of the RTI decoder 150 and the deformatter 141, and transmits the selected signal to a later stage. The switch 203 is changed by a control signal fed from the system controller 132 (see FIG. 96).

Figure 101:
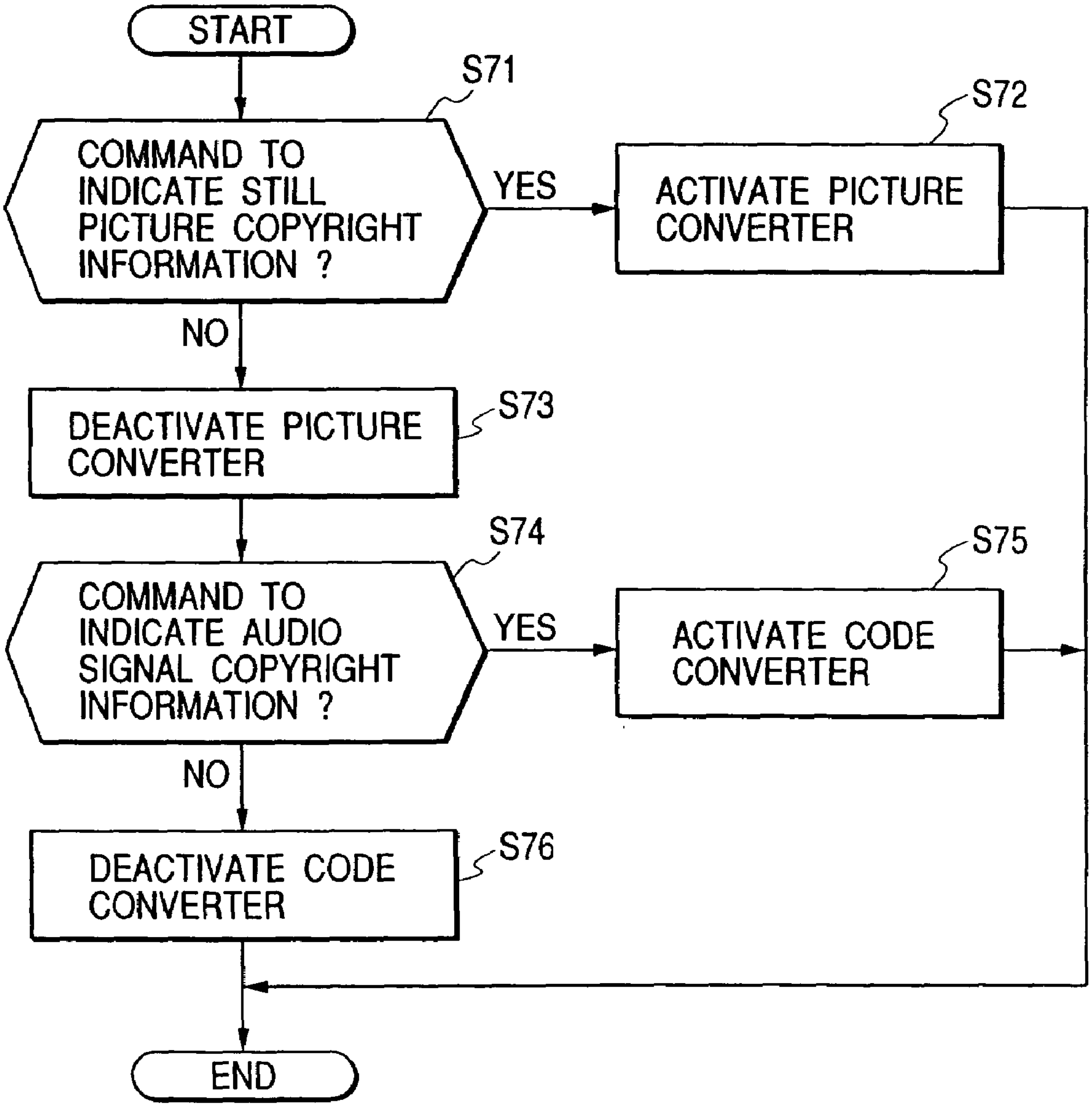
FIG. 101 is a flowchart of a segment of a control program for a system controller in the twenty-fourth embodiment.

FIG. 101 is a flowchart of a segment of a control program for the system controller 132 (see FIG. 96) which relates to the processing of copyright information. As shown in FIG. 101, a first step S71 of the program segment decides whether or not a command to indicate copyright information of a still picture is currently fed from the operation unit 130 (see FIG. 96). When the command is currently fed, the program advances from the step S71 to a step S72. Otherwise, the program advances from the step S71 to a step S73.

The step S72 activates the picture converter 200. Accordingly, the picture converter 200 extracts the copyright information from the RTI signal and converts the copyright information into a corresponding character picture signal (a corresponding copyright information signal). The picture converter 200 outputs the character picture signal to the adder 201. The still-picture signal and the character picture signal are combined by the adder 201 into a composite picture signal. The composite picture signal is outputted from the adder 201. The composite picture signal represents a composite picture in which the copyright information is superimposed on the related still picture. After the step S72, the current execution cycle of the program segment ends.

The step S73 deactivates the picture converter 200 or holds the picture converter 200 inactive. After the step S73, the program advances to a step S74.

The step S74 decides whether or not a command to indicate copyright information of an audio signal is currently fed from the operation unit 130. (see FIG. 96). When the command is currently fed, the program advances from the step S74 to a step S75. Otherwise, the program advances from the step S74 to a step S76.

The step S75 activates the code converter 202. Accordingly, the code converter 202 extracts the copyright information from the digital audio signal and converts the copyright information into a corresponding text character signal (a corresponding copyright information signal). The code converter 202 outputs the text character signal to the switch 203. The step S75 controls the switch 203 so that the text character signal will be transmitted via the switch 203 to a later stage as a RTI signal. After the step S75, the current execution cycle of the program segment ends.

The step S76 deactivates the code converter 202 or holds the code converter 202 inactive. In addition, the step S76 controls the switch 203 to select the output signal of the RTI decoder 150. After the step S76, the current execution cycle of the program segment ends.

It should be noted that the above-indicated processing of copyright information is implemented in unit of cell or track.

Twenty-Fifth Embodiment

Figure 102:
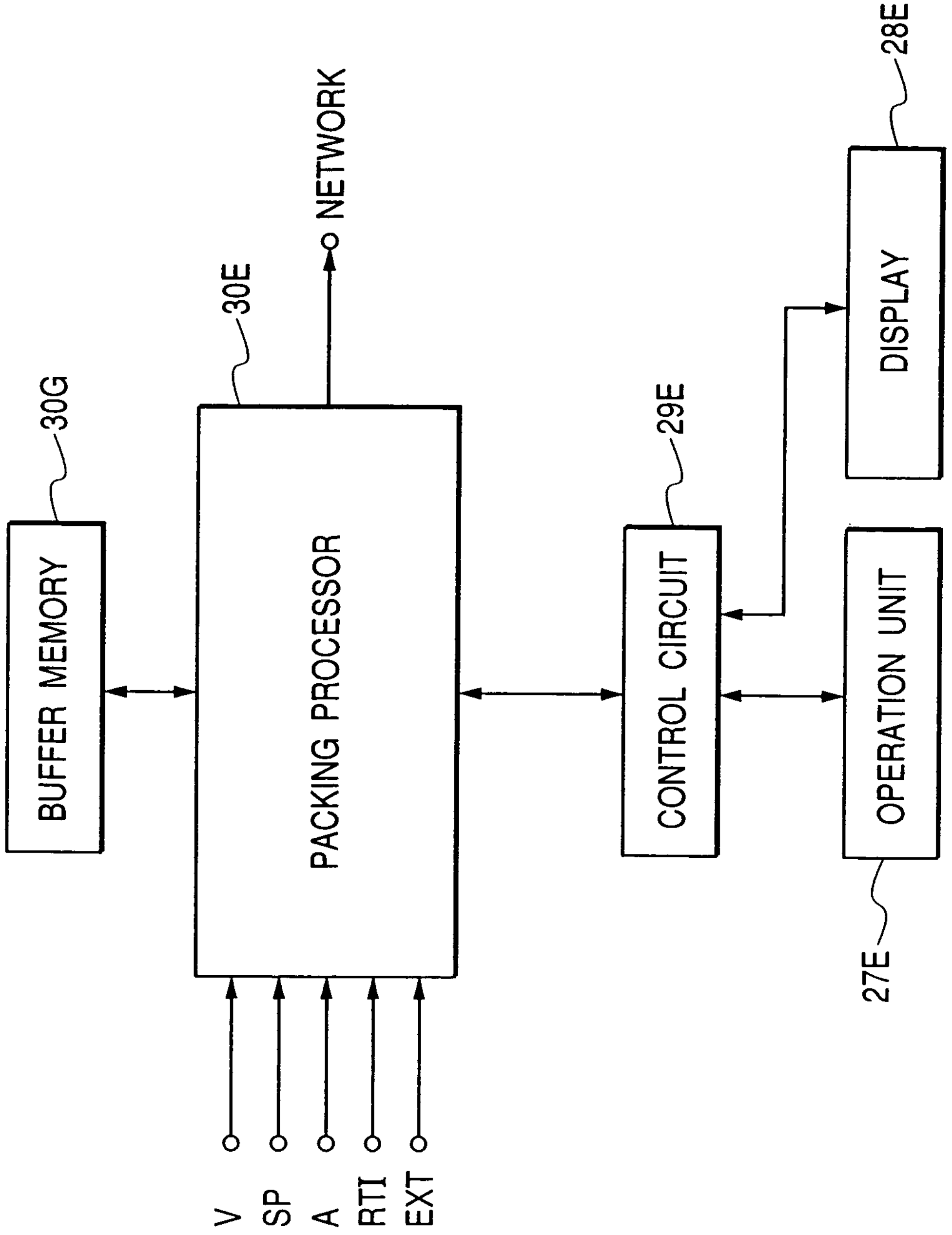
FIG. 102 is a block diagram of a packing apparatus according to a twenty-fifth embodiment of this invention.

FIG. 102 shows a packing apparatus according to a twenty-fifth embodiment of this invention. The packing apparatus of FIG. 102 includes a packing processor 30E, a buffer memory 30G, a control circuit 29E, an operation unit 27E, and a display device 28E. The packing processor 30E is connected to the buffer memory 30G and the control circuit 29E. The packing processor 30E is connected to a network via an interface (not shown). The control circuit 29E is connected to the operation unit 27E and the display device 28E.

The packing processor 30E receives a video signal "V", a still-picture signal "SP", an audio signal "A", a real-time information signal "RTI", and a disc identifier signal "EXT". The packing processor 30E processes the video signal "V", the still-picture signal "SP", the audio signal "A", the real-time information signal "RTI", and the disc identifier signal "EXT" into a processing-resultant signal under the control by the control circuit 29E.

Figure 103:
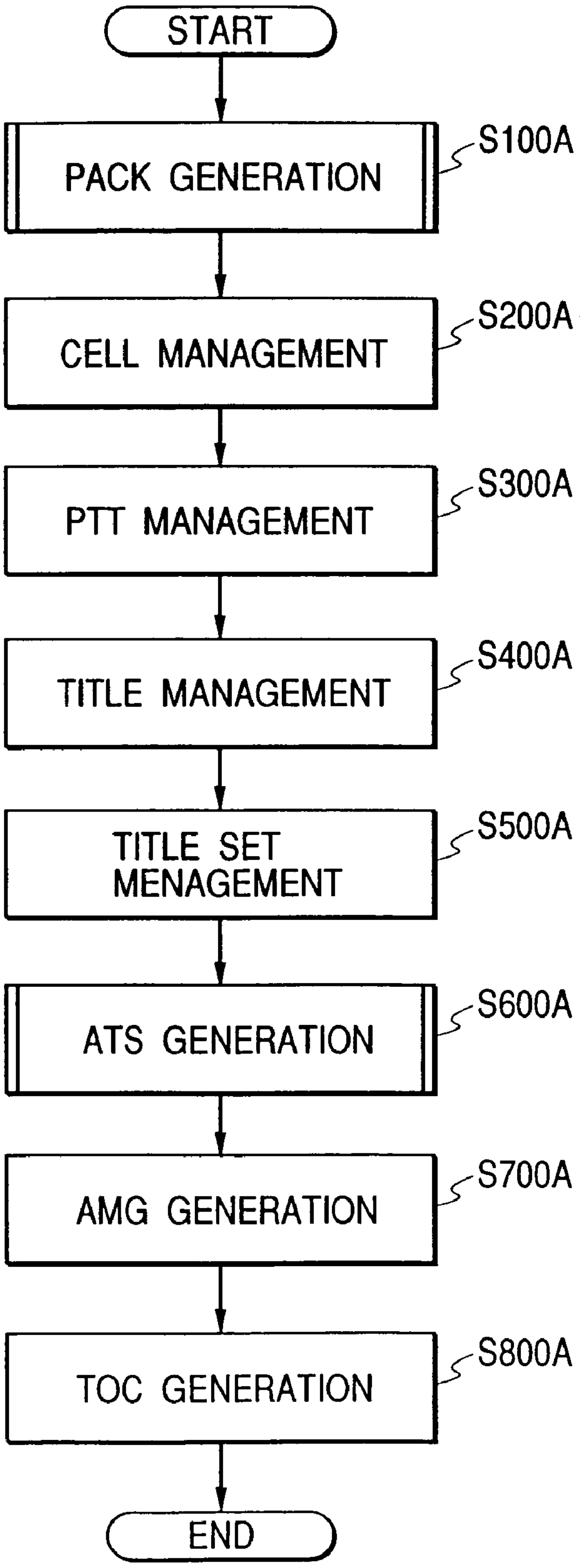
FIG. 103 is a flowchart of a first segment of a control program for a control circuit in FIG. 102.

The control circuit 29E includes a CPU which operates in accordance with a control program stored in an internal ROM. FIG. 103 is a flowchart of a segment of the control program for the control circuit 29E.

As shown in FIG. 103, a first block S100A of the program segment generates audio packs, video packs, still-picture packs, and a real-time text in response to the video signal "V", the still-picture signal "SP", the audio signal "A", the real-time information signal "RTI", and the disc identifier signal "EXT".

A step S200A following the block S100A manages cells ATS-C. A step S300A subsequent to the step S200A manages parts of titles PTT. A step S400A following the step S300A manages audio-only-title audio-objects AOTT-AOB. A step S500A subsequent to the step S400A manages an audio-only-title audio-object-set AOTT-AOBS.

A block S600A following the step S500A generates audio title sets ATS. A step S700A subsequent to the block S600A generates an audio manager AMG. A step S800A following the step S700A generates TOC information. After the step S800A, the execution of the program segment ends.

Figure 104:
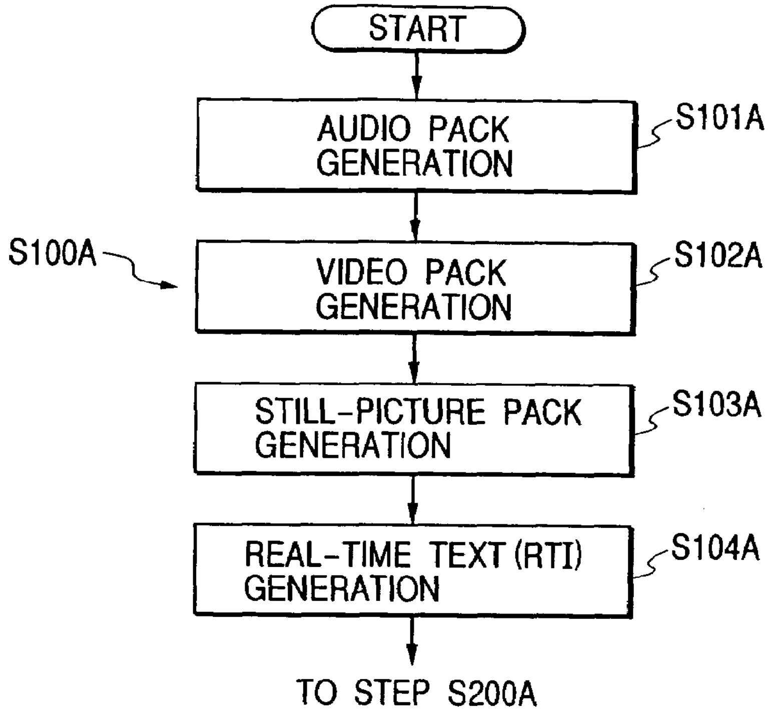
FIG. 104 is a flowchart of the details of a first block in FIG. 103.

FIG. 104 shows the details of the block S100A in FIG. 103. As shown in FIG. 104, the block S100A includes a step S101A which generates the audio packs. A step S102A following the step S101A generates the video packs. A step S103A subsequent to the step S102A generates the still-picture packs. A step S104A following the step S103A generates the real-time text (RTI. The step S104A is followed by the step S200A in FIG. 103.

Figure 105:
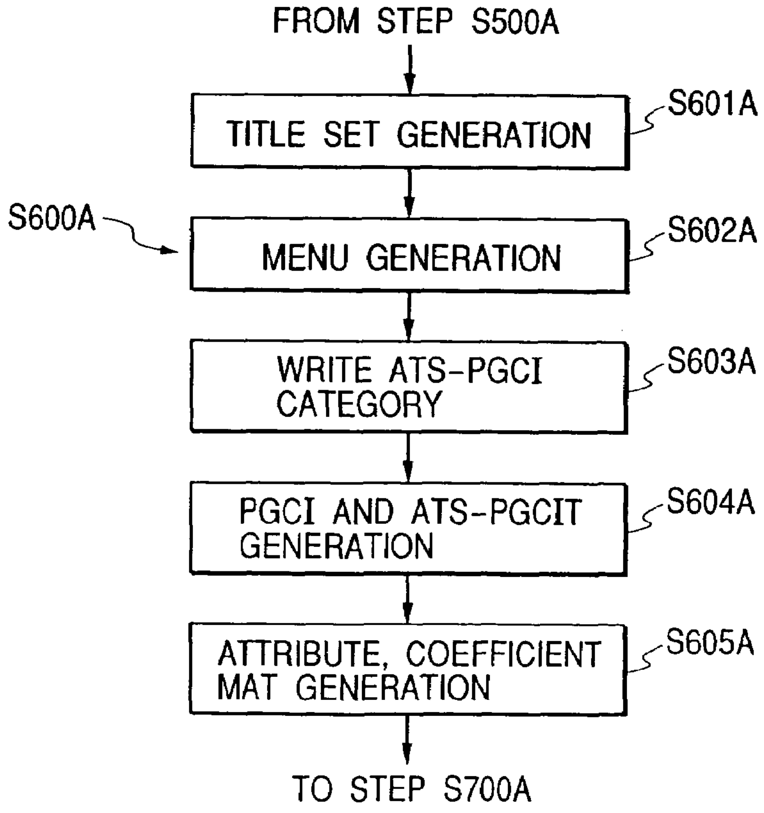
FIG. 105 is a flowchart of the details of a second block in FIG. 103.

FIG. 105 shows the details of the block S600A in FIG. 103. As shown in FIG. 105, the block S600A includes a step S601A following the step S500A in FIG. 103. The step S601A generates title sets. A step S602A subsequent to the step S601A generates a menu. A step S603A following the step S602A writes a PGCI category. A step S604A subsequent to the step S603A generates a program information table PGIT having PG contents including bit-shift information. The step S604A generates program chain information PGCI, and a program chain information table ATS-PGCIT. A step S605A following the step S604A generates attribute and coefficient management tables MAT, and thereby generates ATS information ATSI. The step S605A is followed by the step S700A in FIG. 103.

Figure 106:
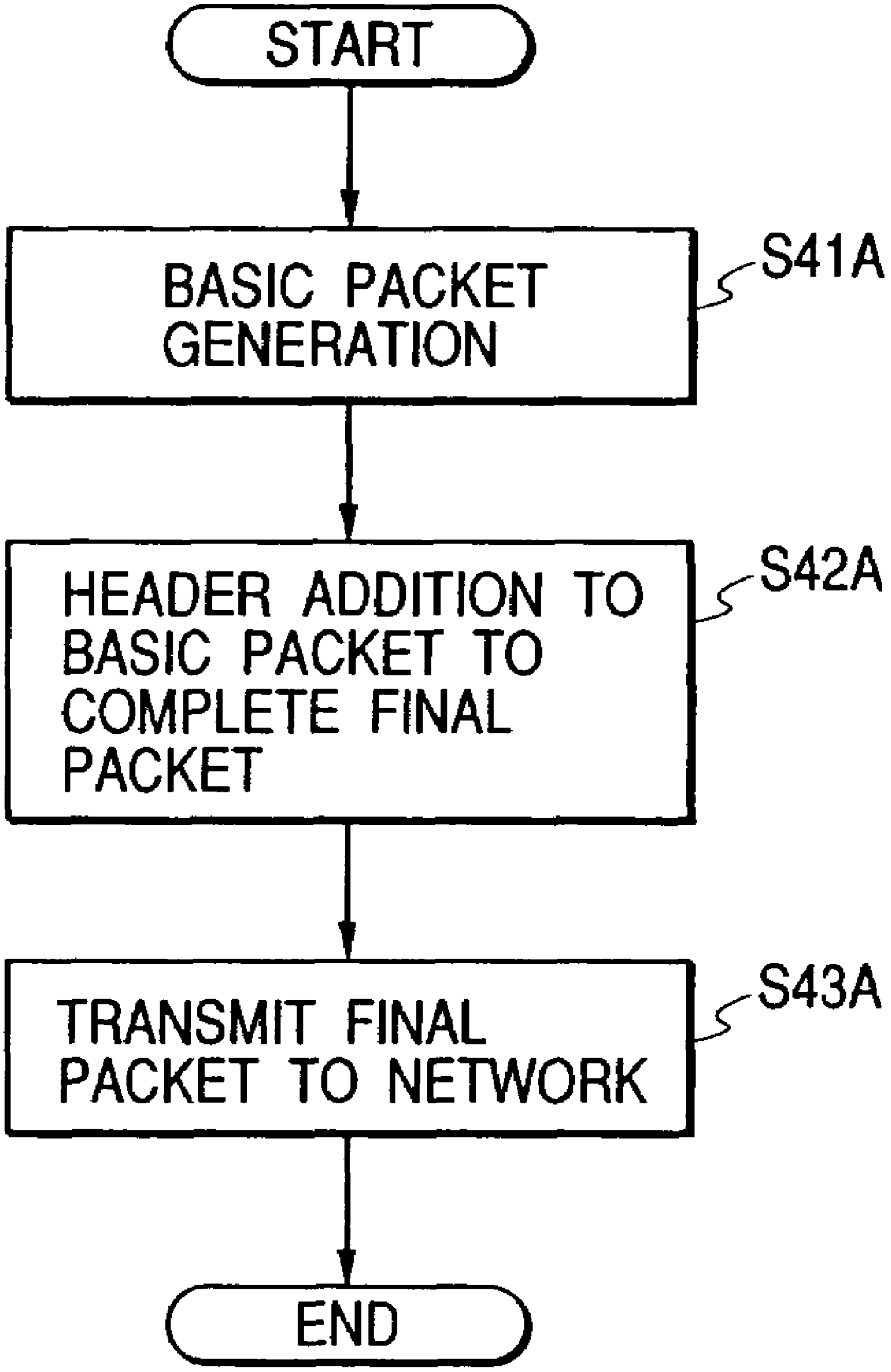
FIG. 106 is a flowchart of a second segment of the control program for the control circuit in FIG. 102.

FIG. 106 is a flowchart of another segment of the control program for the control circuit 29E. The program segment in FIG. 106 is designed to handle digital audio data which has been formatted according to the program segment in FIG. 103. As shown in FIG. 106, a first step S41A of the program segment divides the audio data into basic packets. A step S42A following the step S41A adds headers to the starting ends of the basic packets to change the basic packets to final packets respectively. A step S43A subsequent to the step S42A sequentially transmits the final packets to the network.

Twenty-Sixth Embodiment

Figure 107:
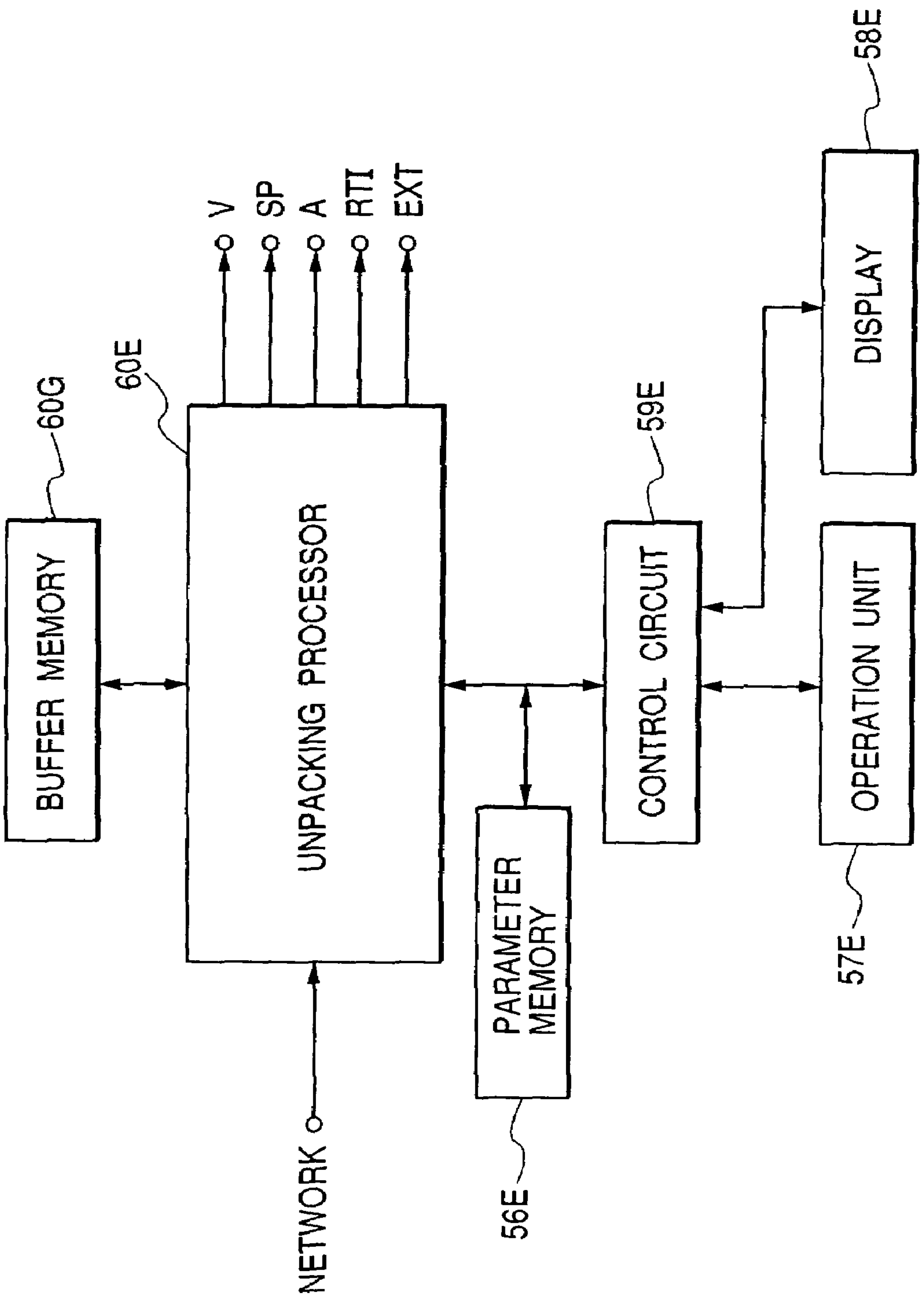
FIG. 107 is a block diagram of an unpacking apparatus according to a twenty-sixth embodiment of this invention.

FIG. 107 shows an unpacking apparatus according to a twenty-sixth embodiment of this invention. The unpacking apparatus of FIG. 107 includes an unpacking processor 60E, a buffer memory 60G, a control circuit 59E, an operation unit 57E, a display device 58E, and a parameter memory 56E. The unpacking processor 60E is connected to a network via an interface (not shown). The unpacking processor 60E is connected to the buffer memory 60G, the parameter memory 56E, and the control circuit 59E. The control circuit 59E is connected to the parameter memory 56E, the operation unit 57E, and the display device 58E.

The unpacking processor 60E receives a stream of packets from the network. The unpacking processor 60E decomposes the packet stream into a video signal "V", a still-picture signal "SP", an audio signal "A", a real-time information signal "RTI", and a disc identifier signal "EXT" under the control by the control circuit 59E. The unpacking processor 30E outputs the video signal "V", the still-picture signal "SP", the audio signal "A", the real-time information signal "RTI", and the disc identifier signal "EXT".

Figure 108:
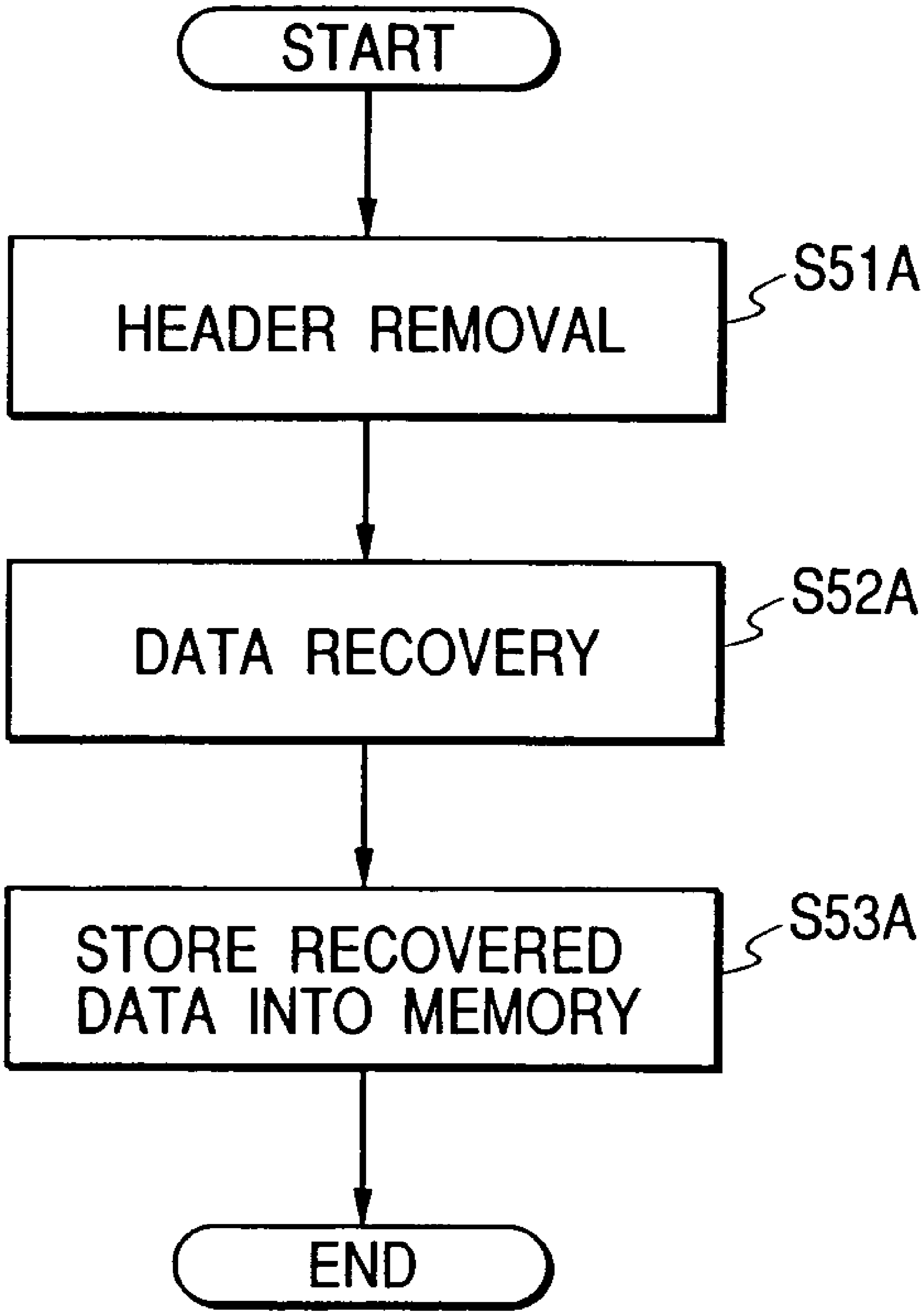
FIG. 108 is a flowchart of a first segment of a control program for a control circuit in FIG. 107.

The control circuit 59E includes a CPU which operates in accordance with a control program stored in an internal ROM. FIG. 108 is a flowchart of a segment of the control program for the control circuit 59E.

As shown in FIG. 108, a first step S51A of the program segment removes headers from received packets. A step S52A following the step S51A recovers original data from the header-less packets. A step S53A subsequent to the step S52A stores the recovered original data into the buffer memory 60G.

Figure 109:
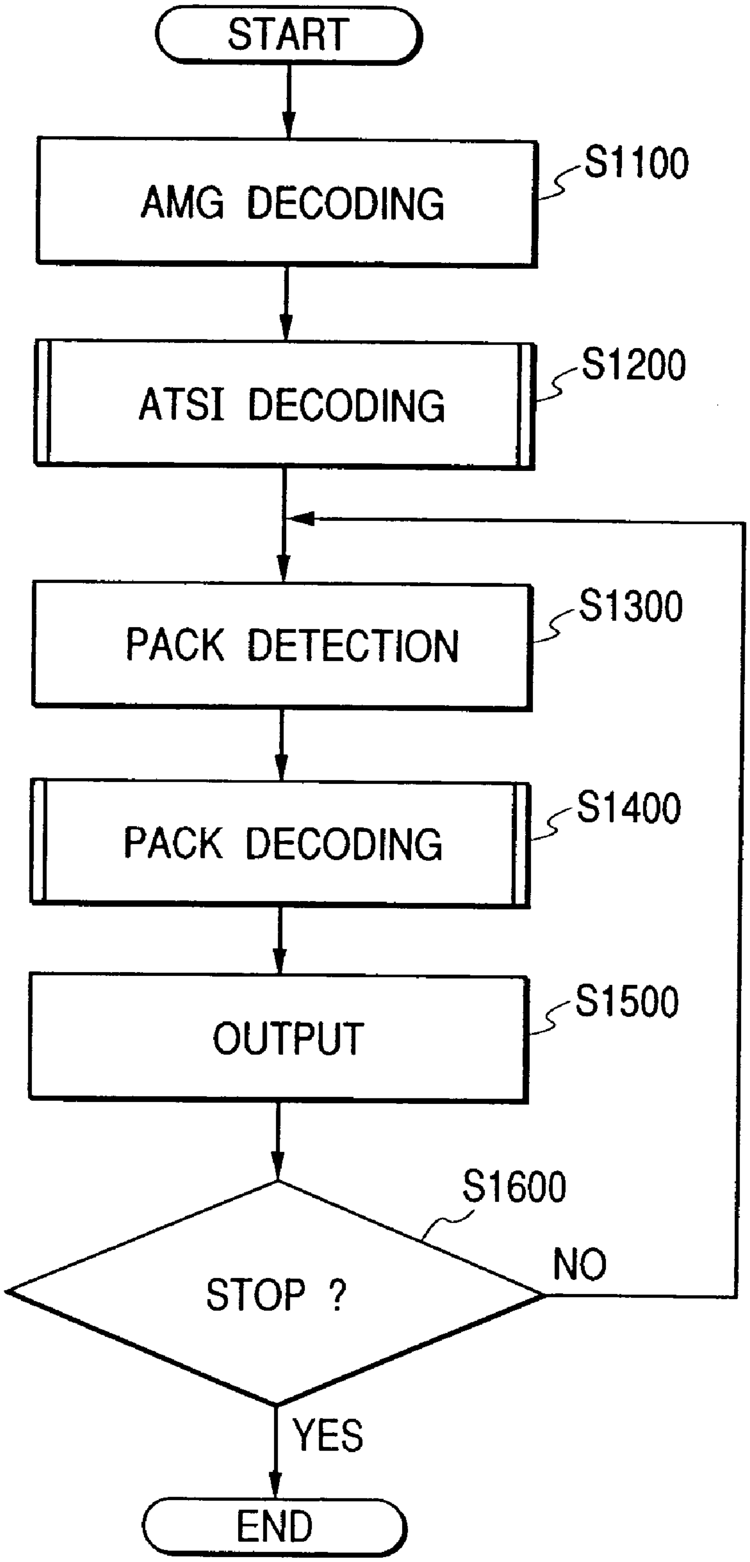
FIG. 109 is a flowchart of a second segment of the control program for the control circuit in FIG. 107.

FIG. 109 is a flowchart of another segment of the control program for the control circuit 59E. The program segment in FIG. 109 is designed to process the recovered original data in the buffer memory 60G. As shown in FIG. 109, a first step S100 of the program segment decodes an audio manager AMG to detect audio title sets ATS.

A block S1200 following the step S1100 decodes ATS information of a desired audio title set ATS. After the block S1200, the program advances to a step S1300.

The step S1300 detects packs. A block S1400 following the step S1300 decodes the packs into an audio signal, a video signal, a still-picture signal, and a real-time text signal. A step S1500 subsequent to the block S1400 outputs the audio signal, the video signal, the still-picture signal, and the real-time text signal.

A step S1600 following the step S1500 decides whether or not a command to stop playback is present. When the command to stop playback is present, the program exits from the step S1600 and then the execution of the program segment ends. Otherwise, the program returns from the step S1600 to the step S1300.

Figure 110:
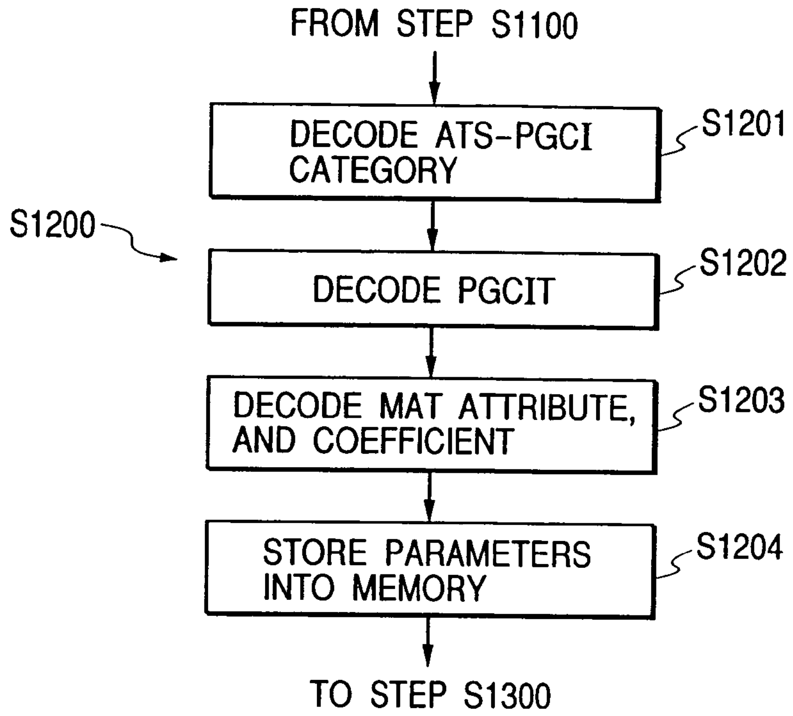
FIG. 110 is a flowchart of the details of a first block in FIG. 109.

FIG. 110 shows the details of the block S1200 in FIG. 109. As shown in FIG. 110, the block S1200 includes a step S1201 which follows the step S1100 in FIG. 109. The step S1201 decodes an ATS-PGCI category. A step S1202 following the step S1201 decodes a program information table PGIT having PG contents including bit-shift information. A step S1203 subsequent to the step S1202 decodes attribute and coefficient management tables MAT. A step S1204 following the step S1203 stores information of the decoding-resultant parameters into the parameter memory 56E. The step S1204 is followed by the step S1300 in FIG. 109.

Figure 111:
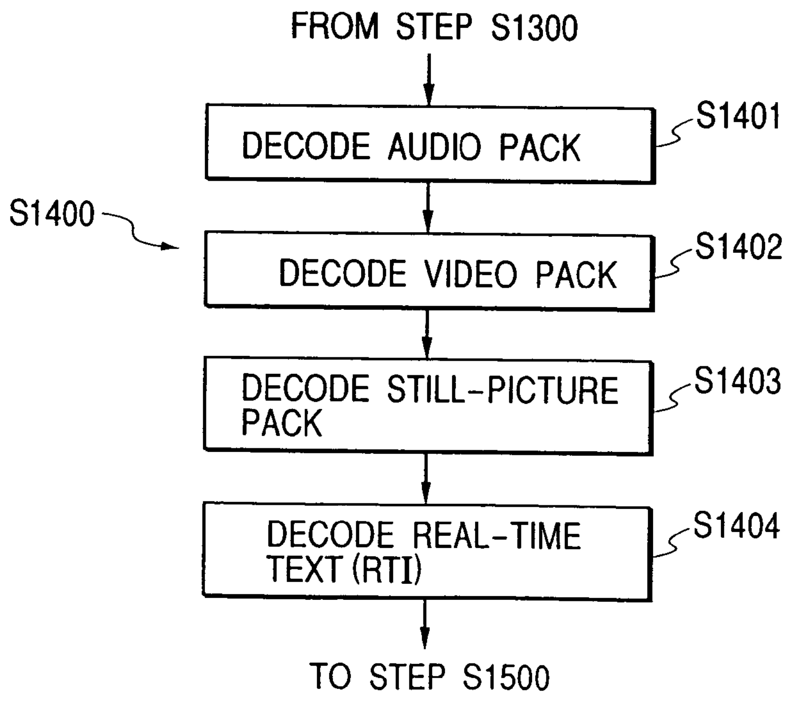
FIG. 111 is a flowchart of the details of a second block in FIG. 109.

FIG. 111 shows the details of the block S1400 in FIG. 109. As shown in FIG. 111, the block S1400 includes a step S1401 which follows the step S1300 in FIG. 109. The step S1401 decodes the audio packs into the audio signal. A step S1402 following the step S1401 decodes the video packs into the video signal. A step S1403 subsequent to the step S1402 decodes the still-picture packs into the still-picture signal. A step S1404 following the step S1403 decodes the real-time text (RTI) into the real-time text signal. The step S1404 is followed by the step S1500 in FIG. 109.

What is claimed is:

1. A digital signal recording apparatus adaptable to be used at least by a decoding apparatus and/or a player, the signal recoding apparatus having an area storing an audio title set (ATS), the audio title set (ATS) including data representing a digital audio signal resulting from steps including (1) quantizing a first original audio signal at a first quantization word length and a first sampling frequency, (2) quantizing a second original audio signal into a quantization-resultant audio signal at a second quantization word length and a second sampling frequency, and (3) subjecting the quantization-resultant audio signal to a bit shift, the first original audio signal being in a front channel (Lf, Rf) group having multiple channels, the second original audio signal being in a rear channel (Ls, Rs) group having multiple channels, the first sampling frequency being assigned to each of the channels in the first channel group, the second sampling frequency being assigned to each of the channels in the second channel group, the bit shift having a quantity common to the channels in the second channel group;

the audio title set (ATS) including data representing the first quantization word length and first sampling frequency and the second quantization word length and second sampling frequency, data representing the quantity of the bit shift and channel assignment information for identifying the channels in the first channel group and the channels in the second channel group;

wherein when used with the decoding apparatus, the decoding apparatus utilizes the data in the audio title set (ATS) to decode the digital audio signal to the original audio signals.

2. An apparatus for decoding the digital audio signal recorded on the digital signal recording apparatus of claim 1, the audio signal being in the first channel group and the second channel group, the apparatus comprising: means for generating the data representing the first quantization word length and the first sampling frequency and the second quantization word length and the second sampling frequency, the data representing the quantity of the bit shift, and the channel assignment information for identifying the channels in the front channel group and the channels in the rear channel group; and means for decoding the digital audio signal in the front channel group and the rear channel group in response to the first quantization word length and the first sampling frequency, the second quantization word length and the second sampling frequency, the quantity of the bit shift, and the channel assignment information.

3. A player for reproducing audio contents from the digital signal recording apparatus of claim 1 which stores the audio signal in the front channel group and the rear channel group, the player comprising: means for generating the data representing the first quantization word length and the first sampling frequency and the second quantization word length and the second sampling frequency, the data representing the quantity of the bit shift, and the channel assignment information for identifying the channels in the front channel group and the channels in the rear channel group; means for decoding the digital audio signal in the front channel group and the rear channel group in response to the first quantization word length and the first sampling frequency, the second quantization word length and the second sampling frequency, the quantity of the bit shift, and the channel assignment information; and means for implementing digital-to-analog conversion of the decoding-resultant audio signal to recover a corresponding analog audio signal.

4. A signal encoding apparatus comprising:

means for generating information; and means for formatting the information into a data structure;

wherein the data structure has an area containing an audio title set (ATS), the audio title set (ATS) including data representing a digital audio signal resulting from steps including (1) quantizing a first original audio signal at a first quantization word length and a first sampling frequency, (2) quantizing a second original audio signal into a quantization-resultant audio signal at a second quantization word length and a second sampling frequency, and (3) subjecting the quantization-resultant audio signal to a bit shift, the first original audio signal being in a front channel (Lf,Rf) group having multiple channels, the second original audio signal being in a rear channel (Ls,Rs) group having multiple channels, the first sampling frequency being assigned to each of the channels in the first channel group, the second sampling frequency being assigned to each of the channels in the second channel group, the bit shift having a quantity common to the channels in the second channel group;

the audio title set (ATS) including data representing the first quantization word length and first sampling frequency and the second quantization word length and second sampling frequency, data representing the quantity of the bit shift and channel assignment information for identifying the channels in the first channel group and the channels in the second channel group.

* * * * *